United States Patent [19]

Murphy et al.

[11] Patent Number: 5,768,148

[45] Date of Patent: Jun. 16, 1998

[54] MAN MACHINE INTERFACE FOR POWER MANAGEMENT CONTROL SYSTEMS

[75] Inventors: Thomas A. Murphy, Southington, Conn.; Kelley E. Gourley, Minneapolis, Minn.; Cliff John Winkel, Eagan, Minn.; Bret William Bolte, Ramsey, Minn.

[73] Assignee: General Electric Company, New York, N.Y.

[21] Appl. No.: 627,349

[22] Filed: Apr. 3, 1996

[51] Int. Cl.[6] .................................................. G01R 21/00
[52] U.S. Cl. ............................................ 364/492; 345/332
[58] Field of Search ........................... 364/492; 395/332, 395/334, 339, 340, 346, 347, 348, 356; 340/825.06, 825.16; 345/332, 334, 339, 340, 346, 347, 348, 356

[56] References Cited

U.S. PATENT DOCUMENTS

| | | | |
|---|---|---|---|
| 4,975,865 | 12/1990 | Carrette et al. | 364/573 |
| 5,381,462 | 1/1995 | Larson et al. | 379/107 |
| 5,408,603 | 4/1995 | Van de Lavoir et al. | 395/349 |
| 5,557,545 | 9/1996 | Löffel et al. | 364/550 |

Primary Examiner—Emanuel Todd Voeltz
Assistant Examiner—Thomas Peeso
Attorney, Agent, or Firm—Carl B. Horton; Fishman, Dionne, Cantor & Colburn

[57] ABSTRACT

A utility for rapid development of three dimensional representations of electrical distribution switchgear is provided. These switchgear elevations have logical connections to the switchgear devices. An elevation can be modified to any dimensions with an infinite number of combinations and arrangements of meters and protection devices to quickly and accurately represent a customer's switchgear. Also, an event logger utility is provided for viewing, organizing and analyzing unusual behavior in a power system. The event logger utility passes a received message as an un-acknowledgeable or acknowledgeable alarm or as an event based upon the contents of a initialization file. A utility for the waveform capture is provided for viewing and analysis of waveforms (e.g., Fourier, frequency and/or harmonic analysis) captured by sophisticated metering devices. Waveforms from a device may be super-imposed for analysis. Processing of the collected waveform data to display any one of the eight waveform parameters (i.e., $I_a$, $I_b$, $I_c$, $I_n$, $V_a$, $V_b$, $V_c$, $V_x$) or a combination thereof including an "all" selection in a window tiling format is provided.

14 Claims, 94 Drawing Sheets

File Logic Special

InTouch-WindowViewer-C:\INTOUCH.32\BRET Development

Multilin269 Setup Screen #3

| | |
|---|---|
| Selected Overload Curve: | 0 |
| Default Display Line Code: | 0 |
| Default Display Page Code: | 0 |
| Default Running Cool Time: | Learned |
| Default Stopped Cool Time: | Learned |
| D/A Ouput Parameter: | Unknown: 0x0 |

| | |
|---|---|
| Speed Switch Delay: | 0.0 Sec. |
| Spare Input Alarm Delay: | 0 Sec. |
| Spare Input Trip Delay: | 0 Sec. |
| Backspin Timer Setpoint: | 0 Sec. |
| Time Between Starts | 0 Sec. |
| Default K: | 0 |

| | | | |
|---|---|---|---|
| Trip Time at 1.05 x FLC: | 0 Sec. | Trip Time at 3.00 x FLC: | 0 Sec. |
| Trip Time at 1.10 x FLC: | 0 Sec. | Trip Time at 3.50 x FLC: | 0 Sec. |
| Trip Time at 1.20 x FLC: | 0 Sec. | Trip Time at 4.00 x FLC: | 0 Sec. |
| Trip Time at 1.30 x FLC: | 0 Sec. | Trip Time at 4.50 x FLC: | 0 Sec. |
| Trip Time at 1.40 x FLC: | 0 Sec. | Trip Time at 5.00 x FLC: | 0 Sec. |
| Trip Time at 1.50 x FLC: | 0 Sec. | Trip Time at 5.50 x FLC: | 0 Sec. |
| Trip Time at 1.75 x FLC: | 0 Sec. | Trip Time at 6.00 x FLC: | 0 Sec. |
| Trip Time at 2.00 x FLC: | 0 Sec. | Trip Time at 6.50 x FLC: | 0 Sec. |
| Trip Time at 2.25 x FLC: | 0 Sec. | Trip Time at 7.00 x FLC: | 0 Sec. |
| Trip Time at 2.50 x FLC: | 0 Sec. | Trip Time at 7.50 x FLC: | 0 Sec. |
| Trip Time at 2.75 x FLC: | 0 Sec. | Trip Time at 8.00 x FLC: | 0 Sec. |

Metering | Statistics | Alarms | Setup 1 | Setup 2 | Setup 3 | Setup 4 | Setup 5 | Setup 6

Device Name: ML269
Group Name: RACK 42
Device Type: Unknown: 0x0
Hardware Rev: N/A
Firmware Rev: 0.0
Firmware Mod: None

| Event | Trend | Help |
|---|---|---|
| Logger | Wave | Exit |

InTouch-WindowViewer-C:\INTOUCH.32\BRET

File  Logic  Special                                    Development

Enhanced MicroVersa Trip-D Monitoring Screen

|  | A | B | C | N |
|---|---|---|---|---|
| Amps: | 0.00 | 0.00 | 0.00 | 0.00 |
| Volts L-N: | 0.00 | 0.00 | 0.00 | Total |
| kW: | 0.00 | 0.00 | 0.00 | 0.00 |
| kVAR: | 0.00 | 0.00 | 0.00 | 0.00 |
| kVA: | 0.00 | 0.00 | 0.00 | 0.00 | kW Demand:        0.00     Volts A-B:
Peak kW Demand:   0.00     Volts B-C:
kWh:              0.0      Volts A-C:
PF:
Frequency:
Breaker Status:   Open
Wires:            3 wire Trip Operations Counter:      Disabled
Sw. Inst/Short Time:          Disabled
Current Unbalance Relay:      Disabled
Gnd Fault ZS1 Selected:       Disabled
Short Time ZS1 Selected:      Disabled Normal Monitoring     Setup Screen Device Name:      RMS9D
Group Name:       DC
Connection:       Delta
Frame Size:       0
Rating Plug:      0
PT Rating:        0
Commnet Address:  0
Modbus Address:   0
Software Rev:     0.00
Product Rev:      Unknown

| Event | Trend | Help |
|---|---|---|
| Logger | Wave | Exit |

Register Mapping Scheme

AMP_A => Current of phase A for a meter identified by DDE topic,
        Register address R30020

VOL_A => Voltage of phase A for a meter identified by DDE topic,
        Register address R30100

R30400 => An item addressed directly with register address.
         No conversion required.

MAN MACHINE INTERFACE FOR POWER MANAGEMENT CONTROL SYSTEMS

BACKGROUND OF THE INVENTION

The invention relates generally to a power management control system and in particular, to a power management control system in which a plurality of power monitoring and control devices are coupled to a computer through a common bus.

In today's power management control systems, a variety of power monitoring or control devices are connected to a common bus which allows the power monitoring or control devices to communicate with a server. One standard protocol used for communicating between the server and the power control and monitoring devices is the Modbus RTU standard. There are many Modbus RTU/DDE Servers commercially available for a wide variety of applications. All major electrical distribution companies have a similar product. The narrow scope of these servers are their major limitation. These systems expect the client applications (Man-Machine Interfaces) to handle the complexities of the actual power controlling and metering devices. Many of the servers are designed to communicate using a protocol designed for use with only certain devices, family of devices or specially designed devices. Also, not all the servers are able to support any generic Modbus RTU compliant device.

FIG. 1 (herein labeled prior art) is a network diagram of General Electric Co.'s power leader distribution system shown at 98. System 98 comprises a computer 100 having a Commnet network interface card 102 installed in one of its I/O slots. The computer contains software for monitoring and controlling selected aspects power usage/consumption. Card 102 provides a Commnet I/O port which defines a Commnet bus 104. As is known, trip units 106, e.g., Trip, Enhanced Trip-D, Trip PM and Enhanced Trip-C Units, which are commercially available from General Electric Co., are connected for communication over bus 104. Meters 108, e.g., Power Leader Meters commercially available from General Electric Co., are connected for communication over bus 104. Relays 110, e.g., Spectra ECM and General Electric Co.'s Power Leader MDP, are connected for communication over bus 104. Control devices 112, e.g., Multilin models 269 and 565, are connected through product interface modules 114 for communication over bus 104. The product interface modules 114 are required, as these control devices are not directly compatible with the Commnet bus. Communication rates on the Commnet bus are relatively slow by today's standards. Further, the Commnet bus is a protocol of General Electric Co. and not an industry standard. Accordingly, many commercially available devices, in particular non General Electric Co. devices, are not compatible with the Comment bus. There is a need to standardize bus protocol in this industry, whereby a customer will be able to configure and/or purchase replace devices or upgrades from a number of manufactures.

Another power monitoring system is described in U.S. Pat. No. 5,381,462 entitled "Utility Monitor Communications Systems." The system includes a meter reading terminal which gathers data from utility meters and sends that data to a utility company's host computer via phone lines. The system uses a variety of error-detection procedures and communications protocols to ensure a high degree of reliability in communicating data to and from the central office and the meter reading terminal. The system also allows immediate interruption of communications should the customer attempt to use the telephone line.

SUMMARY OF THE INVENTION

The above discussed and other drawbacks and deficiencies of the prior art are overcome or alleviated by the power management control system of the present invention. In accordance with the present invention, the power management control system comprises a computer having standard RS485 interface cards and adapters installed in its I/O slots defining multiple industry standard Modbus RTU networks. The computer contains software for monitoring and controlling selected aspects of power usage/consumption, as described in more detail hereinafter. The Modbus RTU protocol is a well known industry standard. Devices with a Modbus RTU interface can be connected directly to the Modbus and other devices which communicate on the Commnet protocol require a Modbus concentrator. The Modbus concentrator provides an interface between the Modbus RTU protocol and the Commnet protocol, whereby these other devices can communicate through the Modbus concentrator over the Modbus. Alternatively, standard Ethernet interface cards and adapters are installed in the computer's I/O slots defining multiple standard Ethernet TCP/IP networks. The Ethernet TCP/IP protocol is a well known standard, which would allow a user of the power management control system of the present invention to use its existing LAN. The use of an existing LAN may significantly reduce installation cost of the system, since much of the system wiring may already be in place. Ethernet gateways are connected to the Ethernet TCP/IP networks to provide an interface between the Ethernet TCP/IP protocol and the Modbus RTU protocol. Connections to any one of the Modbus RTU networks are the same as described above.

Software for monitoring and controlling selected aspects of power usage/consumption is loaded into the computer as described above and includes a dynamic data exchange (DDE) server. The DDE server allows external programs to access power management data in a Microsoft Windows environment. Data interface to the DDE server is provided by the system through the Wonderware Intouch utility or any other DDE aware program. The DDE server configuration and control interface is provided through DDE server application window menus. The DDE server supports DDE aware clients such as Excel or other modules, which include a waveform capture module, an event logger module, productivity modules, and a Wonderware Intouch module. The Wonderware Intouch module includes a tool kit for building screens and interfaces, and a graphical user interface for monitoring and controlling the electrical distribution system.

The waveform capture module provides for viewing and analysis of waveforms (e.g., Fourier, frequency and/or harmonic analysis) captured by sophisticated metering devices. The waveform capture module includes a utility that provides an interface to configure and display data from a device that transmits waveform data. These devices transmit waveform data with different formats. One uniform display format is desired for these different types of meters. This utility applies header information transmitted by the meter to correctly scale and display the comma separated value data transmitted by the devices as applicable. Waveforms from a device may be super-imposed for analysis. Processing of the collected waveform data to display any one of the eight waveform parameters (i.e., $I_a$, $I_b$, $I_c$, $I_n$, $V_a$, $V_b$, $V_c$, $V_x$) or a combination thereof including an "all" selection in a window tiling format is provided.

The event logger module provides for viewing, organizing and analyzing unusual behavior in a power system. The event logger module includes a utility that passes a received message as an un-acknowledgeable or acknowledgeable alarm or as an event based upon the contents of an initialization file. Electrical meters and control/protection devices use various codes to describe occurrences to the circuits that are monitored or controlled. A file collates these codes into three categories for analysis. These three categories for any particular device are modifiable for the code received from a device.

The productivity modules include. for example, a cost allocation module and a load management module. The cost allocation module provides for tracking power consumption to the sub-unit level, developing internal billing methods and reports, thereby reducing cost. The load management module provides for tracking power demand and automatically shedding non-critical loads to prevent peak demand penalties, and provides for timer-based control to reduce power consumption.

The Wonderware Intouch module includes a software toolkit for rapid development of three dimensional representations of electrical distribution switchgear. These switchgear elevations have logical connections to the switchgear devices. An elevation can be modified to any dimensions with an infinite number of combinations and arrangements of meters and protection devices to quickly and accurately represent a customer's switchgear. The PowerWizards eliminate the necessity to draw each individual component line by line. The user starts by selecting a cabinet wizard to which handles, panels, and fasteners are added. Thereafter, circuit breakers, meters and other protection devices are located or dropped onto the appropriate panels in the same locations as the customer's actual switchgear. These items have dialog boxes associated with them. From this dialog box a navigational link is established to another window that contains another PowerWizard that displays detailed metering. configuration. and control information.

The Wonderware Intouch module includes a tabular representation of metering and setup/set point information that is generated automatically, with the appropriate database server links established. A rapid method to accurately generate a user interface for power distribution metering, protection, and control devices with the capability to repeat this interface repeatedly for many devices of the same type while maintaining the capability to uniquely identify a device is provided. The invention allows the user to generate a power distribution device interface without programming skills or detailed knowledge of the device. The PowerWizards instantly develop a standard looking interface for a particular device type. These PowerWizards also create from this standard interface, unique database links that the user defines by selecting a name and entering in this name from a PowerWizard dialog box. In this way the same wizard may be used over and over again but can be logically distinguished from another via the user defined name for a device entered in the PowerWizard dialog box. All margin for error that may have occurred in manually entering in the data access links to a database server are removed by the PowerWizards' capability to set them up automatically using a unique user defined device name.

The DDE server provides a mnemonic cross reference between register items and standardized, alphanumeric parameter names. This mnemonic interface allows the user to retrieve data from a device without knowledge of the actual device register item number. The DDE server further provides a consistent device event data item for dissimilar devices. Also, the DDE server automatically performs time synchronizing for all supported devices and provides a consistent waveform interface. The DDE server is optimized for either the Modbus RTU or Ethernet protocol.

Every Windows application is registered in a Windows kernel with an application name. To uniquely identify a data item for communication between two cooperating (DDE aware) Windows applications. the data item is identified by tuple (Application, Topic, Item). Topic name provides a grouping and item name specifies the actual data point to be accessed under a topic. For the DDE server, the application name is the server's executable name. Topic name can be the device identification name and item name can be the register identification of a field data point. For example, with a General Electric Co. EPM meter, the tuple can be GE16MODB, EPM1, AMP_A where GE16MODB is the Application name for a DDE Server, EPM1 is the meter identification name, and AMP_A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

The DDE server uses a toolkit which is used to maintain DDE communications. Registers can be classified into Fast Poll Registers, Slow Poll Registers and Poll Once Registers. Fast Poll Registers are polled at a rate defined by 'Scan Interval' which is entered during device/topic configuration. 'Slow Poll' registers are polled n times slower than 'Fast Poll' registers. 'Poll Once' registers are polled when a device status changes from DEAD to ACTIVE. The DDE server acts as a link between a client requesting device data and a field device which can provide the data. The DDE server communicates to the field device through communication ports and to the client via a DDE message link. A client sends its requests to the server to read/write some device registers. The server maps each request to suitable device read/write request packets and carries out the necessary transaction with the device. Then it relays the result back to the client after processing and casting specific data types to the proper format. Set points registers are downloaded based on a request from a DDE client, i.e., a program which request data items from the DDE server and accepts data through the DDE. Apart from reporting contents of normal device registers, the server can also collect special data like waveform capture/recording data from the device and pass it to the client.

The DDE server maps item names to their register addresses. The name mapping database and functions are implemented in such a manner that underlying server does not get affected when new naming conventions for an item are to be implemented. Preferably an off-line utility builds a device mnemonic to register address map. The DDE server supports the following data types; signed integer, unsigned integer, signed long, modulus 10000, floating point numbers in IEEE format, discrete bits, and an array of any of the above data types.

The Modbus concentrator accepts time register write requests for all devices connected to it but it will not change the time register value of any device in response to write requests. The time registers for all the devices connected to a Modbus concentrator will be changed only when the server synchronizes time with the concentrator. Periodical time download by the concentrator to selected devices are performed even if it may not have any effect on that particular device. Time synchronization for other devices are performed as per the register format specified for the device register maps.

The DDE server maintains current status (DEAD/ACTIVE) of all active topics (devices). This information does not have any direct register associated with the device topic name and hence a pseudo item called 'STATUS' is maintained by the DDE server. If the DDE server does not get a response from any device during 'n' consecutive poll cycles, then that particular device is declared DEAD. The value of 'n' is read from an initialization file. The status of any device will be updated to a client only if a predefined item called 'STATUS' is made active. DEAD devices would be polled with period equal to a dead device scan interval (available in initialization file) instead of device scan interval. DEAD devices will become ACTIVE when they respond to a polling request.

In general, the DDE server provides appropriate return values as specified for all toolkit functions. i.e., periodic polling packets for active topics and items, periodic polling packets for events and status, periodic update of time to all the devices, data value update to toolkit library for acquired items, event/status report to Intouch so that it becomes part of normal alarm log, and status update for active topics (devices). Set point write requests are properly formatted set point download communication packets for the request. Execution and termination are initiated upon user request from the DDE server window menu.

A system level tester is a software tool that automatically configures itself and assists system integration to reduce the amount of configuration time required. The system level tester automatically identifies some types of device misconfiguration and collects and stores system information for later analysis and reporting. Some systems are constructed in stages and system configuration information needs to be collected in stages and later merged intelligently. Without the system level tester, configuration of the system was performed with the DDE server combined with a man-machine interface. This approach requires correct setup by the operator of both the DDE server and the man-machine interface. The system level tester provides a self-configuring system which eliminates operator error in configuring the system. By eliminating operator error in configuring the system, communications failures could only be the result of misconfigured devices or network cabling. This significantly reduces system integration effort.

The Modbus concentrator is generally a multiple channel data converter/multiplexer which translates data between two protocols for multiple metering and protective devices (i.e., between General Electric Co.s' Commnet peer to peer network protocol and the industry standard Modbus RTU protocol). The concentrator acts as a pseudo host for Commnet devices and as a pseudo slave for each device in the Modbus RTU network. The concentrator creates virtual Modbus devices for every physical Commnet device attached to its multiple channels. Multiple channels allow parallel processing for data conversion, improving the throughput of the network in which it is utilized. Further, the concentrator autoconfigures itself by seeking all the devices attached in the Commnet channels and storing this information in a configuration database which is used to determine address conflicts among the attached Commnet devices. Multi-channel data collection and conversion decreases data latency of all the devices attached to the concentrator. The virtual devices created in the concentrator act as if they were any other slave device in the network. The concentrator device is transparent in the system. The autoconfiguration and address conflict reporting decreases the amount of time needed to configure the devices. The autoconfiguration also eliminates any errors that could be caused by a user during device configuration by automatically seeking only valid devices.

It will be appreciated that a programmable logic controller could be programmed to perform the same functions of the Modbus concentrator, described above, and that such is within the scope of the present invention.

The Ethernet gateway encapsulates a serial protocol in a LAN packet (TCP/IP). The Ethernet network sends and receives data packets via the LAN to the Ethernet gateway. Packets of serial data, received from the computer are retransmitted by the gateway to remote data monitoring devices on the appropriate serial port, and conversely, data packets received by the gateway on a serial port will be sent to the computer via the LAN. Since, the gateway seeks to retransmit packets received from the LAN, it is very important to ensure that these packets did in fact come from the power management system and not other non-related devices (i.e., authentication and security). This serial-to-Ethernet transfer protocol employs a header which contains information regarding the number of bytes in the serial data packet and a checksum byte that ensures that the header itself has not been corrupted.

The LAN packets transmitted to the gateway by the computer comprise the serial Modbus communications data packet plus a fifteen byte header inserted in front of it. The first ten bytes contain a string of AAhex characters to help identify the packet as a valid General Electric power management packet. The eleventh byte, the port byte, indicates which of the four ports of the gateway the message is to be transmitted on. The twelfth byte, the error status, is zero when the LAN packet is originated by the computer. However, if the LAN packet was originated by a gateway, this byte will contain any serial communications errors (i.e., parity, overrun, framing errors, etc.) that may have occurred when the gateway received the serial packet. The two bytes that follow indicate the number of bytes to follow this fifteen byte header. The last byte of the header contains a one byte checksum for the header.

The Ethernet LAN and the Ethernet gateways are abstracted into a set of network virtual communication ports. The advantages of the network virtual communication ports include; simplified addressing of the monitoring devices that communicate serially; simplified computer software; and allowance of greater code re-use and compatibility between this system and other systems which access serial ports directly from the computer.

The power management and control system also includes a DDE server simulator for simulating supervisory management and control of electrical distribution systems. The DDE server simulator is an alternative DDE server which simulates device values rather than acquiring data from real devices. The DDE interface to the client is identical to the interface with the server, except that the DDE server simulator does not display I/O traffic. The DDE server simulator generates and calculates device data from user generated electrical property profiles and updates DDE compliant clients. The DDE server simulator accepts the actual topics and item names and power profiles are user configurable with an option to apply white noise to the data, which provides true-to-life values to the user. These simulated measured values are used to calculate derived parameters and pre-set arrays provide waveform data in the proper format. Device events and trips can be interjected by the user and properly interpreted by the simulator. The data is passed to the clients via DDE.

The DDE server simulator simulates the modbus register maps of the electrical distribution, monitoring, and control devices. The DDE server simulator also uses the same base configuration as the DDE server (described hereinbefore) and simulates the behavior of a number of communicating devices without being connected to a network.

The DDE server simulator receives different types of inputs. The first type of input is DDE messages, which are received from the clients and mainly comprise a request to send data as identified by Topic and Item name. These messages may also be for setpoint download to the data point identified by Topic and Item names. Devices to be simulated by DDE server simulator will be based on topics configured by the user. A second type of input is configuration data which includes device configuration parameters, device register-map configurations, protocol timer intervals, and protocol time-outs which are input through a configuration utility.

The DDE server simulator consists of modules for performing configuration, simulation of device functions, and servicing DDE clients. The user has to configure server specific parameters and simulator specific parameters. The server specific configuration parameters include topic configuration and server operational parameters. The server specific configuration data is stored in initialization files and other configuration files. Examples of server specific configuration data are device address, topic name configuration, device register map, invalid register addresses, and timer values such as protocol timer intervals and protocol time-out values.

The DDE server simulator simulates supervisory management and control of an electrical distribution system. It should be noted, however, that the simulation of the data produced by remote power control and monitoring devices is not necessarily intended to match the field device characteristics in terms of accuracy and entirety. Communications between the DDE server simulator and the client(s) conforms to the DDE topic and item name conventions, allowing DDE clients to be able to handle data coming from the simulator without any changes. The DDE server simulator simulates parameters for devices which have been configured by user.

The DDE server simulator provides a user the ability to create and monitor a power management control system without physically creating the system. The user interface for the DDE server and the DDE server simulator are substantially the same and the user can operate in either mode with ease. The user can also trigger events (e.g. relay tripping) and monitor the reaction in the power management control system. The DDE server simulator is a powerful tool that significantly reduces the expense in creating a viable power management control system.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIG. 5 is a view of an event/alarm logger window generated by the computer software of FIG. 4;

FIG. 14–28 are views of the Intouch—windowviewer window generated by the computer software of FIG. 4;

DESCRIPTION OF THE PREFERRED EMBODIMENT

Figure 1:
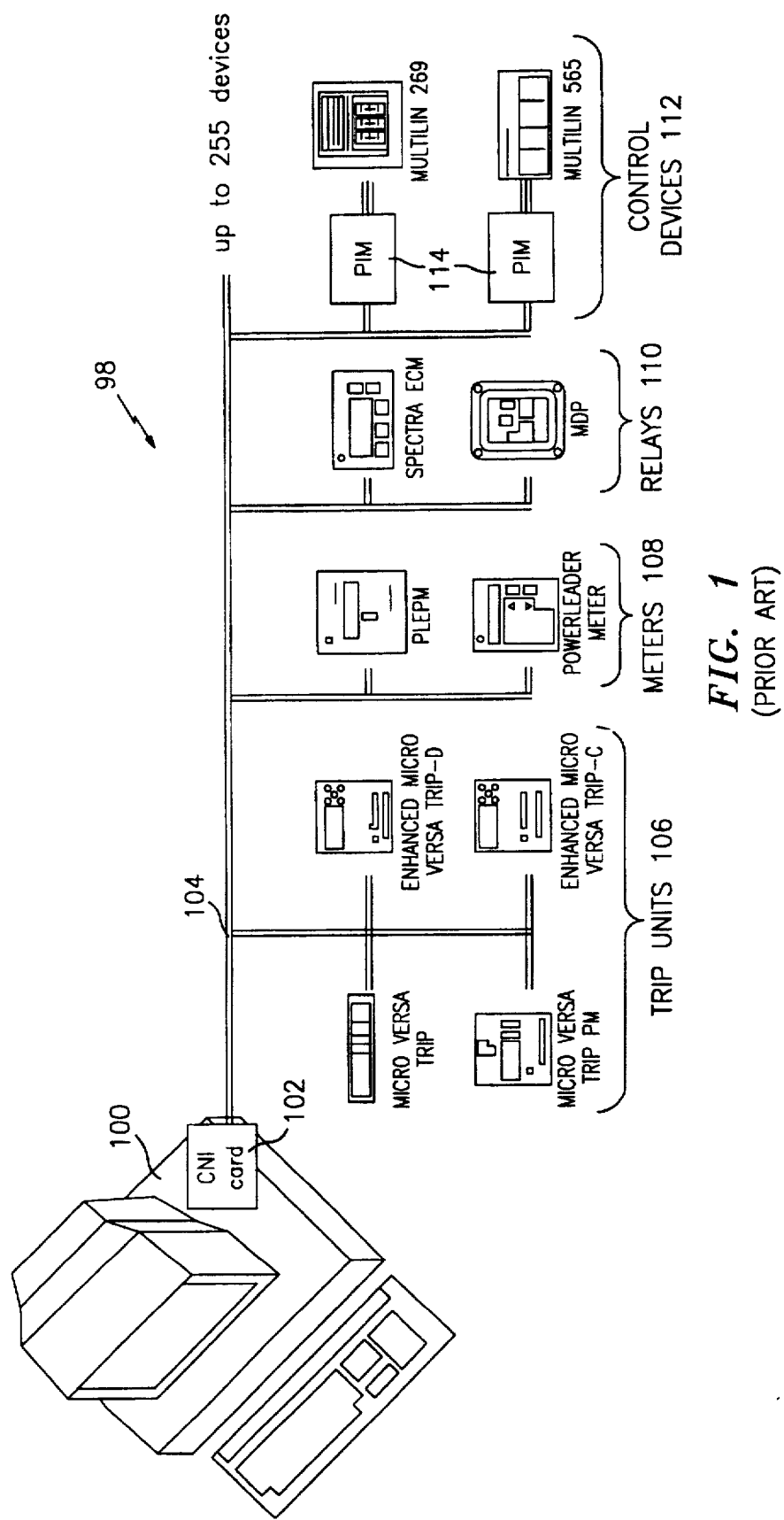
FIG. 1 is a diagrammatic block diagram of a power management and control system in accordance with the prior art.
Figure 2:
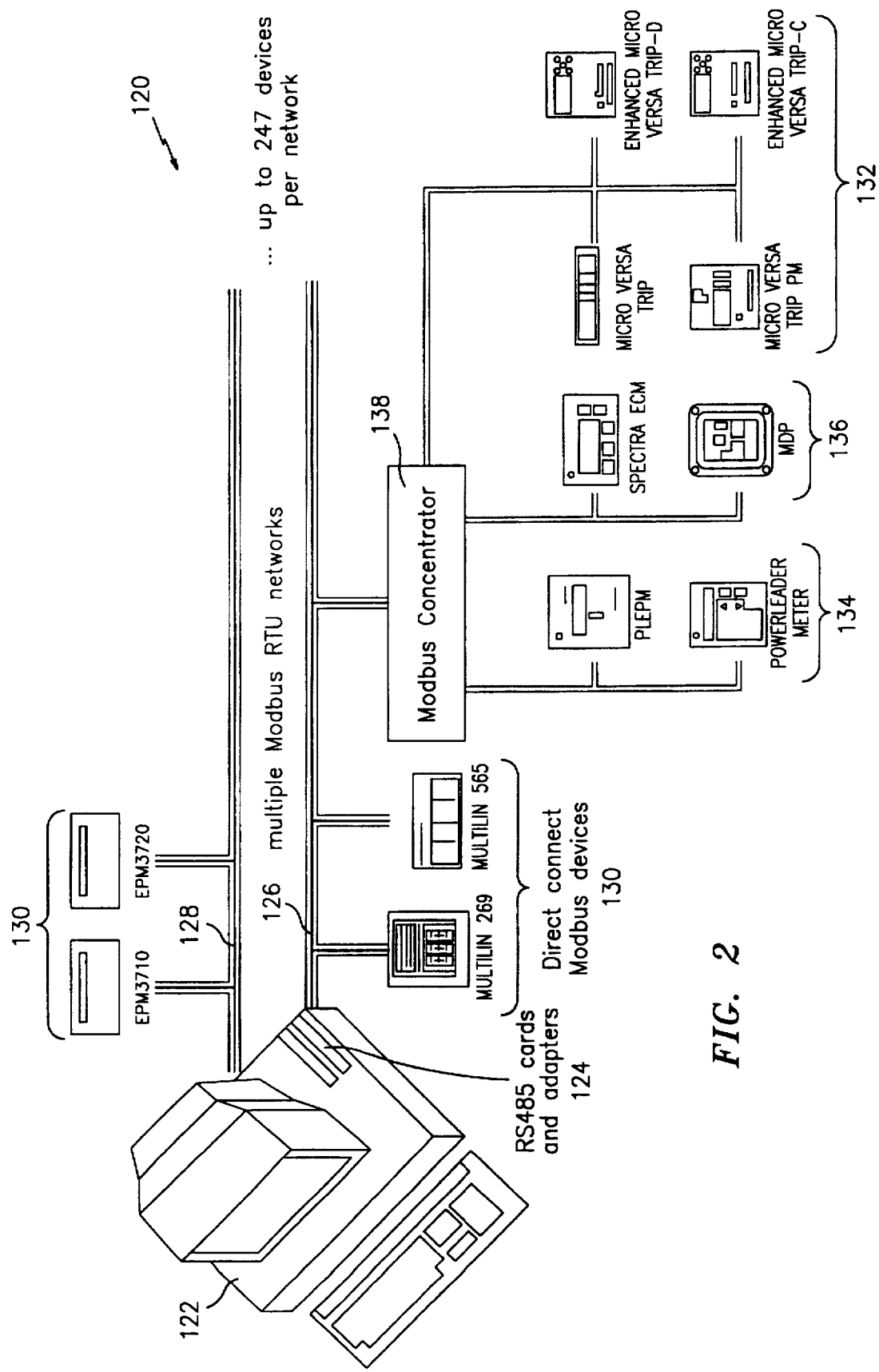
FIG. 2 is a diagrammatic block diagram of a power management and control system in accordance with a Modbus embodiment of the present invention.

Referring now to FIG. 2, a network diagram for the power management control system in accordance with a first embodiment of the present invention is generally shown at 120. System 120 comprises a computer 122, e.g., an IBM-PC AT compatible machine which is based on a Pentium processor, having standard RS485 interface cards 124, or an RS232 to RS485 convertor, and adapters installed in its I/O slots, see, EIA-485, Standard for Electrical Characteristics of Generators and Receivers for Use in Balanced Digital Multipoint Systems. The computer 122 contains software for monitoring and controlling selected aspects of power usage/consumption, as described in more detail hereinafter. Cards 124 provide I/O ports which define multiple industry standard Modbus RTU networks 126 and 128, see, e.g.; "Modicon Modbus Protocol-Reference Guide" Rev. E., Modicon, Inc. In this example, up to eight Modbus RTU networks can be provided from computer 122. The Modbus RTU protocol is a well known industry standard. Devices with a Modbus RTU interface can be connected directly to the Modbus, e.g., control devices 130, such as, Multilin models 269 and 565 and power management EPM 3710 and EPM 3720. Other devices communicate on the Commnet protocol and include trip units 132, e.g., Trip, Enhanced Trip-D, Trip PM and Enhanced Trip-C Units, which are commercially available from General Electric Co., meters 134, e.g., Power Leader Meters commercially available from General Electric Co., and relays 136, e.g., General Electric Co.'s Spectra ECM and Power Leader MDP, are also employed as described above with regard to the prior art. A Modbus concentrator 138 provides an interface between the Modbus RTU protocol and the Commnet protocol, whereby these devices can communicate through Modbus concentrator 138 over the Modbus (again, an industry standard protocol). In this example, up to thirty-two devices (i.e., direct connect devices or Modbus concentrators) can be connected to each Modbus RTU network.

Figure 3:
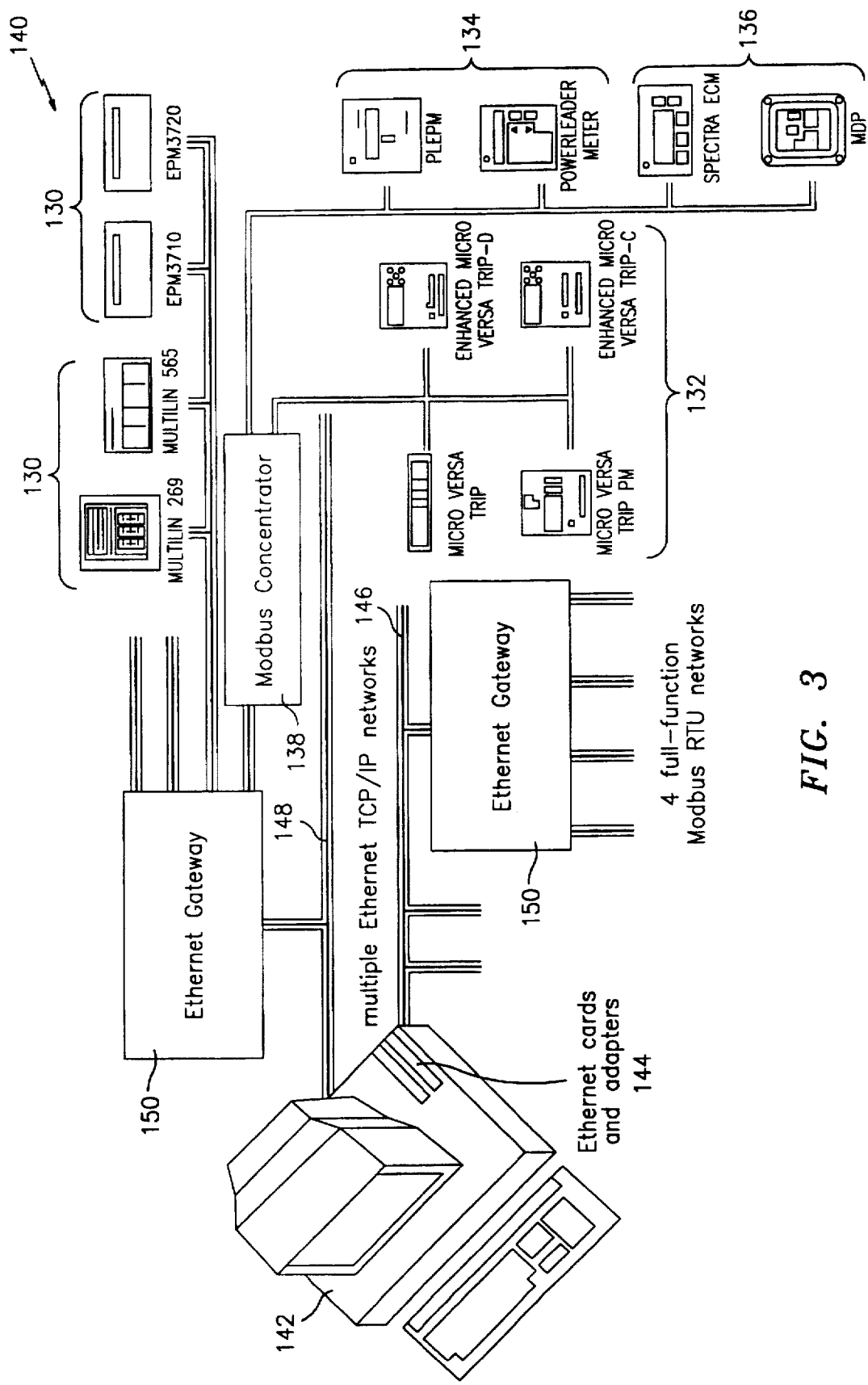
FIG. 3 is a diagrammatic block diagram of a power management and control system in accordance with an Ethernet embodiment of the present invention.

Referring to FIG. 3, a network diagram for the power management control system in accordance with a second embodiment of the present invention is generally shown at 140. System 140 comprises a computer 142, e.g., a PC based computer, having standard Ethernet interface cards 144 and adapters installed in its I/O slots. The computer 142 contains software for monitoring and controlling selected aspects of power usage/consumption, as described in more detail hereinafter. The Ethernet TCP/IP protocol is a well known standard, which would allow a user of the power management control system of the present invention to use its existing LAN. The use of an existing LAN may significantly reduce installation cost of the system, since much of the system wiring may already be in place. Ethernet gateways 150 are connected to the Ethernet TCP/IP networks to provide an interface between the Ethernet TCP/IP protocol and the Modbus RTU protocol. In the present example, each Ethernet gateway 150 provides a connection between an Ethernet TCP/IP network and four Modbus RTU networks.

Connections to any one of the Modbus RTU networks are the same as described with respect to the embodiment of FIG. 2. More specifically, devices with a Modbus RTU interface can be connected directly to the Modbus, e.g., control devices 130, such as, Multilin models 269 and 565, Trip units 132, e.g., Trip, Enhanced Trip-D, Trip PM and Enhanced Trip-C Units, which are commercially available from General Electric Co., meters 134, e.g., Power Leader Meters commercially available from General Electric Co., and relays 136, e.g., General Electric Co.'s Spectra ECM and Power Leader MDP, are also employed as described above with regard to the prior art. Modbus concentrator 138 provides an interface between the Modbus RTU protocol and the Commnet protocol, whereby these devices can communicate through Modbus concentrator 138 over the Ethernet.

Figure 4:
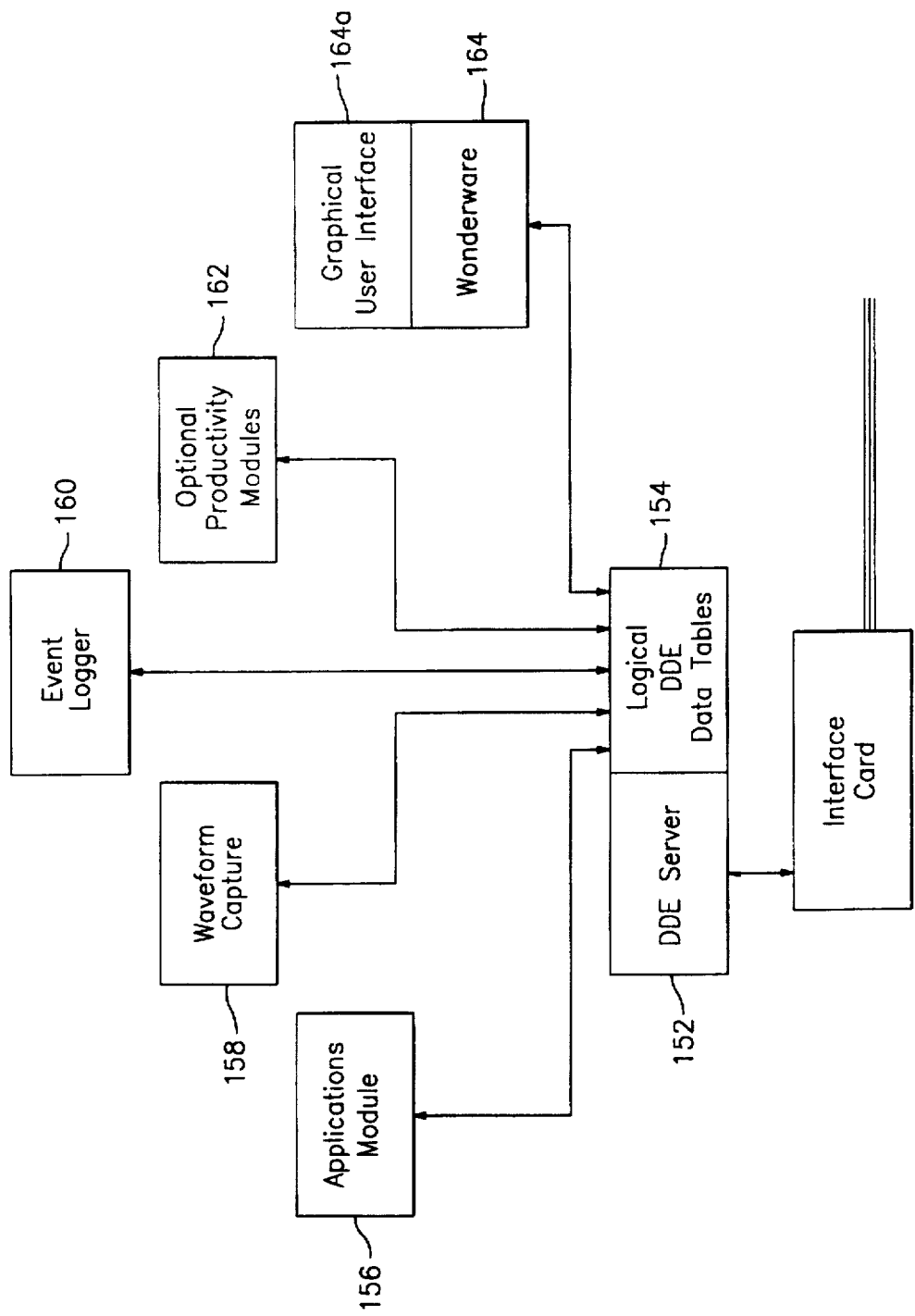
FIG. 4 is a block diagram of the computer software used in the power management and control system of the present invention.

Referring now to FIG. 4, a block diagram of the software for monitoring and controlling selected aspects of power usage/consumption, discussed above is generally shown. This software is loaded into the computer as described above and includes a dynamic data exchange (DDE) server 152. DDE server 152 allows external programs to access power management data in a Microsoft Windows environment. Data interface to DDE server 152 is provided by the system through a Wonderware Intouch utility. The DDE server is a 16 bit application under Windows NT. A configuration and control interface for the DDE server is provided through server application window menus. Associated with DDE 152 are logical data tables 154 and related modules, i.e., an Excel or other DDE aware applications module 156, a waveform capture module 158, an event logger module 160, productivity modules 162, and a Wonderware Intouch module 164. Module 164 includes a tool kit for building screens and interfaces, and a graphical user interface 164a for monitoring and control of the electrical distribution system. The graphical user interface 164a for the server operates in 32 bit Windows or Windows NT environment and Intouch library functions. Module 158 provides for viewing and analysis of waveforms (e.g., Fourier, frequency and/or harmonic analysis) captured by sophisticated metering devices. Module 160 provides for viewing, organizing and analyzing unusual behavior in a power system. Productivity modules 162 include, for example, a cost allocation module and a load management module. The cost allocation module provides for tracking power consumption to the sub-unit level, developing internal billing methods and reports, thereby reducing cost. The load management module provides for tracking power demand and automatically shedding non-critical loads to prevent peak demand penalties, and provides for timer-based control to reduce power consumption. DDE server 152 communicates though the interface card, i.e., the RS485 interface cards 124, or a RS232 to RS485 convertor, in the embodiment of FIG. 2 and the Ethernet interface cards 144 in the embodiment of FIG. 3.

Figure 5:
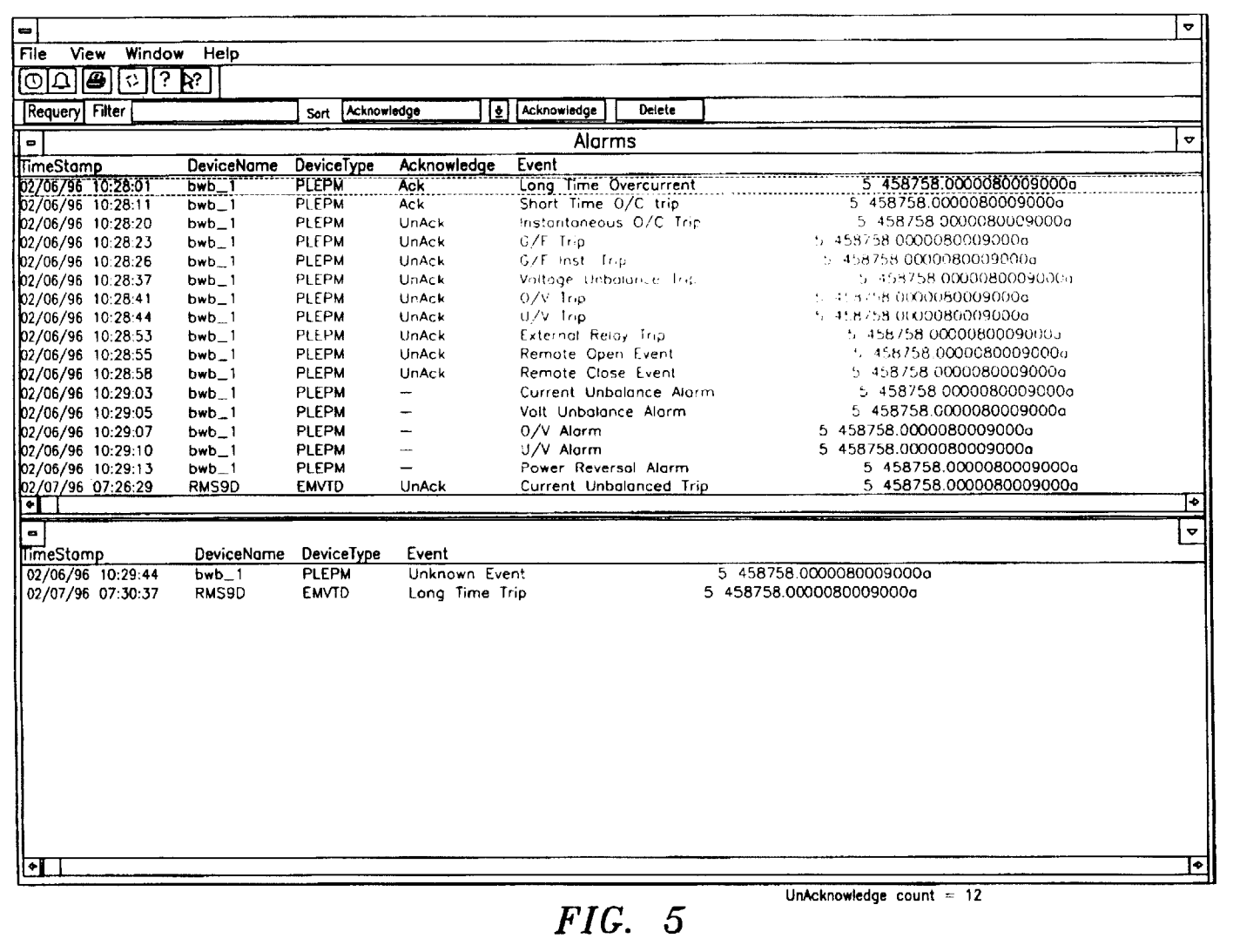

The event logger module 160 includes a utility that passes a received message as an un-acknowledgeable or acknowledgeable alarm or as an event based upon the contents of an initialization file. The DDE server ensures that all events are cast in the same format so that the event logger module 160 can interpret each event. Electrical meters and control/protection devices use various codes to describe occurrences to the circuits that are monitored or controlled. A file collates these codes into three categories for analysis. These three categories for any particular device are modifiable for the code received from a device. Referring to FIG. 5, the utility accesses codes from various types of devices and determines, via a look-up in the file, which of three categories this code shall be reported by. The three categories are 'ACK/UNACK' for acknowledgeable alarms, '-' for alarms requiring no acknowledgment, and events which are merely reports of device status. The key feature is the initialization file which allows new devices to be added or the category for an existing device's code to be modified without rewriting the utility.

Figure 6:
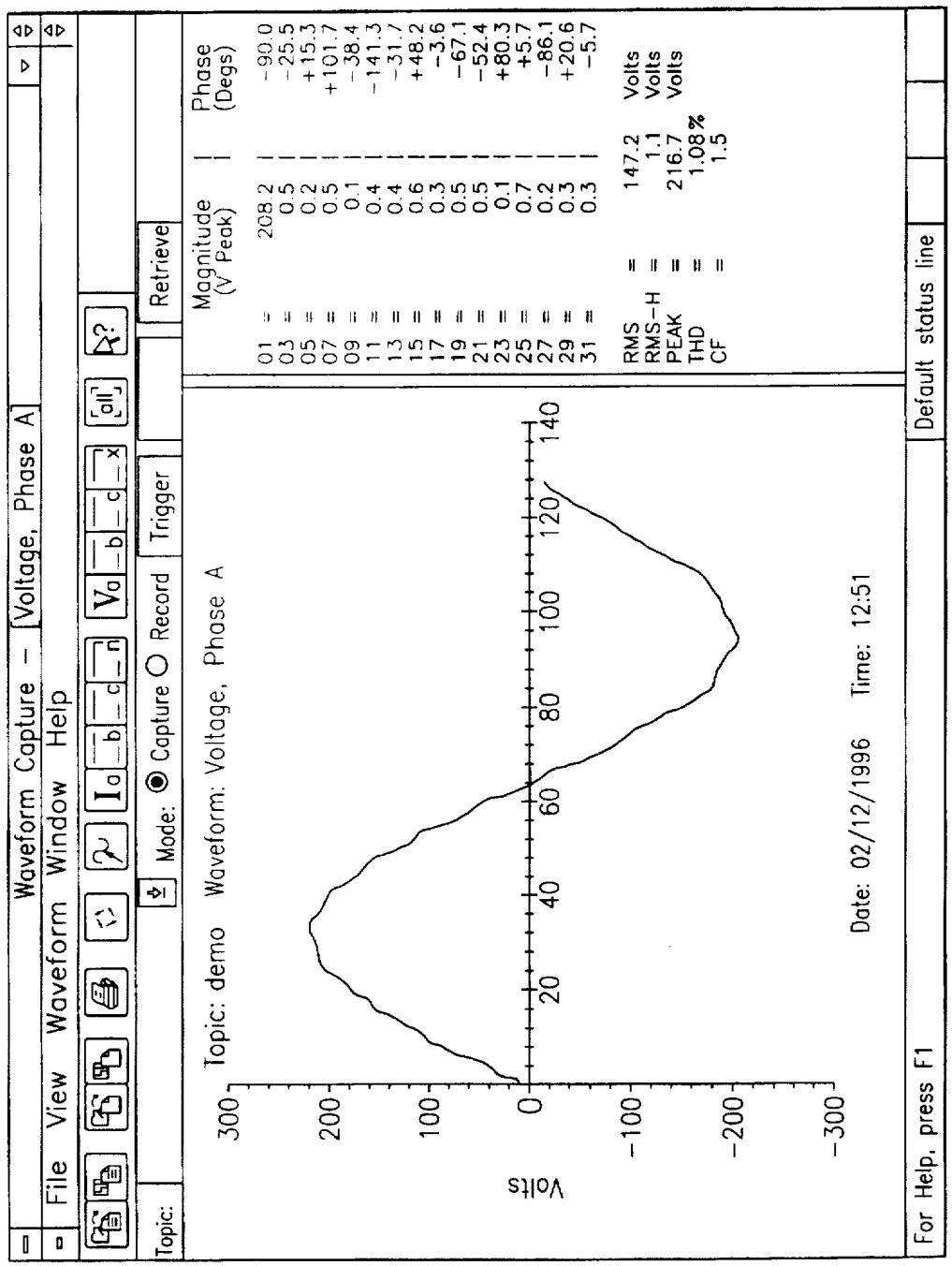
FIG. 6 is a view of a waveform capture-voltage, phase A window generated by the computer software of FIG. 4.
Figure 7:
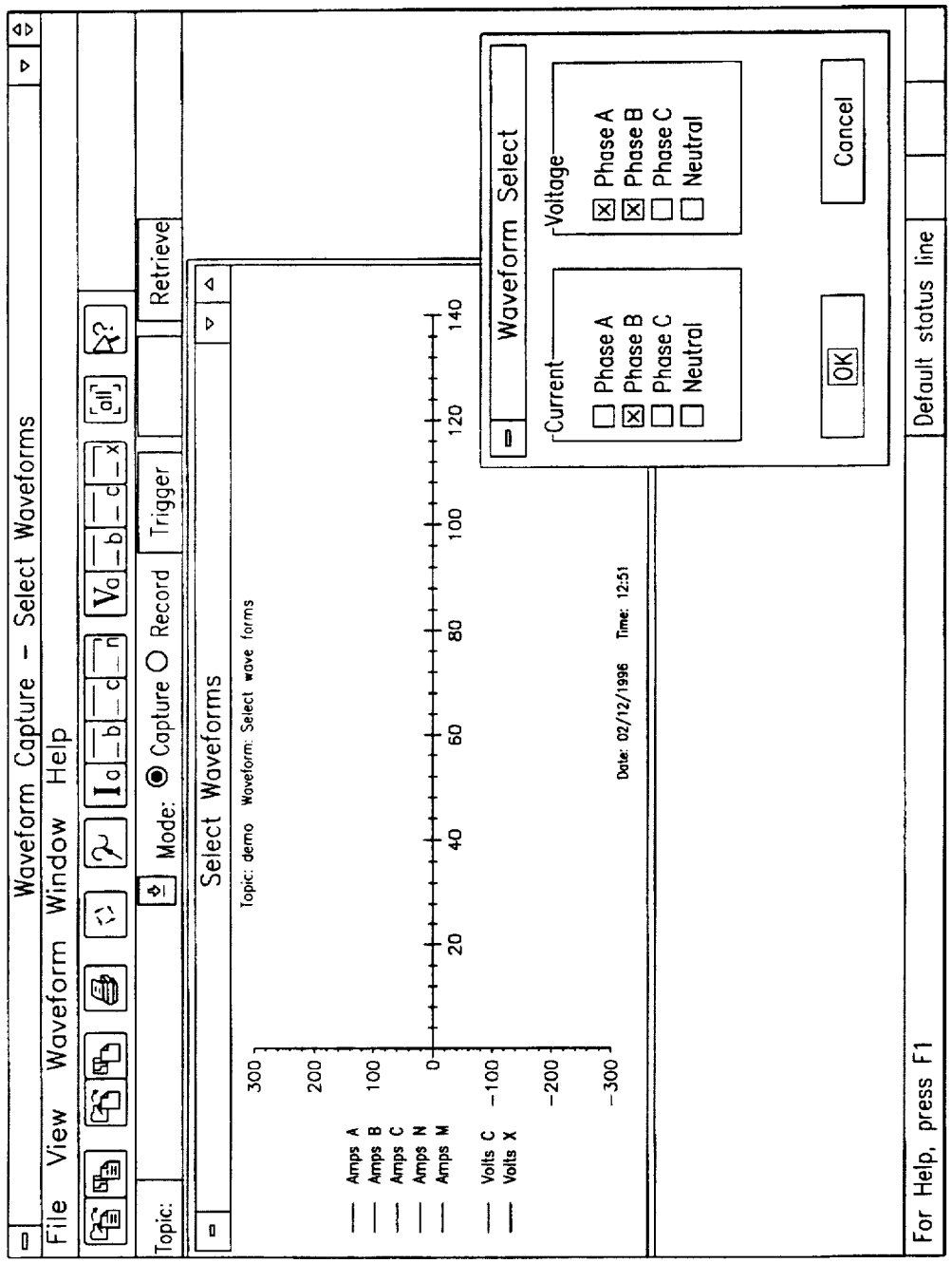
FIG. 7 is a view of a waveform capture-select waveforms window generated by the computer software of FIG. 4.
Figure 8:
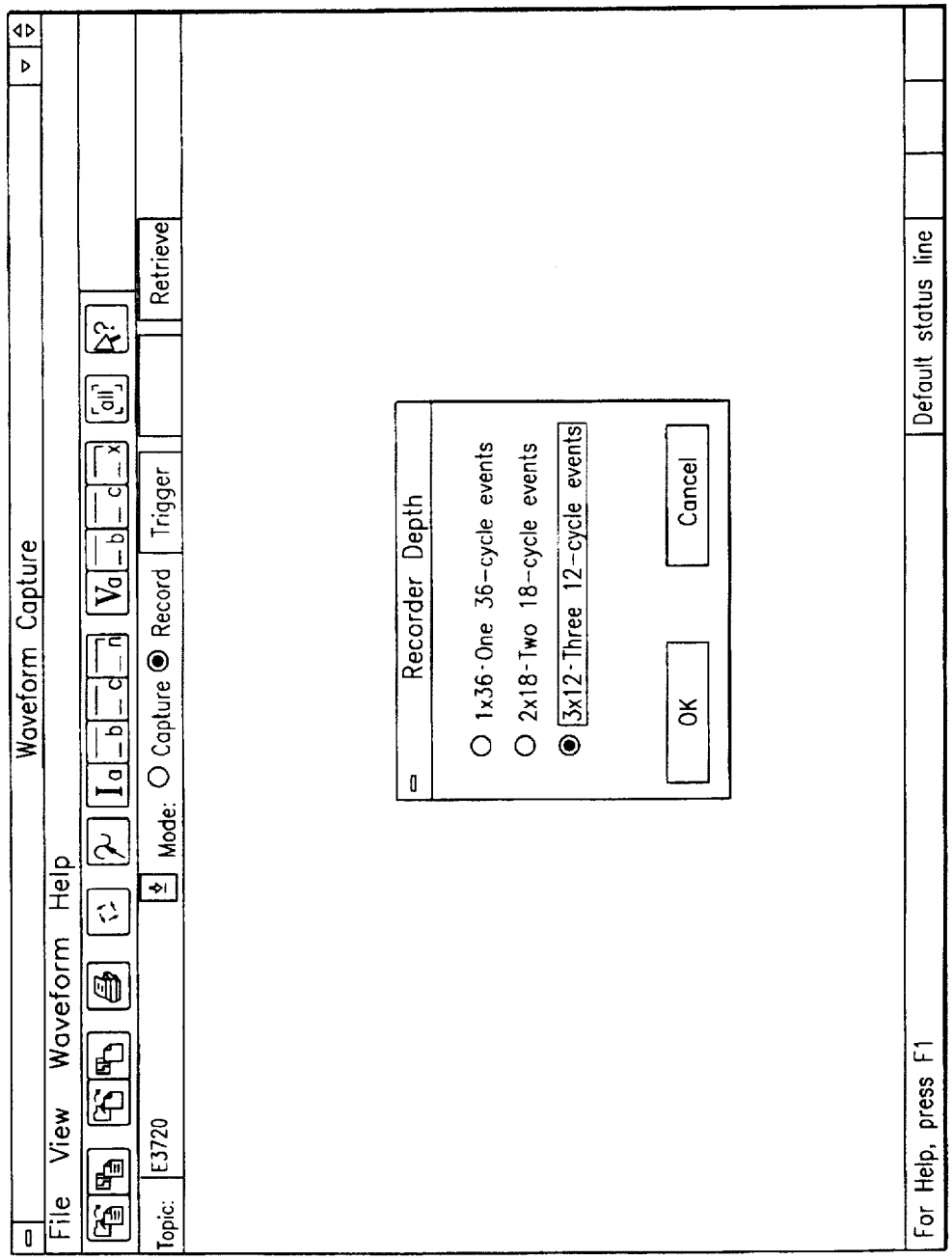
FIG. 8 is a view of a waveform capture window to set device record depth generated by the computer software of FIG. 4.

The waveform capture module 158 includes a utility that provides an interface to configure and display data from a device that transmits waveform data, e.g., a General Electric Co. Power Leader Meter and/or Power Management Ltd.'s EPM3710 & EPM3720 meters. These devices transmit waveform data with different formats. One uniform display format is desired for these different types of meters. This utility applies header information transmitted by the meter to correctly scale and display the comma separated value data transmitted by the devices as applicable. A dialog box interface exists to set the record depth as shown in FIG. 8. Waveforms from a device may be super-imposed for analysis. Referring to FIG. 6, processing of the collected waveform data to display any one of the eight waveform parameters (i.e., $I_a$, $I_b$, $I_c$, $I_n$, $V_a$, $V_b$, $V_c$, $V_x$ or a combination thereof including an "all" selection in a window tiling format is shown. Selections are made through the point and click of the desired parameter. Referring to FIG. 7, the transposing feature which manipulates the collected waveform data to display any of up to eight parameters on a X-Y axis with the correct amplitude and phasing is generally shown. Referring to FIG. 8, a dialog box to set the recorder depth is shown. This dialog, once the OK button is selected, causes the waveform utility to download the correct command sequence to configure the meter. Similarly the "trigger", "arm" and "retrieve" buttons issue the command sequence appropriate for the type of device selected to trigger, arm and retrieve waveform data. The DDE server 152 receives these commands and provides the standard functions for theses actions to the devices.

Figure 9:
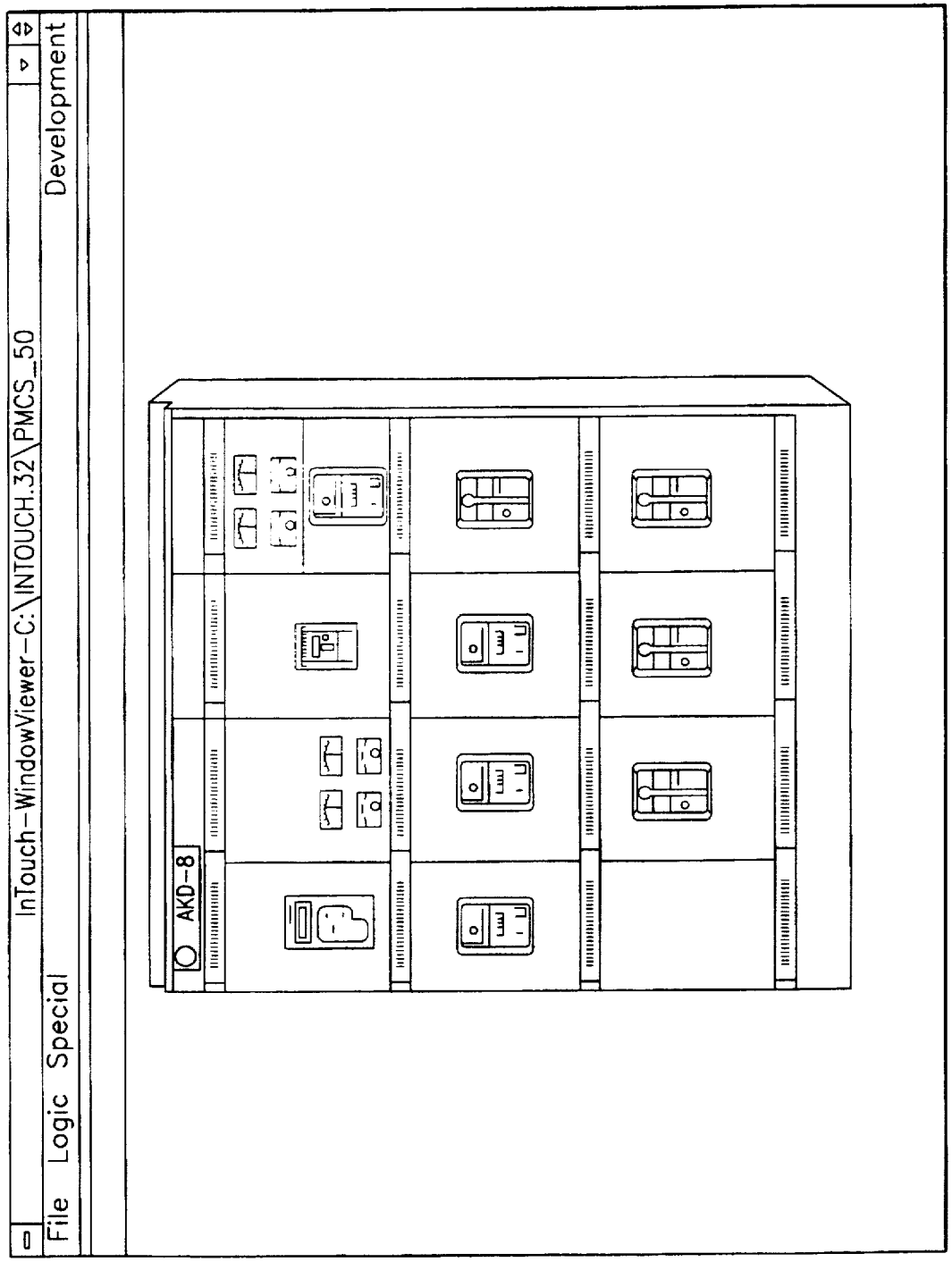
FIG. 9 is a view of an Intouch-windowviewer window showing switchgear elevations generated by the computer software of FIG. 4.
Figure 10:
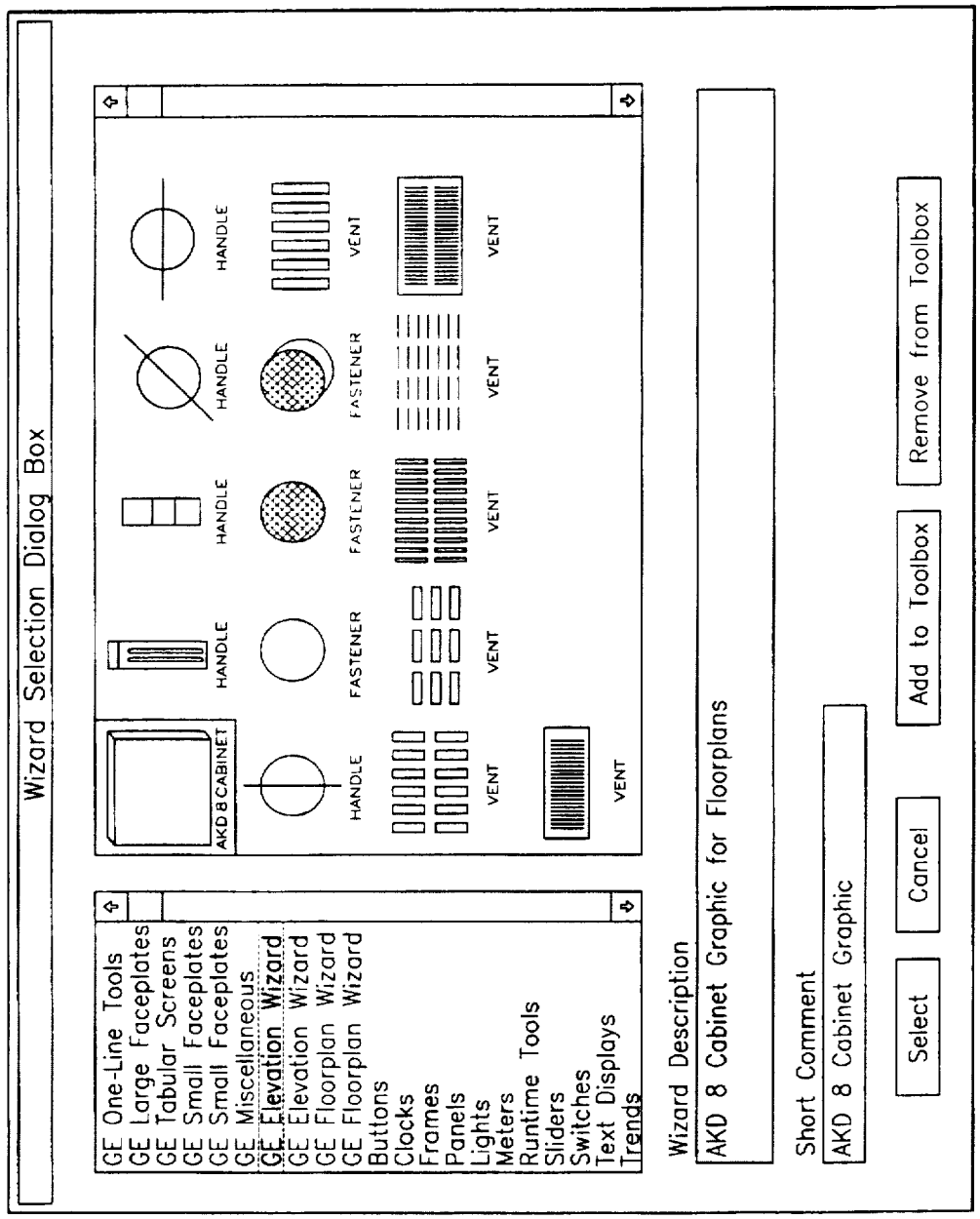
FIGS. 10–13 are views of wizard selection dialog box windows generated by the computer software of FIG. 4.
Figure 11:
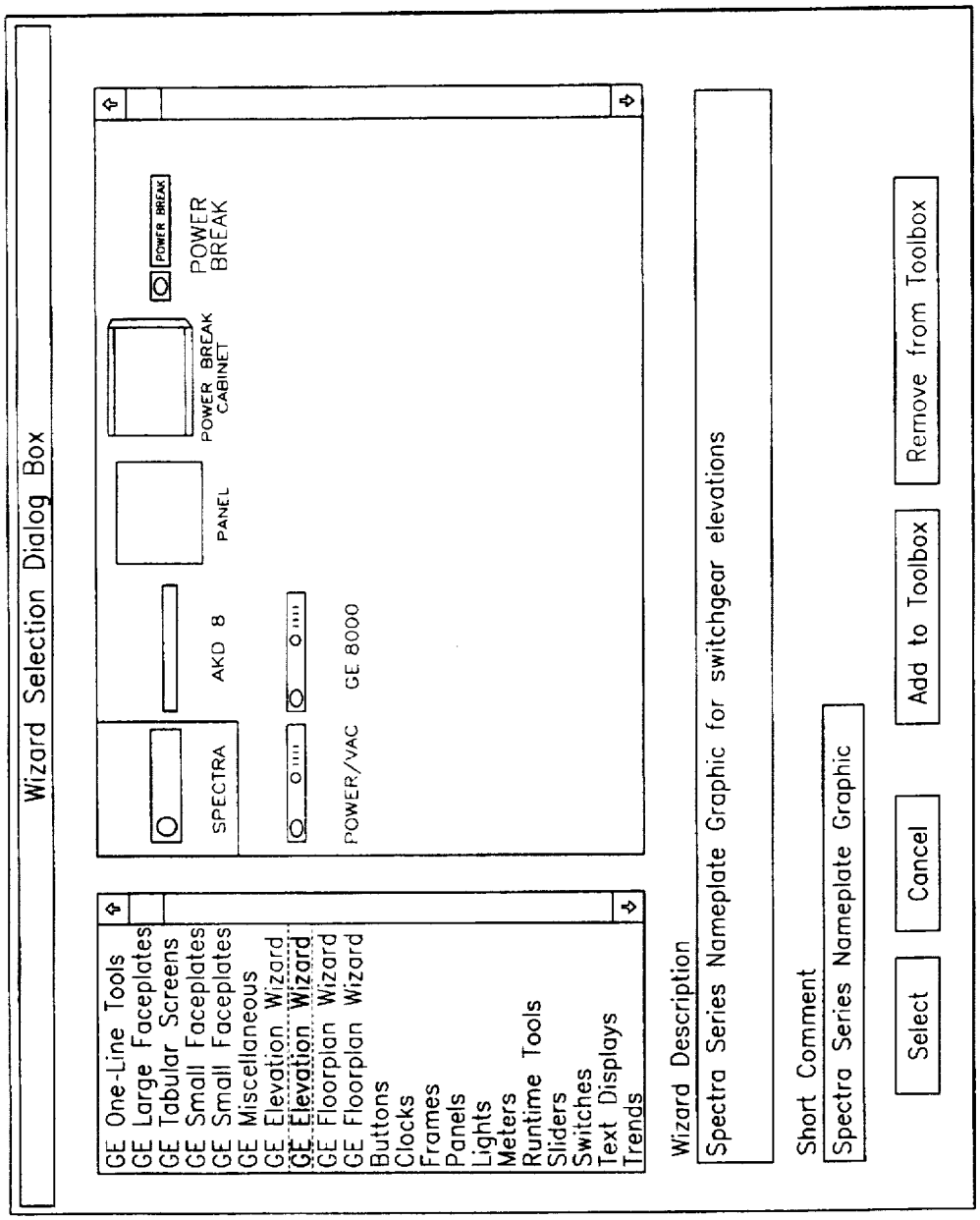
Figure 12:
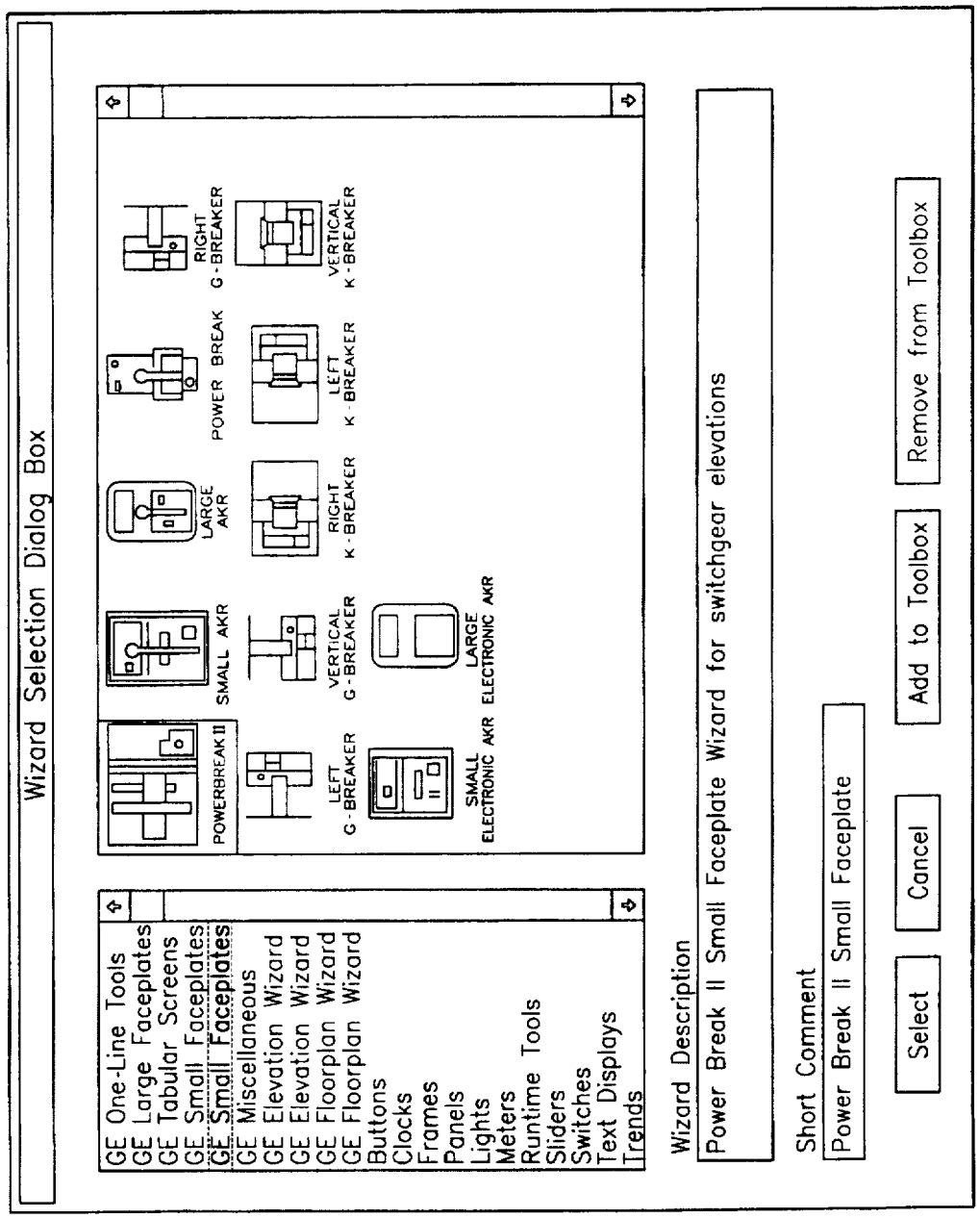
Figure 13:
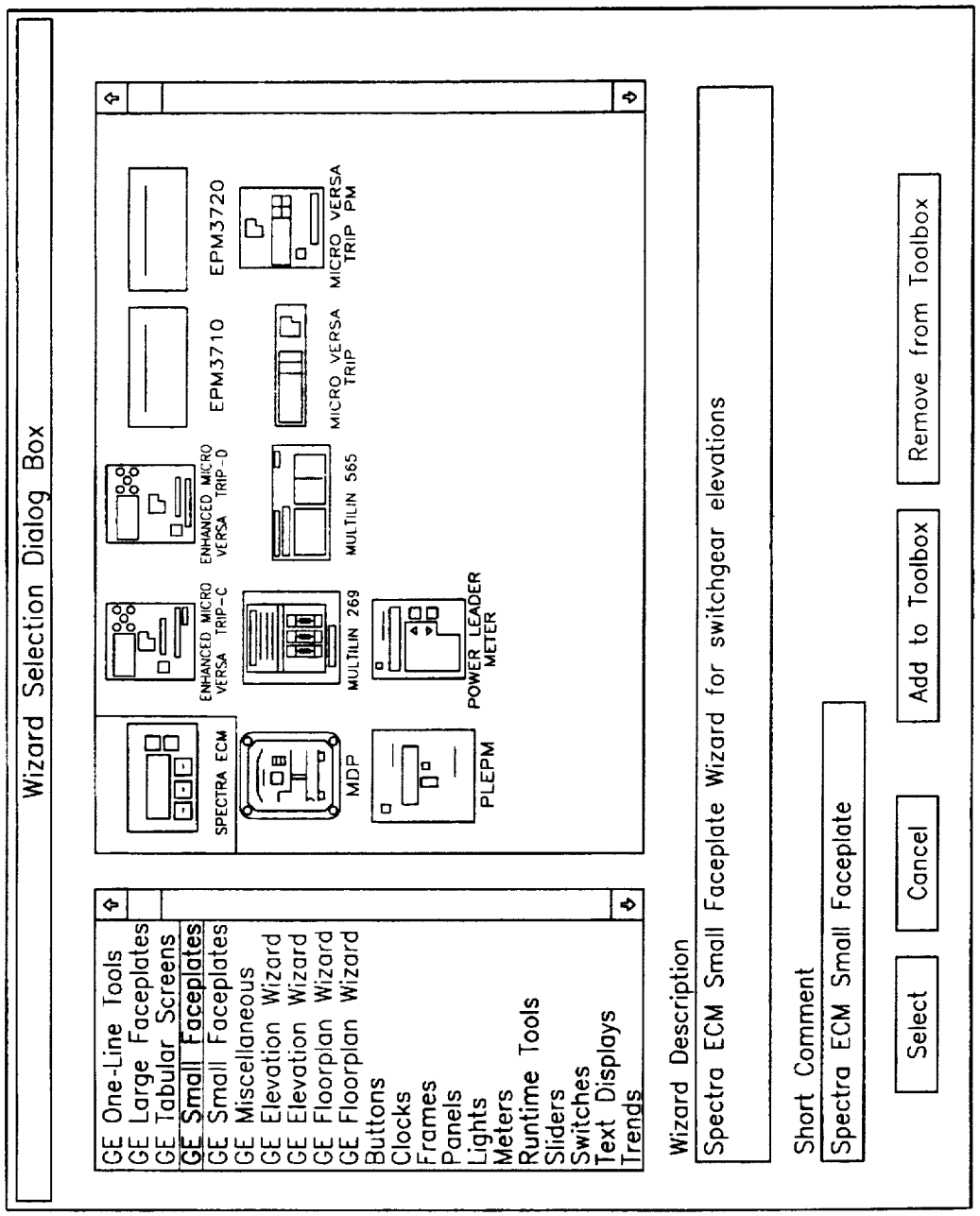
Figure 15:
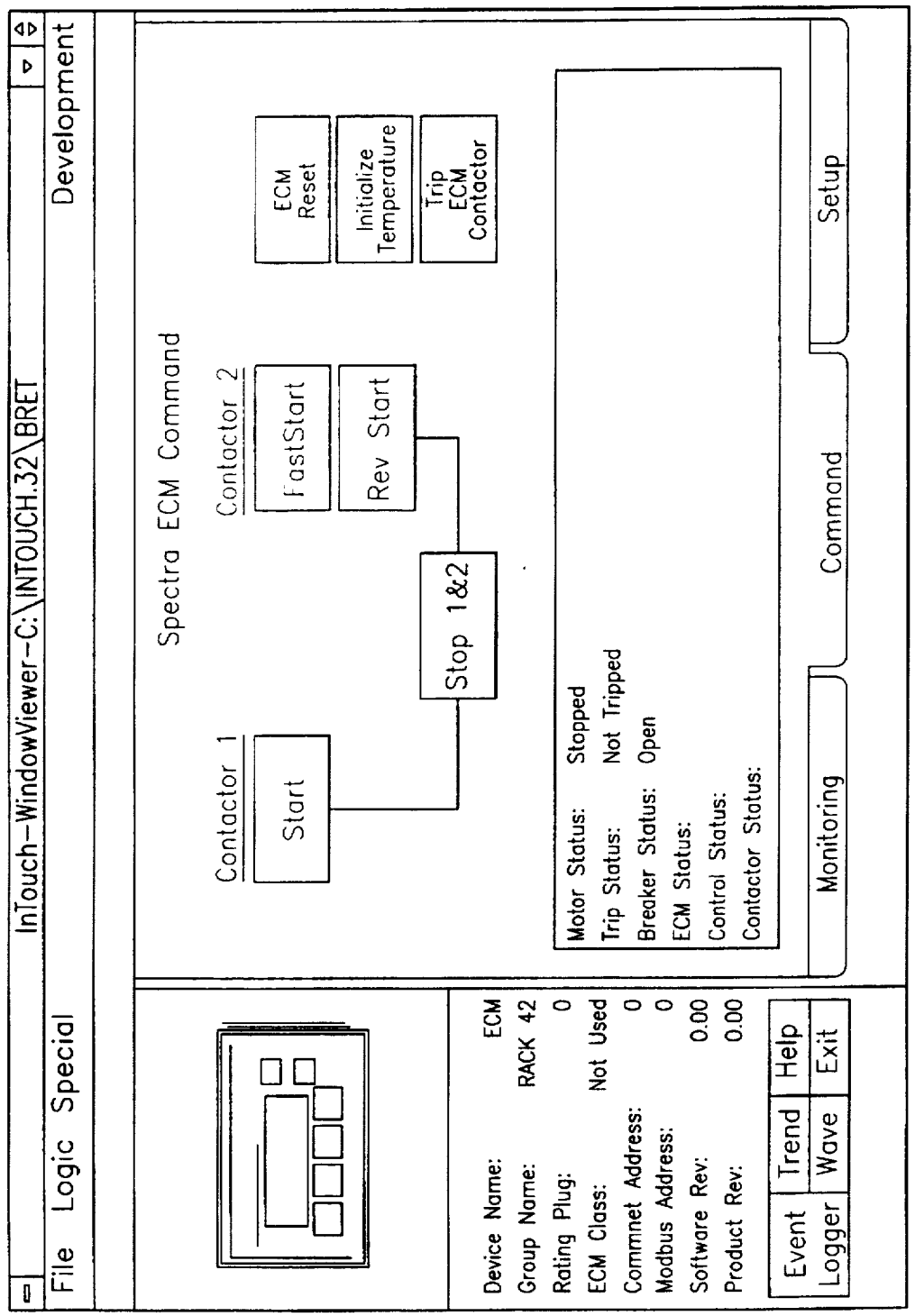
Figure 18:
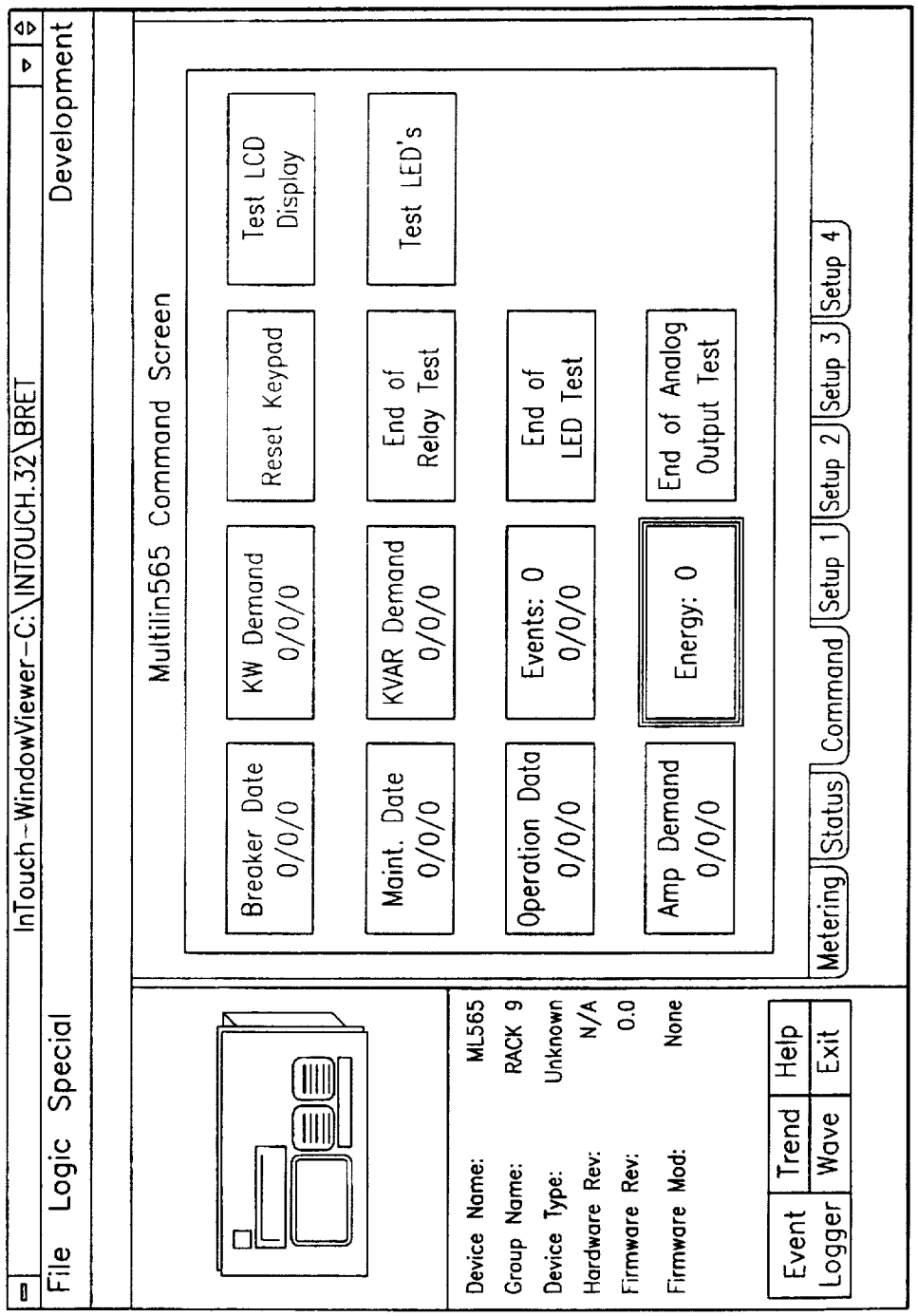
Figure 22:
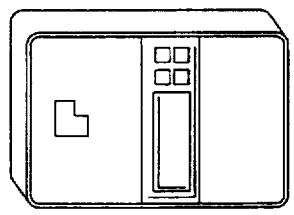
Figure 23:
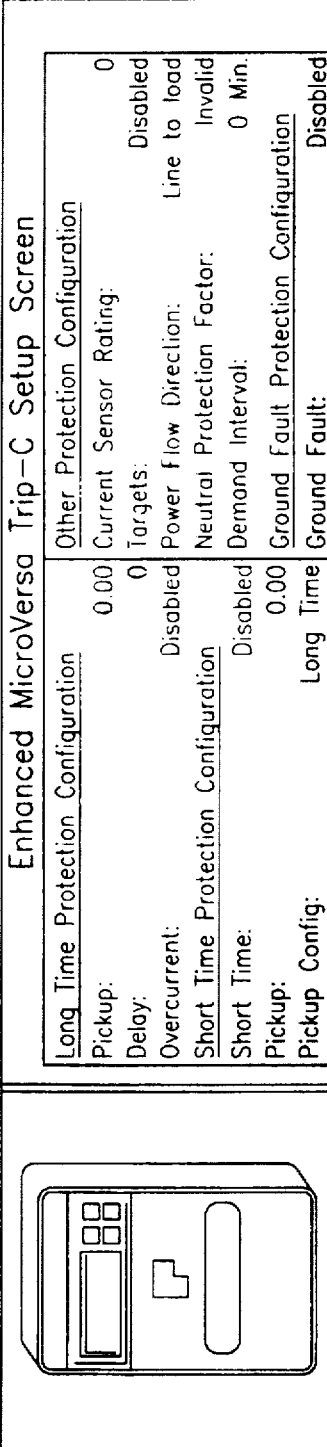

The Wonderware Intouch module 164 includes a software toolkit for rapid development of three dimensional representations of electrical distribution switchgear. These switchgear elevations have logical connections to the switchgear devices. Referring to FIG. 9, a typical switchgear elevation developed with the so-called PowerWizards illustrated in FIGS. 10–13 is shown. This elevation can be modified to any dimensions with an infinite number of combinations and arrangements of meters and protection devices to quickly and accurately represent a customer's switchgear. The PowerWizards eliminate the necessity to draw each individual component line by line. The user starts by selecting a cabinet wizard such as the AKD-8 or Power Break Cabinet to which handles, panels, and fasteners are added, FIGS. 10 and 11. Thereafter, circuit breakers (FIG. 12), meters and other protection devices (FIG. 13) are located or dropped onto the appropriate panels in the same locations as the customer's actual switchgear. These items have dialog boxes associated with them that are opened by double clicking on one of the PowerWizards once they have been dropped. From this dialog box a navigational link is established to another window that contains another PowerWizard that displays detailed metering, configuration, and control information.

The Wonderware Intouch module 164 includes predefined tabular representations of metering and setup/set point information that is generated automatically, with the appropriate database server links established. A rapid method to accurately generate a user interface for power distribution metering, protection, and control devices with the capability to repeat this interface repeatedly for many devices of the same type while maintaining the capability to uniquely identify a device is provided. The invention allows the user to generate a power distribution device interface without programming skills or detailed knowledge of the device. Referring to FIGS. 14–24, various examples of PowerWizards which cover a range of devices from metering to protection/control devices which commonly occur in electrical distribution systems are shown. The PowerWizards instantly develop a standard looking interface for a particular device type. These PowerWizards also create from this standard interface, unique database links that the user defines by selecting a name and entering in this name from a PowerWizard dialog box. In this way the same wizard may be used over and over again but can be logically distinguished from another via the user defined name for a device entered in the PowerWizard dialog box. All margin for error that may have occurred in manually entering in the data access links to a database server are removed by the PowerWizards capability to set them up automatically using a unique user defined device name.

Figure 25:
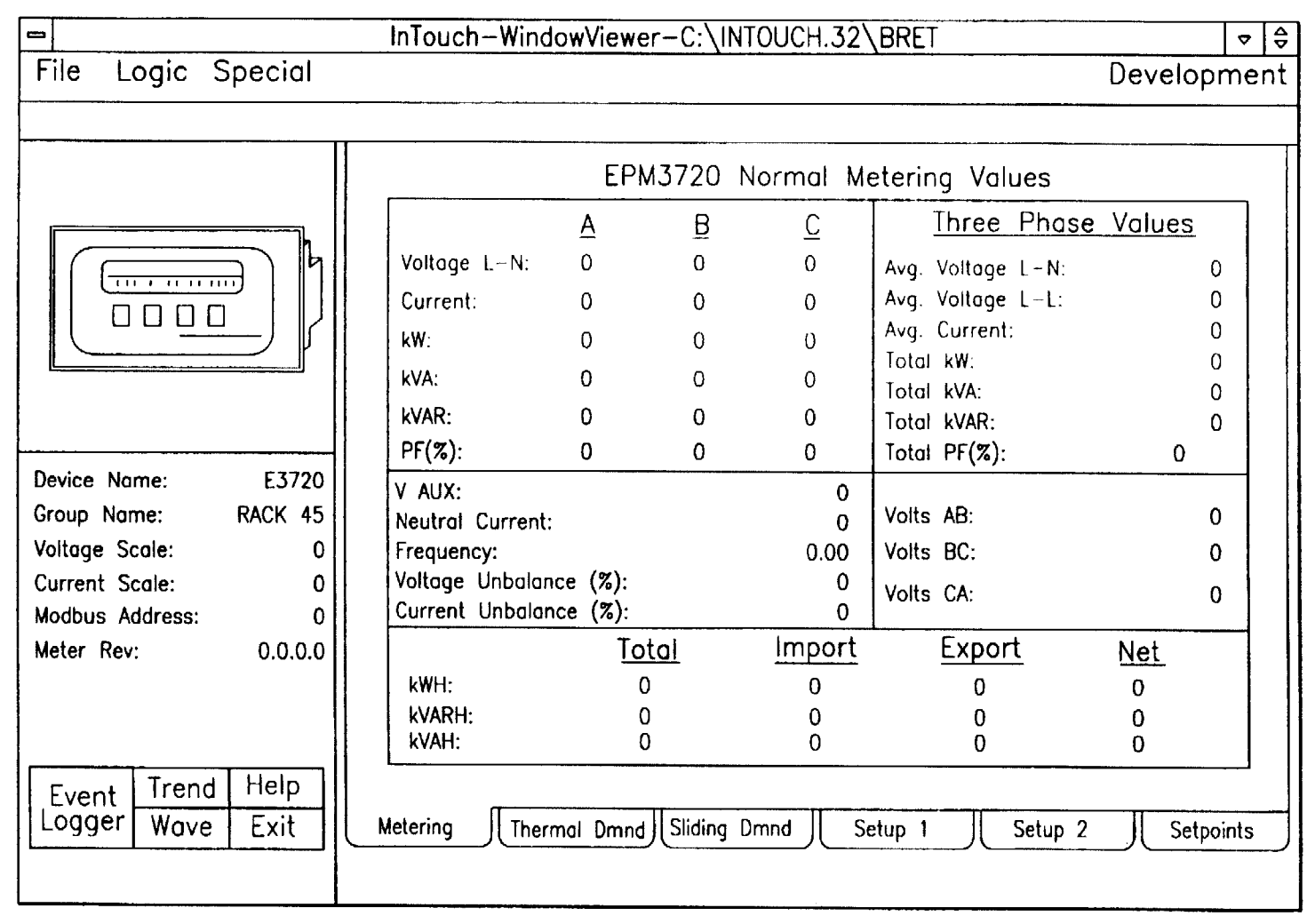
Figure 26:
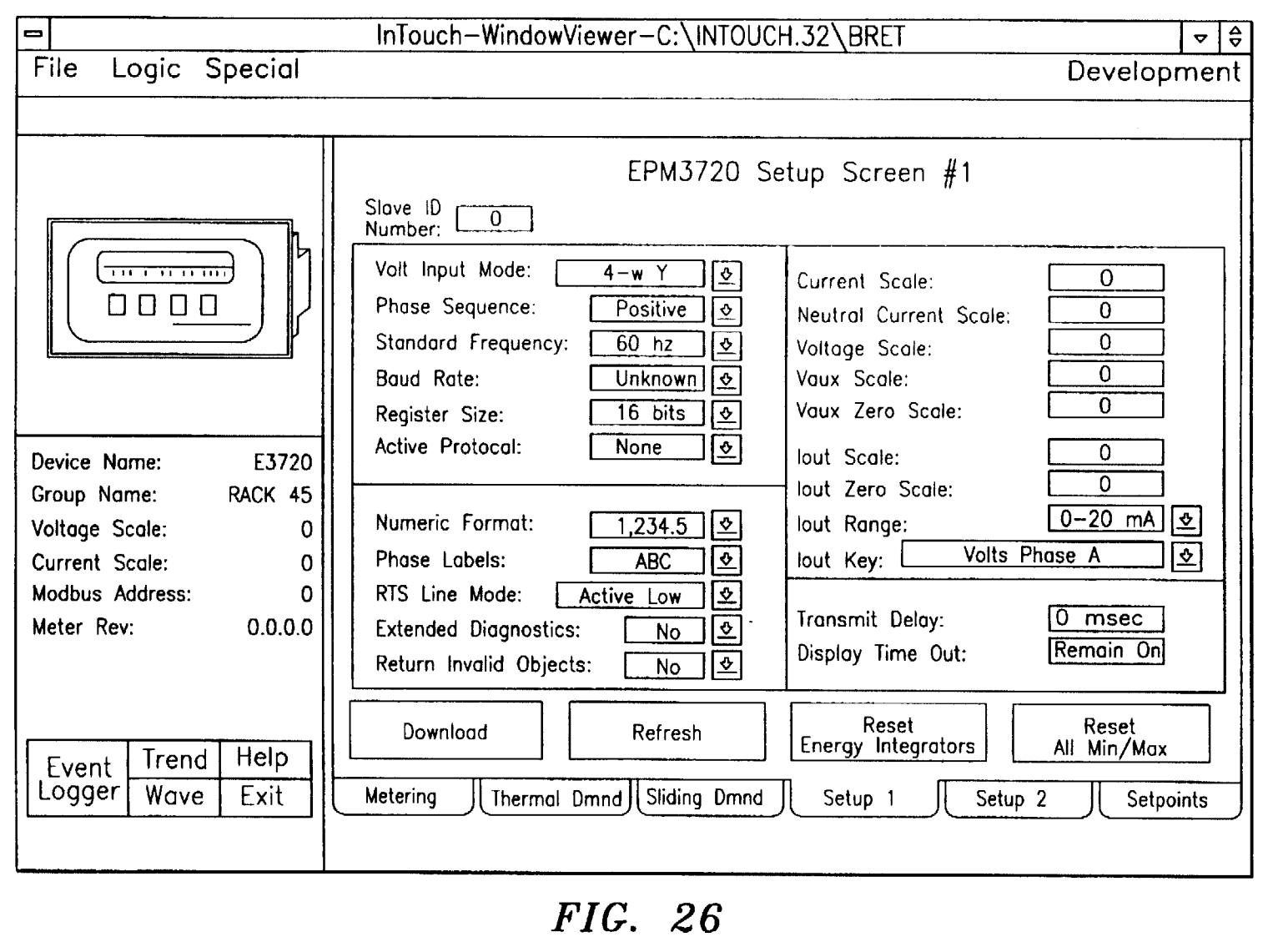
Figure 27:
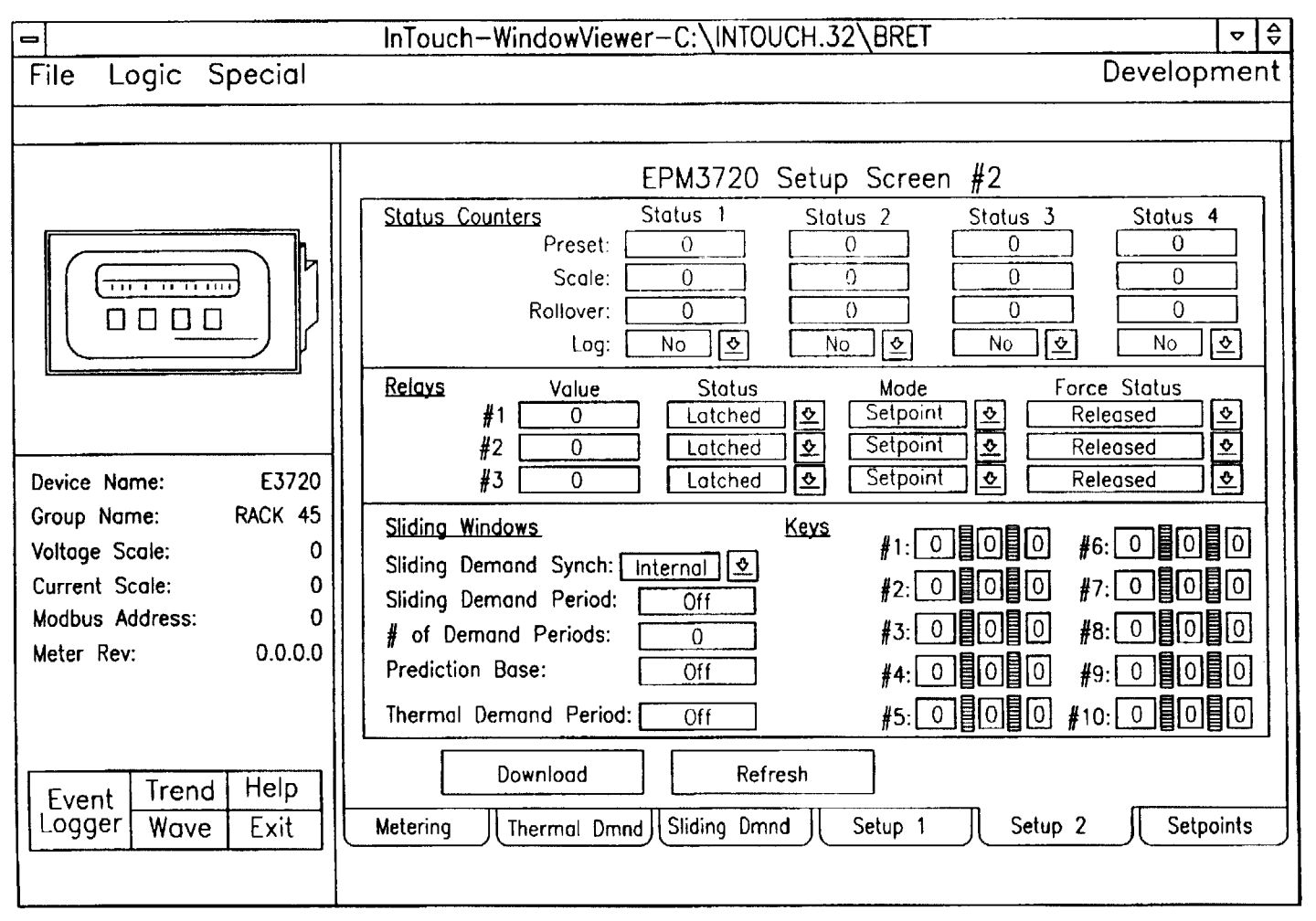
Figure 28:

By way of example, a rapid method to generate accurately a user interface for an EPM3720 meter, with the capability to repeat this interface many times for many devices of this same type while maintaining the capability to uniquely identify each device and to correctly assign trigger keys for up to seventeen set points is provided. This allows the user to generate an EPM3720 interface without programming skills or detailed knowledge of the device and to assign only valid trigger key set points. Referring to FIG. 25, the manipulation of data to represent all metered values at one time instead of viewing this information in a "line-edit" format of only a few pieces of information at a time from the meter faceplate is shown. Referring to FIG. 26, drop down boxes containing valid meter configuration setup information are shown. Each drop down box for a parameter removes the necessity of the user to search for the valid options for that parameter and instead accelerates the configuration process with a point and click method. Referring to FIGS. 27 and 28, the use of a software "thumb wheel" approach to select only the valid setup/set point "keys" is shown. For example, the trigger keys for a EPM3720 are not contiguous from 0000 to FFFF, the EPM3720 PowerWizard however skips the reserved/invalid keys and only allows key codes within the correct ranges to be downloaded to the meter. FIG. 28 also illustrates how the EPM3720 PowerWizard performs a look-up table function for up to 11 standard and 6 high speed Set points with their associated trigger key, high and low set point limit, set point activate/deactivate time delays, and the associated desired EPM3720 action as a result of a set point being reached.

DDE server 152 is described hereinbelow for the RS485 interface embodiment. However, it will be appreciated that the same is applicable to the Ethernet interface embodiment with the exception that the server is optimized for Ethernet protocol (instead of Modbus RTU protocol). DDE server 152 provides a mnemonic cross reference between Modbus RTU register items and standardized, alphanumeric parameter names. This mnemonic interface allows the user to retrieve data from a device without knowledge of the actual device register item number. DDE server 152 further provides a consistent device event data item for dissimilar devices. Also, DDE server 152 automatically performs time synchronizing for all supported devices and provides a consistent waveform interface. DDE server 152, for the RS485 interface, is optimized for Modbus RTU protocol by compensating for invalid ranges of registers in the device polling packets and it also provides superior protocol debugging capabilities by displaying the complete Modbus RTU input/output packet traffic. In addition, the DDE server 152 performs automatic conversion between 16 bit and 32 bit device register modes. A generic interface allows any Modbus RTU device to be used with the system. The DDE server uses the Modbus RTU protocol standard for communication to metering, relaying and I/O devices using the RS-485 communication ports.

Every windows application is registered in a windows kernel with an application name. To uniquely identify a data item for communication between two cooperating (DDE aware) windows applications, the data item is identified by tuple (Application, Topic, Item). Topic name provides a grouping and item name specifies the actual data point to be accessed under a topic. For the DDE server, the application name is the server's executable name. Topic name can be the device identification name and item name can be the register identification of a field data point. For example, with a General Electric Co. EPM meter, the tuple can be GE16MODB, EPM1, AMP_A where GE16MODB is the Application name for a DDE Server, EPM1 is the meter identification name, and AMP_A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

Figure 29:
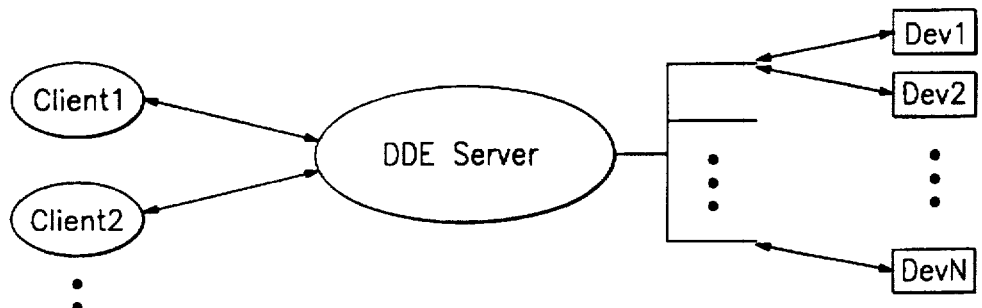
FIG. 29 is a schematic block diagram the DDE server link between clients and devices of the power management and control system of the present invention.

The DDE server includes toolkit functions which are used to maintain DDE communications. Registers can be classified into Fast Poll Registers, Slow Poll Registers and Poll Once Registers. Fast Poll Registers are polled at a rate defined by 'Scan Interval' which is entered during device/topic configuration. Slow Poll Registers are polled once in every 'n' fetches of Fast Poll Registers and the value of 'n' is read from an initialization file. "Poll Once" type of registers are polled only once when an item in that group becomes active. 'Poll Once' registers are also polled when a device status changes from DEAD to ACTIVE. Set points registers are to be downloaded based on request from a DDE client, i.e., a program, for example, such as Wonderware Intouch 5.0 or MSExcel, which request data items from the DDE server and accepts data through DDE. Referring to FIG. 29, the DDE server acts as a link between a client requesting device data and a field device which can provide the data. The DDE server communicates to the field device through communication ports and to the client via DDE message link. A client sends its requests to the server to read/write some device registers. The server maps each request to suitable device read/write request packets and carries out the necessary transaction with the device. Then it relays the result back to the client after processing and, if necessary, casts the collected device data to the proper format. Apart from reporting contents of normal device registers, the server can also collect special data like waveform capture/recording data from the device and pass it to a client.

Figure 30:
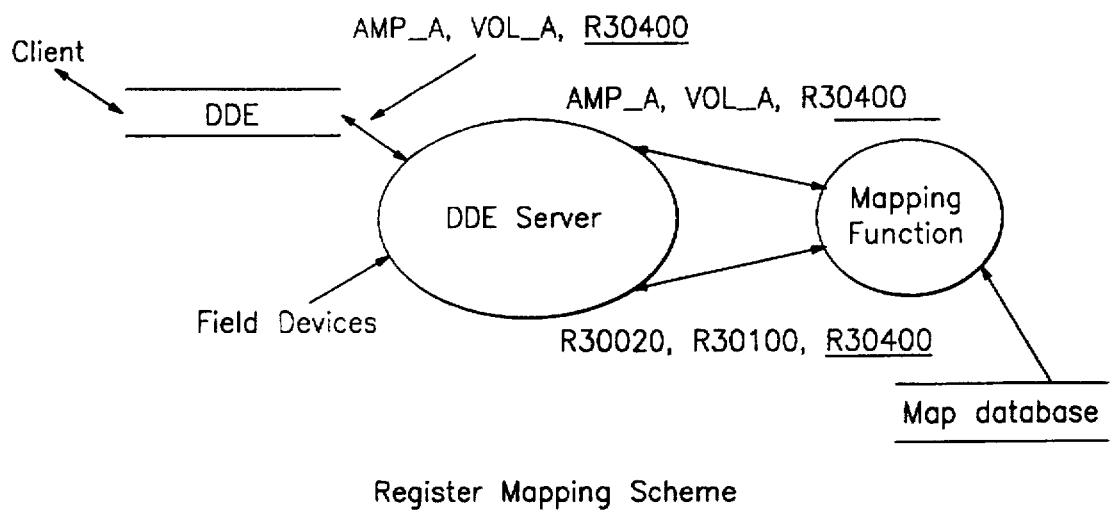
FIG. 30 is a schematic block diagram of the DDE server register mapping scheme of the power management and control system of the present invention.

To ease the configuration of field data points the user can access field data points on the DDE link using mnemonics which easily identify data points rather than using register addresses. At the same time, the register based item names are provided to maintain compatibility with Modbus RTU protocol conventions. Referring to FIG. 30, the DDE server maps item names to their register addresses. The name mapping database and functions are implemented in such a manner that underlying server does not get affected when new naming conventions for item are to be implemented. Preferably an off-line utility builds a device mnemonic to register address map. The DDE server supports the following data types; signed integer, unsigned integer, signed long, modulus 10000, floating points numbers in IEEE format, discrete bits, and an array of any of the above data types.

The DDE server interfaces through the RS485 interface, e.g., a multiport (4 port or 8 port) RS485 Stargate communication card or through a RS232/RS485 converter. The RTS line may have to be activated/deactivated to ensure proper flow control. Hardware flow control for all the ports are enabled/disabled when the communication port is configured. In the present example, the DDE server supports a maximum of 8 communication ports, whereby a maximum of 247 Modbus RTU devices can be connected on each port and the Modbus concentrators cannot have an address greater than 32. Addresses of devices connected to any one port should be unique. DDE server 152 can interface to client nodes on a network using NetDDE support for DDE communication.

The DDE server supports following data types: unsigned integer, a default for Rnnnnn item name; signed integer, specified is 'I' with an Item name of RnnnnnI; long signed integer, specified is 'L' with an Item name of RnnnnnL; floating point value, specified is 'F' with an Item name of RnnnnnF; discrete status bits, specified is 'D' with an Item name of RnnnnnDxxxxx; modulus 10000, specified as 'E' with an Item name of RnnnnnE; and array values, an array of either signed integer, unsigned integer, long signed integer and float values with array specified 'Axxx'.

Figure 31:
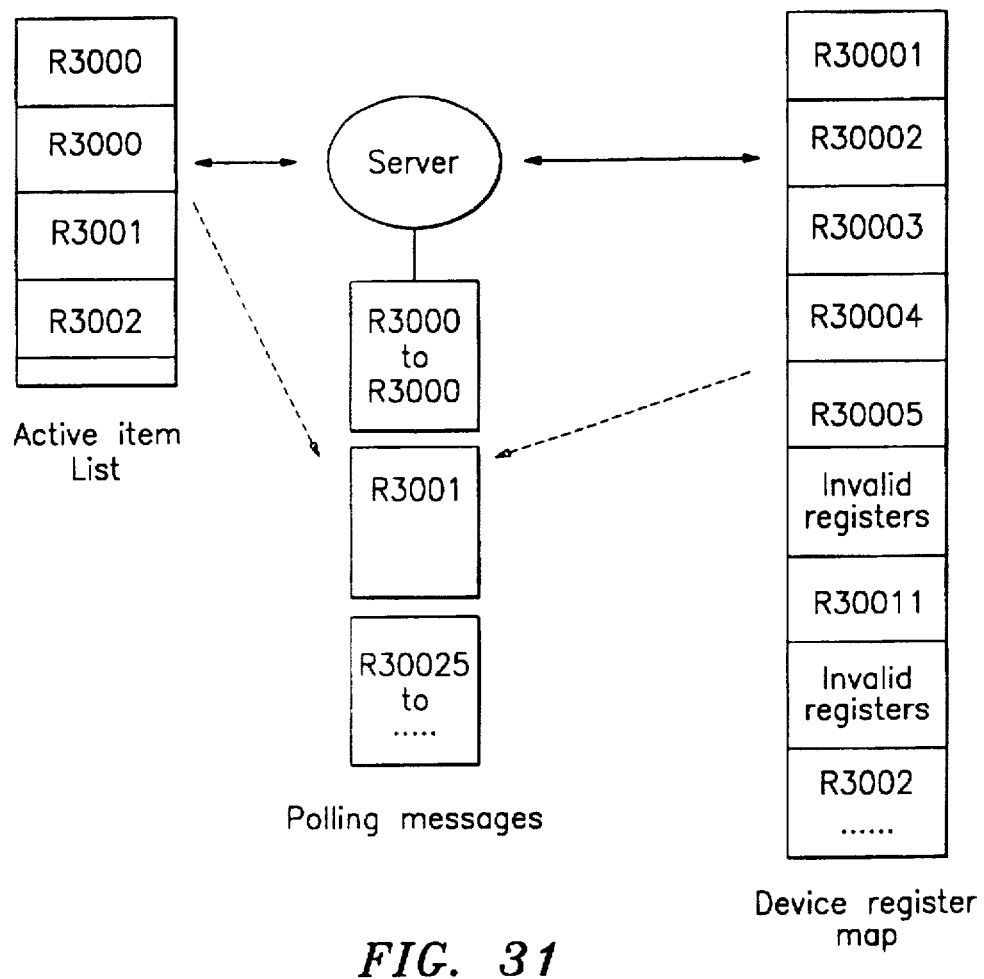
FIG. 31 is a schematic block diagram of the DDE server, register map and message polling of the power management and control system of the present invention.

Referring to FIG. 31, the DDE server handles field device communication through timer call back functions. The DDE server polls the devices which are in an active list and from each device it acquires registers (items) which are in the active list. The DDE server may group various items while performing data acquisition to optimize polling required from field devices. Device register maps usually have some gaps for future use. While grouping various items in a single polling cycle, the DDE server accounts for invalid register addresses for a particular device. Fast and Slow Group Registers are not packed into the same packet. The DDE server may have to limit grouping because of limitations on packet length of the response packet or the download packet. The maximum packet length is restricted to 125 registers (250 bytes) by Modbus RTU protocol standards. The DDE server executes set point commands received from client applications and communicates all set point values to the devices. The DDE server periodically synchronizes time with connected devices and adjust for the time formats of each of these devices.

The Modbus concentrator accepts time register write requests for all devices connected to it but does not change the time register value of any device in response to write requests. The time registers for all the devices connected to a Modbus concentrator will be changed only when the server synchronizes time with the concentrator. Periodical time download to selected devices are performed even if it may not have any effect on that particular device. Time synchronization for other devices are performed as per the register format specified for the device register maps.

The DDE server maintains current status (DEAD/ACTIVE) of all active topics (devices). This information does not have any direct register associated with the device topic name and hence a pseudo item called 'STATUS' is maintained by the DDE server. If the DDE server does not get a response from any device during 'n' consecutive poll cycles then that particular device is declared DEAD. The value of 'n' is read from an initialization file. The status of any device will be updated to a client only if a predefined item called 'STATUS' is made active. DEAD devices would be polled with period equal to a dead device scan interval (available in initialization file) instead of the device scan interval. DEAD devices will become ACTIVE when they respond to a polling request.

The DDE server displays communication traffic in text format in its Window, if it is setup to do so. A setup option is provided in the server main menu for this purpose. Communication traffic is displayed in a 'scrollable' window for selected devices and selected options.

Further, the DDE server logs communication errors which include, by way of example, time-out errors, CRC errors, wrong station ID responses, exception responses and extra bytes reported in the response to a query from the device. The DDE server logs communication errors for ACTIVE devices only and logs the device status whenever a device becomes ACTIVE or DEAD.

Server configuration data is accepted through the interfaces and is stored in initialization files or other configuration files. Configuration is an off-line function and is disabled during run-time. The configuration utility is provided for; communication port configuration, device/topic configuration, device type register map configuration, device type register group polling priority configuration, device type supported function codes configuration, device type register map invalid register addresses, item mnemonic to register mapping, and server operational parameters.

In the present example, up to 8 communication ports can be configured. It will be appreciated, that this is restricted by the number of ports that the 16 bit Windows or Windows NT communication driver will support. For each port the following parameters can be configured:

Baud Rate: 1200, 2400, 4800, 9600, 14400, 19200, 38400, 57600

Parity: Even, Odd, None

Stop Bits: 1, 2

Hardware flow control: Enable, Disable

Presently, Modbus RTU protocol standards require eight bits. At the time of initialization, the DDE server configures the communication ports, devices and timers as defined by user. Also, all device specific databases are initialized. From the main menu the user can start the server, stop the server, suspend protocol, and resume protocol during runtime.

Configuration ranges in the present example are as follows; a device name can be up to 20 characters, a scan interval can be in the range of 1–9999999 milliseconds, and a slave address can be in the range of 1–247. It will be appreciated, that multiple topics can be configured with the same slave address and communication port. The configuration utility will detect multiple topics before configured on the same slave address and will issue a warning message to this effect when user configures a topic on an already configured address. The communication port to which a device is connected must be previously defined.

A device type register map must be configured for each of the device topics connected thereto. The system provides for configuration of a starting valid address, a last valid address, a set of invalid register blocks using this utility. Valid registers, in the present example, are R0XXXX; R1XXXX; R3XXXX; or R4XXXX. Accordingly, DDE server 152 supports the following Modbus register types; R0XXXX—Discrete coils, R1XXXX—Discrete status registers, R3XXXX—Input registers, and R4XXXX—Set point registers. With these generic types, a user can configure any number of register types. Each of these types will have poll rate attributes (i.e., Fast Poll, Slow Poll, or Poll Once). Buffered events, read/write date/time registers for time synchronization, waveform capture data and waveform recording data are implemented differently in the devices which support them hence, no common configuration utility is provided for these functions. The DDE server handles each of these functions specifically. Again a mnemonic name is associated with a register address. Further, a user can configure protocol timer tick and valid data time out value with this utility. Server time out tick is read from an initialization file.

By way of example, several of the devices discussed above, i.e., EPM, RMS6, RMS9B, RMS9C, RMS9D, ECM, MDP and the Modbus concentrator, include register types R3XXXX; R4XXXX; and R0XXXX. To acquire data from these devices and to download set points, the DDE server implements Modbus function codes, 01, 03, 04, 05, 06, 16, 56. Various register groups, i.e., dynamic values, set points, command registers, event registers, fixed value registers, and Commnet statistics can be configured by the user into either Slow Poll Register or Fast Poll Registers or Poll Once Registers. The DDE server downloads time stamps to all these devices periodically. Time download periodicity is available in an initialization file. An event count register is polled at the Fast Poll rate. When the event count register is non-zero, an event fetch is performed by reading the start address from the event buffer. Each event is read and time stamped sequentially. The event code is expanded with a description, additional data fields, and a date stamp of the events before sending to client.

The Multilin 269 device, discussed above, includes register types R3XXXX and R4XXXX. To acquire data from this device and to download set points, the server implements Modbus function codes, e.g., 03, 04, 16. This device has no time or event registers.

The Multilin 565 device, discussed above, includes register types R3XXXX; R4XXXX; and R0XXXX. To acquire data from these devices and to download set point, the server implements Modbus function codes, e.g., 03, 04, 05, 06, 16. Date and time stamped event strings formed from buffered events are provided.

The PML 3710 device, discussed above, includes register type R4XXXX. To acquire data from this devices and to download set points, the server implements Modbus function codes, e.g., 03, 16. The waveform capture feature of PML 3710 is supported by the DDE server. Date and time stamped event strings formed from buffered events are provided.

The PML 3720 device, discussed above, includes register type R4XXXX. To acquire data from this device and to download set points, the server implements Modbus function codes, e.g., 03, 16. The waveform capture and waveform recording features of PML 3720 are supported by the DDE server. Date and time stamped event strings formed from buffered events are provided.

In general, the DDE server provides appropriate return values as specified for all clients, i.e., periodic polling packets for active topics and items, periodic polling packets for events and status, periodic update of time to all the devices, data value update to clients for acquired items, event/status report to Intouch so that it becomes part of normal alarm log, and status update for active topics (devices). Set point write requests are properly formatted set point download communication packets for the request.

Execution and termination of the server are initiated on user request from the DDE server window menu.

The following Modbus function codes are supported by the DDE server of the present invention:

Function Code 1: Read Coils.
Function Code 2: Read Input status.
Function Code 3: Read holding registers.
Function Code 4: Read input registers.
Function Code 5: Write single coil.
Function Code 6: Write single holding register.
Function Code 15: Write multiple coils.
Function Code 16: Write multiple holding registers, and
Function Code 56: Retransmit last response.

Figure 31A:
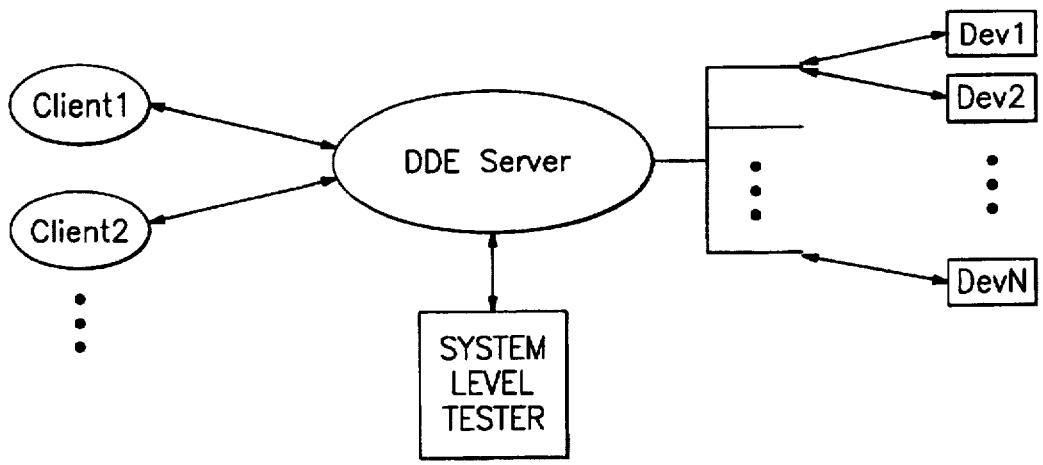
FIG. 31A is a schematic block diagram the DDE server link between clients and devices of the power management and control system including a system level tester.

FIG. 31A illustrates a variation of the embodiment shown in FIG. 31. The system in FIG. 31A includes a system level tester which represents a software program executed by the computer to automate the configuration of a network of Modbus RTU devices. The system level tester can automatically scan and identify Modbus RTU devices, store all results in a database and provide several reports, and display metering information for devices retrieved directly over an RS-485 network or through an Ethernet gateway.

The power management and control system may include up to several hundred separate power monitoring and networking devices. Configuring and testing a typical system is very labor intensive. The system level tester is a software tool that automatically configures itself and assists system integration to reduce the amount of configuration time required. The operator needed to be able to view device metering information to verify correct communication and AC power wiring. The system level tester automatically identifies some types of device mis-configuration and collects and stores system information for later analysis and reporting. Some systems are constructed in stages and system configuration information needs to be collected in stages and later merged intelligently.

Without the system level tester, configuration of the system was performed with the DDE server combined with a man-machine interface. This approach requires correct setup by the operator of both the DDE server and the man-machine interface. Failure to configure either 100% correctly will result in communication failure or no metering data. The system level tester provides a self-configuring system which eliminates operator error. By eliminating operator error in configuring the system, communications failures could only be the result of misconfigured devices or network cabling. This significantly reduces system integration effort.

The system level tester automatically identifies the Modbus RTU devices coupled to the DDE server. The system level tester acts as a Modbus master and sequentially queries each Modbus address. When it receives a response it requests additional data that is used to uniquely identify each device type. The system level tester uses a combination of registers to create a "signature" response for each device type.

The system level tester also identifies configuration errors on the network and scans a RS-485 network at multiple baud rates. In this way, the system level tester can identify a device that has the wrong baud rate selected. The system level tester also detects (but does not distinguish) devices with duplicate addresses or communication hardware failure and network faults.

The system level tester displays metering values via both an RS-485 network, and an Ethernet network. Once the system level tester identifies all the devices, it writes the configuration information to a file that is read by the serial DDE server (FIG. 2) or the Ethernet DDE server (FIG. 3). The system level tester starts the server and then establishes links to the server to display a subset of each device's metering data.

The system level tester also maintains system configuration data and print reports. The system level tester stores system configuration details for each job. Job data can be broken down into sub-systems. The system level tester provides a report for the entire job, a job subset, and a report of the current devices attached. The data is stored in an industry standard format and can be used by other products. The allows the user the ability to generate their own custom reports.

Figure 32:
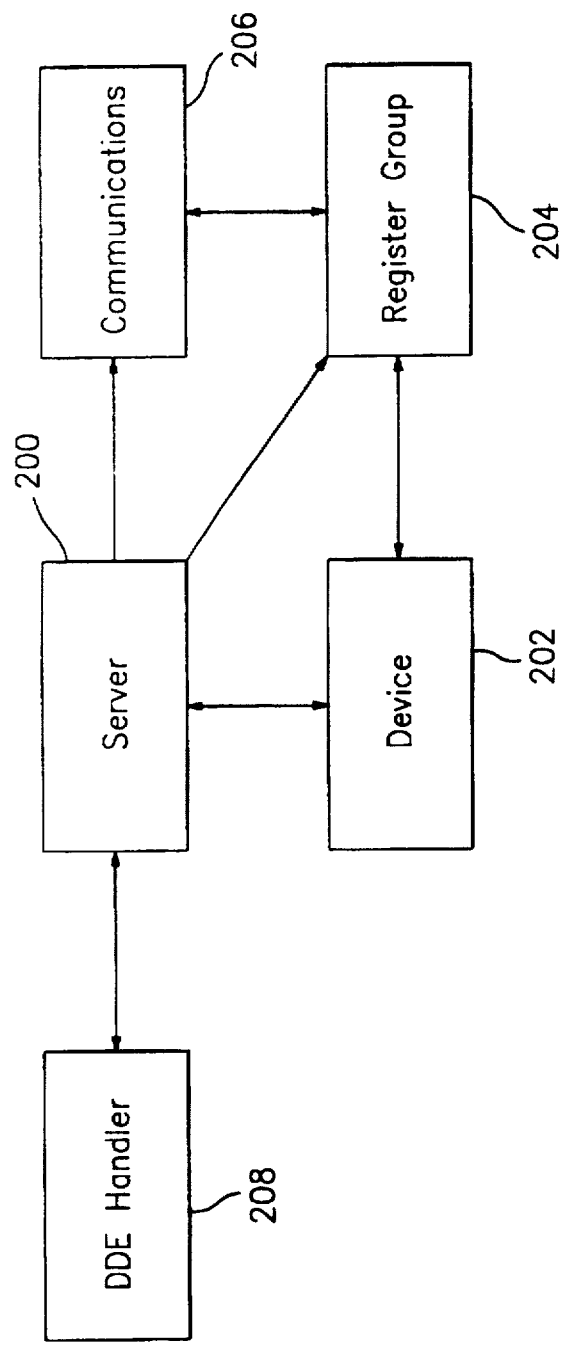
FIG. 32 is a schematic block diagram of the component subsystems of the DDE server, including a server module, a DDE handler module, a device module, a register group module and a communications module.

Referring to FIG. 32, the component subsystems (i.e., modules) of the DDE server include; the server (application) 200, the device module 202; the register groups module 204; the communication module 206; and the DDE handler module 208. All these modules (except for the DDE handler) employ an object oriented approach. Each module comprises several classes.

The application module 200 handles all external inputs to the system viz., user interactions and client requests via the DDE link. As described above the server is configured for various devices when server is off-line. The configuration parameters include register map configuration, mnemonic configuration, and configuration of the communication port to which the device is attached. While on-line, the server will expect requests from clients through the DDE handler and service those requests. It also receives any special command from user, e.g., to stop the protocol, and carries it out properly. In the application module, Class. CServer, provides server communication with the toolkit through the DDE handler and synchronizes comport processing.

Figure 33:
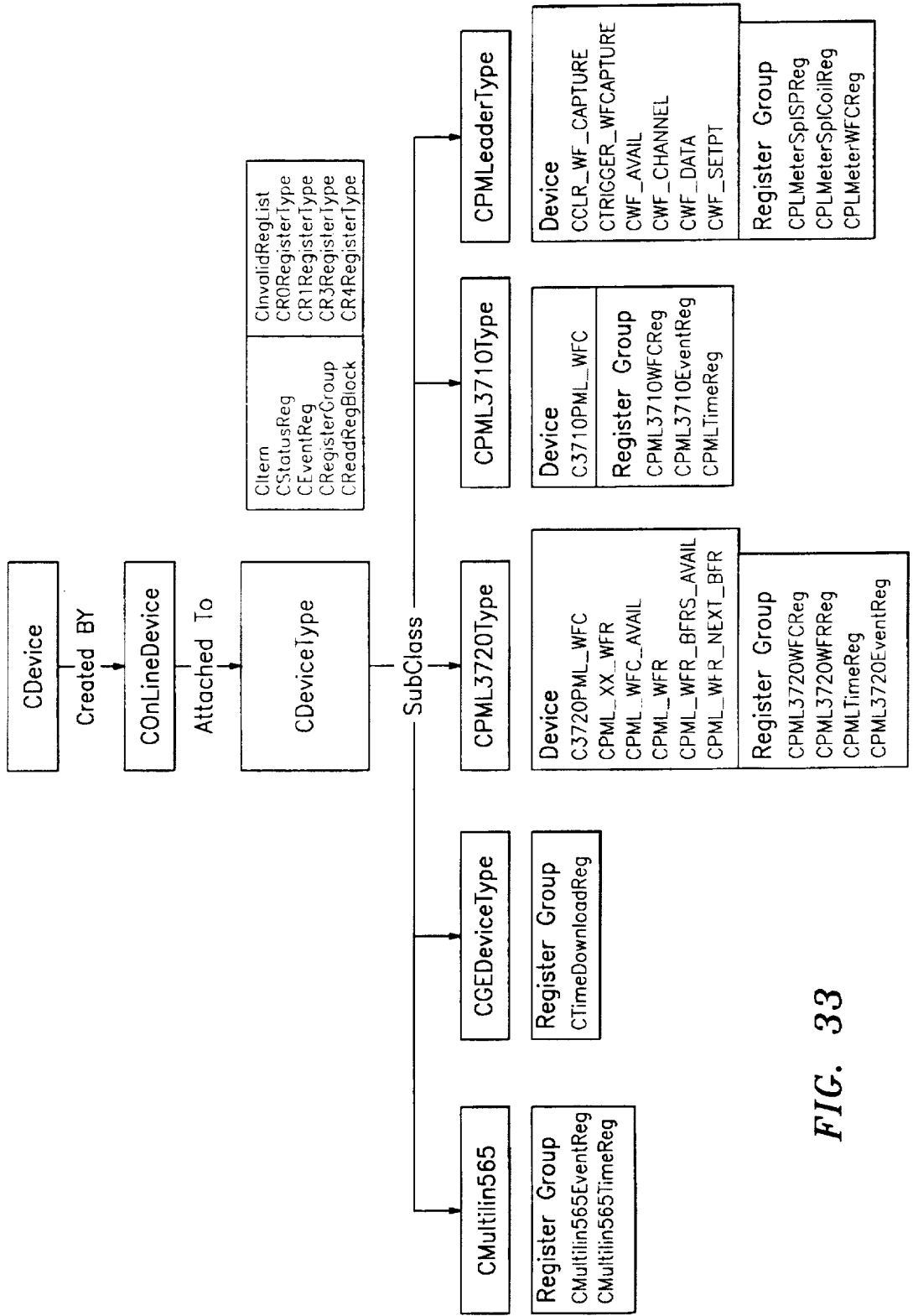
FIGS. 33 and 34 are diagrams of the device module of FIG. 32.
Figure 34:
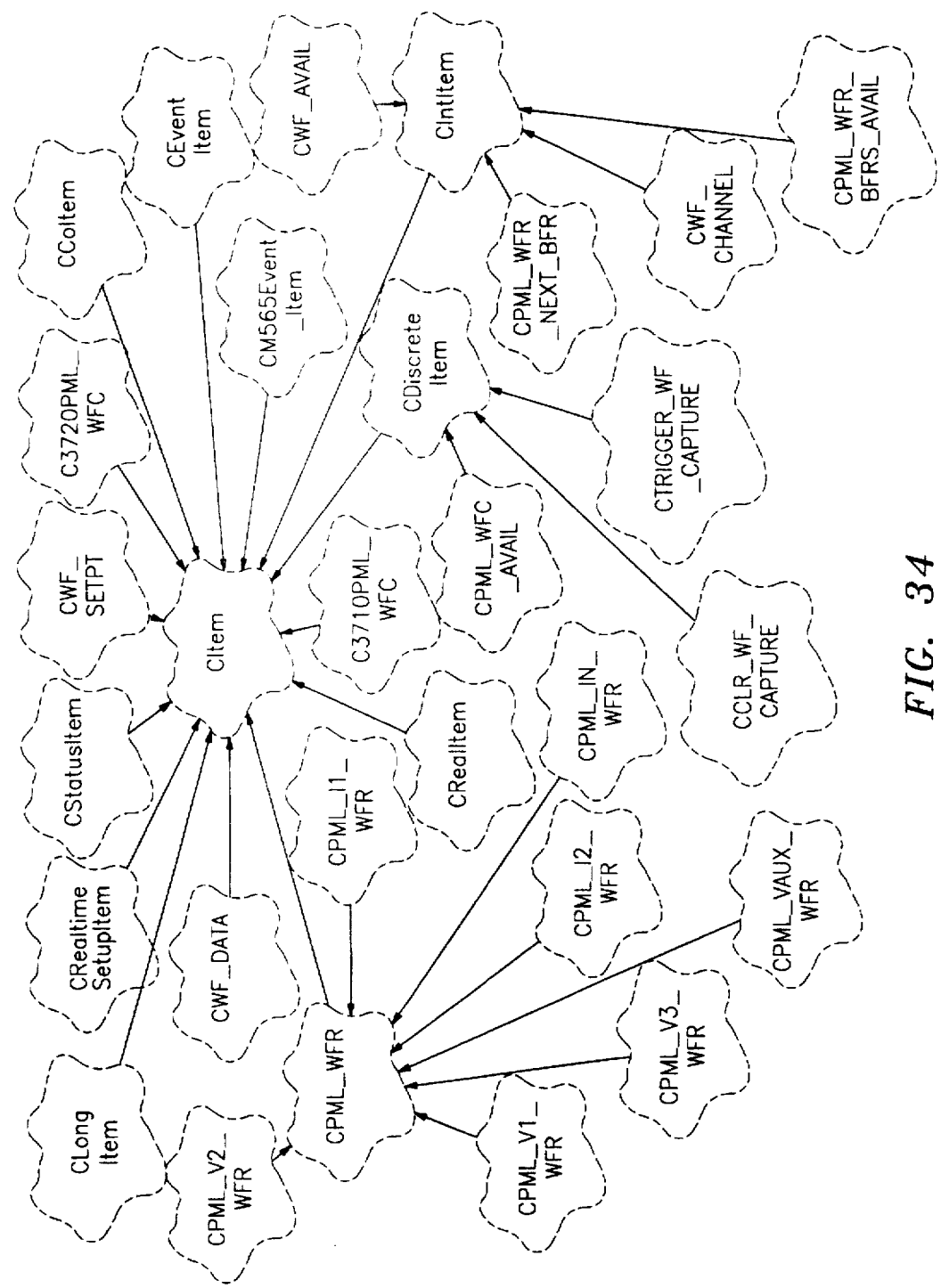

Referring to FIGS. 33 and 34, the device module 202 abstracts a field device and handles multiple register categories (or register groups). Class, CCoilItem, provides support for the special discrete register bit operations for R0 and R1 reference register types. Class, CDev, contains all device information like device name, device ID, device type name and com-port address. Class, CDeviceType, abstracts a field device type the server will talk to, has a variable number of register groups, contains a mnemonics list, and has function codes associated with it. Class, CDiscreteItem, extracts discrete bit array in a register, for a 16-bit register, all 16 bits can be programmed while for a 32-bit register only the lower 16 bits can be specified by user. Class, CEventItem, handles the event processing for a selected device, e.g., a General Electric Co. device, formats an event string and pass it to the client. Class, CGEDeviceType, supports event register group, by way of example, part nos. EPM, RMS6, RMS9B, RMS9C, RMS9D, ECM, PLMeter and MDP qualify as General Electric Co. device types. Class, CIntItem, takes care of unsigned and signed integer items. Class, CItem, is a data point present in field device. CItem comprises a plurality of registers in the device and can handle a single type or array of types. CItem is the base class for different types of items present in the application and include integer, long, real, coil, discrete bits and real time parameters. An item has reference to the register group it belongs to. Whenever a new item is created or activated a dummy register block is created and polled immediately for the fast updating of the item. Class, CLongItem, handles a signed long data type. Class, CMnemonic, contains the mnemonic name and the corresponding register format. Class, CModbusConcType, automatically synchronizes time with all Modbus concentrator device which have only time download property. Class, CMultilin565EventItem, handles the special event processing present for Multilin 565 device. Class, CMultilin565Type, supports event register group and processing for Multilin meters, which are similar to that of General Electric Co. devices. Class, COnLineDevice, exist only when the server is running, whenever an on-line device is created, a copy of its device type is created and attached to the on-line device. Class, CPLMeterType, is associated with the General Electric Co. Power Leader meter devices and supports CPLMeterWFCReg register group for waveform capture. Class, CPLMeterWFDataItem, is a text item associated with the PLMeter. CPLMeterWFData item is a collection of 'n' samples read from the device, with the number of samples and sample's start address are read from the application's .INI file. Class, CPML3710EventItem, handles the event processing for a PML3710 Device and formats an event string and passes it to the client. Class, CPML3710Type, supports a PML3710 Device where the default register group CPML3710WFCRegGroup supports waveform capture. The event processing is similar to other device types except that it doesn't contain an event count register. Class, CPML3710WFCDataItem, is a text item associated with the PML3710. CPML3710WFCDataItem is a collection of 'n' samples read from the device. Each sample is 12 bits and two consecutive registers, giving three values. The number of samples and sample's start address are read from the application's .INI file. Normally for PML devices the WFC is 99 registers. Class, CPML3720AvailItem, handles the PML_WFC_AVAIL special item in the PML3720 device. Class, CPML3720EventItem, handles the event processing for a PML3720 Device and formats an event string and pass it to the client. Class, CPML3720Type, supports a PML3720 device. The default register groups that go with this device type are CPML3720WFCRegGroup and CPML3720WFRRegGroup for handling waveform capture and waveform recording respectively. Class, CPML3720WFCDataItem, is a text item associated with the PML3720. CPML3720WFCDataItem is a collection of 'n' samples read from the device, where each sample is 12 bits and two consecutive registers, giving three values. The number of samples and sample's start address are read from the application's .INI file. Class, CPML3720WFRDataItem, collects required sample data and updates them to the client. CPML3720WFRDataItem handles the PML_WFR_BFRS_AVAIL and PML_WFR_NEXT_BFR special items in the PML3720 device. Class, CRealItem, keeps data in an IEEE floating point format, in 16-bit mode, two registers are required while in 32-bit mode, only one register will give the value. Class, CStatusItem, is a text item which exists in every device. The status strings that are updated by this item to a device are ACTIVE and DEAD.

Figure 35:
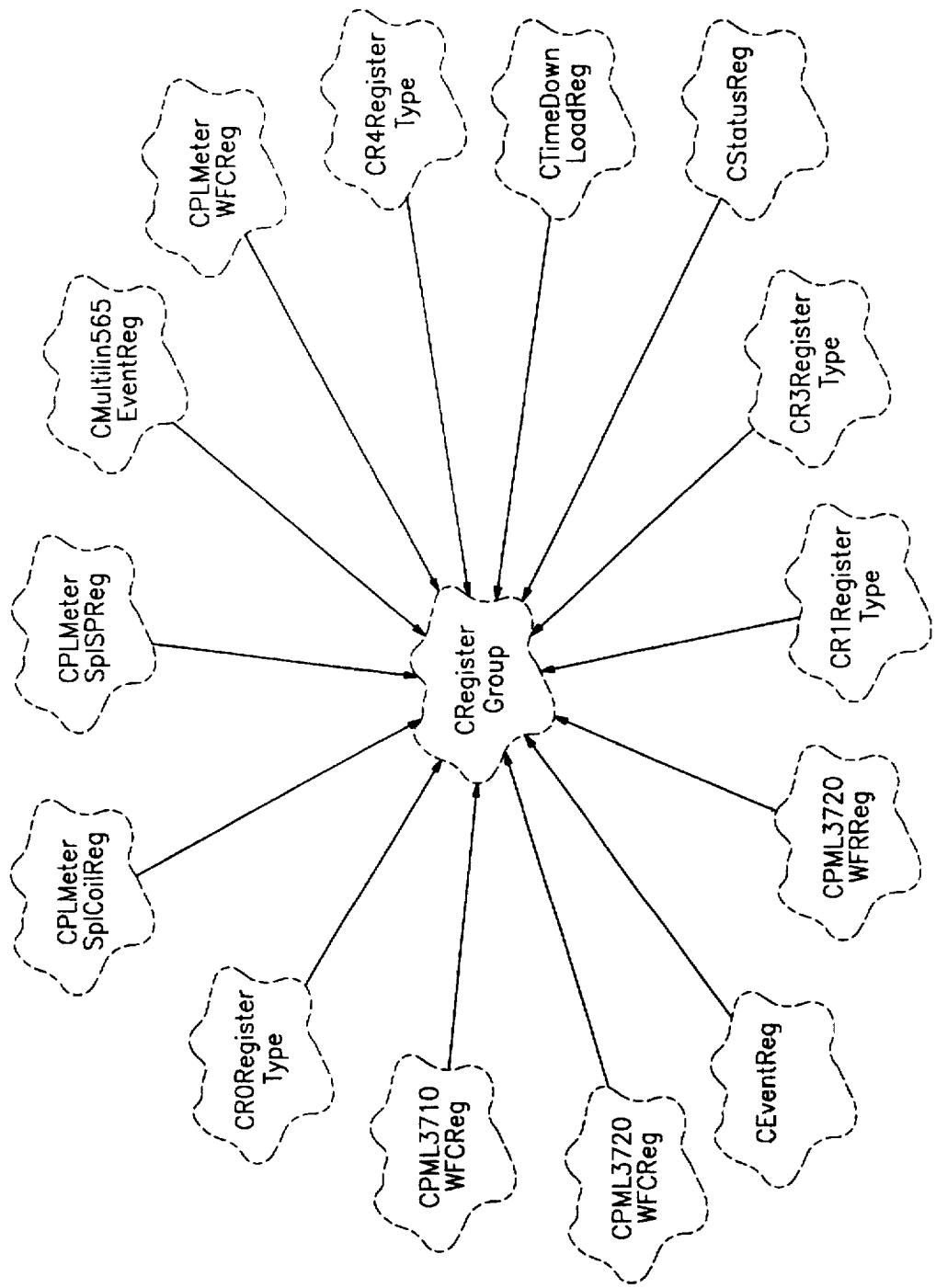
FIG. 35 is a diagram of the register group module of FIG. 32.

Referring to FIG. 35, the register group module 204 supports an array of registers, a few registers in the array may be declared as invalid. Consecutive registers can be grouped together to define an item or a point. An item performs processing on these registers depending on the item type. Clients are interested in the item value after the processing has taken place. The register group module is designed to handle multiple numbers of such items. Class, CEventReg, supports events handling for General Electric Co. devices. Class, CInvalidRegBlock, maintains the invalid range where it contains invalid registers range in (Start, End) pairs. Class, CInvalidRegList, list is an ObList containing CInvalidRegBlock objects for a particular register group. Class, CMultilin565EventReg, supports the Multilin565 events. Class, CPLMeterSplCoilReg, manages two command coil items, i.e., TRIGGER_WF_CAPTURE and CLR_WF_CAPTURE for General Electric Co. Power Leader Meter. Class, CPLMeterSplSPReg, manages set point registers for the Power Leader Meter. A DDE item present in this group is WF_SETPT. Class, CPLMeterWFCReg, supports waveform capture for General Electric Co. Power Leader Meter. DDE items present in this group are WF_DATA, WF_AVAIL, WF_CHANNEL, WF_HOUR, WF_MIN, WF_SEC, and WF_MSEC. This register group supports waveform capture data retrieve. Class, CPML3710EventReg, supports the PML 3710 events. Class, PML3710WFCReg, is a register group for PML3710 and has a DDE item referred to as PML_WFC. This register group supports the PML_WFC item in retrieving the WFC data from the device. Class, CPML3720EventReg, handles the PML 3720 events. Class, CPML3720WFCReg, is a register group for PML3720 and has only two DDE items which are referred to as PML_WFC and PML_WFC_AVAIL. This register group supports the PML_WFC item in retrieving the WFC data from the device depending on the availability of the data (which is known by PML_WFC_AVAIL). Class, CPML3720WFRReg, is a register group for PML3720 device and has several DDE items which are referred to as PML_WFR, PML_WFR_BFRS_AVAIL, PML_WFR_NEXT_BFR, PML_V1_WFR, PML_V2_WFR, PML_V3_WFR, PML_VAUX_WFR, PML_I1_WFR, PML_I2_WFR, PML_I3_WFR and PML_IN_WFR. Class, CR0RegisterType, supports function codes 01 (coil read), 05 (write single coil), 15 (write multiple coils). This is a generic register group type from which the user is allowed to dynamically instant many register groups for a device type. Class, CR1RegisterType, supports function code of 02 (for read discrete bits). All write commands on this type of registers are discarded. This is a generic register group type from which the user is allowed to dynamically instant many register groups for a device type. Class, CR3RegisterType, has a 04 (read input registers) function code. All write commands on this type of registers are discarded. This is a generic register group type from which the user is allowed to dynamically instant many register groups for a device type. Class, CR4RegisterType, is a register group that has specific function codes that are 03 (read holding registers), 06 (write single register), and 16 (write multiple registers). This is a generic register group type from which the user is allowed to dynamically instantiate many register groups for a device type. Class, CReadRegBlock, contains a valid register range which can be used while sending read packet to the device. A valid block may represent one or more than one item. It also contains start and stop positions of items in the register group's item list for register group's convenience while updating the item values to toolkit. The valid blocks are recalculated whenever an item is added or deleted, hence the register blocks list is dynamically changing. Class, CRegister Group, handles a category of registers whose access will be similar by client. It has list of all active items of the group in a member called m-ItemList. Also it has a list of valid register blocks. It can acquire data for all active items in m-ItemList and download data for an item to the device. It maintains a list of valid blocks which is sent to the field device one at a time. A valid block is polled on behalf of maximum possible items thus optimizing the polling. Class, CStatusReg, manages the STATUS item. This register group and the item are present for all the devices. Class, CTimeDownloadReg, downloads time to the Modbus concentrator and General Electric Co. devices and does not support any items. Class, CTimeDownload565, downloads time to the Multilin565 device and does not support any items. Class, CTimeDownloadPML, downloads time to the PML 3710 and PML 3720 devices, and does not support any items.

Figure 36:
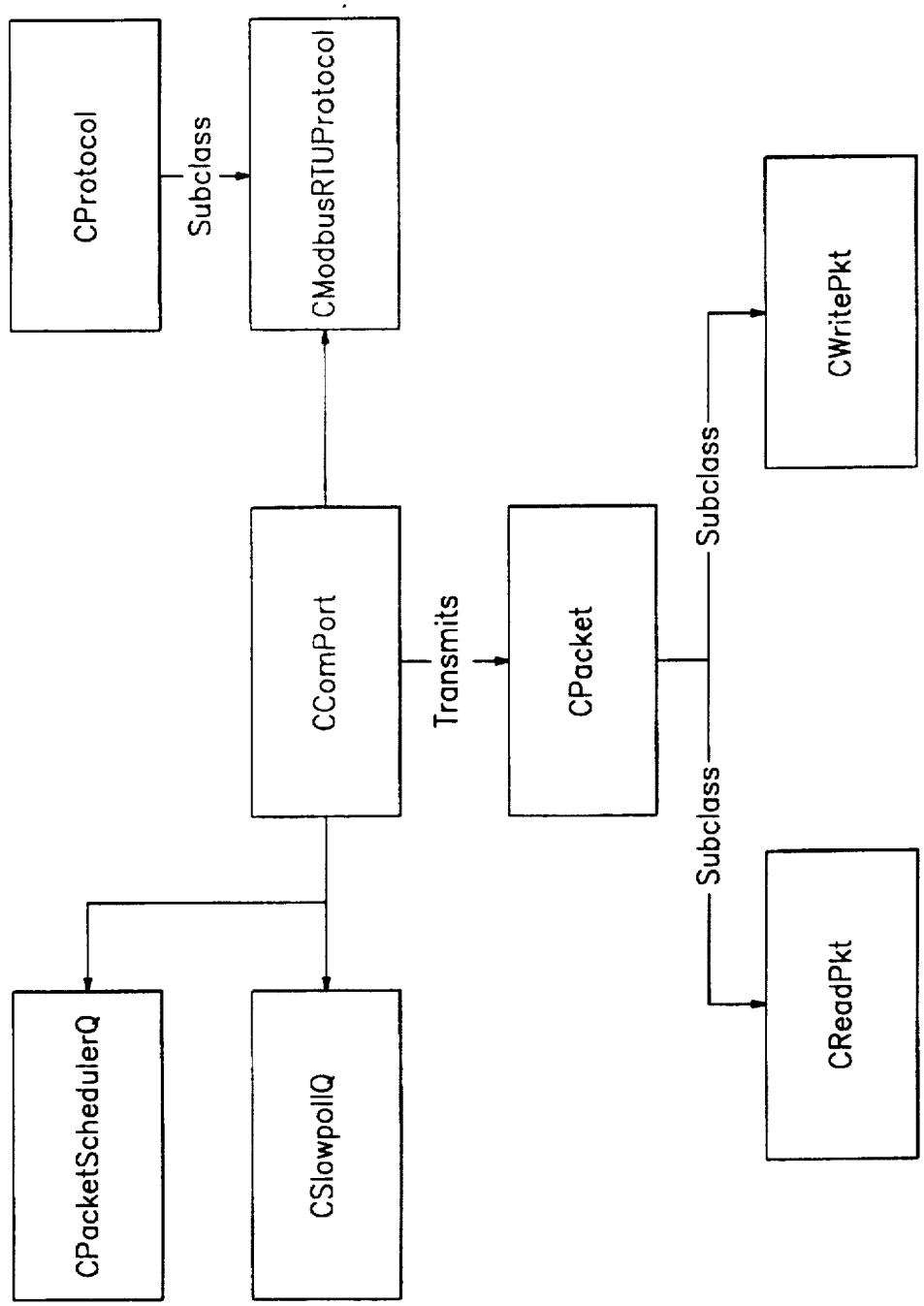
FIGS. 36 and 37 are diagrams of the communication module of FIG. 32.
Figure 37:
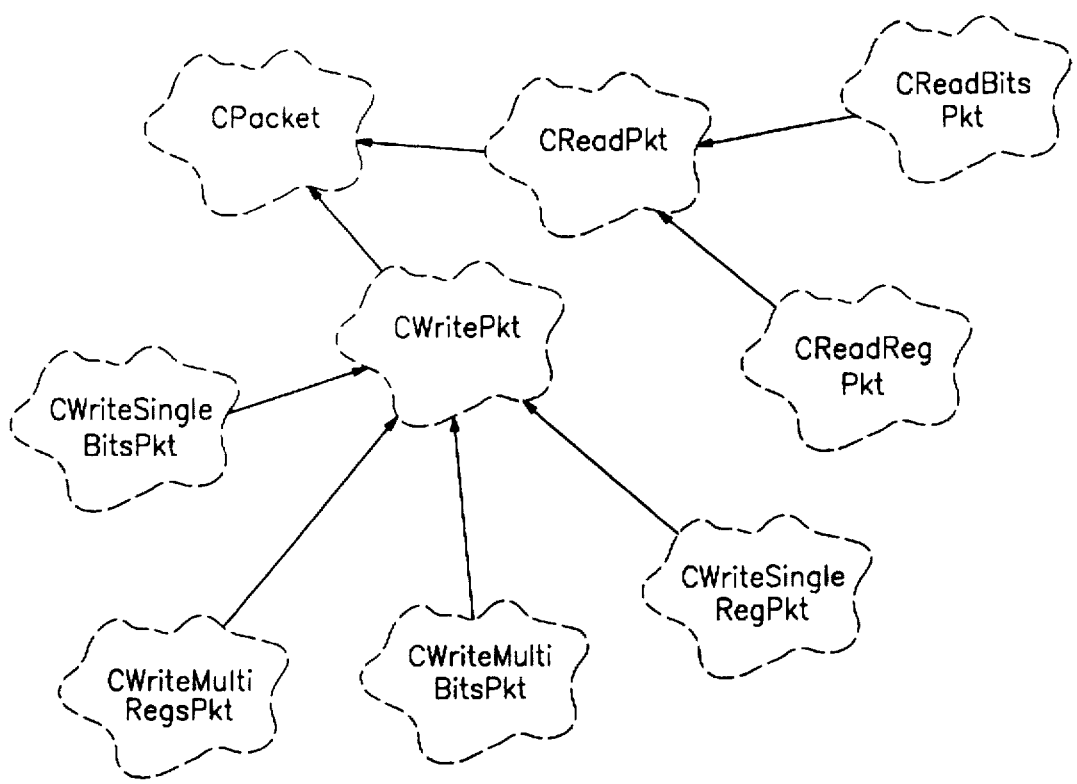

Referring to FIGS. 36 and 37, the communication module 206 enables the server to communicate with a device. All client requests are to be mapped to various Modbus packets and then these packets have to be transmitted to the device successfully. Also the replies from the devices are received here first and checked for CRC error. This module also is capable of declaring any device as DEAD if it cannot communicate with the device or ACTIVE when communication resumes with a previously DEAD device. Class, CComPort, supports the transaction of a Modbus packet between the server application and the device. The comport maintains a queue of packets and returns immediately after transmitting a packet and checks for the response only at the next scan cycle. This improves throughput of packet I/O with the device. Class, CModbusRTUProtocol, implements the specific Modbus RTU protocol functions. This improves class implements Modbus RTU protocol and the method of adding CRC to the data bytes before sending to device. Also, it checks CRC for a response bytes and clears it for further processing. Class, CPacket, implements the common understanding between the server and the device with which both are able to talk to each other. The packet does not contain CRC. The CPacket contains both the request as well as the response and acts as a base class for Modbus function code implementation. The packet's interface with items is fixed as two bytes per register in 16-bit mode and four bytes per register in 32-bit mode. For a discrete item or a coil item, the rightmost bit only is used, while all other bits are discarded. Class, CProtocol, is a generalized protocol base class. A protocol is a set of rules governing the format and meaning of the messages (or packets) that are exchanged between the server and the device. CProtocol is designed such that it can put any error-check on bytes before transmitting and also do any error check on response bytes that are received. Class, CReadBitsPkt, reads discrete registers (R1 reference) and coil register (R0 reference). Class, CReadPkt, is a base packet class which provides generalized methods for all those Modbus packets which are meant for reading register values. Class, CReadRegPkt, reads input registers (R3 reference) and holding registers (R4 reference). Class, CWriteMultiBitsPkt, writes into multiple coil registers (R0 reference). Class, CWriteMultiRegsPkt, writes into multiple holding registers (R4 reference). Class, CWritePkt, is a base packet class which provides generalized methods for all those Modbus packets which are meant for writing single or multiple register values. Class, CWriteSingleBitsPkt, writes into single coil registers (R1 reference). Class, CWriteSingleRegPkt, writes into single holding registers (R4 reference).

The DDE handler module 208 implements the toolkit interface functionality for communicating to clients. It handles various DDE communication with clients and uses Wonderware DDE Toolkit 5.0 Library with MFC support to interface server class with the toolkit and supports the DDE message protocol. The DDE server utilizes the DDE handler to implement DDE communication links with clients. All client requests are suitably broken down to one or more of the following operations by DDE Handler: CreateTopic, the server becomes ready to poll the device indicated by topic name; CreateItem, an item can be created only for an already created topic and the server becomes ready for polling the item; ActivateItem, the server starts polling the field device corresponding to topic whose item has been activated and supplies the item value to requesting client periodically; DeactivateItem, polling of the active item is stopped; DeleteItem, the specified item is no more required and hence is deleted; and ExecuteCommand, the client performs a command on the device with the specified topic name, whereby if the device is present, and is able to understand the command, the command processing is carried out by server.

Figure 38:
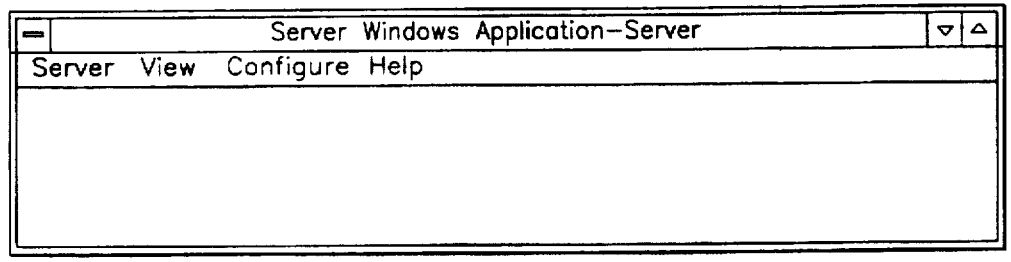
FIGS. 38 and 39 are views of a server windows application window generated by the computer software of FIG. 4.
Figure 39:
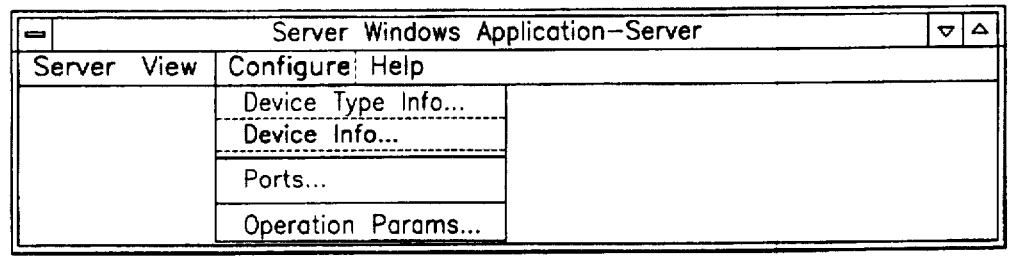
Figure 40:
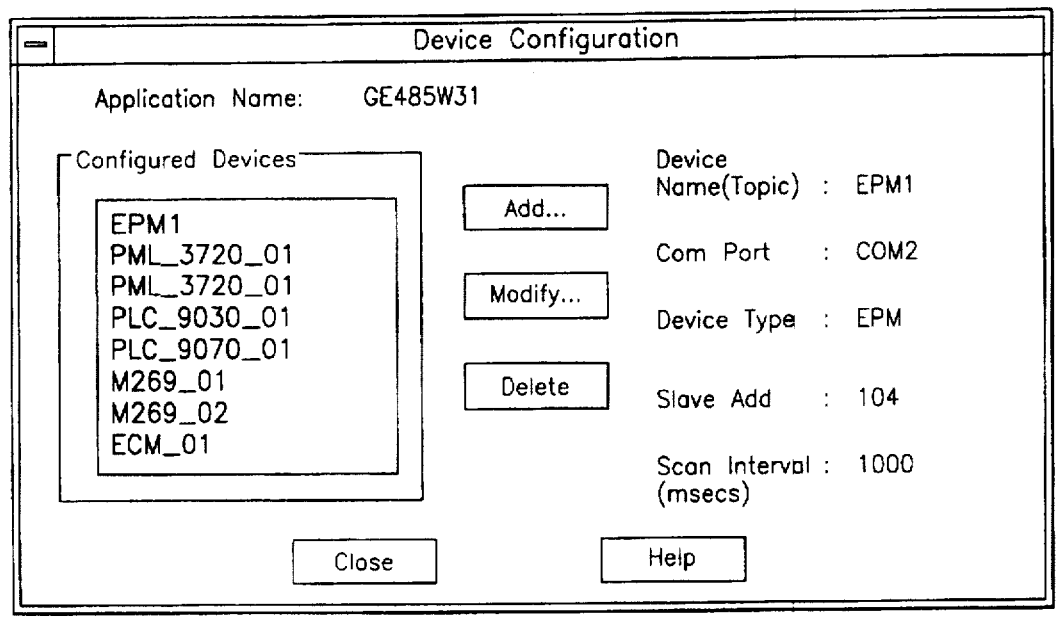
FIG. 40 is a view of a device configuration window generated by the computer software of FIG. 4.
Figure 41:
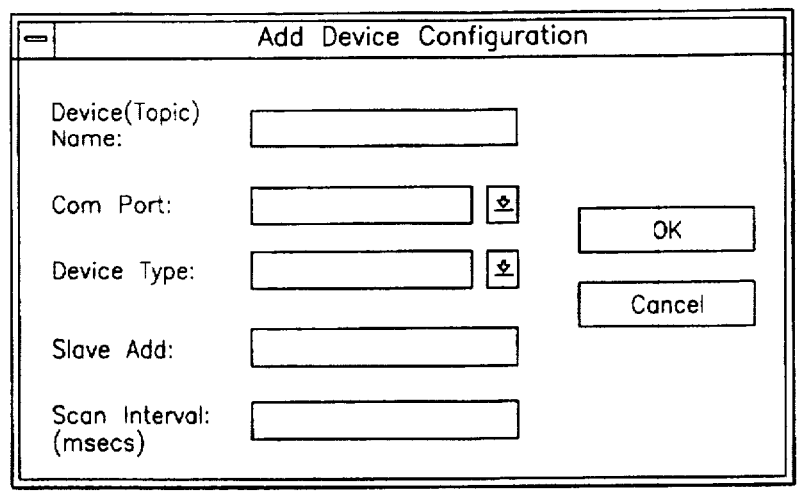
FIG. 41 is view of an add device configuration window generated by the computer software of FIG. 4.
Figure 42:
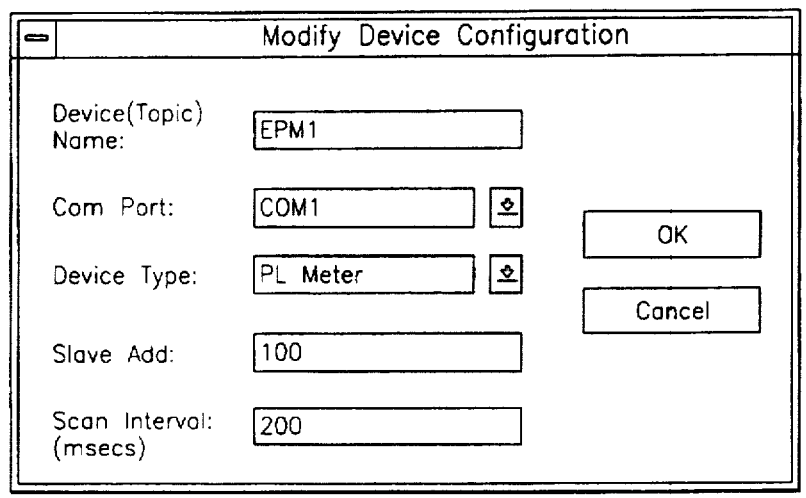
FIG. 42 is view of a modify device configuration window generated by the computer software of FIG. 4.

The DDE SERVER WINDOWS APPLICATION-SERVER screen, off-line mode, is generally shown in FIG. 38. The CONFIGURATION button is selected on the SERVER WINDOWS APPLICATION-SERVER screen generating a menu from which DEVICE INFO is selected as shown in FIG. 39. Selection of DEVICE INFO generates a DEVICE CONFIGURATION screen shown in FIG. 40. From the DEVICE CONFIGURATION screen, configuration of a new device (ADD), modification of an existing device (MODIFY), or deletion of an existing device (DELETE) can be selected. Selection of the ADD button generates an ADD DEVICE CONFIGURATION screen shown in FIG. 41. Selection of the MODIFY button generates a MODIFY DEVICE CONFIGURATION screen shown in FIG. 42. Selection of the DELETE button will result in the device information for that device being deleted.

Figure 43:
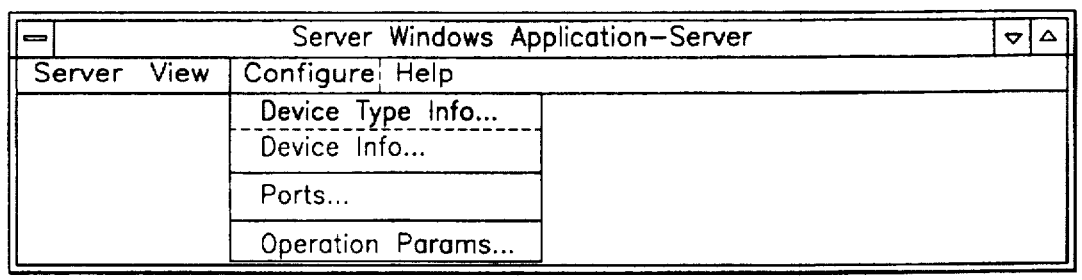
FIG. 43 is a views of the server windows application window generated by the computer software of FIG. 4.
Figure 44:
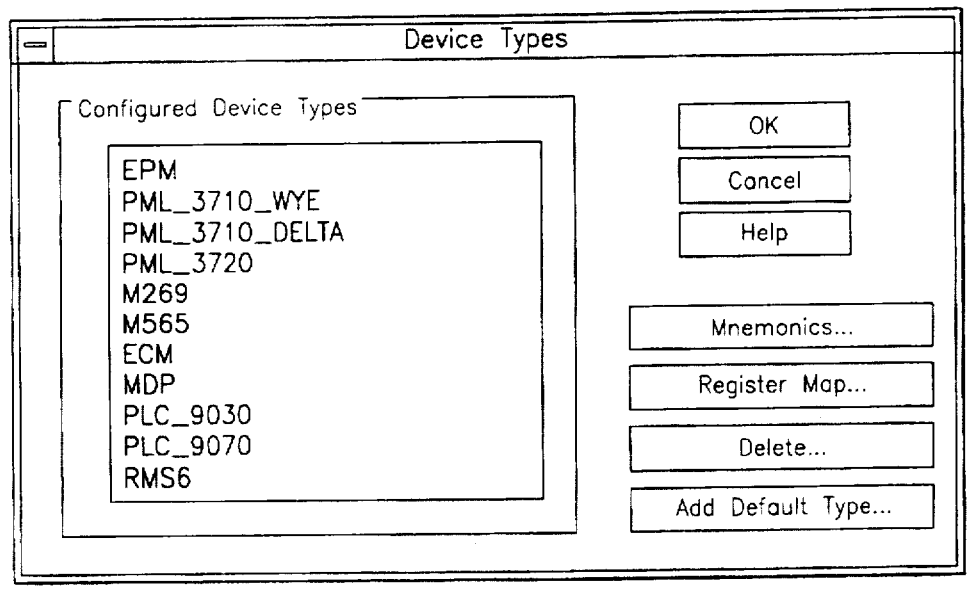
FIG. 44 is view of a device types window generated by the computer software of FIG. 4.
Figure 45:
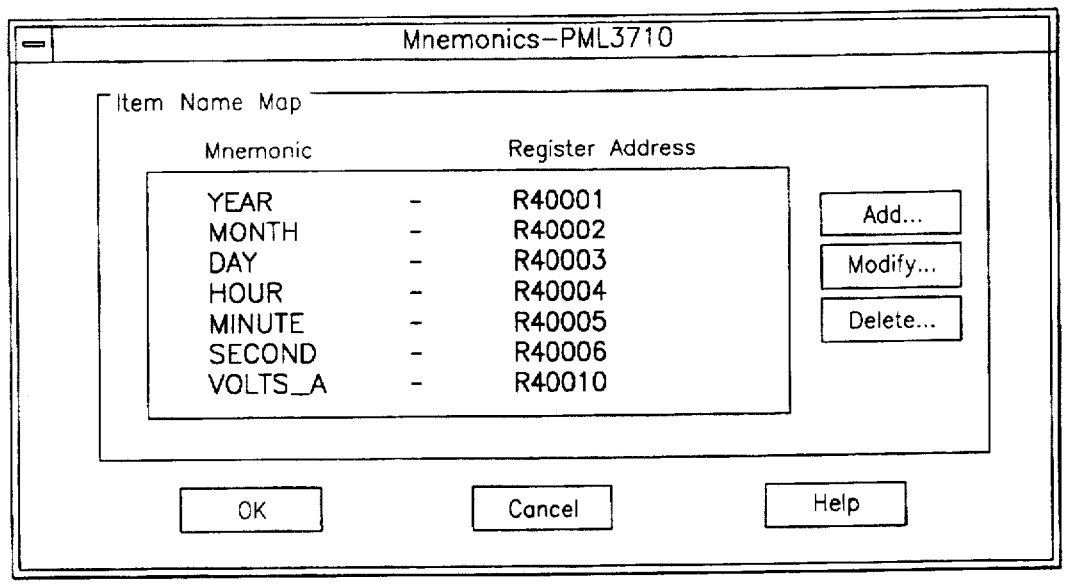
FIG. 45 is view of a mnemonics window generated by the computer software of FIG. 4.
Figure 46:
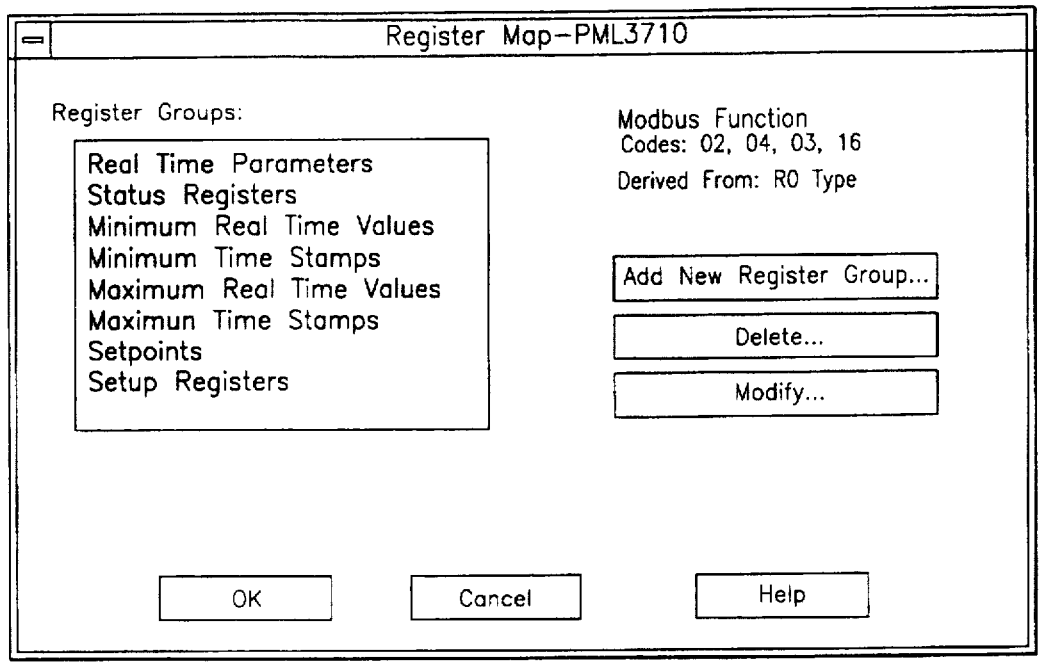
FIG. 46 is view of a register map window generated by the computer software of FIG. 4.

From the menu generated by the CONFIGURATION button on the SERVER WINDOWS APPLICATION-SERVER screen, DEVICE TYPE INFO is selected as shown in FIG. 43. Selection of DEVICE TYPE INFO generates a DEVICE TYPES screen shown in FIG. 44. From the DEVICE TYPES screen, modify the mnemonics for a type (MNEMONICS), modify the register map for a type (REGISTER MAP), delete default type (DELETE), or add a new default type of device (ADD DEFAULT TYPE) can be selected. Selection of the MNEMONICS button generates a MNEMONICS screen, in this example for the PML3710 device, shown in FIG. 45. Selection of the REGISTER MAP button generates a REGISTER MAP screen, in this example for the PLM3710 device, shown in FIG. 46. Selection of the DELETE button will result in that device type being deleted.

Figure 47:
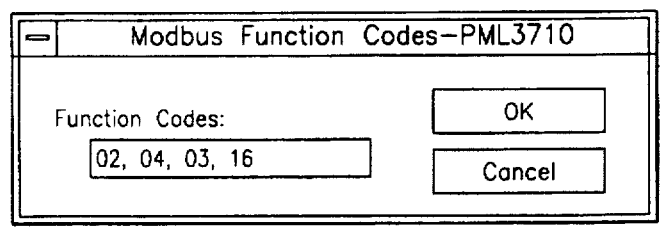
FIG. 47 is view of a Modbus function codes window generated by the computer software of FIG. 4.
Figure 48:
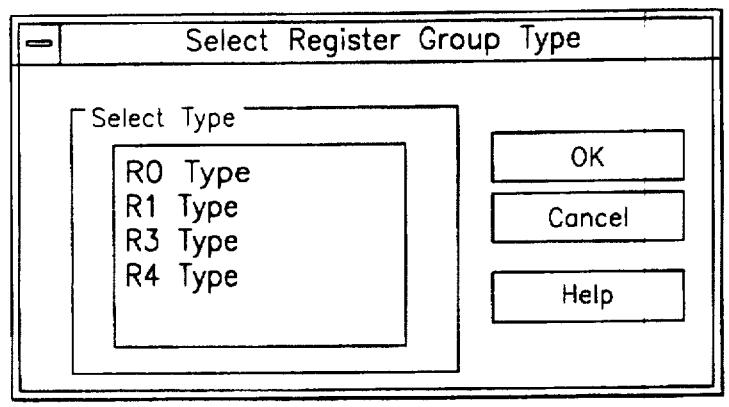
FIG. 48 is view of a select register group type window generated by the computer software of FIG. 4.
Figure 49:
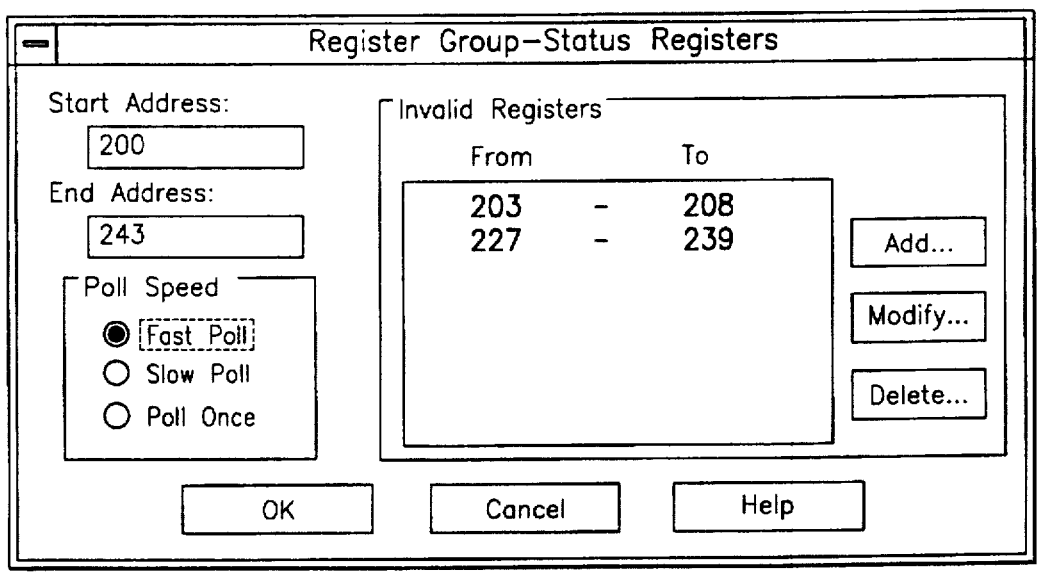
FIG. 49 is view of a register group-status registers window generated by the computer software of FIG. 4.
Figure 50:
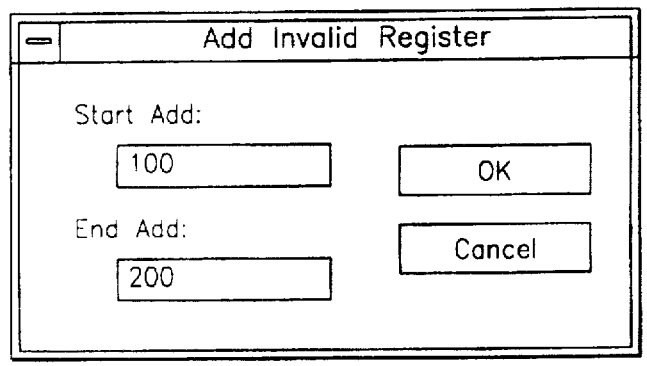
FIG. 50 is view of a add invalid register window generated by the computer software of FIG. 4.
Figure 51:
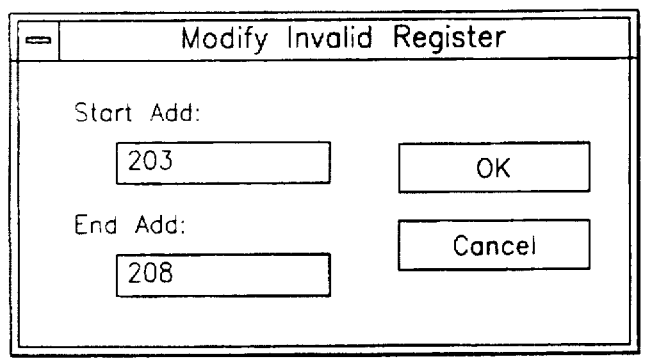
FIG. 51 is view of a modify invalid register window generated by the computer software of FIG. 4.

From the REGISTER MAP screen, addition of a new register group (ADD NEW REGISTER GROUP), delete a register group (DELETE), or modification of a register group (MODIFY) can be selected. Selection of the ADD NEW REGISTER GROUP button when the register group being added is the first register group present in the device type generates a MODBUS FUNTION CODES screen, in this example for the PML3710 device, shown in FIG. 47, for modification of the function codes. Modification of the FUNTION codes for a device type is not otherwise available. Thereafter, the SELECT REGISTER GROUP TYPE screen shown in FIG. 48, is generated for selection of the register group. Selection of the OK button on the SELECT REGISTER GROUP TYPE screen after the registers have been selected generates a REGISTER GROUP-STATUS REGISTERS screen shown in FIG. 49. The REGISTER GROUP-STATUS REGISTERS screen provides register group information and is displayed when the MODIFY button in the REGISTER MAP screen is selected. Selection of the ADD button on the REGISTER GROUP-STATUS REGISTERS screen generates an ADD INVALID REGISTER screen shown in FIG. 50, for adding invalid registers. Selection of the MODIFY button on the REGISTER GROUP-STATUS REGISTERS screen generates a MODIFY INVALID REGISTER screen shown in FIG. 51, for modifying invalid registers.

Figure 52:
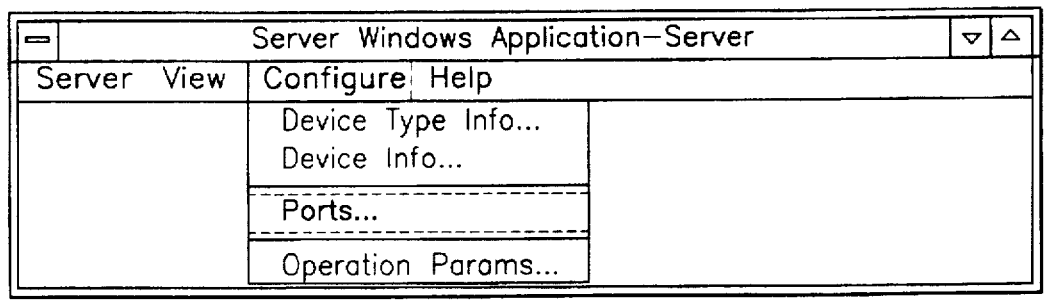
FIG. 52 is view of the server windows application window generated by the computer software of FIG. 4.
Figure 53:
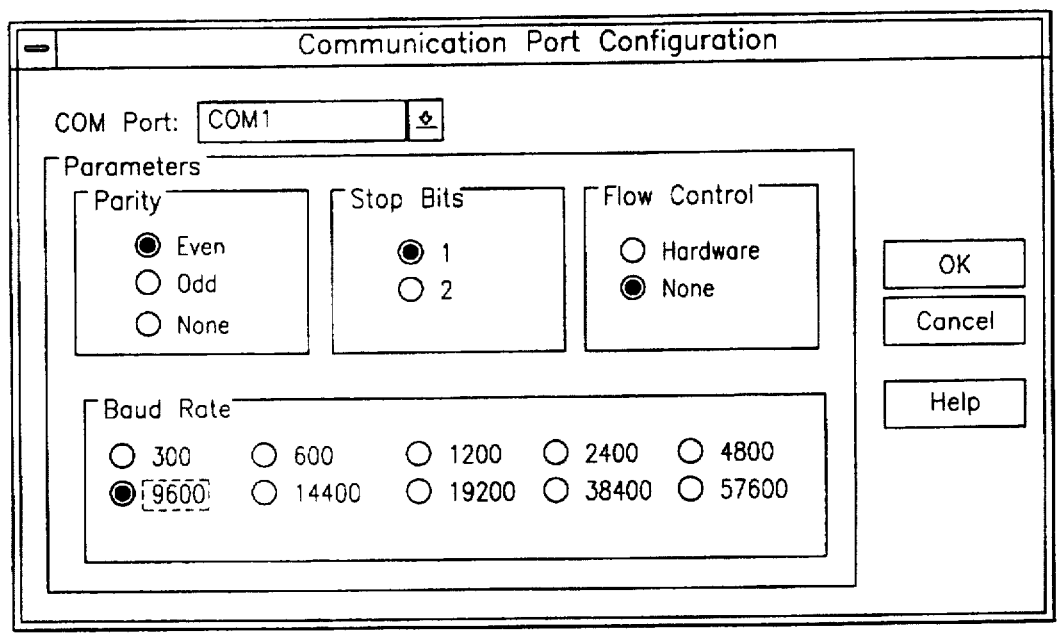
FIG. 53 is view of a communication port configuration window generated by the computer software of FIG. 4.

From the menu generated by the CONFIGURATION button on the SERVER WINDOWS APPLICATION-SERVER screen, PORTS is selected as shown in FIG. 52. Selection of PORTS generates a COMMNICATION PORT CONFIGURATION screen shown in FIG. 53. From the PORTS screen parity, stop bits, flow control and baud rate are displayed and set for each communication port.

Figure 54:
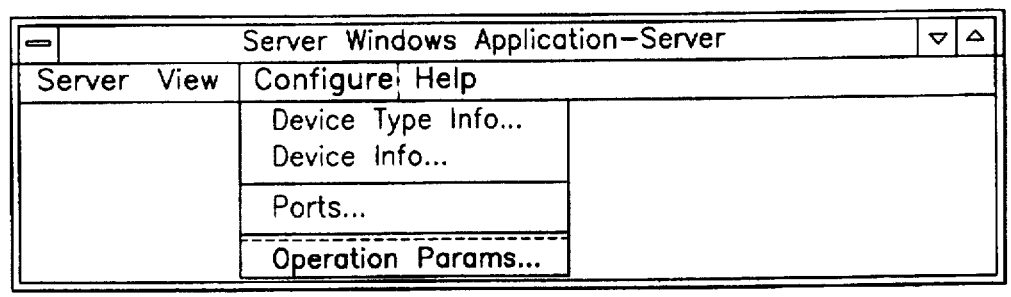
FIGS. 54-59 are views of the server windows application window generated by the computer software of FIG. 4.
Figure 55:
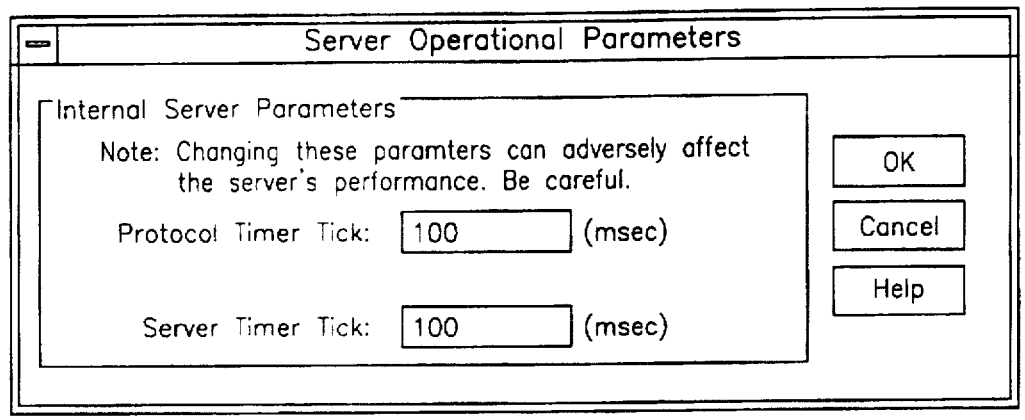

From the menu generated by the CONFIGURATION button on the SERVER WINDOWS APPLICATION-SERVER screen, OPERATION PARAMS is selected as shown in FIG. 54. Selection of OPERATION PARAMS generates a SERVER OPERATIONAL PARAMETERS screen shown in FIG. 55. From the SERVER OPERATIONAL PARAMETERS screen protocol timer tick and valid data timeout are displayed and set.

Figure 56:
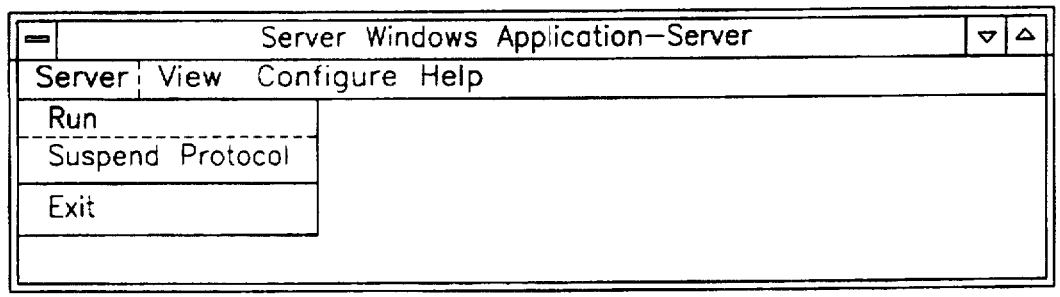
Figure 57:
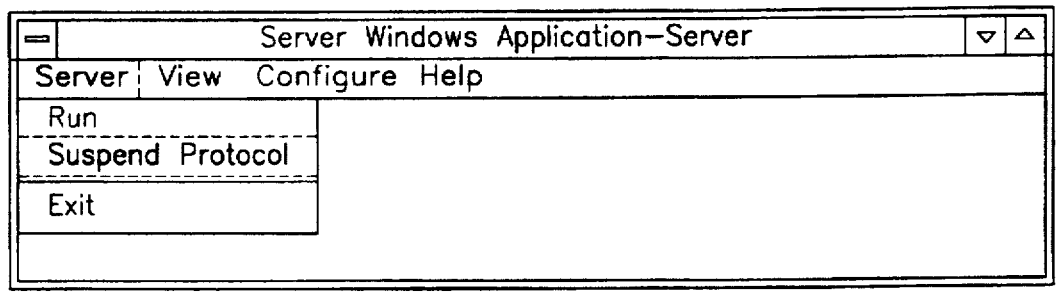
Figure 58:
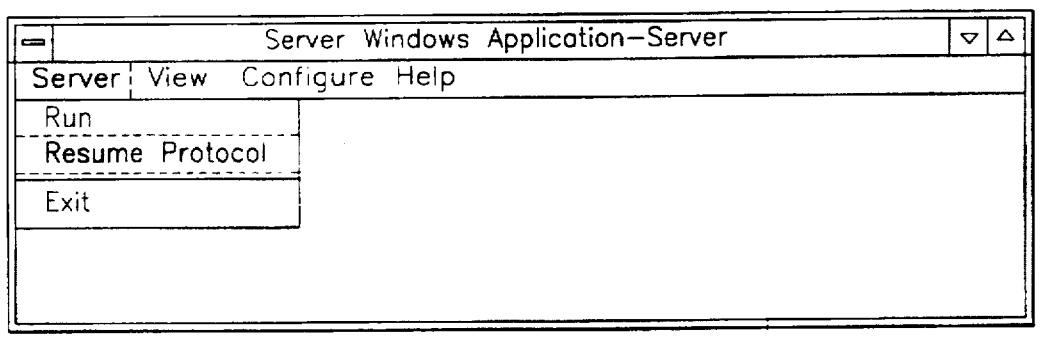

After configuration is set as defined above, the SERVER button is selected on the SERVER WINDOWS APPLICATION-SERVER screen generating a menu from which RUN is selected as shown in FIG. 56, bringing the server on-line and disabling the configuration option. From the menu generated by the SERVER button on the SERVER WINDOWS APLICATION-SERVER screen, SUSPEND PROTOCOL is selected as shown in FIG. 57, which allows suspension of the protocol for purposes of analysis. Once protocol analysis is completed, the menu generated by the SERVER button on the SERVER WINDOWS APLICATION-SERVER screen displays a RESUME PROTOCOL, as shown in FIG. 58, which is selected to resume protocol.

Figure 59:
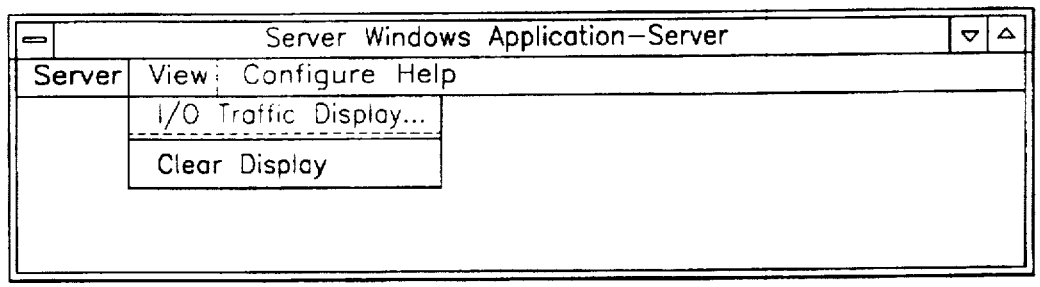
Figure 60:
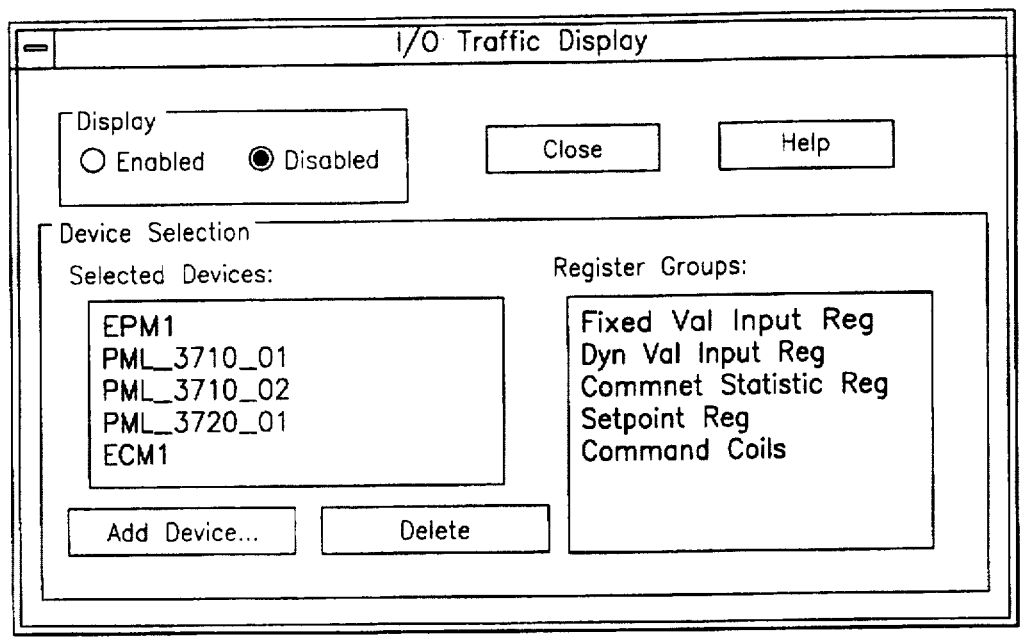
FIG. 60 is view of an I/O traffic display window generated by the computer software of FIG. 4.
Figure 61:
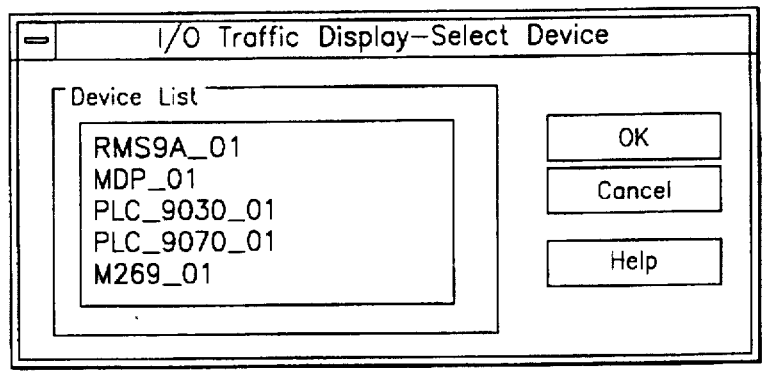
FIG. 61 is view of an I/O traffic display-select device window generated by the computer software of FIG. 4.

Once the server is on-line, as described above, the VIEW button is selected on the SERVER WINDOWS APLICATION-SERVER screen generating a menu from which I/O TRAFFIC DISPLAY is selected as shown in FIG. 59. Selection of I/O TRAFFIC DISPLAY generates an I/O TRAFFIC DISPLAY screen shown in FIG. 60, which provides a display of I/O traffic. Selection of the DELETE button on the I/O TRAFFIC DISPLAY screen deletes the selected device. Selection of the ADD DEVICE button on the I/O TRAFFIC DISPLAY screen generates an I/O TRAFFIC DISPLAY-SELECT DEVICE screen shown in FIG. 61, where active devices not selected for I/O traffic display are listed for selection.

Figure 62:
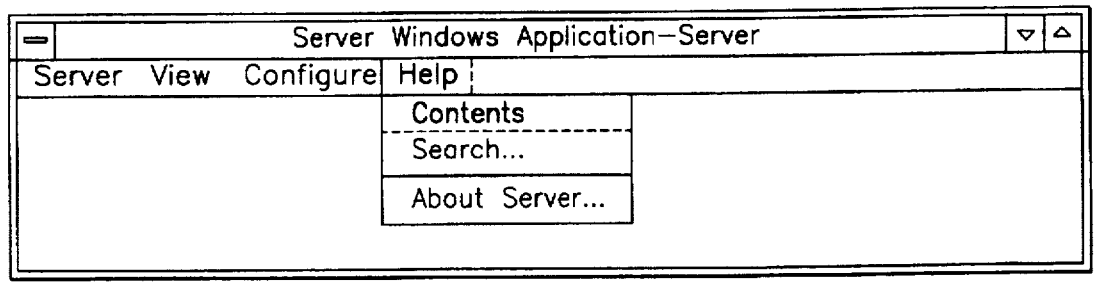
FIG. 62 is view of the server windows application window generated by the computer software of FIG. 4.

The HELP button on the SERVER WINDOWS APLICATION-SERVER screen can be selected at any time. Selection of the HELP button generates a menu from which CONTENTS, SEARCH or ABOUT SERVER can be selected, as shown in FIG. 62. Selection of CONTENTS generates help contents screens. Selection of SEARCH generates help search topics screens. Selection of ABOUT SERVER generates information screen regarding the DDE server.

In summary, the DDE server uses the Modbus RTU protocol to communicate with a field device. The server has to poll these devices continuously and get the required data for a client. Communication parameters are set up during configuration defining what communication is to be carried out. No initialization before communicating to the devices is necessary. The server always assumes that all the devices are ready and polls them at its poll speed. All fast poll registers are polled continuously, slow poll registers are polled 'n' times slower than fast poll registers where 'n' is read from an N file, all poll once registers are polled only once when the item becomes active. If some devices do not respond, the server declares them as DEAD and informs interested clients. More specifically, the server transmits a query packet and waits for response, i.e., the server is the master and the device is the slave. If a response from the specified device is received within a fixed time, the server checks the response for CRC error. If CRC available at the end of the response packet matches the CRC computed by server, then the response is accepted and is processed further. If CRC in above case does not match or the response has a CRC error, the server retransmits the packet. A Modbus function code is used, for certain devices that are connected through the concentrator, to request field devices to retransmit the response packet where a CRC error has occurred previously. Otherwise, a query packet is retransmitted by server. The server transmits the query packet to the device until it either gets an accepted response or a specified retransmit limit has been reached. If retransmit limit is reached, the server declares the corresponding device DEAD and stores the query packet in a slow poll queue. The same query packet will be tried again at a slower frequency. If during dead device poll, the server receives a good response packet from the device then server makes that device ACTIVE and will resume normal polling for the device.

When the server is not running (i.e., off-line mode), the user can configure the system using the configuration menu commands. The user can configure; communication port parameters, device address-topic, device register map and invalid registers, register group polling priority, device type supported function codes, and operational parameters.

When the server is running (i.e., on-line mode), the user can view the server's communications with field devices in I/O traffic display. This display tells the user about all the outgoing and incoming server data packets as well as all errors happening during transactions. The user may select the devices of interest for I/O traffic viewing by using the I/O traffic display dialog.

The DDE server starts up, reads configuration data from disk and initializes all other objects. The system is started in the on-line mode. The application module is used for configuration of the system. Whenever the user confirms the change (e.g., by pressing OK button, accepting the change), all configuration data is stored into hard disk.

The DDE handler passes all client requests for any topic and any item to the application module. The application module validates that the device exists and passes further request of item data to the device module. The device module is in turn dependent on register groups for getting data in the correct format for any item in any device. The register groups decide which registers are to be polled and with what Modbus function packets. Accordingly, the register groups create a suitable packet and passes it to the communication module. The communication module carries out the actual transaction with the device. The result of the transaction is returned to the register groups which in turn passes it to the device module. After getting the data, the device module updates it to the clients.

Modbus concentrator 138 is generally a multiple channel data converter/multiplexer. Concentrator 138 translates data between two protocols for multiple metering and protective devices (i.e., between General Electric Co.s' Commnet peer to peer network protocol and the industry standard Modbus RTU protocol). The concentrator acts as a pseudo host for Commnet devices and as pseudo slave for each device in the Modbus RTU network. Concentrator 138 creates virtual Modbus devices for every physical Commnet device attached to its multiple channels. Multiple channels allow parallel processing for data conversion, improving the throughput of the network in which it is utilized. Further, concentrator 138 autoconfigures itself by seeking all the devices attached in the Commnet channels and storing this information in a configuration database which is used to determine address conflicts among the attached Commnet devices.

Multi-channel data collection and conversion decreases data latency of all the devices attached to the concentrator. By keeping a virtual device map in its own memory, the concentrator improves the response time of requests from the host computer acting as master in the RS485 Modbus RTU protocol. The virtual devices created in the concentrator act as if they were any other slave device in the network. The concentrator device is transparent in the system. In other words, the system does not know that there is an interface device in the middle of two different network architectures/protocols.

The autoconfiguration and address conflict reporting decreases the amount of time needed to configure the devices. The autoconfiguration also eliminates any errors that could be caused by a user during device configuration by automatically seeking only valid devices. Unhealthy device addresses that conflict among attached devices can be found by using the information of the concentrator once the autoconfiguration function is complete.

Figure 63:
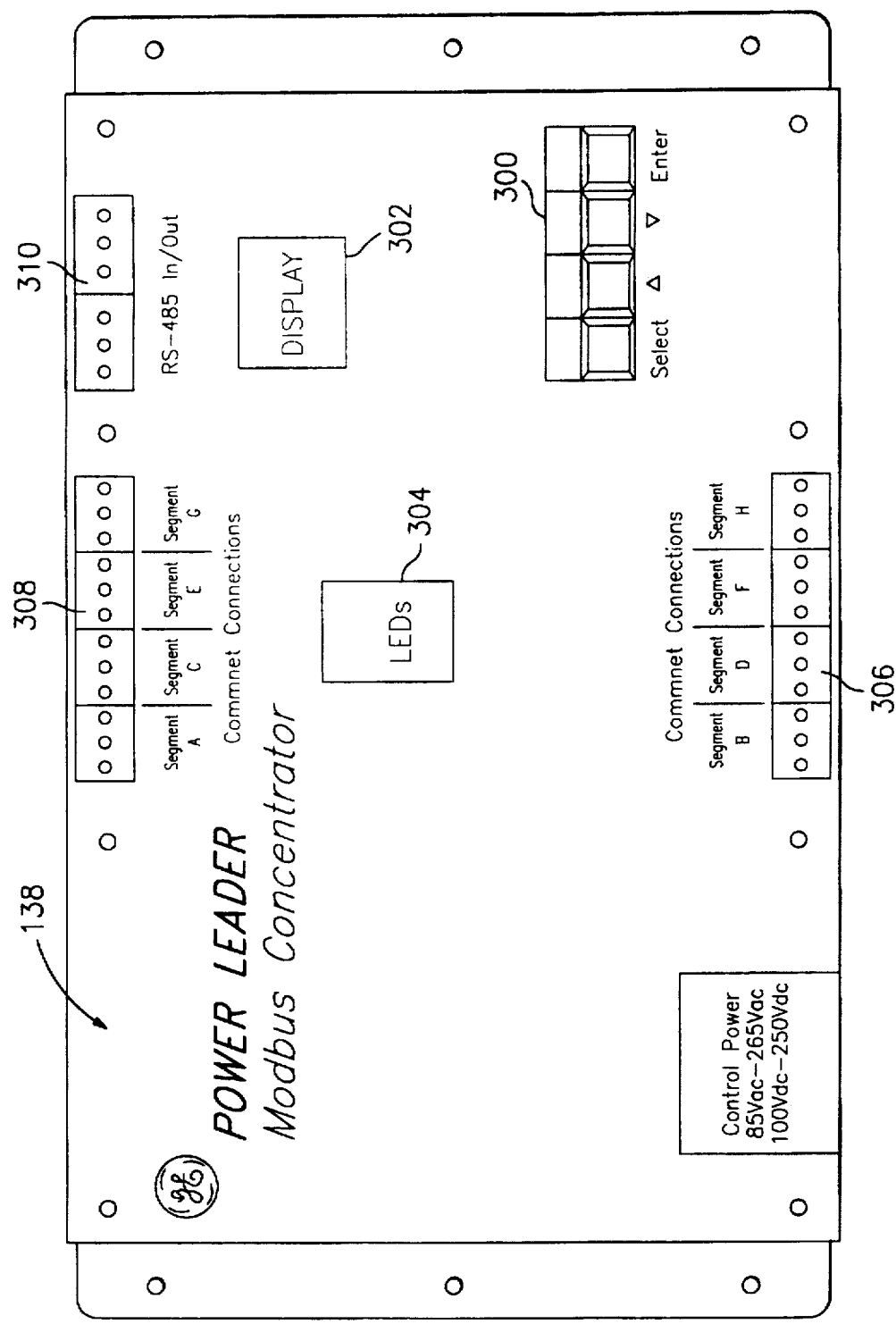
FIG. 63 is front elevation view of a Modbus concentrator in the power management and control system of the present invention.

The concentrator in the present example provides eight Commnet channels and allows connection of four Commnet devices per channel. The RS485 standard physical interface is preferably opto-isolated. Further, referring to FIG. 63, the concentrator provides input of data using four function switches (keys) 300, a four character display for feedback information 302, two bar graph status LEDs 304 for operation status, Commnet connections 306 and 308, and RS485 connections 310.

Figure 75A:
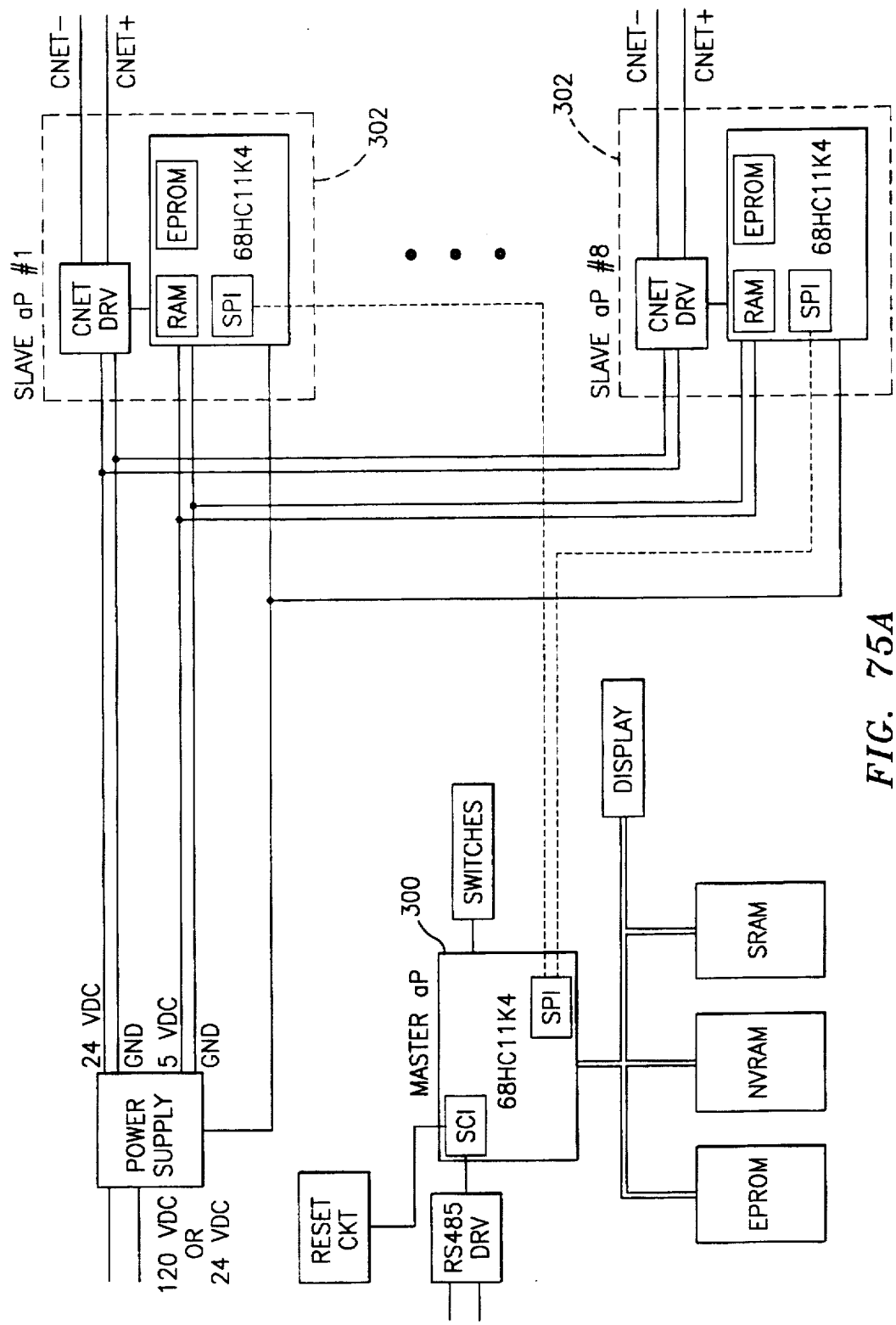
FIG. 75A is a schematic block diagram of the Modbus concentrator in accordance with the present invention.
Figure 75B:
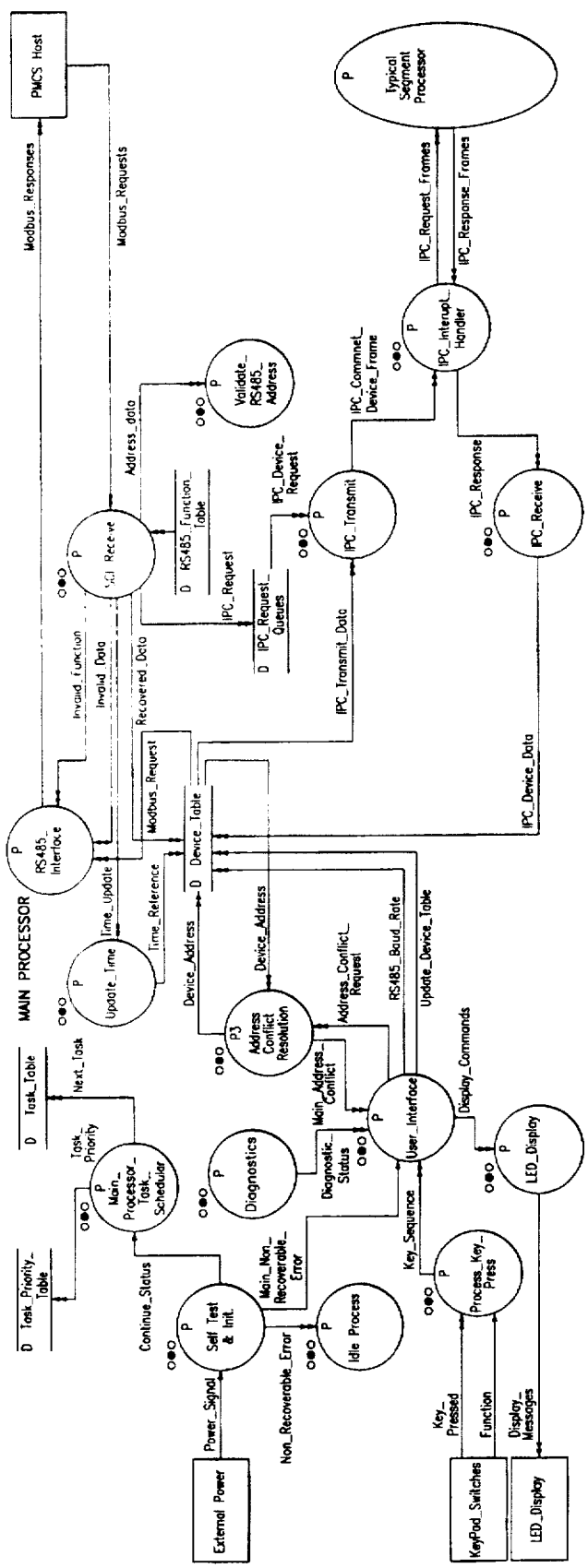
FIG. 75B is a system diagram of the main processor in the Modbus concentrator of the present invention.
Figure 76:
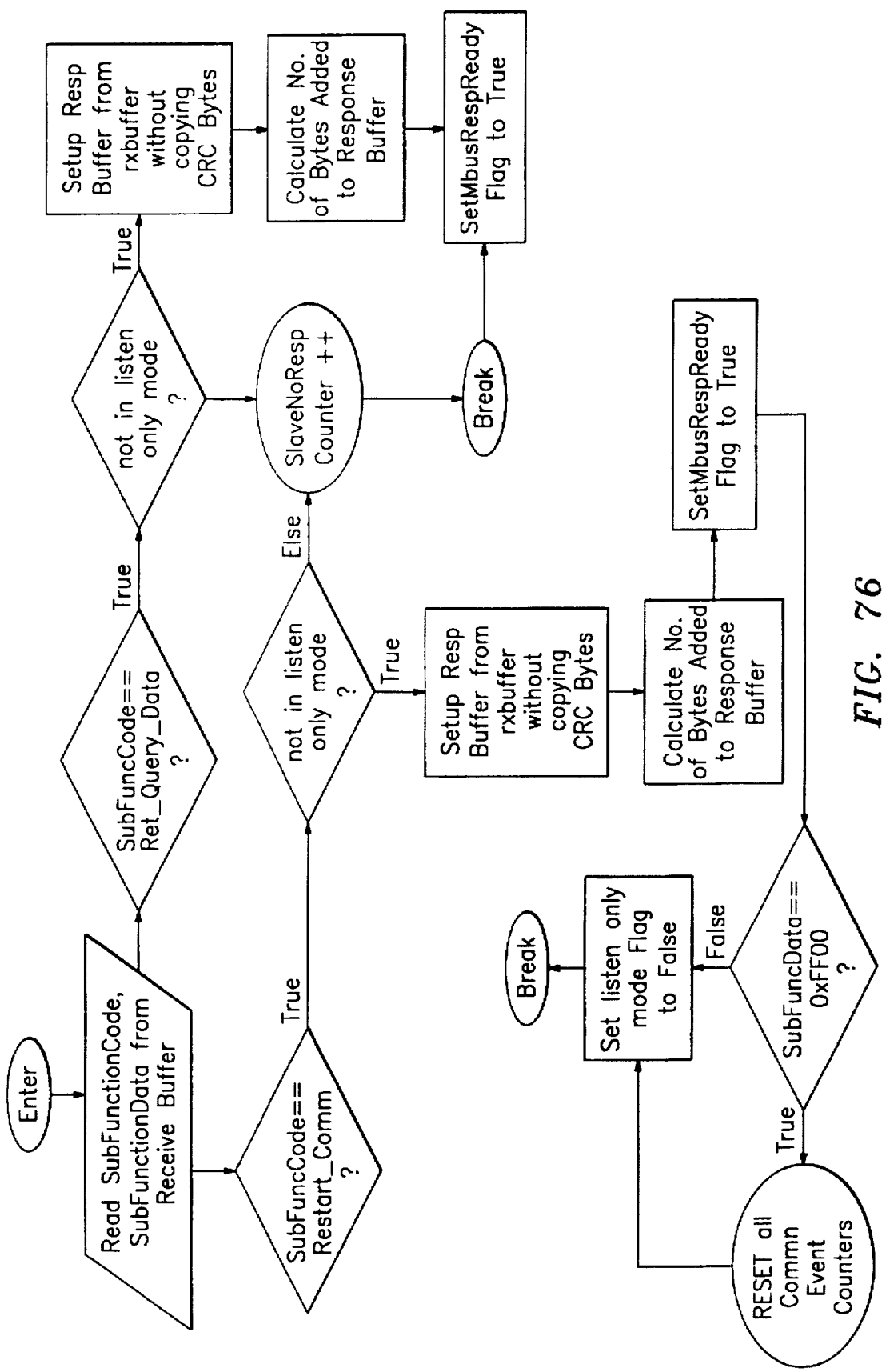
FIGS. 76-83 are software structure diagrams of the diagnostics module of the Modbus concentrator.
Figure 77:
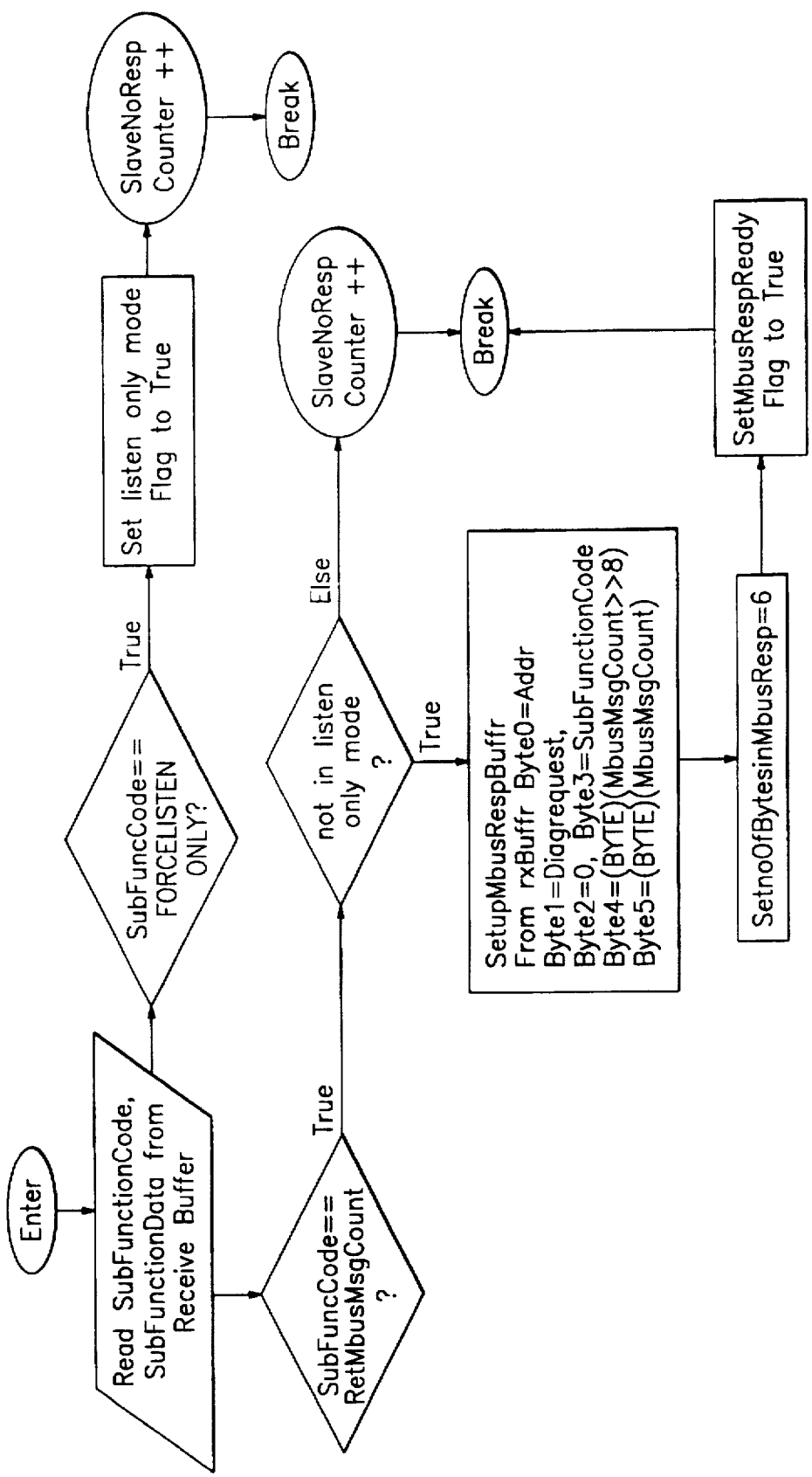
Figure 78:
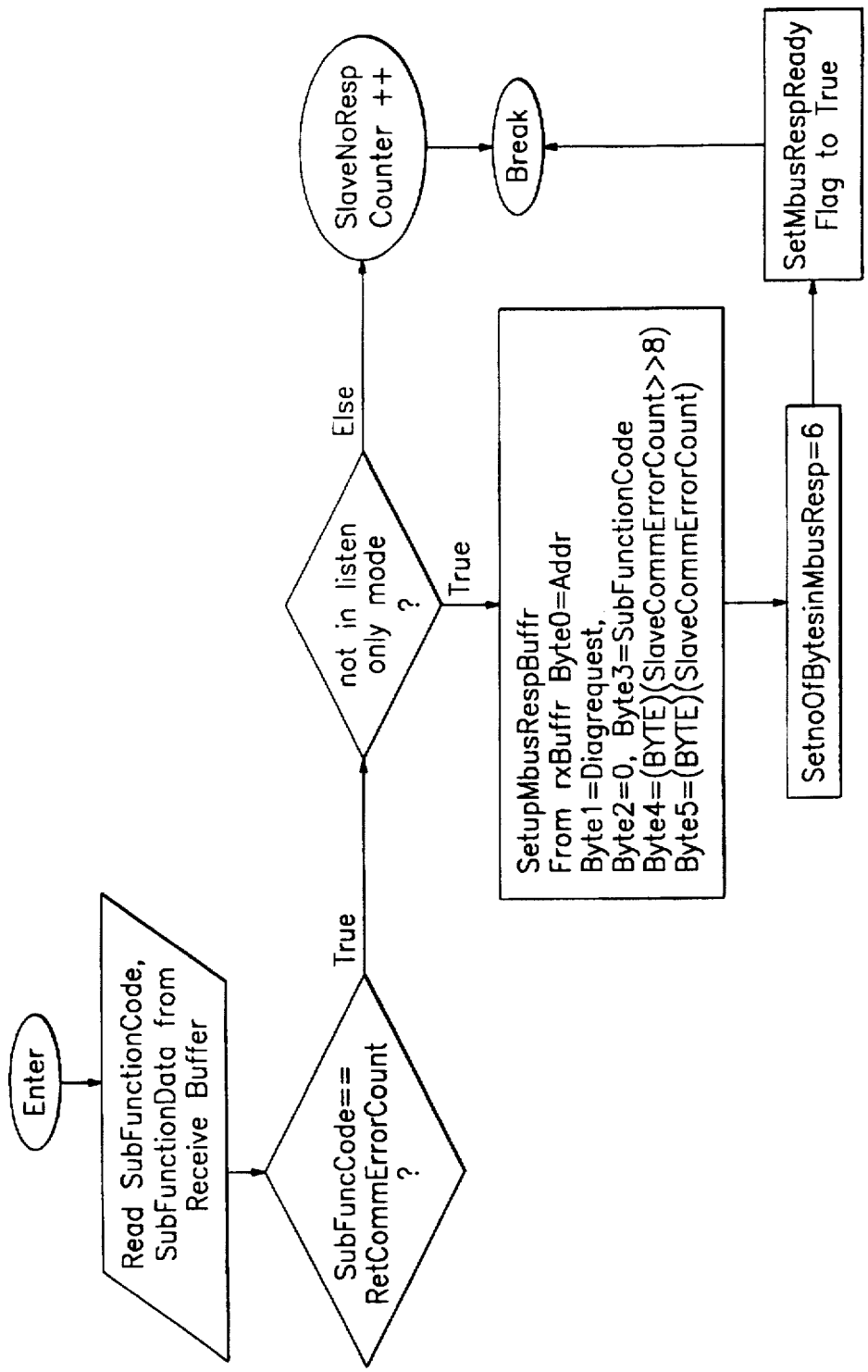
Figure 79:
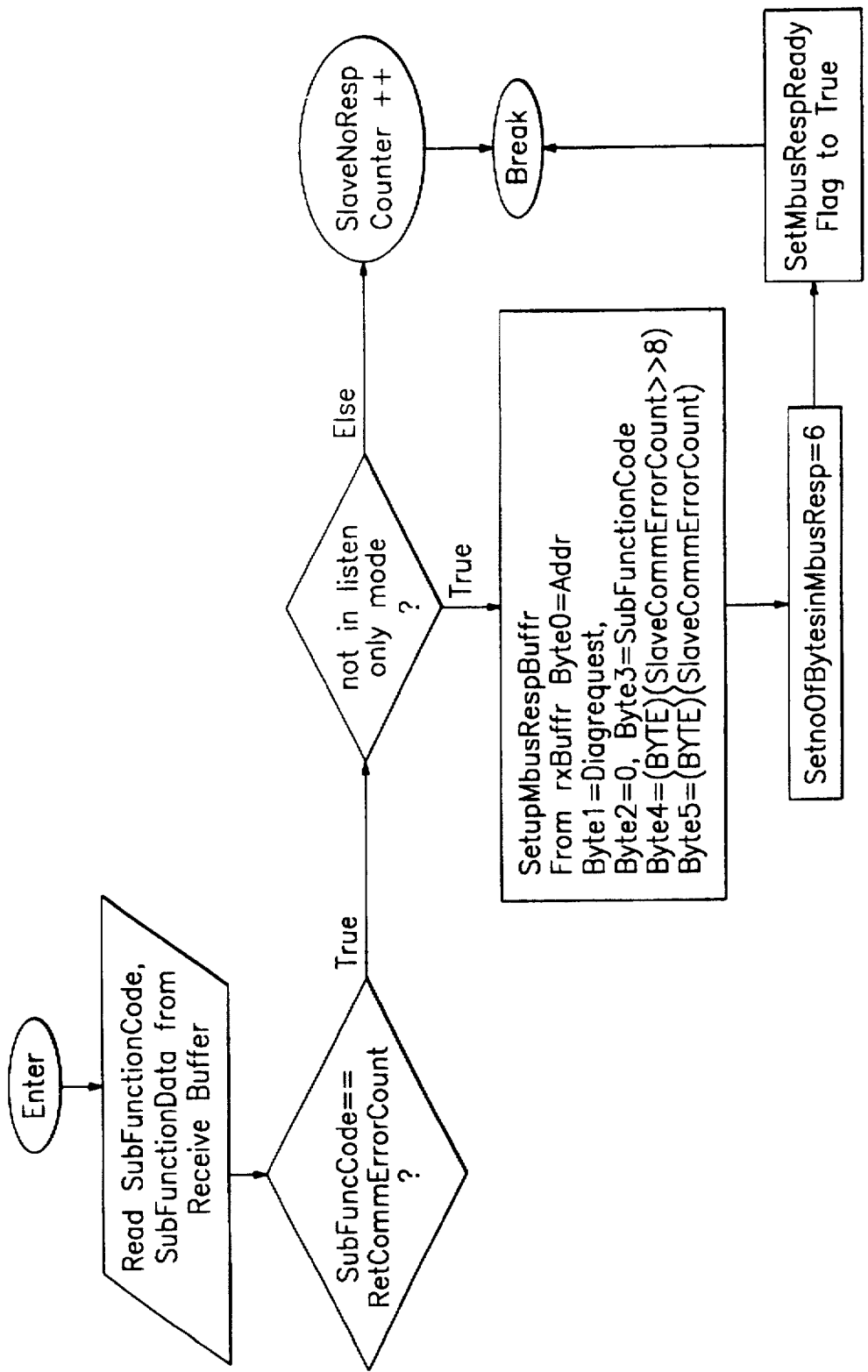
Figure 80:
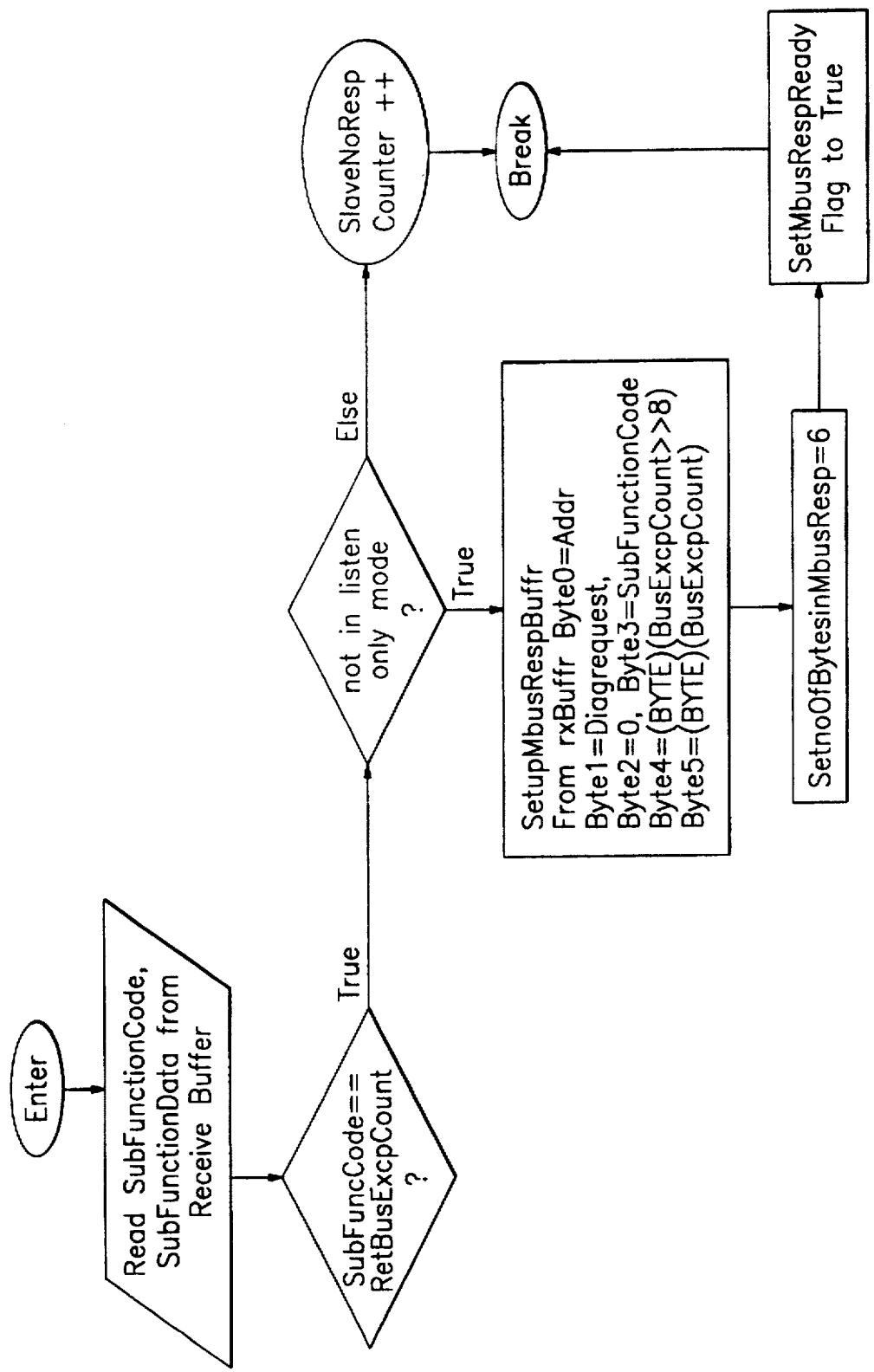
Figure 81:
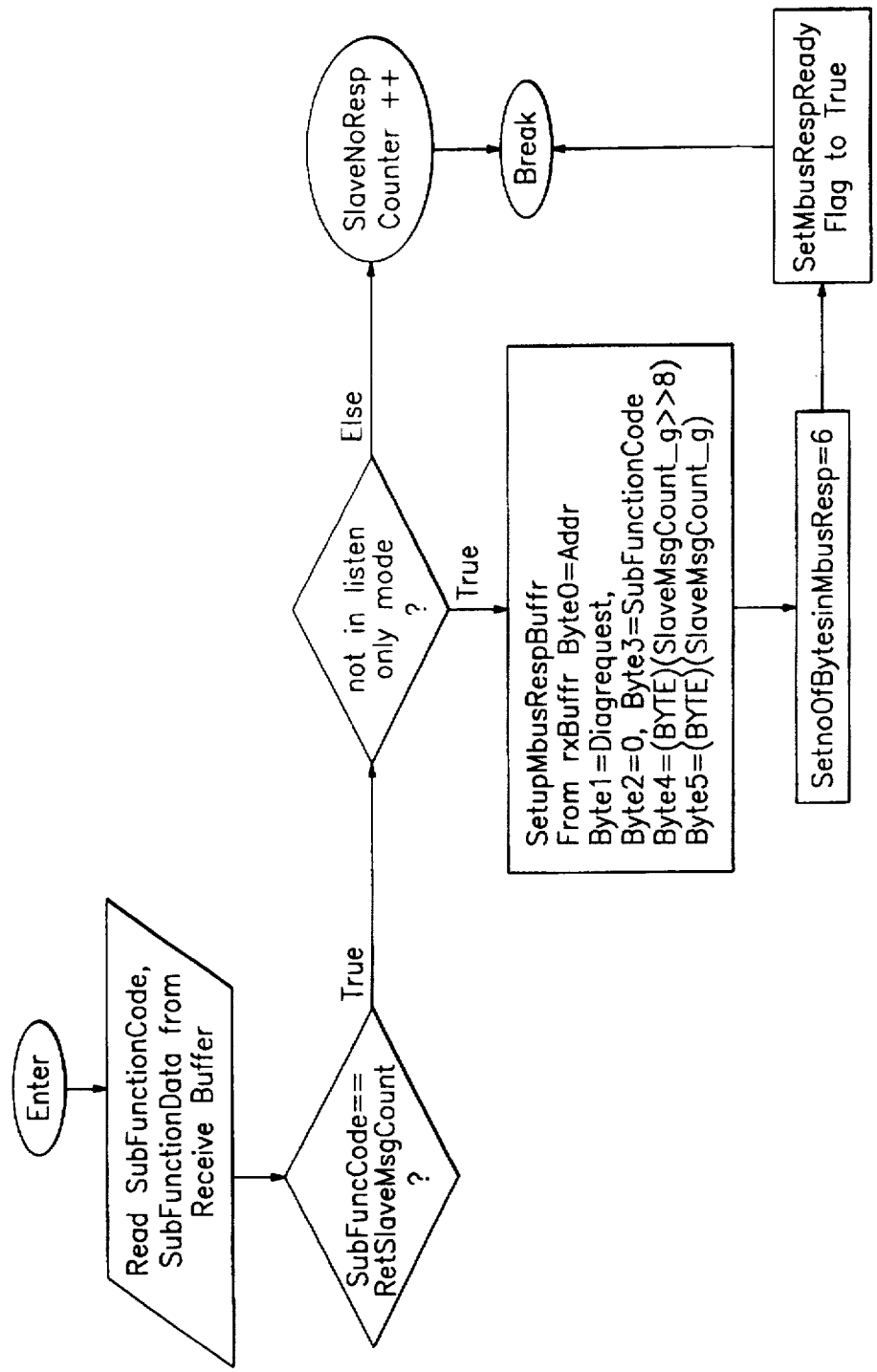
Figure 82:
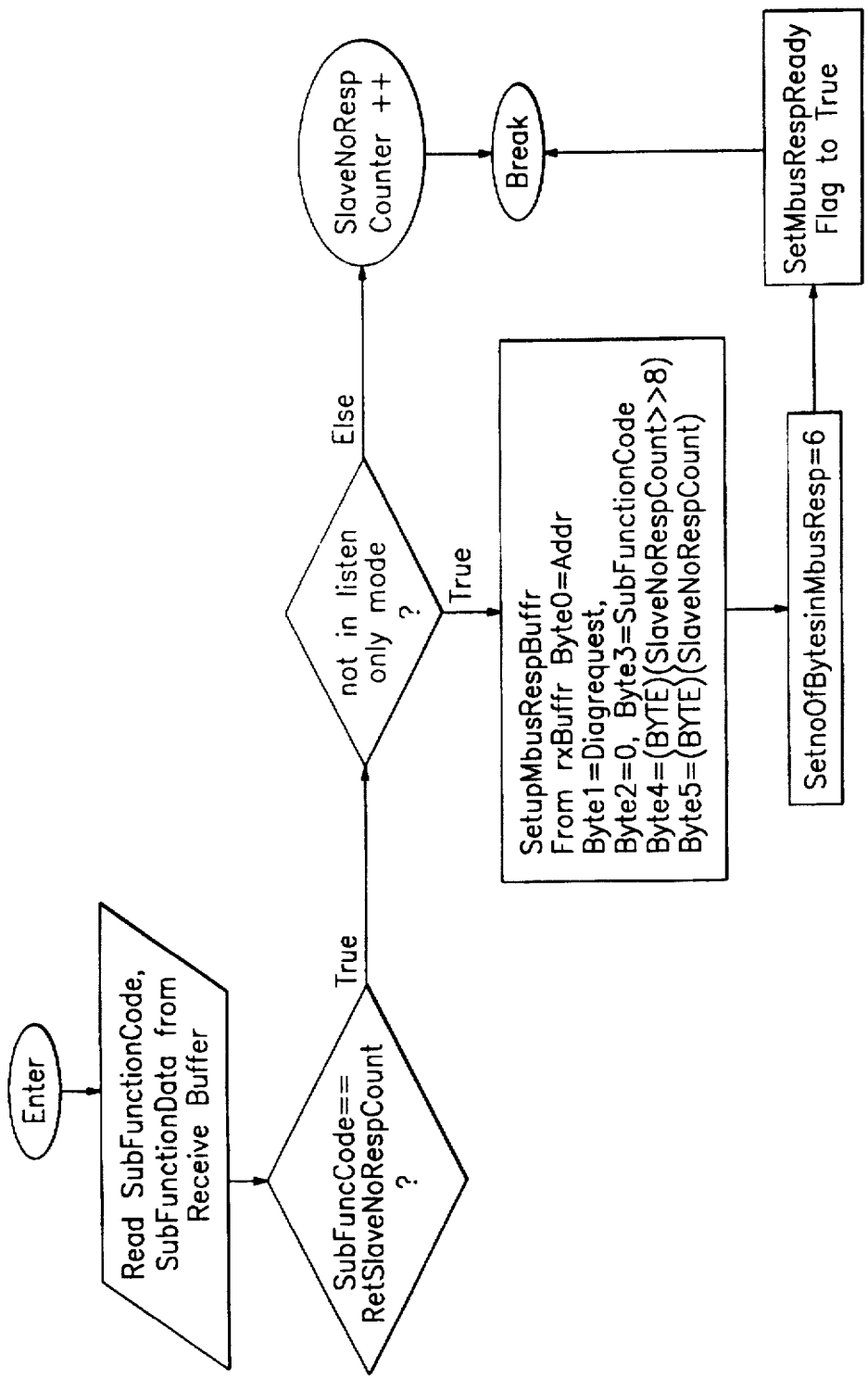
Figure 83:
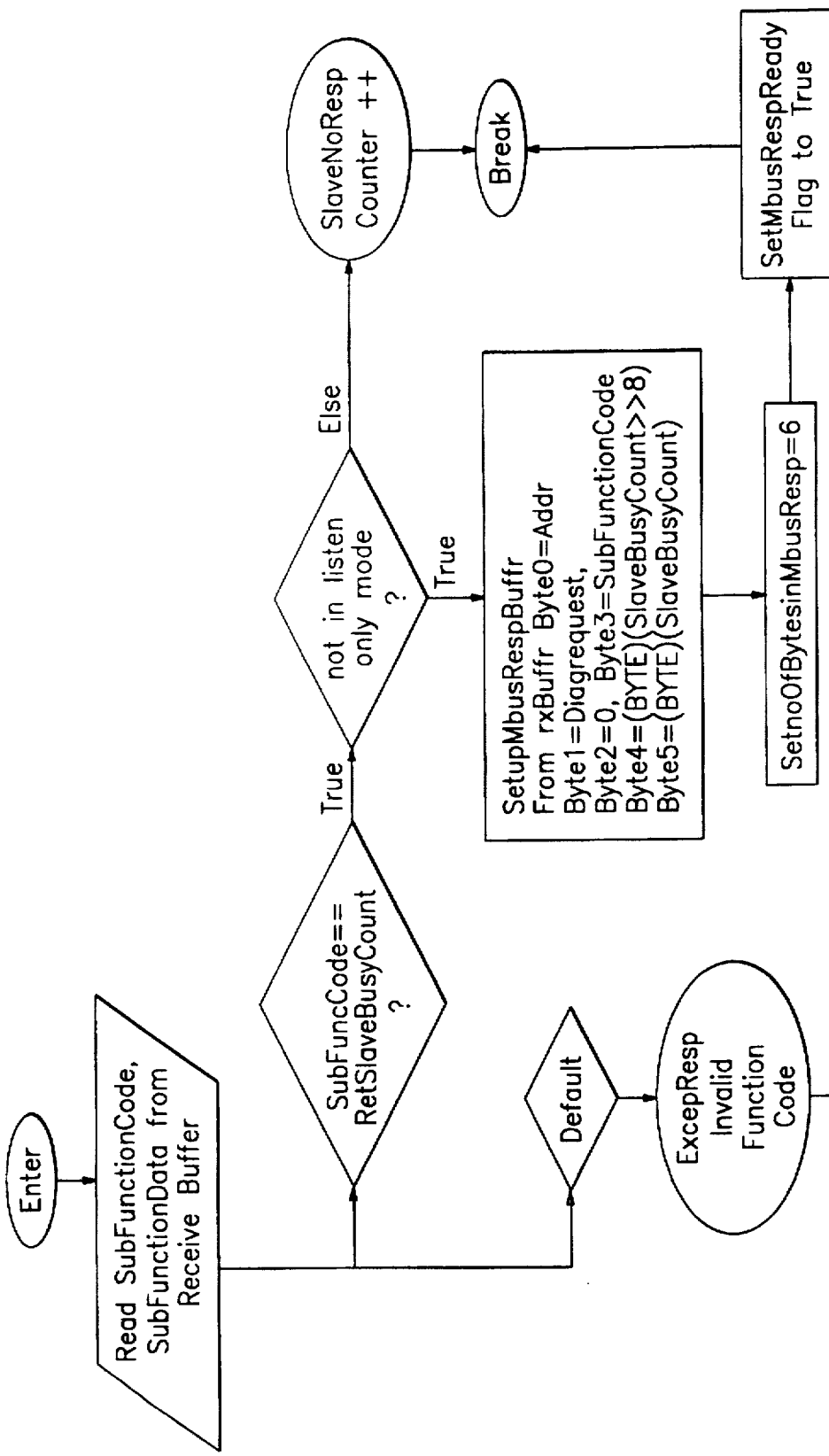

Referring to FIGS. 75A and B, a main processor (e.g., Motorola 68HCH11K4) 300 performs the processing tasks and interfacing to the host computer while eight segment processors (e.g., Motorola 68HCH11A1) 302 perform the processing tasks and interfacing with the Commnet devices. 1K byte of RAM memory is allocated for holding engineering unit data for each Commnet device in the main processor and 8K byte of RAM is allocated for holding raw Commnet device data of each device in the segment processors.

Modbus concentrator 138 communicates with the computer through a command-response protocol in which the Modbus concentrator (slave) responds to the computer (master) requests. In this architecture, the computer initiates transactions using Modbus RS-485 request frames and the Modbus concentrator responds by supplying the requested data to the computer in the appropriate response message, or by taking appropriate action requested by the computer. Each Modbus concentrator has a unique device address on the RS-485 interface.

The Modbus RTU protocol defines the format of the frame for all requests by placing into it the receivers address (slave) a function code defining the requested action, any data to be sent and an error checking field. The Modbus concentrator response message is also constructed using the Modbus RTU protocol. The Modbus concentrator response frame contains its address, confirming the action taken, any data to be returned and an error checking field. The Modbus concentrator sends an exception message in response if an error occurred in receipt of a message, or if the Modbus concentrator is unable to perform the requested action. The basic format of a Modbus request and response frames are illustrated in the following TABLE.

TABLE

| Request Frame | Response Frame |
| --- | --- |
| Device Address → | Device Address |
| Function Code | Function Code |
| Data Bytes ← | Data Bytes |
| Error Check | Error Check |

The device address field of the Modbus frame consists of one byte (i.e., 8 bits). In the present example, valid Modbus concentrator addresses are in the range of 1–247 (decimal). The computer addresses a virtual device by placing its address in the address field of the frame. When the virtual device sends its response, it places its own address in this address field to let the computer know which virtual device is responding, if more than one are present. Address '0' is used for a broadcast address. No response from the slave devices is expected for a broadcast message. The host computer downloads time to the virtual devices connected to the concentrator. On receipt of this message, the Modbus concentrators main processor and segment processors update the time in their respective set point registers.

The function code field of a message is one byte. The Modbus concentrator supports only a subset of Modbus RTU protocol function codes. The data field of the Modbus frame is constructed using sets of two hexadecimal digits, in the range of 00 to FF hexadecimal, and represents additional information. The date field of request frame contains information that the Modbus concentrator must use in performing the action defined by the function code. The response frame contains information the computer requested from the Modbus concentrator. The error checking field is two bytes wide and is based on a cyclical redundancy check (CRC) calculation performed on the message contents.

The Modbus concentrator has the capability to interface with up to eight Commnet segments. Each segment processor of the Modbus concentrator interfaces with up to a maximum of four Commnet devices. The segment processors are responsible for scheduling the transmission of Commnet request messages, receiving scheduled response messages and unsolicited messages from the Commnet devices. The Commnet protocol is described in CommNet Device Functional Handbook (GE ED&C 331A3105P1) and CommNet Application Language Handbook (GE ED&C 331A2673P1) which are incorporated herein by reference.

A select key, when pressed after prime power is applied to the Modbus concentrator, deactivates the message scrolling on the display and initiates the menu startup. The select key also allows the user to go back to the previous sub-menu. An enter key initiates the next sub-menu for the corresponding menu option. If the user presses the enter key when the display at the last sub-menu (or value options), the main processor's application program accepts the user command and executes it. The user command is either storing the selected numerical value entered by the user or executing a diagnostics command. The Modbus concentrator can have two types of displays after data entry. If the user enters a value to be stored, the LED displays main menu with first item entered. If a diagnostic command is entered, the diagnostics error code is displayed. Increment/decrement keys are provided for scrolling through the items in the menu. The increment key is provided for the user to view the next option after the current option is displayed. The display displays the first item of the menu after the last item of the menu. The decrement key is provided to display the previous option and after the current item is displayed. The decrement key displays the last option in the menu after the first option in the menu is displayed. Menu loop around is provided for both incrementing and decrementing. The LED display displays the Modbus concentrator's hierarchically organized menus.

The main menu in the user interface contains ten selections, i.e., CNFG, SEG1–SEG8 and DIAG. The CNFG selection provides a sub-menu for the selection of Modbus port address (ADDR) and it's baud rate (BAUD). The segment displays (SEG1 through SEG8) have similar sub-menus that will be used for initializing the Commnet devices connected to that Commnet segment.

Referring to FIGS. 76–83 a self-test and initialization task is invoked by the application of prime power to the Modbus concentrator which results in a Power on Reset flag. During self-test and initialization, the main processor's self test diagnostics are executed, initialized and the peripherals connected to the main processor are initialized. The main processor self-test and initialization function involves the following operations. The main processor and I/O ports are initialized. Self-test diagnostics on PROM, internal RAM, EPROM, Timer, external RAM and key-board interface are performed. An unsuccessful self-test identifies the main processor as failed and identifies the main processor function that failed. Check-sum verification test on PROM is performed, PROM check-sum is computed and stored in a selected memory location when the PROM is fused. A write-read test is performed on all internal and external RAM modules. Special bytes 0×55 and 0×AA are written to all RAM locations. The RAM locations are checked by comparing the byte that was written to the memory location to a byte read from the same location. An EEPROM checksum verification test is performed and if it fails, the EEPROM is initialized to the default values. The EEPROM's checksum is updated for every EEPROM data change. The count value in the timer/counter is read twice with a small pause between the two read operations. The timer is declared failed if there is no difference between two count values obtained in the read operations.

The main processor test each of the inter-processor communication paths between the main processor and the segment processors by sending a test-telegram to each of the segment processors and then receiving the appropriate response frame from each of the segment processors.

Diagnostic error code bytes from the segment processors are received and stored. The main processor sends a request frame to each of the segment processors for their diagnostic error code bytes. The segment processors sends response frames with their self-test diagnostic error code bytes. If the segment processor does not pass, the segment processor responds with the segment processors device address when the main processor polls the segment processors and asks for the segment processors self-test diagnostic error code bytes.

Initialize the main processor interfaces, peripherals, internal and external RAM, and the timer to support the processor task frames and the time-slice for task switching. The processors address table is initialized and read the address of the first task's starting addresses from EEPROM. The main processor sends the set device address request to each of the segment processors for initialization of all Commnet devices connected to the Modbus concentrator. The main processor clears (set to 0) the setpoint registers that contain wall time (hr., min., sec). The wall time reference is incremented after initialization is complete. Next, the main processors sends the segment processors a request frame to have the segment processors reset their internal setpoint registers that contain the accumulated time from the last time update. On the detection of no initialization self-test errors, the main processor commands the segment processors to illuminate the green LEDs. On the detection of a recoverable error, the main processor displays the error-code on the LED panel (scrolling message) and commands the segment processors to blink the green and red LEDs. Upon the occurrence of a non-recoverable error, the main processor enters an idle state, a blank pattern is displayed on the user's LED display panel and the main processor tries to command the segment processors to illuminate the red LEDs. On the detection of a non-recoverable self-test diagnostic error, the main processors task scheduler is inhibited from entering a normal processing state and tries to send messages to the segment processors for the segment processors to enter and remain in the idle state.

Proper communication with the segment processors is realized by a hand shaking procedure that employs the send and receive data lines between the main and the segment processors. When the main processor wants to send a message frame to a segment processor, the main processor sets the send data line to the segment processor. This action will interrupt the segment processor and the segment processor services the interrupt by reading the IPC request frame from the main processor. A similar operation is performed when the segment processors want to transmit a request to the main processor. The segment processor sets the receive data line on the main processor.

The main processor operating state is determined from the status of the initialization self tests. In the normal operating state the processor has self-tested successfully and illuminates the main processors green LED on the front panel. In the recoverable operating state a recoverable error is detected during self-test. In the non-recoverable operating state a non-recoverable error detected during self-test, the main processor's red LED on the front panel is illuminated, and the main processor enters the idle state. In the idle state message a frame request from main processor to segment processors is issued commanding the segment processors to enter the idle state on a main processor.

An address resolution test is initiated by the user as part of the Modbus concentrator start-up sequence. The address resolution test, test for Commnet device address conflicts within a segment and for Commnet device address conflicts between Commnet segments. The test is performed by the main processor and the segment processors.

A device address table is a table of addresses of Commnet devices connected to the Modbus concentrator. A flag initiates the Commnet device address conflict resolution test. An address conflict flag (Add Cnflt Flg) is set when the main processor detects an Commnet device address conflict. A device address list is a list of addresses of Commnet devices connected to the segment processors.

The main processor commands the segment processors to blink the red LED fault indicators during the execution of the address conflict resolution test. The main processor commands the segment processors to read the addresses of the Commnet devices connected to the segment processors and to check for address conflicts between the Commnet devices connected to the segment processor. The segment processor flags address conflicts within the Commnet devices connected to the segment processor. The main processor commands the segment processors to transfer the list of Commnet devices connected to each of the segment processors and the status of the individual segment Commnet device address conflict tests. The main processor records all Commnet device conflicts detected by the segment processors and places the lists of Commnet devices received from the segment devices into the Commnet device address table. The main processor searches the Commnet device address table for duplicate Commnet device addresses across the segment processors. On detection of duplicate Commnet device addresses, the main processor sets the Address Conflict Flag. The main processor transfers the Commnet device address table to each of the segment processors. The segment processors places the updated Commnet device address table in their memory. Further, the main processor commands the segment processors to stop blinking the red LED fault indicators and have the segment processors with Commnet address conflicts illuminate or blink the green and red LEDs in accordance to the status of the Commnet address conflict and conflict resolution test. The main processor commands the segment processors with no Commnet address conflicts to stop blinking the red LED fault indicators if they do not have any Commnet address conflicts.

The device address list is a list of addresses of Commnet devices connected to the segment processor. The list includes the Modbus concentrator RS-485 bus address. The address conflict flag (Add Cnflt Fig) is a flag that is set when the main processor detects an Commnet device address conflict. The address conflict test (Add Cnflt tst) is a request frame to segment processors to perform address conflict test. The LED blink command (LED Blnk cmd) is a request frame to command segment processors to have segment processors blink the red LEDs during the execution of the address conflict and address resolution test. The LED illuminate command (LED Ilumnt cmd) is a request frame to command segment processors to have segment processors with Commnet address conflicts to illuminate or blink the green and red LEDs in accordance to the status of the address conflict and address resolution test after the address conflict resolution test is completed.

The main processor supports a number of tasks for managing the communications interface with the computer, managing the LED display/key-pad interface and supporting IPC communications. The task scheduler is configured to execute these tasks sequentially through a pre-defined sequence as defined by the task table and task priority table. The task scheduler is invoked after initialization and self-test are complete on the Normal state flag being set when no non-recoverable errors detected during the execution of the initialization diagnostics. The task scheduler is placed into the Idle state on the detection of a non-recoverable error during self-test diagnostic execution and remain in the Idle state, disable the communication interfaces with the PMCS and the segment processors and be inhibited from initializing the task scheduler. The following sections list the task scheduler inputs, processing definition and outputs generated during the normal state.

The following processing elements are required: the status of timers 2.22 mil. sec. counter; the task table is a memory table that specifies the tasks to be executed and the starting address for each task; the task priority table is a table defines the priorities level for the tasks contained in the task table; and the normal state flag is set, whereby the task scheduler enters the normal state when there are no non-recoverable self-test errors during initialization.

The task scheduler function is a root task (the main procedure is in, e.g., 'C' code) and checks for an elapsed time interval of 2.22 mil. seconds by counting 4096 clock pulses for task frame switching in the main processor. The main processor's tasks are executed to the priority they are defined in the task priority table. The next task to be executed is initiated by having the timers clock pulse count equal to or be greater than its programmed pulse count of 4096 counts. If its clock pulse count is lesser than the programmed time pulse count, the task scheduler's timer's pulse count is incremented. If the counters clock pulse count is equal to 4096 counts, the task pointer is incremented and the next task in the task table is initiated. If a task is completed within the 2.2 seconds frame, the counter is reset, the task pointer is incremented to the next task and the next task is initiated. The task schedulers frame counter pulse counter is inhibited when the main processor receives either a IPC or SCI communication interrupt. The counter is interrupted so that the main processor can service the IPC or the SCI message request. The counters pulse counting will commence after the IPC or the SCI message request is serviced.

There are two timers for interfacing with the computer. These timers ensure error free transmission and reception with the host PMCS. The two timers are the inter-byte timer and transmit timer which is updated at a 2.22 mil. sec. rate. The inter-byte timer ensures that the delay between messages received is greater than 3.5 times the character time. If the inter-message gap time is less than 3.5 times the character length, the main processor considers the new message to be a continuation of the previous message. In case of an inter-byte error, the complete frame is discarded and the host and the Modbus concentrator re-initialize for a new frame transfer. The Modbus concentrator re-initialize for a new frame reception. The transmit timer is initialized on every character transmitted. Data transfer ensures that the time between two transmit characters will not be more than 3.5 times the character time. On an error in transmission, the main processor discards the transmission and the diagnostics byte is updated with appropriate error code.

The Normal State Flag is a flag indicating that the main processor is in the Normal state. The following tasks is performed when the main processor is in the Normal state: self-test and initialization; address conflict resolution; user interface; LED display; key-pad interface; BIT diagnostics; SCI interface; transmit; receive; SCI (RS-485 Modbus) interrupt service; IPC interface; poll; command; IPC interface interrupt; service; event handling; and time synchronization.

The LED Display and key-pad interface provides the user with the capability to examine Modbus concentrator diagnostic status. It also provides the user with the means to scroll through the Modbus concentrator menus and enter Commnet device data. As stated previously, the LED display consists of four character display while the key-pad consists of four keys. The LED display and key-pad interface is managed by the main processor. The LED display has four display states: scrolling, main-menu display, sub-menus display and the entry options display. The first state informs the user that the Modbus concentrator is in the normal state by scrolling the following message across the LED display—"Power Leader Modbus Concentrator Rev x.xx Address xxx" (defined as the normal message). The second display state informs the user that the Modbus concentrator is in the Idle state by scrolling the following message across the LED display—"Diagnostics Failed Error code xx Address xxx" (defined as the diagnostics fail message). The LED displays two other display states to permit the user to increment or decrement the menu displayed and enter Commnet device data.

The following key-pad menu-functions are the input for the function: diagnostics error, '00'—no error; code byte, 'FF'—non-recoverable error; else, have recoverable diagnostic error code; key pressed, flag that indicates the user has depressed a key; press—upon any key is pressed (the state of key goes from OPEN to CLOSED); not-pressed—Idle state (the state of key is OPEN state); and three key pressed—the flag that indicates that the user has depressed three keys for more than three seconds, the flag will initiate the Commnet device address conflict test. The menu functions specify the key combination selected and pressed, and include, select menu, enter Commnet device data, increment menu, decrement menu, and command auto configuration.

Figure 84:
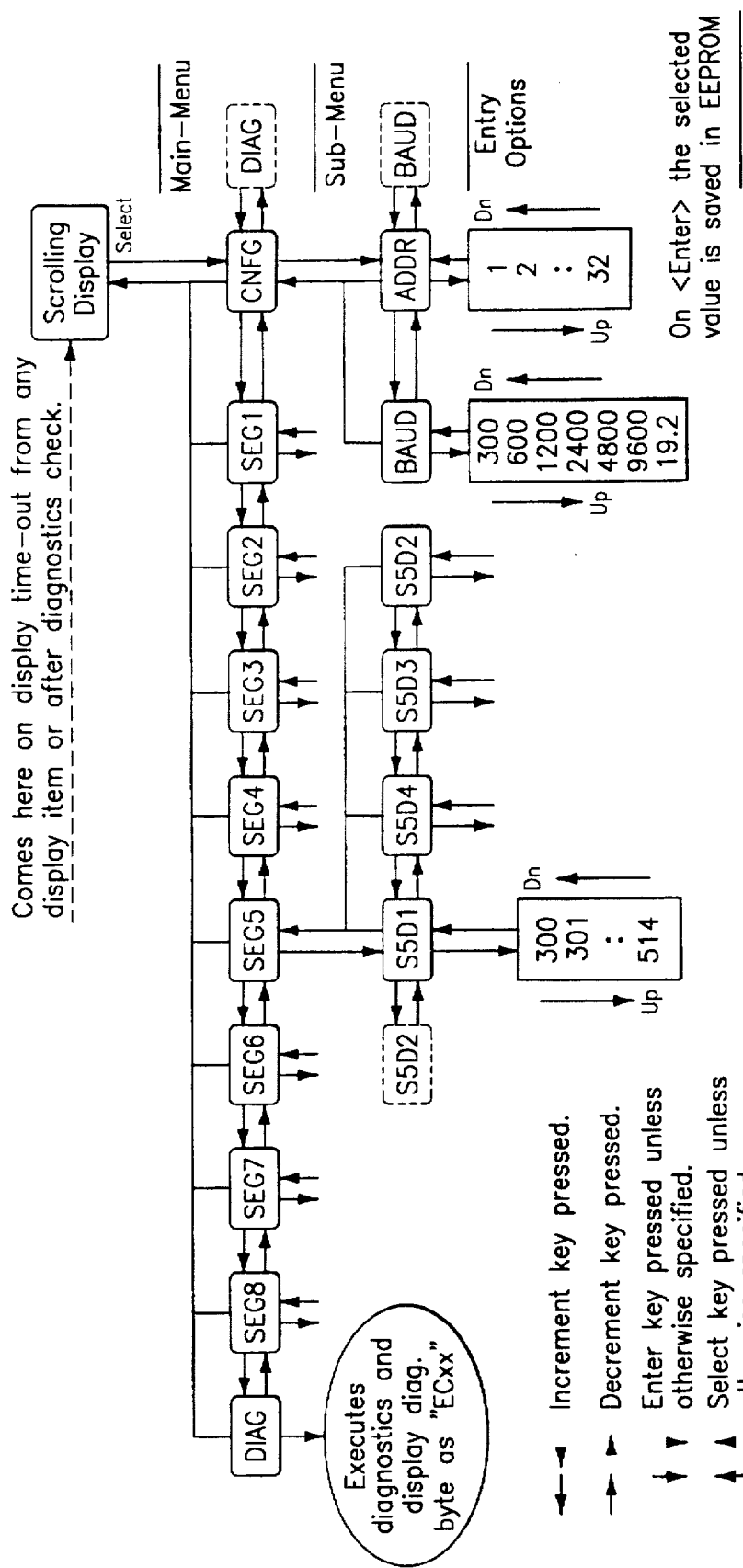
FIG. 84 is a menu and display diagram for the Modbus concentrator.
Figure 85:
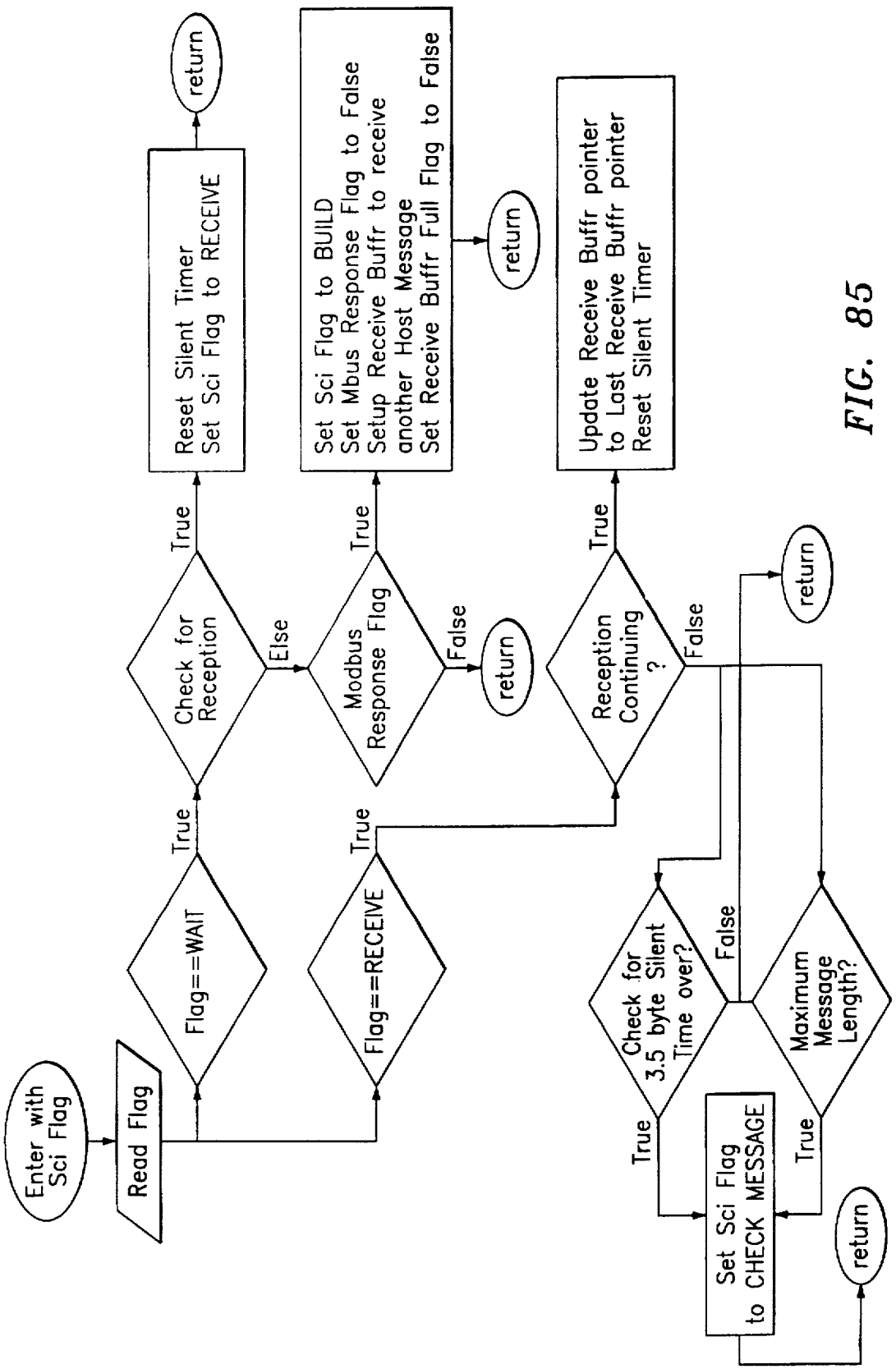
FIGS. 85-89 are software structure diagrams of the SCI request module of the Modbus concentrator.
Figure 86:
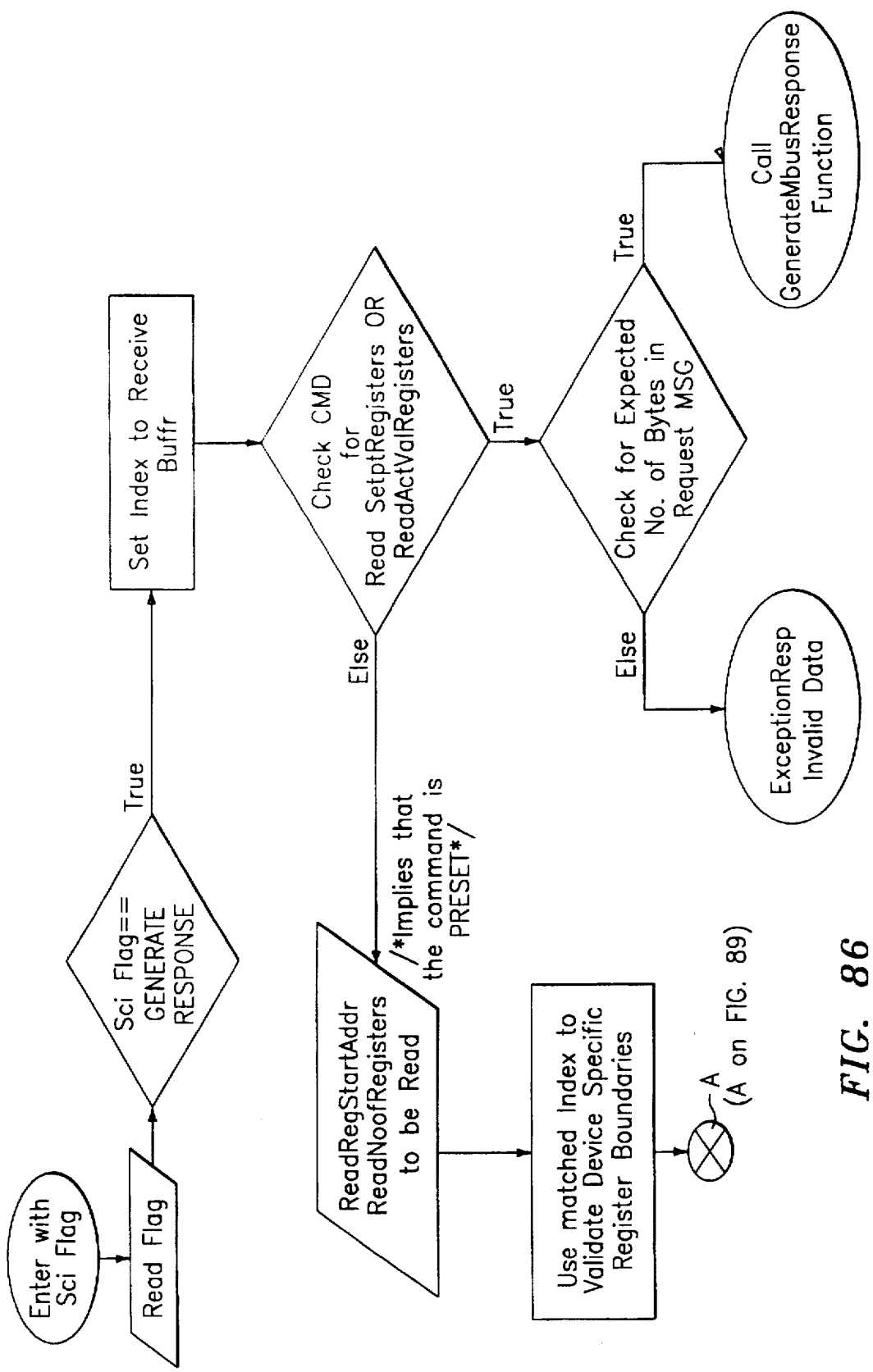
Figure 87:
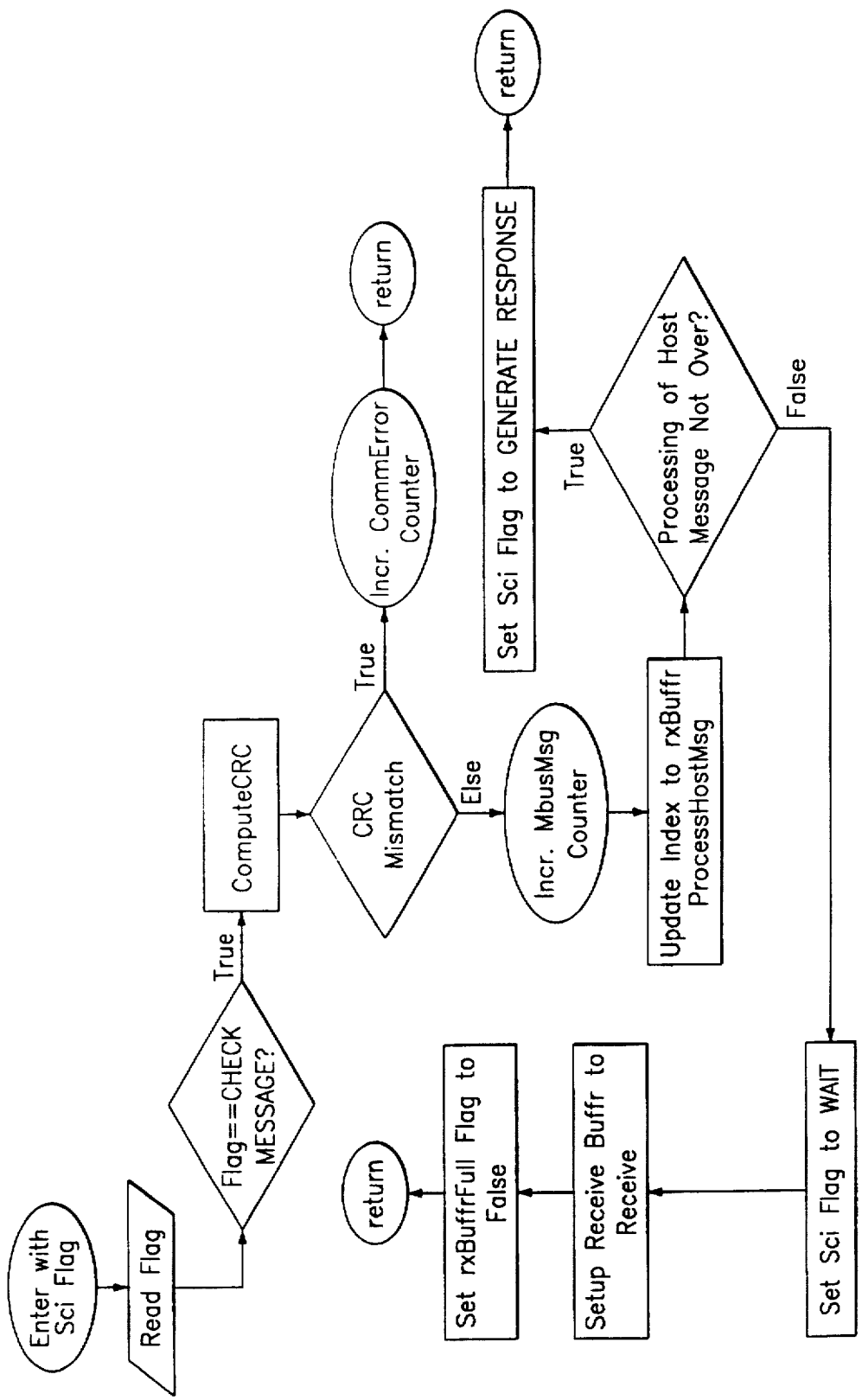
Figure 88:
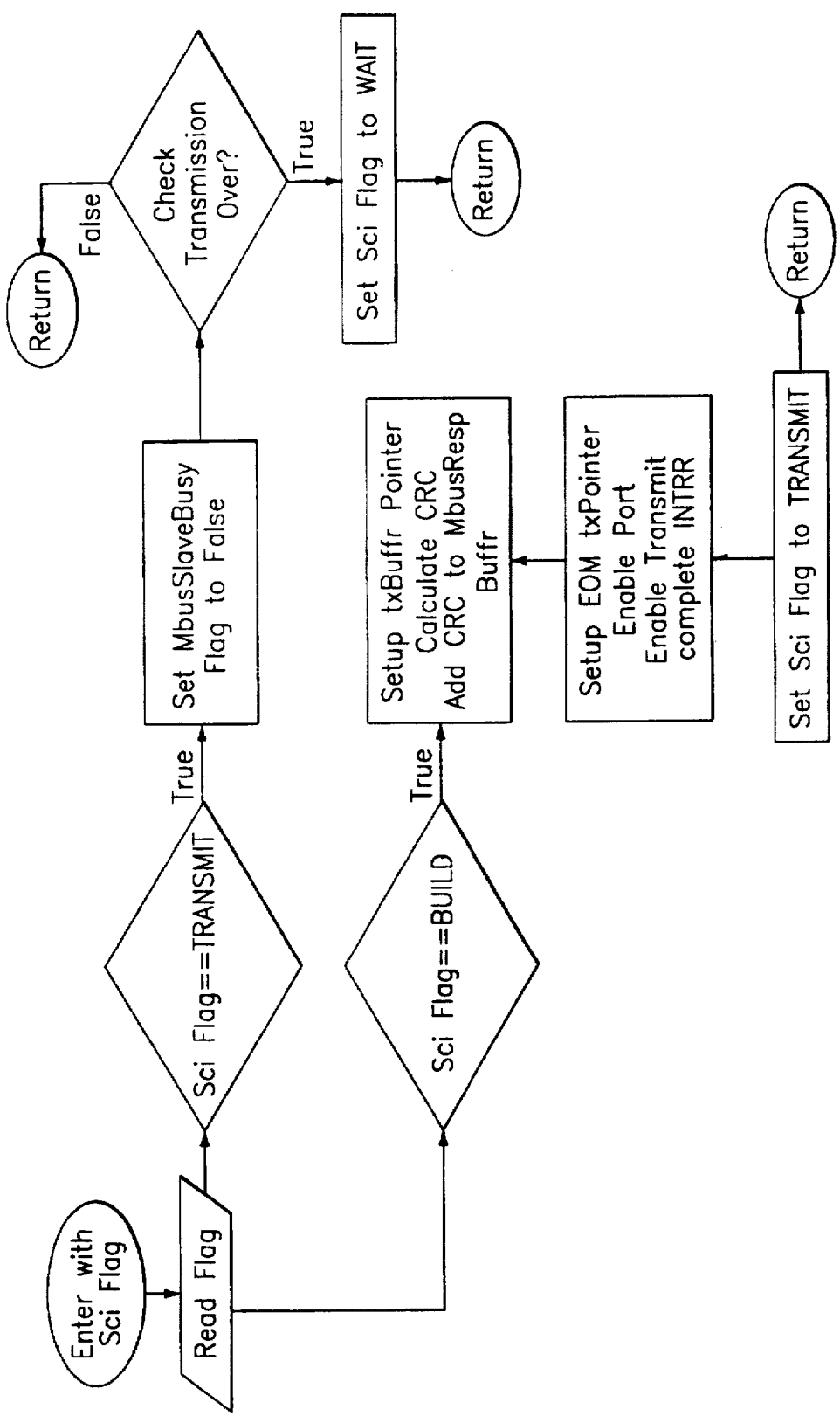
Figure 89:
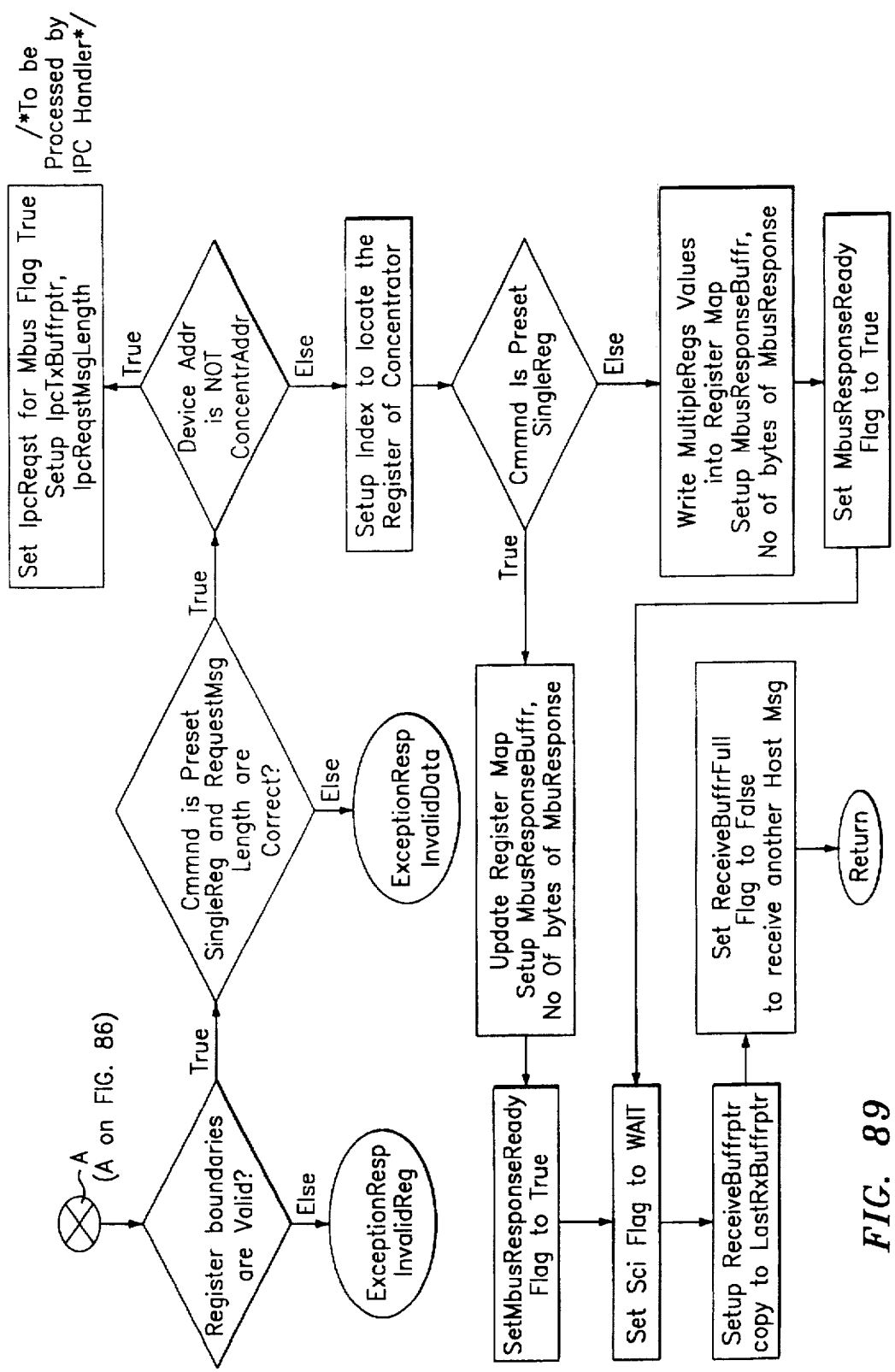
Figure 90:
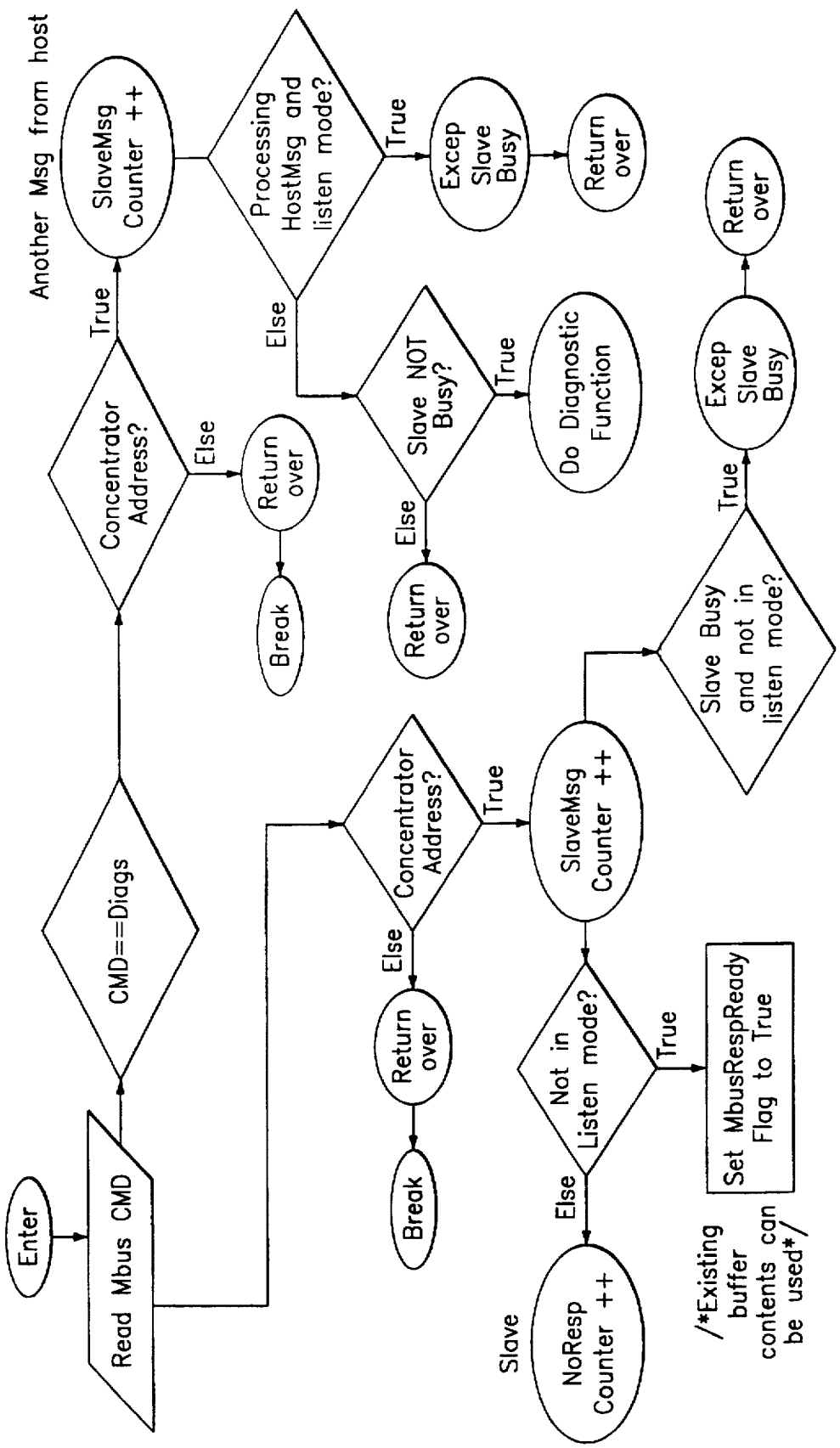
FIGS. 90-92 are software structure diagrams of the process host message module of the Modbus concentrator.
Figure 91:
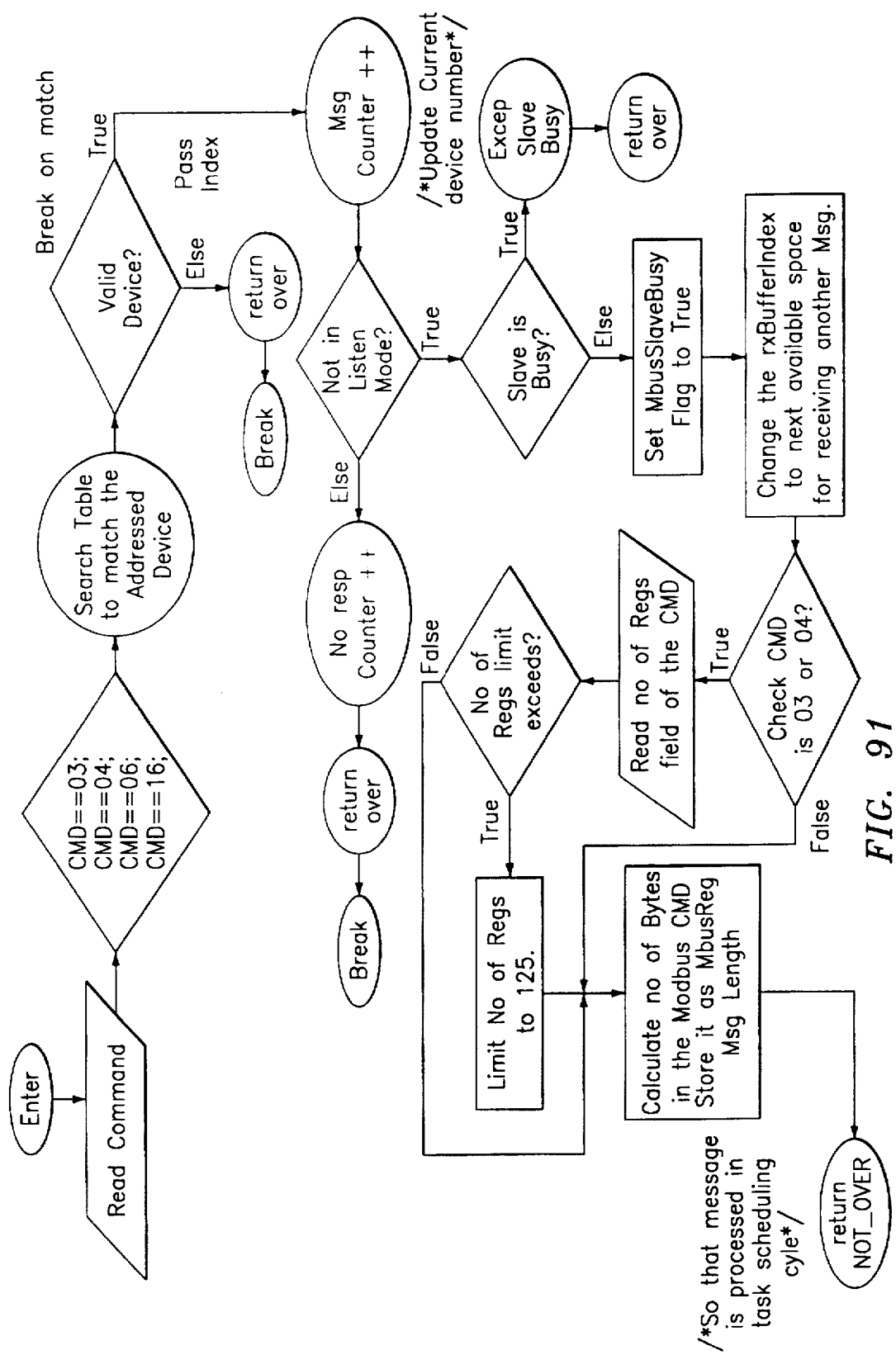
Figure 92:
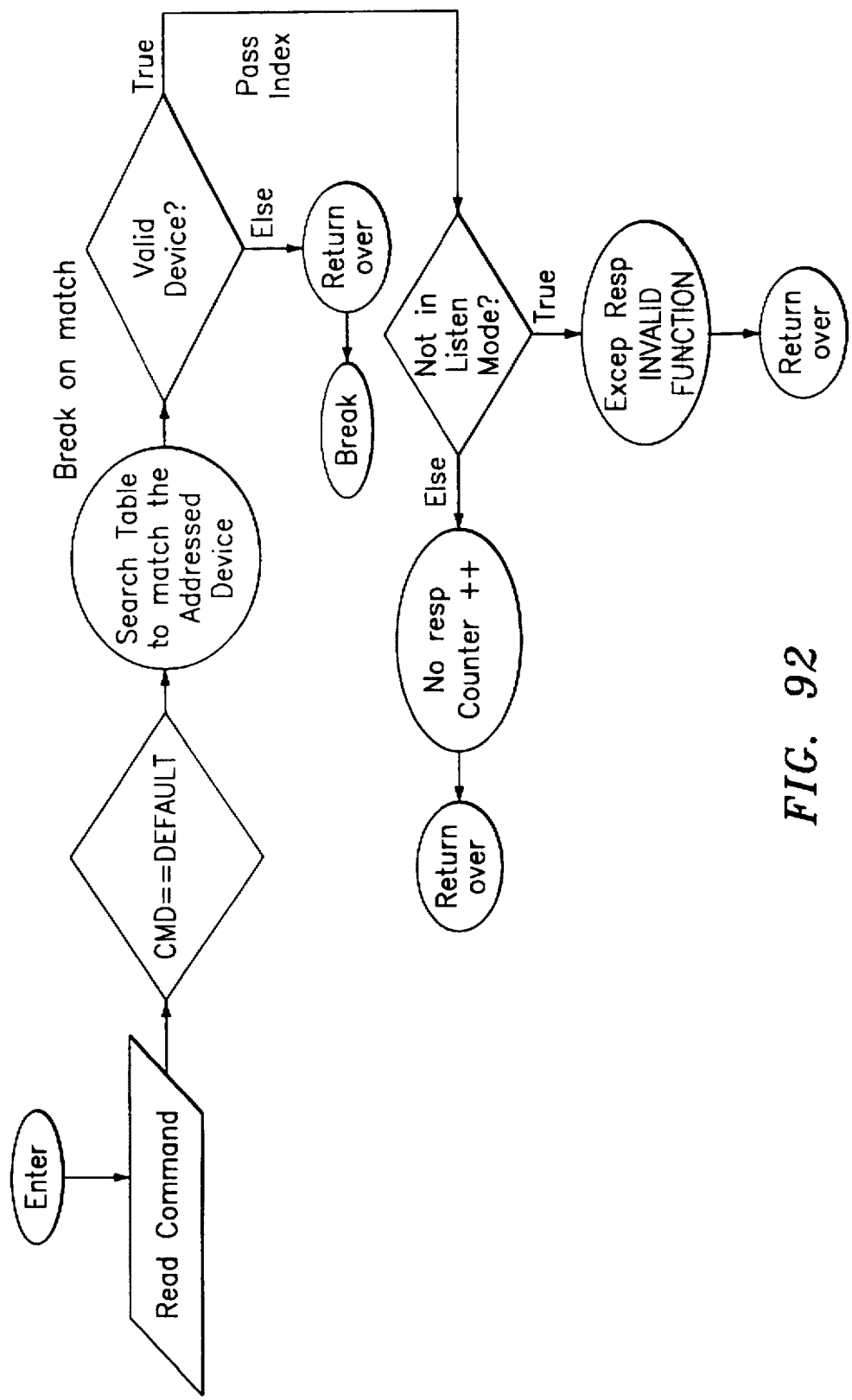
Figure 93:
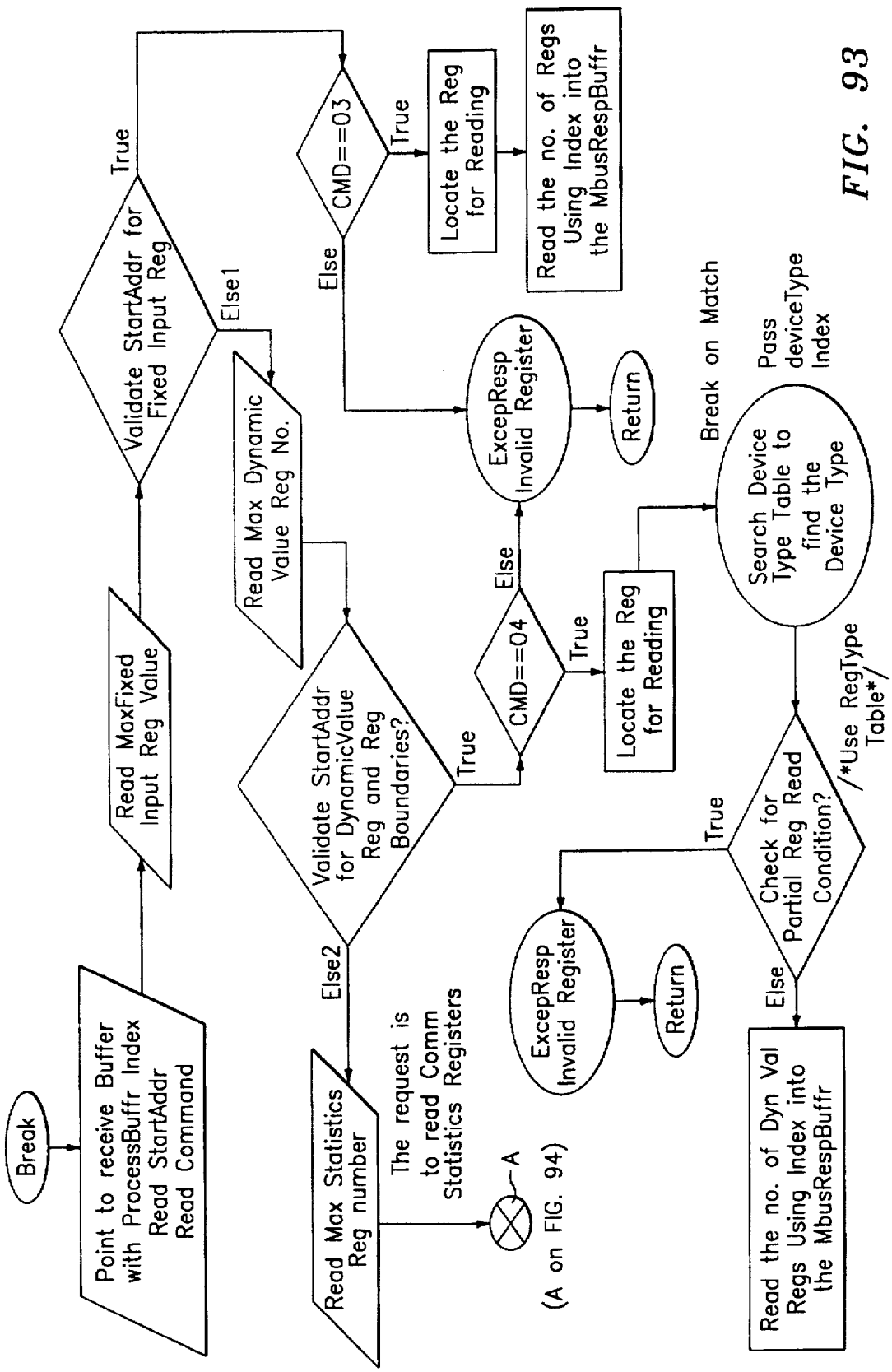
FIGS. 93 and 94 are software structure diagrams of the Modbus request module of the Modbus concentrator.
Figure 94:
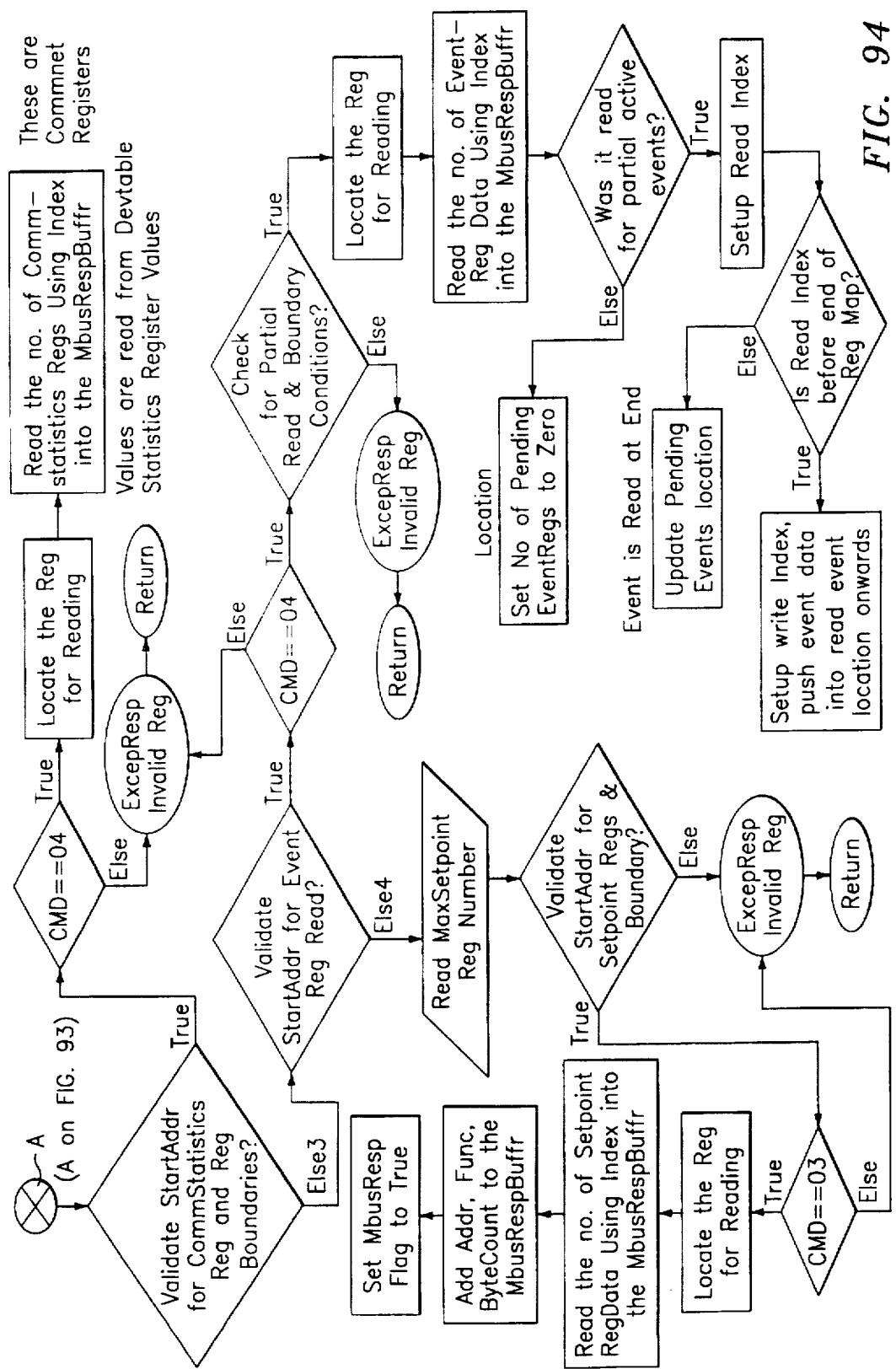
Figure 95:
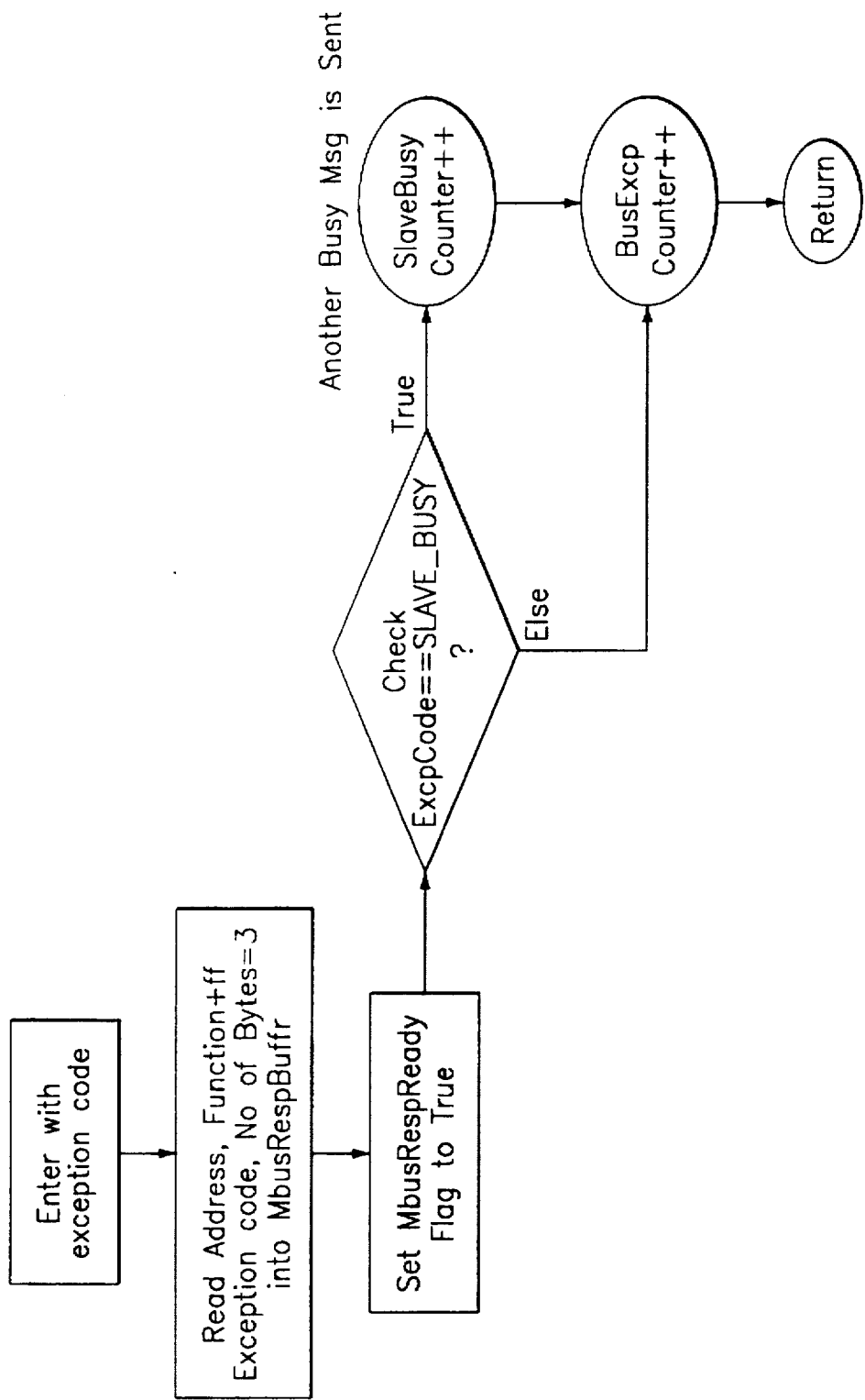
FIG. 95 is a software structure diagram of the exception request module of the Modbus concentrator.
Figure 96:
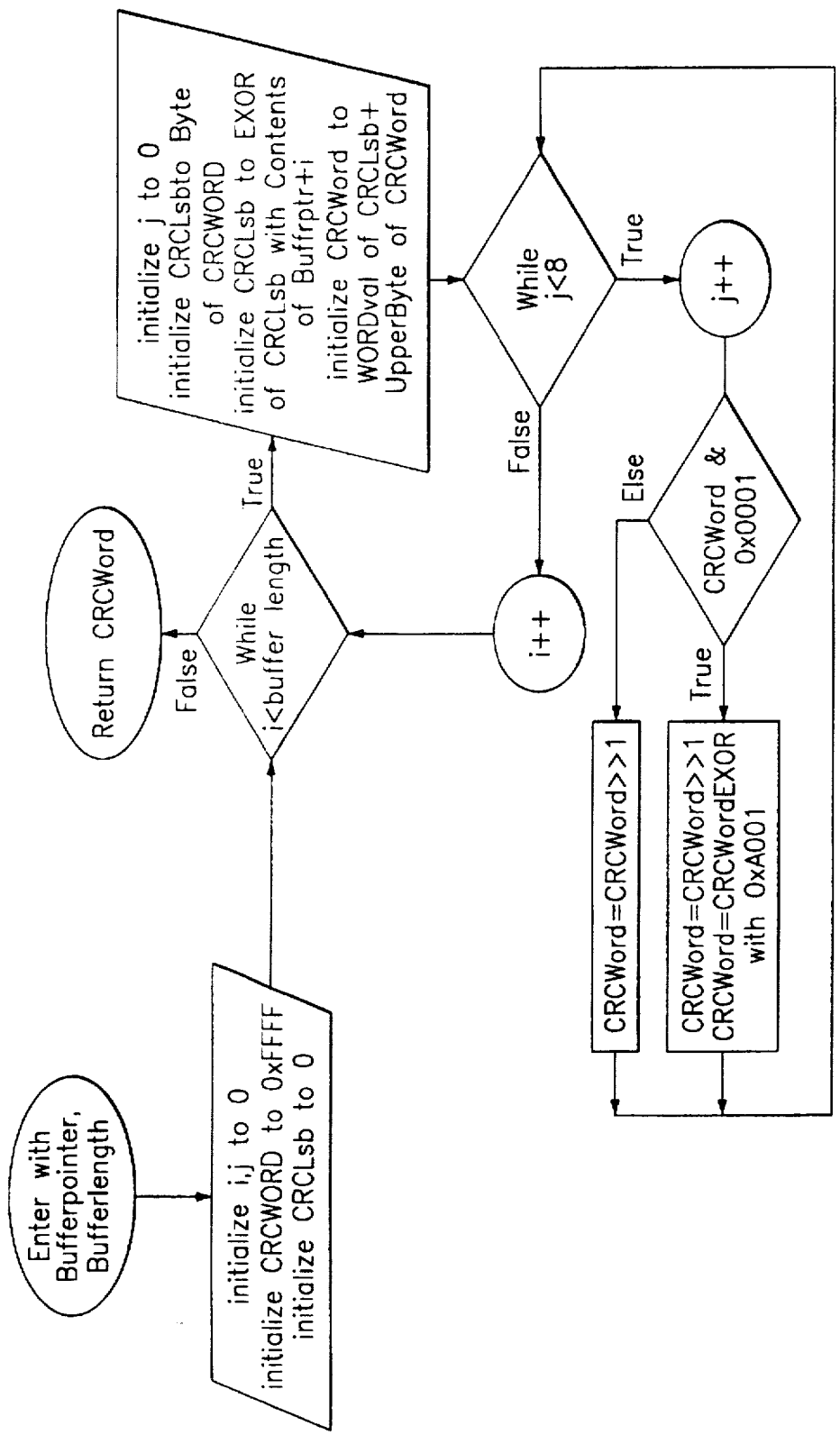
FIG. 96 is a software structure diagram of the CRC module of the Modbus concentrator.
Figure 97:
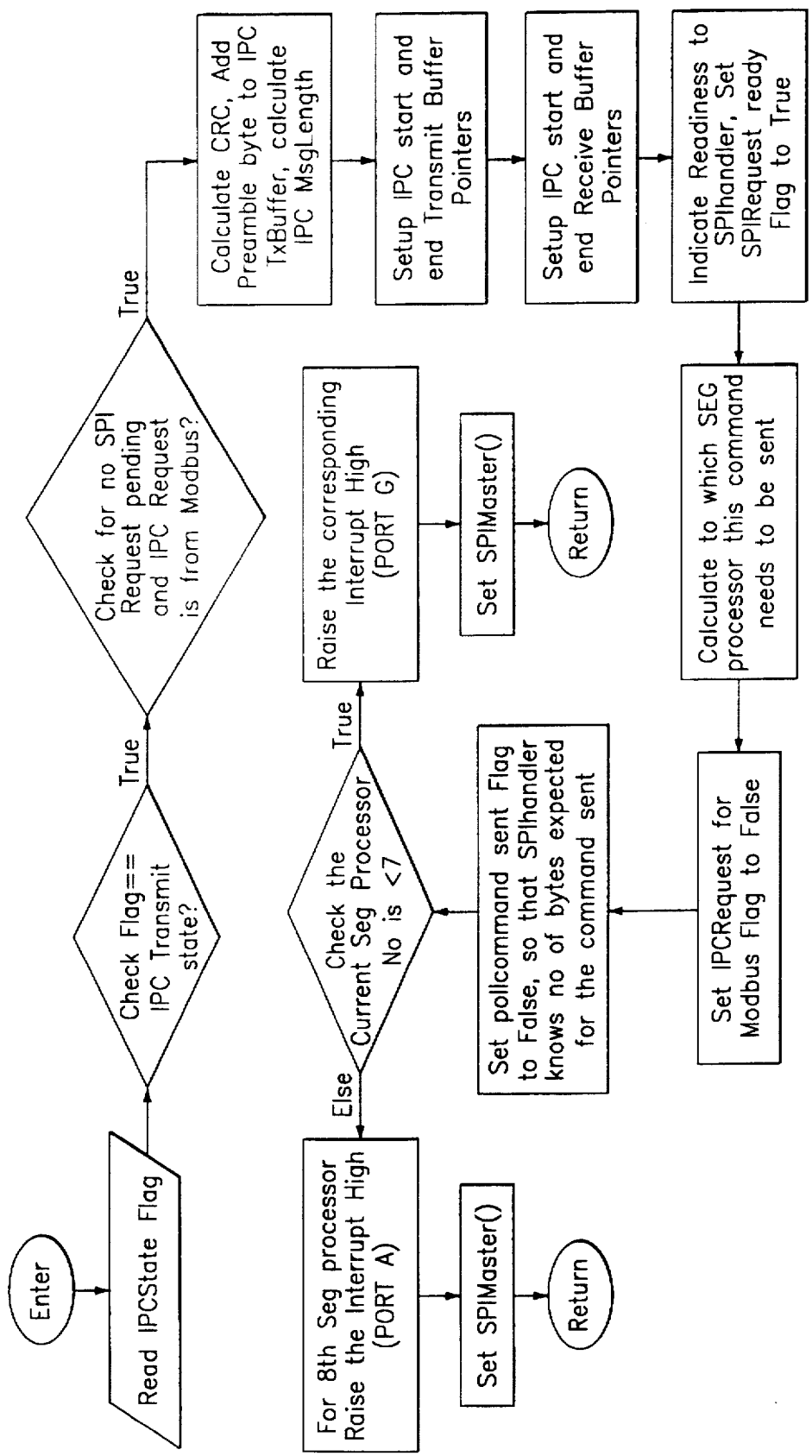
FIGS. 97-106 are software structure diagrams of the IPC handler module of the Modbus concentrator.
Figure 98:
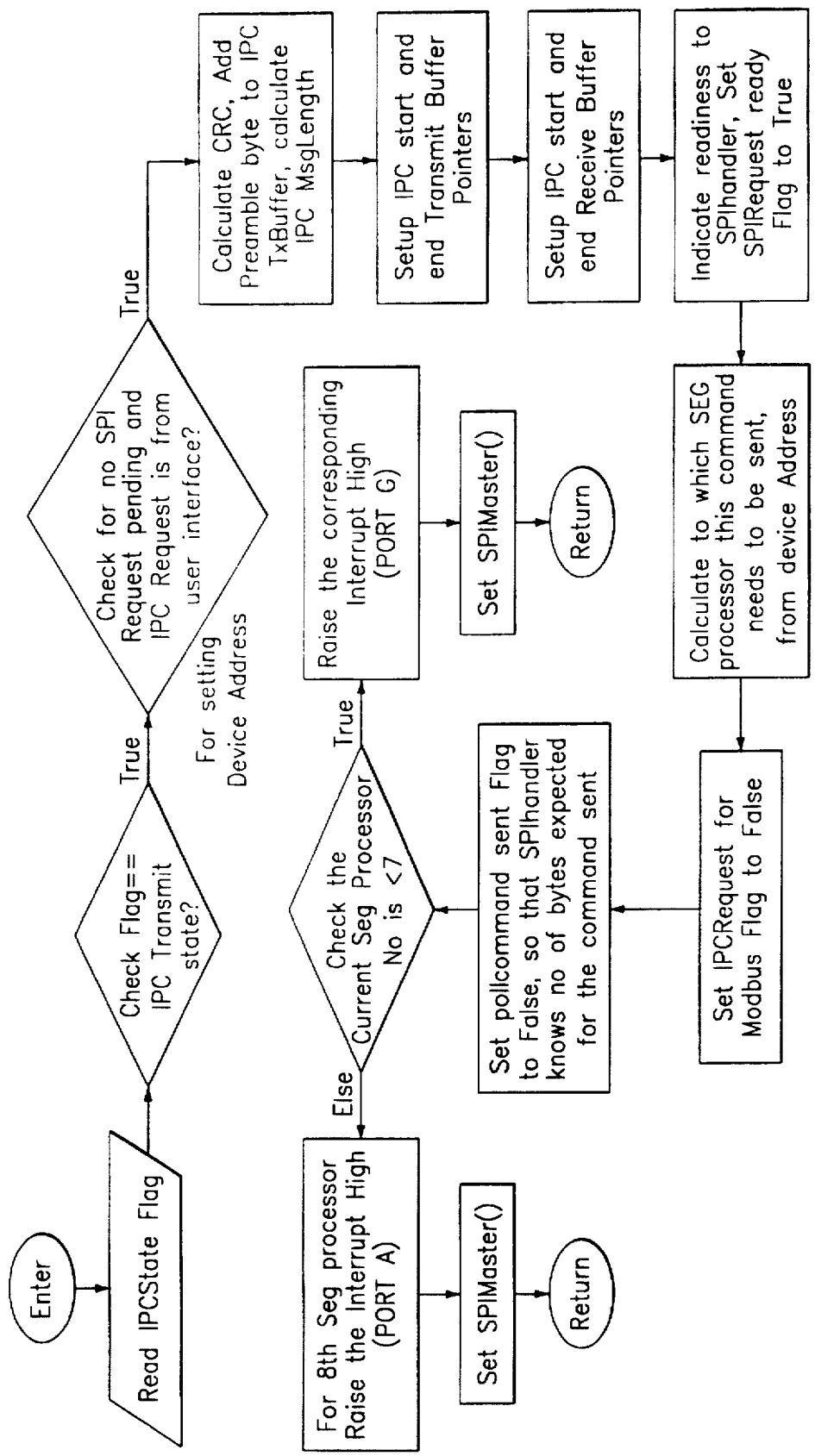
Figure 99:
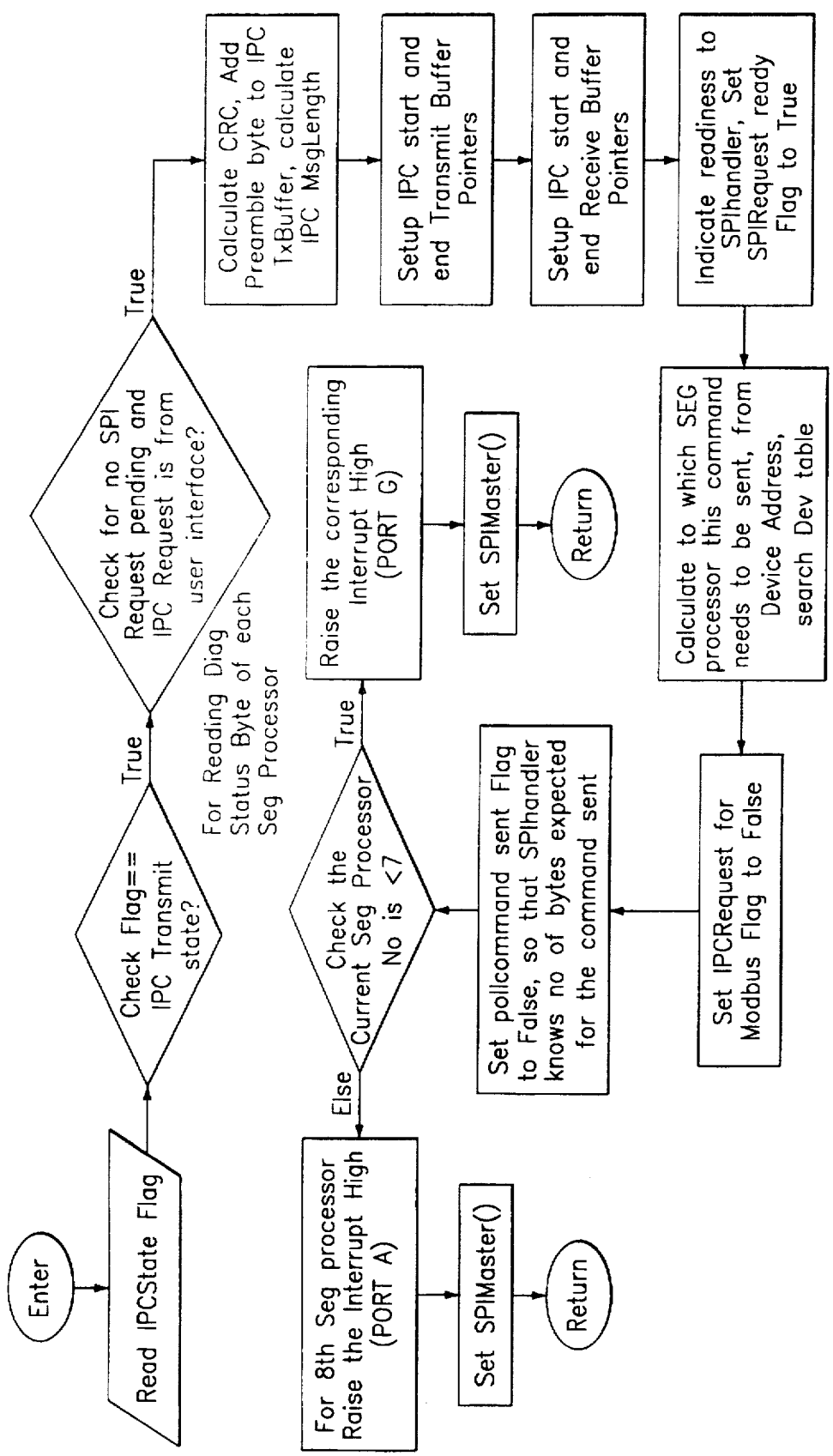
Figure 100:
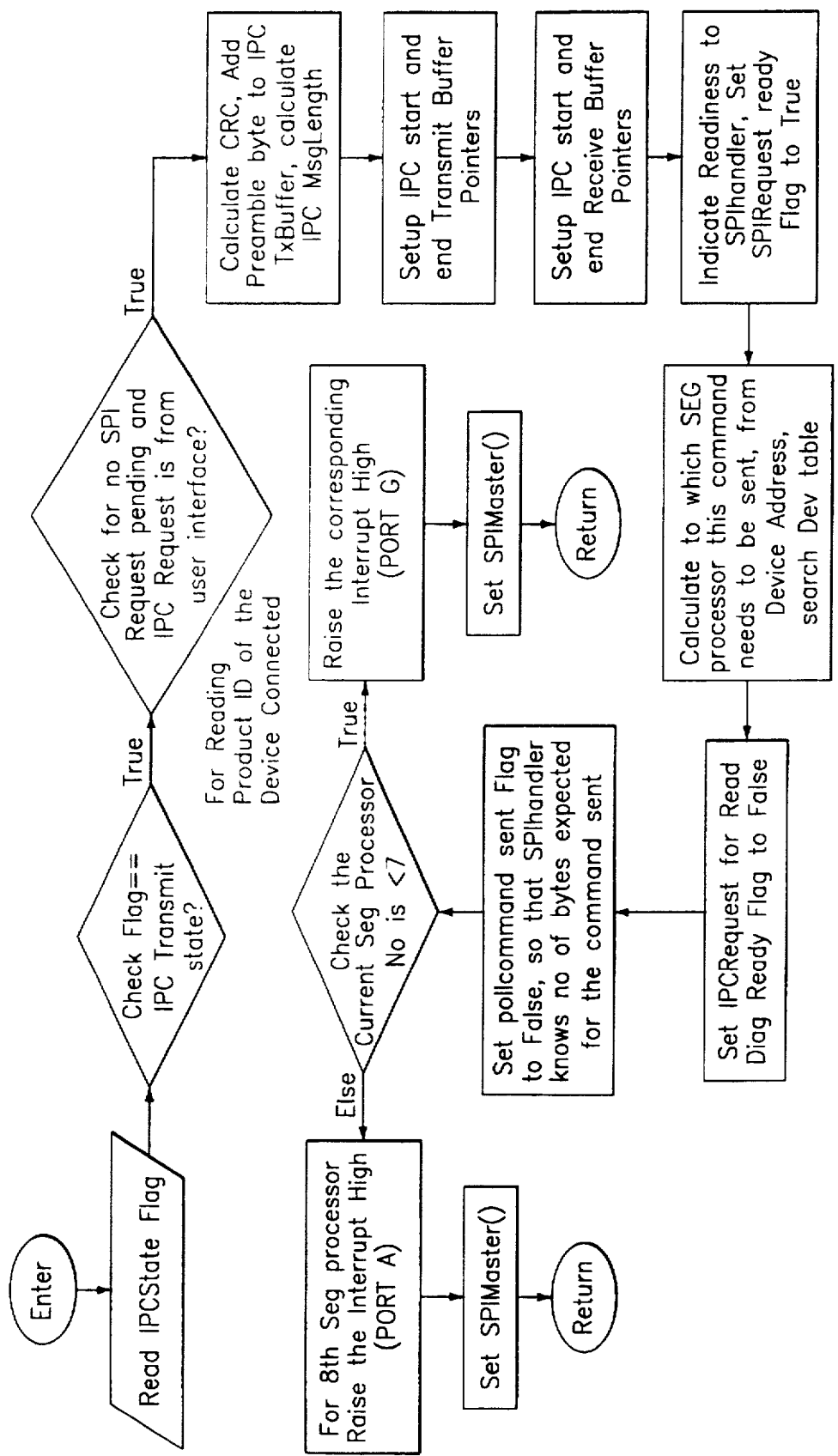
Figure 101:
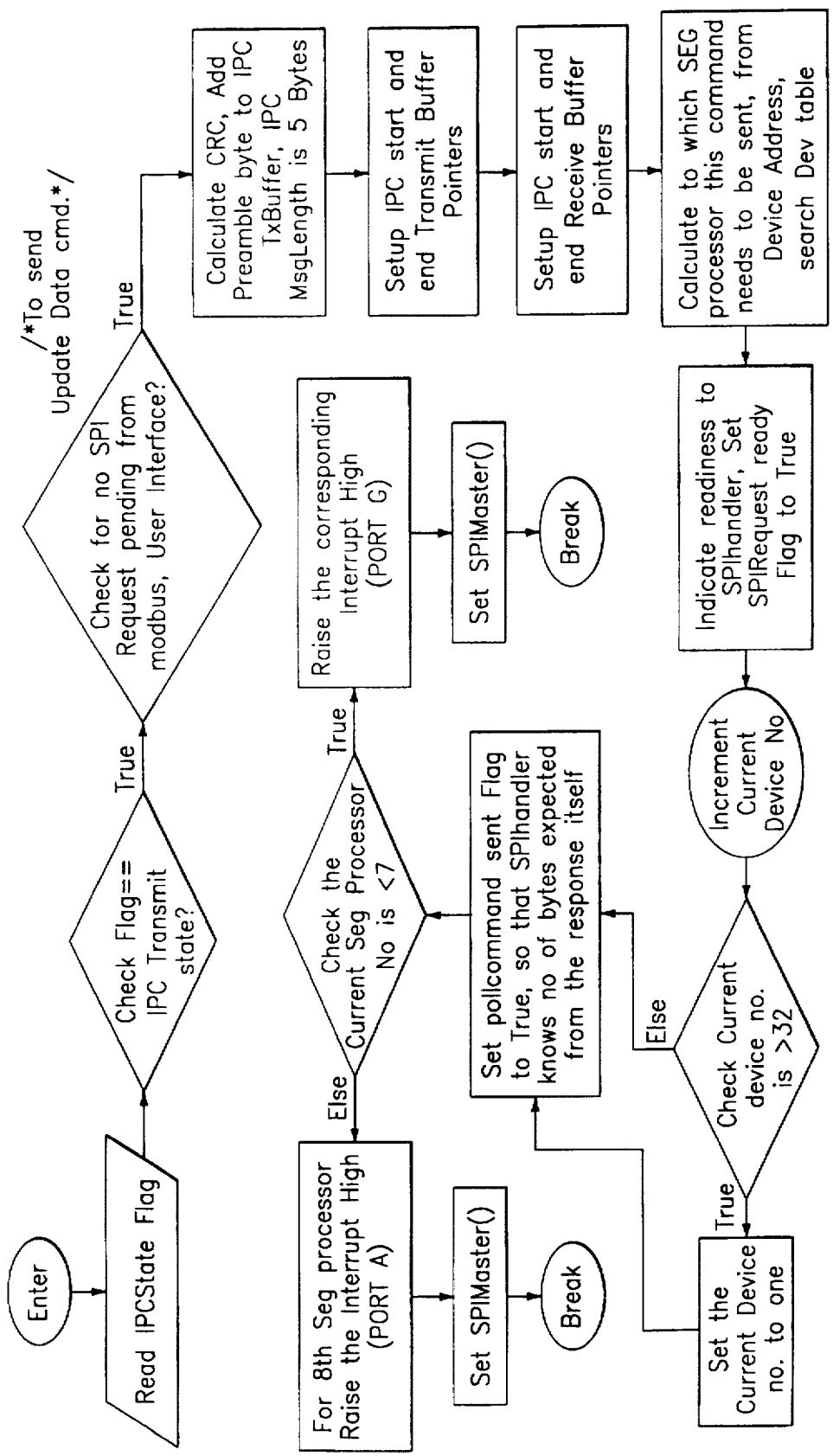
Figure 102:
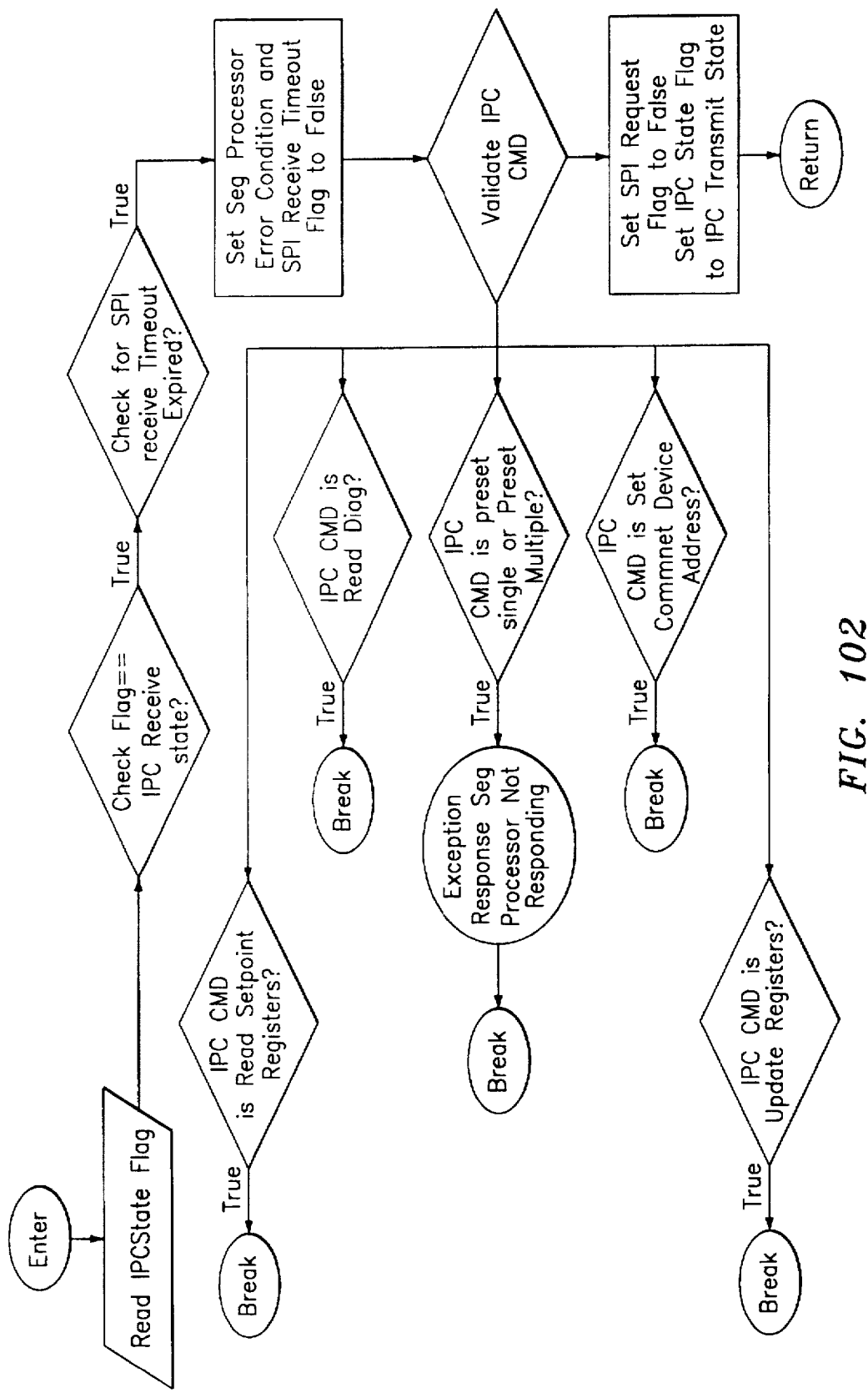
Figure 103:
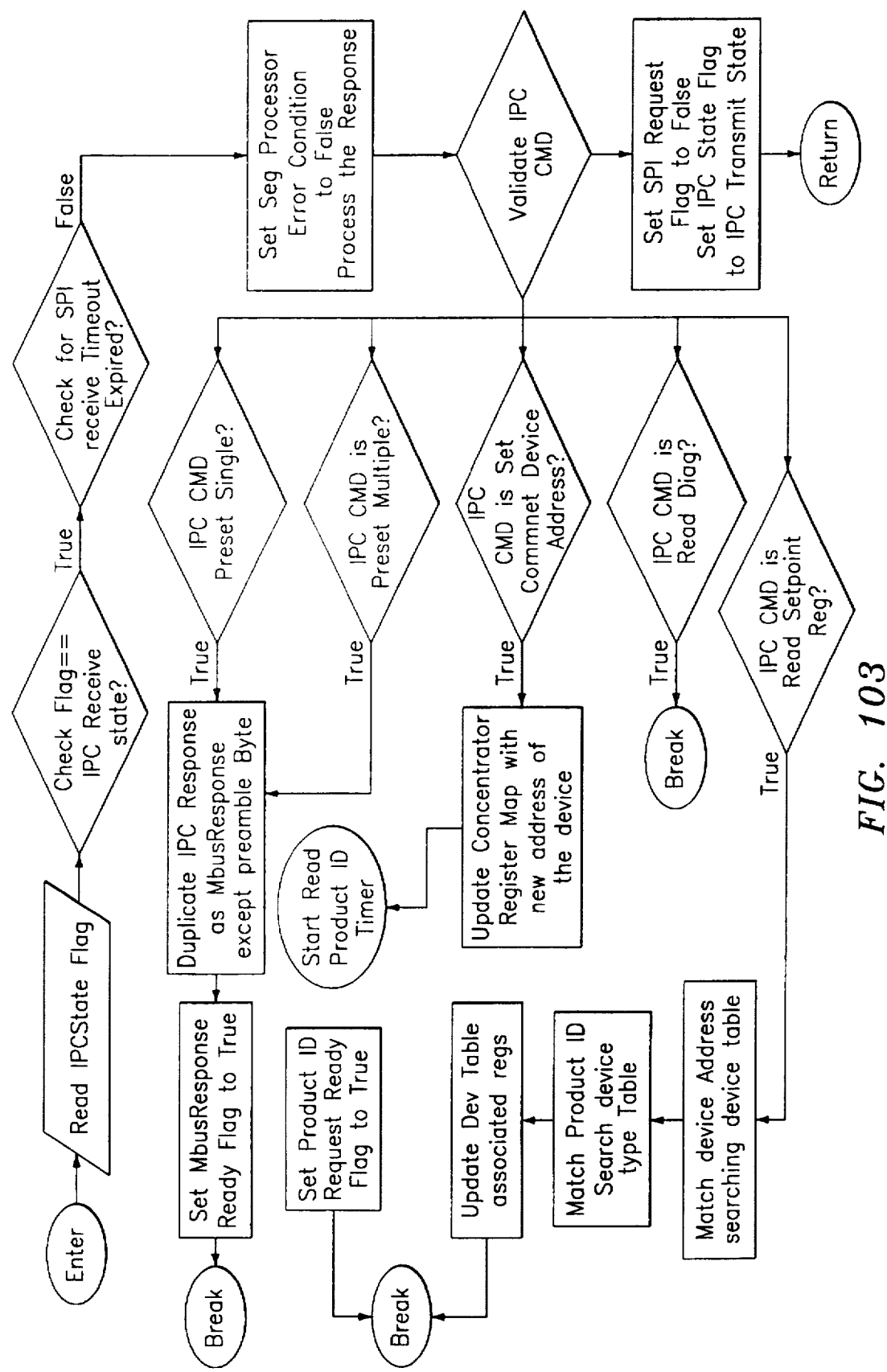
Figure 104:
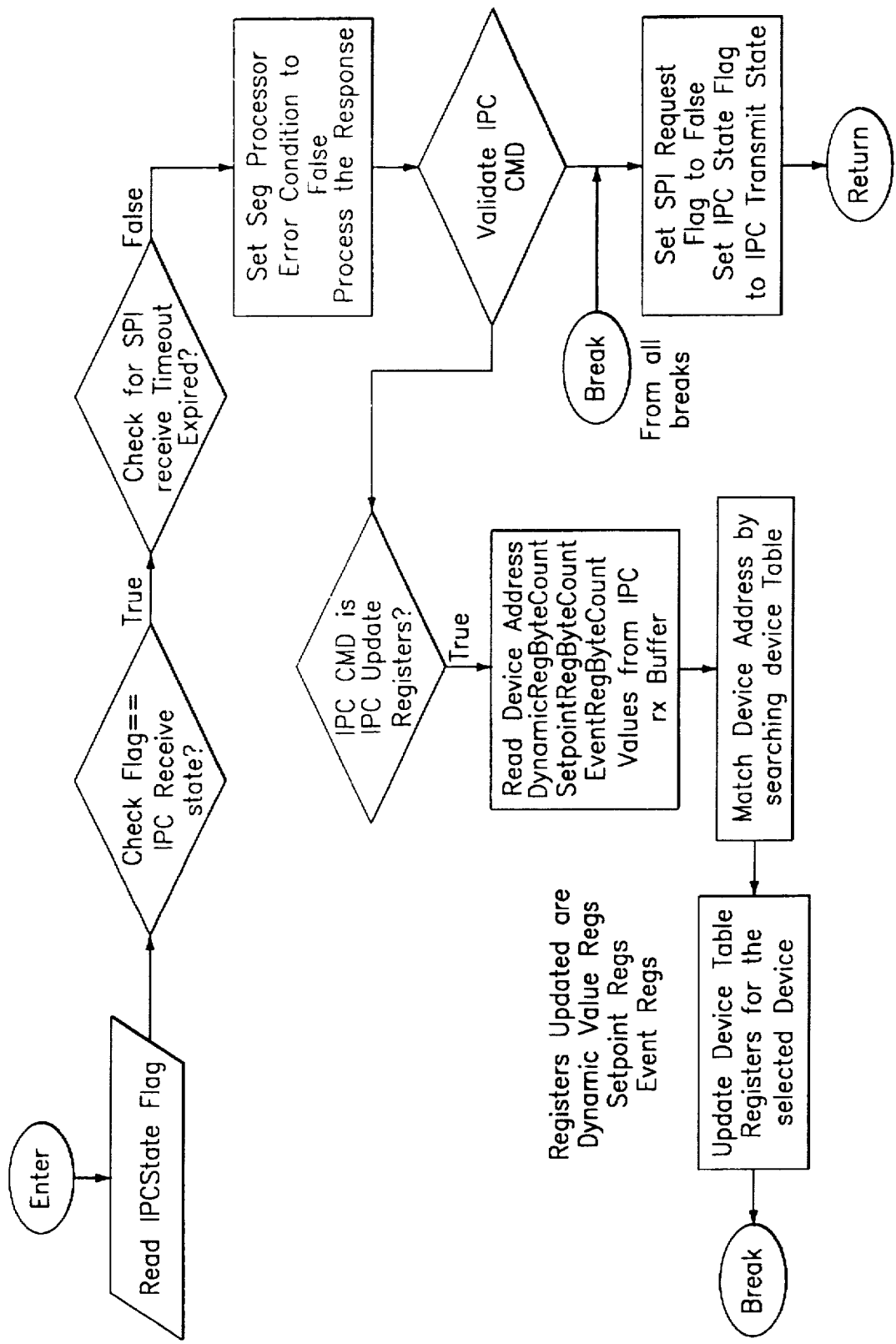
Figure 105:
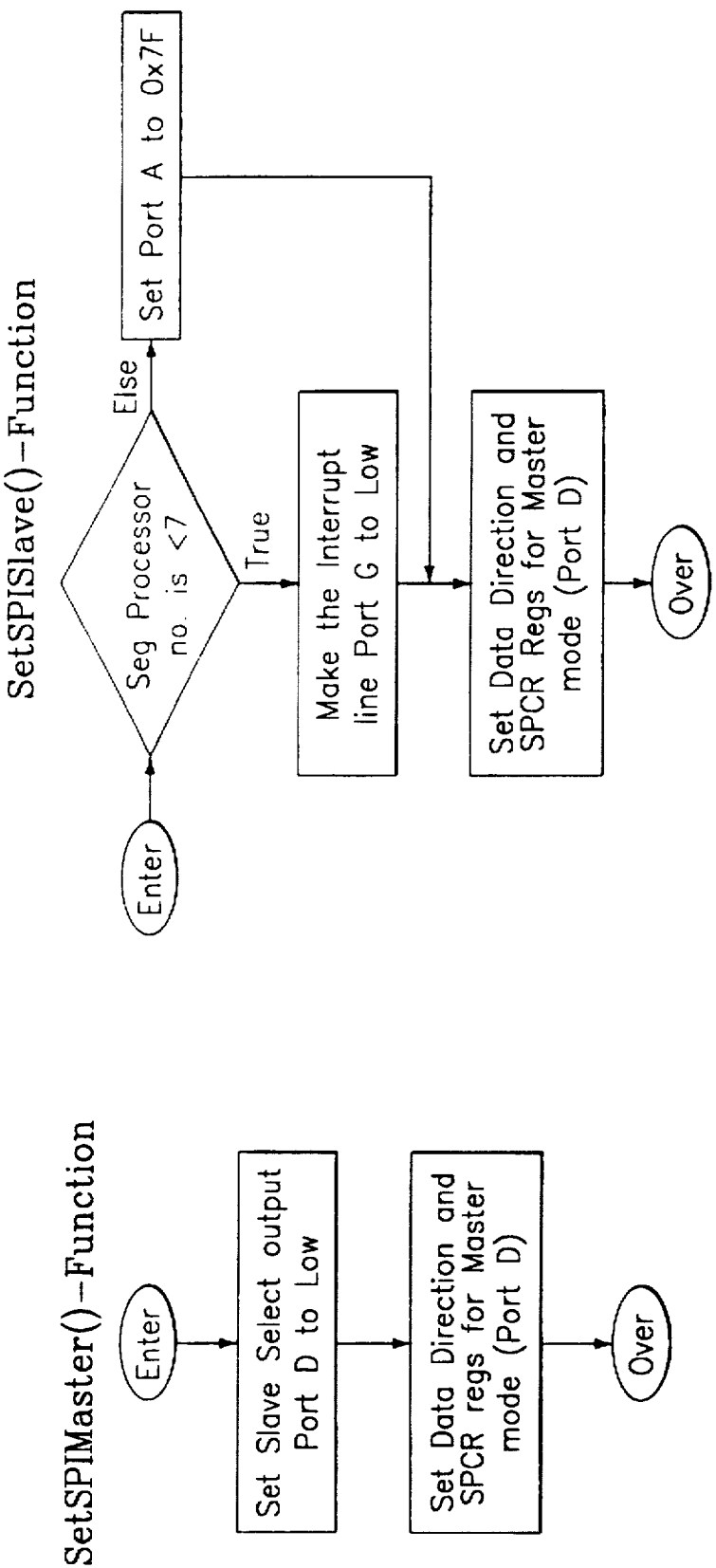
Figure 106:
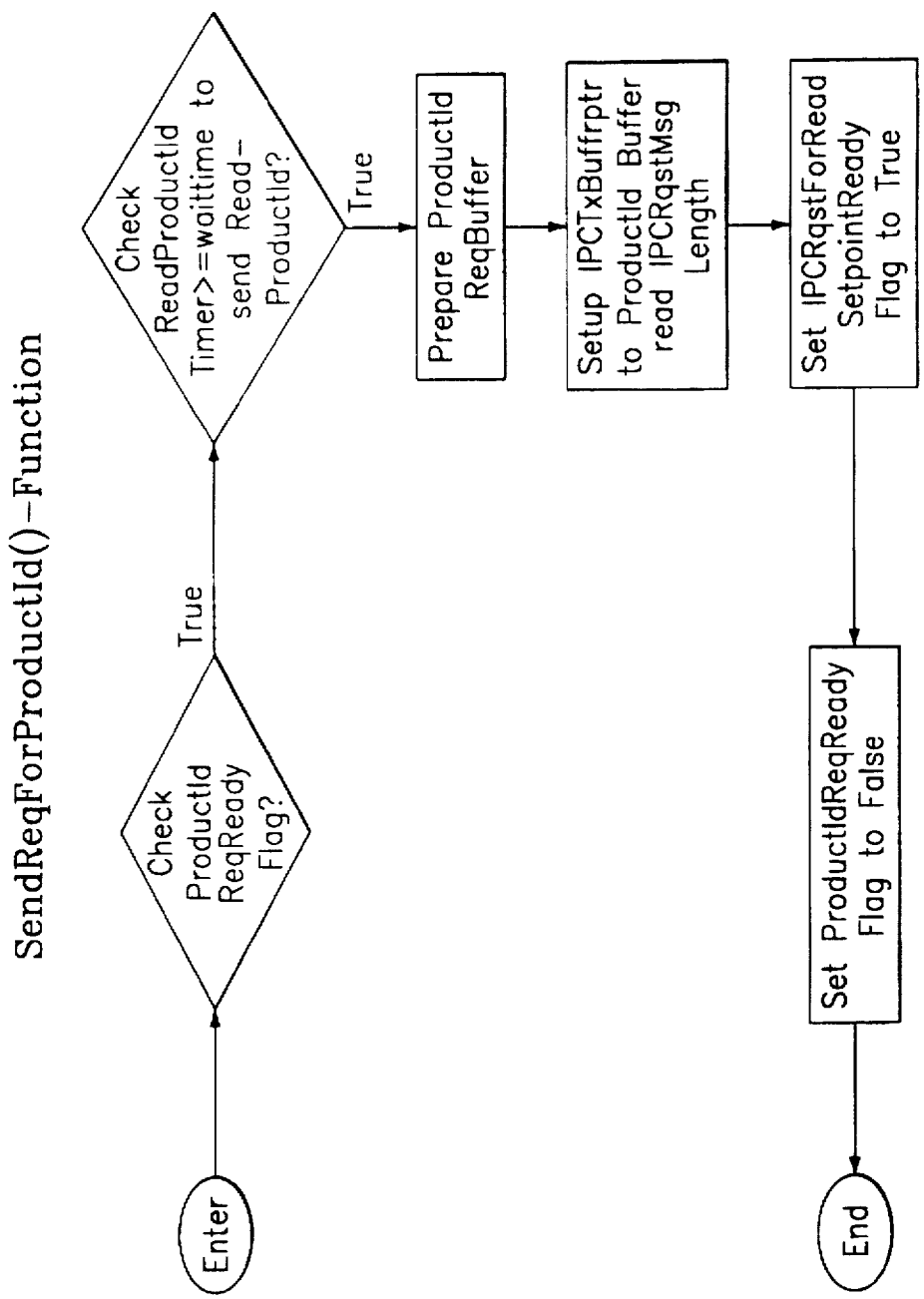

Referring to FIG. 84, the LED display and key-pad interface state diagram illustrates the different menus and displays available to the user through the Modbus concentrator's display interface. It also illustrates how the Modbus concentrator displays are selected and invoked. The LED display's display sequence starts with a scrolling display of the diagnostic byte status message. The LED display displays the normal state message on successful diagnostics execution and display the Idle states diagnostics file message on the detection of a fault. During the application of prime power to the Modbus concentrator, the main processor and the segment processor's self-test diagnostics are executed and the diagnostics error codes is displayed as "ECxx" (denotes Error Code xx) in the LED display. The user can view all error codes by scrolling through the LED display buffer.

An 'Enter' key press on value options menu updates the Commnet device address table, stores the new data entered in EEPROM and then the Modbus concentrator sends a set device address to the respective Commnet segment with new data. The main processor sends the segment processors set device parameter frames by setting the data transfer interrupt line to the segment processors and then sends an appropriate function code with the set device parameter data. This transfer is maintained until the main processor clears the data transfer interrupt to the segment processors. The LED display and key-pad interface task has a display timer that is initiated by any key press while the LED display is not in the scrolling state. The display timers preset time (i.e., display time-out time) in the present example, is ten to twelve seconds. During this time period, the LED display is maintained and on expiration of this time period, the LED display reverts to the scrolling display state with the display of the appropriate display states message.

Update the LED display in accordance to the key-pad key pressed and the current display format. Entry of data through this interface will modify the following tables/variables: diagnostic error, '00'—no error; code byte, 'FF'—non-recoverable error; else, have recoverable self-test error code; address table (addr table) is a list of all the Commnet devices addresses connected to the Modbus concentrator, including the Modbus concentrator address also in this example the Modbus baud rate, i.e., the Modbus request frame transmission baud rate is 300, 600, 1200, 2400, 4800, 9600, 192000; the ipc tx buffer data transmits buffer ID to send Commnet device data through the IPC interface (1, 2, . . . 8); and the ipc cnt buf len transmits buffer length (300, 301, . . . 514).

The Modbus concentrator main processor, in the present example, is based on the Motorola 68HC11 family devices. The main processor employs the microprocessor's SPI port for communicating with the segment processors. Two types of IPC message frames are developed by the main processor and sent to the segment processors. The IPC message frames are: (1) the main processor forwards RS-485 command message frames received from the Computer to the segment processors, and (2) the main processor sends message frames that requests the segment processors to poll the Commnet devices for status. The first type of message frame is transferred when a control command frame is received from the Modbus host. The second type of message frame is used to obtain the status of all Commnet devices connected to the Modbus concentrator.

In polling, the segment processors poll the Commnet devices connected to the Modbus concentrator, process and forward the received data from the Commnet devices to the main processors IPC task handler so that the received data can be placed in a memory buffer transfer to the Computer. Commnet devices are polled according to a Commnet address table. Commnet device polling is having the segment processors send an update request to Commnet devices for the Commnet devices to respond with the contents of their registers. The data sent to the segment processors include the dynamic value registers, fixed value registers, set point registers, event registers and the statistics registers contents. On receipt of this data from the segment processors, the main processor's IPC task unpacks the data and place it in the IPC receive data buffer. The segment processors service the main processor's request, obtain the Commnet device register data and forward the Commnet register data to the main processor.

The ipc rx buffer is a receive buffer. The seg cmd frame is a request frame to command segment processors to obtain Commnet device register date. The seg rec frame is a response frame to main processor with Commnet device register data. The ipc rx buff len is the number of bytes in received frame. The addr table is an address table and the ctrl ready is a control command in the queue for execution.

The main processor polls the segment processors one at a time and request the segment processors obtain Commnet device register data and forward the Commnet device register data to the main processor. The segment processors respond to the main processor's request with the message frames that contain the Commnet devices register data. In the execution of this task, the main processor waits for the reception of the requested data. The task is suspended until the main processor's IPC receive buffer has the Commnet device data for processing. When it has the data, it unpacks the buffer and update the device register file. The main processor waits for the completion of the reception data.

When there is no reception pending and the control ready is active, this task sets control OK flag so that the IPC interface can support an internal data transfer between the main processor and the segment processors. This task waits until the control ready flag is cleared. A cleared control ready flag informs the main processor that the polling task is completed. When there is no reception pending and there is no control ready and control OK flags, this task initiates the transfer of an update request to the segment processors for the register status from the next Commnet device in the address table. This task has the main processor activate the appropriate segment processor interrupt line (according to the segment number). The set processor interrupt line interrupts the segment processor so that the segment processor can receive the request frame from the main processor. The transmit buffer is sent after the interrupt line is set.

The cttrl ok is an OK to execute control command and the dev reg db is a Commnet device register file.

The control command forwarding task is performed between the main processor and a segment processor. This task functions as a task in waiting and is invoked upon reception of a control command frame from the PMCS host through the RS-485 Modbus interface.

The mod rx buffer is a receive buffer, the mod rx buf len is the number of bytes to reception, the ipc ctrl rx buffer is a control receive buffer, the ipc ctrl rx buf len is the number of bytes to reception, the ipc ctrl tx buffer is a transmit buffer to send through IPC control interface, the ipc ctrl tx buf len is a transmit buffer length, the ctrl ready is a control command present, the ctrl ok is an OK to execute control command, and the addr table is the address table.

Referring to FIGS. 85–89, this task is invoked by the SCI interface module when a control command frame is received from the computer. The following processing is performed in servicing the computer control command. When there is no control command in the SCI interface queue, this task waits for a control command frame from the SCI interface module. This is performed by waiting for ctrl ready and ctrl OK to be active.

On of ctrl ready and ctrl OK being set, this task transmits the received ipc ctrl tx buffer to the appropriate segment processor. The segment number is identified from the Commnet device address in the mod tx buffer and address table. The segment processor transmit sequence starts with activation of the appropriate segment processor interrupt line (according to the segment number). Activation of the segment processor's interrupt line will interrupt the segment processor processing task so that the segment processor can receive the control request frame from the main processor. The main processor sends out the transmit buffer immediately after the interrupt is activated. In case of exception frame reception, try re-transmitting for three times before setting an error in diagnostics byte. The ctrl ready and ctrl OK flags is cleared after the main processor receives the acknowledgment from the segment processor. This action will result with both the IPC polling and SCI interface tasks being released so that they can receive and service the next message frame.

The ctrl ready is a control command in the queue for execution, the ctrl OK is an OK to execute control command, and the ipc ctrl tx buffer is an IPC control buffer being transferred to segment processor.

Th SCI interface supports receiving and servicing RS-485 frame requests from the computer. The SCI interface task services the message frames received through the RS-485 communication interface, processes the request and forwards the response.

The mod rx buffer is a receive buffer, the mod rx buff len is the number of bytes to reception, the dev reg db is a Commnet device register database and the addr table is a Commnet device address table with Commnet segment numbers.

Referring to FIGS. 90–96, on reception of any message frame from the computer, this task checks the received message frame for data validity (address validity and CRC are checked in the ISR) and Modbus concentrator state. This tasks processing states are: (1) Busy processing previous request, and (2) Ready to process request. If the Modbus concentrator is busy processing a previous request the new request will be placed in the main processors interface data buffer and be held until the present message frame is serviced. In case of an exception, the appropriate exception message is developed and forwarded to the Computer.

When the message is valid and the main processor is ready to process the message, each supported message frame requires the main processor to initiate different actions and processing tasks. To support message re-transmission with the Computer, the main processor maintains the last request frame from the Computer in the mod TX buffer. The request frame is maintained until the main processor receives a new message frame from the Computer.

On receipt of frame, the main and segment processors update the time in their internal set point registers. The main processor does not respond to the Computer on a Broadcast frame. The Read Coil Status (01) results when a request for read the coil status is received, this process builds the mod tx buffer from dev reg db and forward the request to the appropriate segment processor. The receive frame provides the Commnet devices coil status. The Read Holding Registers (03) results when a request for read holding registers is received, this function builds the mod tx buffer from dev reg db and forward the request to the appropriate segment processor. The receive frame provides the start register number and number of registers for reading the register database. The Read Input Registers (04) is a request that involves similar processing as the above request but it reads the data from the Commnet devices input registers. The Force Single Coil (05) results when a request for force the coil status is received, this process builds the ipc ctrl tx buffer from dev reg db and forward the request to force a coil to the ON or OFF state to the appropriate segment processor. The receive frame provides the Commnet devices coil status. The Preset Single Register (06) is a control command from the computer. On receipt of this request, this procedure builds ipc ctrl tx buffer and sends it to appropriate segment processor through IPC control interface. The function sets ctrl ready flag to notify the IPC interface (for both polling & control tasks) and develops the RS-485 response frame and send it to the computer. The Preset Multiple Registers (16) is a control command except that it can control multiple parameters of a selected device. Like the previous request, upon receipt of this request, this procedure builds ipc ctrl tx buffer and forwards it to the segment processor through IPC control interface. The function sets ctrl ready flag to notify the IPC interface (both polling & control tasks) and builds the response frame and sends it out. The Re-Transmit the last message (56), on receipt of a request for re-transmit, initiates re-transmission of the transmit buffer build for last request. The Test Telegram (80) results when a request for test telegram is received, this process builds the ipc mod tx buffer from dev reg db and forwards the request to the appropriate segment processor. The segment processor re-transmits the received message back to the main processor. This process is performed during initialization in the execution of the self test diagnostics.

When the SCI interface task is servicing a request from the computer, the SCI interface task sets a de busy flag and send an exception message when another request Computer is received.

The mod tx buffer is a transmit buffer, the mod tx buf len is the number of bytes to be transmitted (should be non-zero value), the ipc ctrl tx buffer is a transmit buffer to send through IPC control interface, the ipc ctrl tx buff len is a transmit buffer length, and the ctrl ready is a control command in the queue for execution.

The main processors SCI Modbus interrupt service routine supports processing and receiving or transmitting RS-485 requests from or to the computer. For every character transmission or character reception the this task commands the main processor to generate an interrupt while this task services the RS-485 Modbus request.

The SCI interrupt handler causes the main processor to generate an interrupt upon reception or transmission of a character. The following variables are updated before the first transmit interrupt: the mod tx buffer is a transmit buffer; the mod tx buf len is the number of bytes to be transmitted; and the addr table is a table of Commnet device addresses connected to the Modbus concentrator which also includes the Modbus concentrator address.

The SCI Interface interrupts are generated for each RS-485 message frame that contains a character that is transmitted or character that is received from the computer. The SCI interface interrupt service routine (ISR) identifies the type of interrupt to be developed and task to be performed according to the nature of the transaction involving the character.

For receive interrupts, the SCI interface ISR receives the message frame and function code and stores it in mod rx buffer. From the function code, the SCI interface ISR computes the number of bytes to be received (for some function codes, the byte count is available in the data field) and stores the bytes received in the receive data buffer. The mod rx buff len is updated when the address received belongs to Modbus concentrator being addressed and the received frame CRC is OK. The rx buf len contains the number of data bytes in the received message frame. The inter-byte error counter is re-initialized on every character received.

The SCI interface interrupt handler develops a transmit interrupt every time a character in the mod tx buffer is outputted in a RS-485 message frame. The mod tx buf len is decremented until the last character in the buffer is transmitted. The SCI interface transmit interrupt is cleared when the last character is transmitted to the computer. The SCI interface interrupt handler increments the failed message counter on a message frame time-out and a received message frame failed CRC test.

The output of this task after the last transmit interrupt servicing is completed. The mod tx buff len the '00'— transmission completed, the Fail Count is the number of time-out and failed CRC tests occurred in servicing current RS-485 message frame.

On reception of a character, the SCI interface interrupt task updates the following variables after the last receive interrupt is serviced: the mod rx buffer is the receive buffer and the mod rx buff len is the number of bytes in reception.

Referring to FIGS. 97–106 the main processor has eight IPC transfer and eight IPC receive interrupt handlers, one of each for each segment processor. The IPC interrupt handlers notify the segment processors that the main processor is going to forward a computer message frame to the segment processors while the IPC receive interrupt handlers notifies the main processor that a segment processor is going to transfer Commnet device data to the main processor. The following hand-shaking protocol is employed to transfer data between the segment processors and the main processor.

The main processor initiates a transfer request by activating the IPC transfer interrupt followed by sending the request frame to the desired segment processor. The segment processor receives the request, services the request and then responds with a receive interrupt and response frame to the main processor. The IPC interrupt handler places the received data in the ipc rx buffer. The following sections lists the inputs to the IPC interface interrupt handler, processing associated with the IPC interface interrupt handlers and the outputs developed after the transfer is completed. Computer message frames to be passed to segment processor set the IPC transfer interrupt in the main processor. Data frames to be transferred to the main processor in a segment processor set the IPC receive interrupt in the main processor.

In the main processor, there are eight interrupt service routines, one for each of the eight segment processors. This architecture supports identifying the segment processor associated with the transfer and handling the frame transfer from the segment processor involved with the transfer. One receive interrupt is generated for each frame transferred between the main processor and the segment processors. Under this scheme, the main processor receives all the characters in the received data frame before exiting the interrupt.

The IPC interrupt routine receives byte by byte and stores it in the ipc rx buffer. From the function code, the IPC interrupt routine computes the number of bytes to be received (for some function codes, the byte count is available in the data field) and stores the bytes received in the ipc receive data buffer. Thus, it receives the characters according to the byte count. The mod rx buff len is updated when the address received belongs to Modbus concentrator and the received frame CRC is OK. The rx buff len contains the number of data bytes in the received data frame.

The following variables are updated after the last data frame receive interrupt is serviced: the ipc rx buff, data frame contents are placed into the receive buffer; and the ipc rx buff len is the number of bytes in data reception.

An event is defined as an asynchronous condition occurring outside the normal operation of a Commnet device. All asynchronous events is logged by the Modbus concentrator. The main processor maintains a global event table for all Commnet devices. The main processor polls the segment processors for Commnet device status and on receipt of the response to this request, the main processor places all event logs received into a global event table for the system. The most recent 24 events is maintained and be available to the computer from the main processor. The main processor stores event logs in the chronological order in which they were received with EVENT 1 being the oldest event and EVENT N being the latest one. The main processor clears the global event file of all events transferred to the computer. Each event message is time stamped with a 10 mil. sec. accuracy. Events is stored in the same format for all Commnet devices. The main processor maintains the number of active events in the Active event register.

The IPC Function 03 Response, for each of the segment processors develops and returns an IPC Function Response to IPC Function 03 to the main processor in response to receiving an IPC Function Request 03, Read R/W Registers, from the main processor. The RS-485 Function Request 3, RS-485 request from the computer to the main processor. Function Request defines number of event logs to be transferred to the Computer from the main processor. The main processor maintains the global event file and transfer event logs to the computer on request from the computer.

The event file stores between 0 and 24 event logs. If there are more events than can be stored in the event file, the oldest event is removed and the rest of the events in the event file are shifted downward, freeing the event log for the earliest event entered. The event logs is automatically cleared after the computer reads them. If the computer does not read all the recorded events, the event registers are shifted to represent remaining events to be read by the computer. The number of active events reflects unread events by the computer. The computer may read event registers at any event log boundary. Event registers following the event that was read is shifted up to fill in the event logs transferred to the computer. Event logs before the event logs that are read will not be affected. Computer request to read event registers partially will be returned with an exception code.

The main processor polls the segment processors for their Commnet device status through IPC Function Request 03. When the main processor receives the status, the main processor places the event log received into the global event file in the device register buffer and increment the number of events contained in the Active event register. The main processor always add new event logs to the head of the global event file in the device register buffer.

The global event file is cleared on the application of power to the Modbus concentrator and is maintained while power is applied to the Modbus concentrator.

The IPC Function Request 03, IPC Read R/W Registers request from the main processor to each of the segment processors. Function Request 03 is the request for the segment processors to transfer the contents of their data registers to the main processor. The Function Request 03 Response, the main processor returns to the computer the RS-485 bus address, function code 03, starting memory address and quantity of data registers to be transferred to the computer and the contents of the data registers in response to receiving RS-485 function request 03 from the computer. The Active event register is the number of active events in the global event file, ranges between 0 and 24. The Dev reg buff is a Commnet device register file.

Time synchronization is the process of updating the time reference in the main and segment processors. The time synchronization process is automatically performed on command from the computer on the initial application of power to the Modbus concentrator and at any time the computer wants to update the time reference in the main and segment processors. The computer sends the main processor RS-485 Modbus 16h function request (Preset Multiple Registers) with the new time reference to be placed into the main processor and segment processors set point registers.

The RS-485 Function Request 16, Preset Multiple Registers request from the computer to the Modbus concentrator main processor. The request contains new time reference to be placed into the main processors time reference set point registers. The IPC Function Response 100 for each of the segment processors develops and returns the IPC Function Response 110 to the main processor in response to receiving a IPC Function Request 110 from the main processor.

At power up, the main processors register set is cleared and function 16 provides the means for the computer to load the time reference into the main processor's set point register set. The computer transmits a 16 (preset Multiple Registers) when the computer wants to update the time reference in the main and segment processor's set point registers. On receipt of these RS-485 function requests, the main processor loads the time reference into its internal set point registers and, develops and sends the response to function request 16 if the time reference updating was received through function request 16. The main processor does not have to develop a RS-485 function response for a RS-485 Function request 00 (Broadcast).

Next, the main processor sends each of the segment processors IPC function code 110 (Time Synchronization Update). On receipt of this IPC request, each of the segment processors places the updated time reference into the segment processors set point registers. Each of the segment processors develops the response frame to IPC function code 110 and sends the response frames to the main processor.

The Function Request 16 Response, the main processor returns the Modbus concentrator's RS-485 bus address, function code 16, starting memory address and quantity of set point registers updated with the new time reference in response to receiving RS-485 function request 16. The IPC Function Request 110, IPC Time Synchronization Update request from the main processors to each of the segment processors. The request contains new time reference to be placed into each of the segment processors time reference set point registers.

All the segment processors have the same processing functionality. The segment processors self-test and initialization task is invoked by the application of prime power to the Modbus concentrator and the development of a Power On Reset (POR) flag. During self-test and initialization, each segment processor executes its self test diagnostics and becomes initialized. Also the peripherals connected to the segment processors are initialized.

The input for this function is developed from the application of prime power to the Modbus concentrator. The application of prime power results with the generation of the Power on Reset flag to each segment processor. The Power-on-reset flag is a flag that is passed to the initialization task to initiate self-test. The Idle State flag is set, the task scheduler remains in the Idle state on the detection of a non-recoverable self-test error during initialization.

The segment processor self-test and initialization processing involves the following operations. The initialization of each of the segment processors and Commnet devices connected to the segment processors. This test is performed on each segment processor. The self-test diagnostics on PROM, internal RAM, EPROM, Timer, SPI Interface, external RAM and Commnet device interfaces. An unsuccessful self-test identifies the segment processor that failed and identify the associated processor function that failed. The following tests is performed for each segment processor. Check-sum verification test on PROM (PROM check-sum is computed and stored in a selected memory location when the PROM is fused). Special patterns (0×00, 0×FF, 0×55, 0×AA) are written to the lower byte and to the upper byte of all memory locations. The memory locations are checked by reading the pattern that was written to the memory locations and then comparing the pattern read from memory to the pattern that was written to memory. This test is performed on all internal and external RAM modules. EEPROM Check-sum verification test is updated for every EEPROM data change.

The segment processors timers is checked by setting the timers time count limit to 4096 counts (2.2 mil sec.) and then after 2.2 mil. sec., check the timers pulse count. If the pulse count in the timer count register is identical to the present value, the timer is OK. If the pulse count in the time count register is different from the preset value, the timer is defective and the segment processor is declared as having a non-recoverable error.

Each of the segment processors inter-processor communication path with the main processor is checked by having the segment processors receive a test-telegram from the main processor and then sending the appropriate response frame back to the main processor. Each of the segment processor interfaces and their peripherals (SPI, etc.) and all internal and external RAM for start of processing are initialized. The segment processors timer is initialized. The timer is initialized to 4096 counts (2.22 mil. seconds time intervals). The processors address table is initialized. The main processor sends the set device address request to each of the segment processors for initialization of all Commnet devices connected to the Modbus concentrator. On receipt of the Preset Multiple Registers request frame, the segment processors clears (set to 0) the set point registers that contain the event time (hr., min., sec.) reference. The event time reference starts incrementing after initialization is complete. The segment processors enters the Idle state when they receive an IPC message frame that commands the segment processors to enter the Idle state when the main processor declares that it has a non-recoverable error or by the segment processors not receiving any message frames from the main processor. In case of an unsuccessful self-test, the segment processor disables all its functions except for responding to a diagnostics byte request from the main processor and turn on its red LED to indicate that it has a non-recoverable error. On successful completion of the self-test, the segment processor initializes its peripherals (SPI, etc.) and internal and external RAM for normal operation and turn its green LED to indicate that the segment processor has no initialization self-test errors.

Each of the segment processor's self-test diagnostic error code bytes are updated after the segment processors complete their self-test diagnostics. The Operational Status: Normal, the segment processor self-test successfully performed and the segment processor's green LED is turned on; Recoverable, a recoverable error detected during self-test; Non-recoverable, a non-recoverable error detected during self-test, segment processor turns on its red LED and enters the Idle State; diagnostics error, '00'—no error; code byte, 'FF'—non-recoverable error; else, have recoverable diagnostic error code; and Addr table, address table with device addresses and segment numbers.

The segment processors has a number of tasks for managing the IPC interface with the main processor, managing the Commnet device interfaces and storing Commnet device data. The segment processor's task scheduler is configured to execute these tasks sequentially through a pre-defined sequence as defined by the segment processor's task table and task priority table. The task scheduler is invoked after initialization and self-test are complete on the Normal state flag being set (no non-recoverable errors detected during the execution of the initialization diagnostics). The task scheduler is placed into the Idle state on the detection of a non-recoverable error during the self-test diagnostics execution and remain in the Idle state, disable the IPC communication interface with the main processor and be inhibited from initializing the task scheduler on the non-recoverable error. The following sections list the Task Scheduler inputs, processing definition and outputs generated during the normal state.

The following processing elements are required to implement this function timer state: status of timers 2.22 mil sec counter; task table is a memory table that specifies the tasks to be executed and the starting address for each task; task priority table is a table defines the priorities level for the tasks contained in the task table; Normal state flag, on flag being set, the task segment processor enters the Normal state when there are no non-recoverable self-test errors detected during initialization; segment processor remains in the Idle state; and Idle State Flag, on this flag being set, the task scheduler enters and remain in the Idle state on the detection of a non-recoverable self-test error during initialization.

The task scheduler function is a root task and checks for an elapsed time interval of 2.22 mil. seconds by counting 4096 clock pulses for task frame switching in each of the segment processors. The segment processor's tasks are executed to the priority they are defined in the task priority table. The next task to be executed in initiated by having the timers clock pulse count equal to or be greater than its programmed pulse count of 4096 counts. If its clock pulse count is lesser than the programmed time pulse count, the task scheduler's timer's pulse count is incremented. If the counters clock pulse count is equal to 4096 counts, the task pointer is incremented and the next task in the task table is initiated. If a task is completed within the 2.2 seconds fame, the counter is reset, the task pointer is incremented to the next task and the next task is initiated. The task schedulers frame counter pulse counter is inhibited when the segment processor receives either a IPC communication interrupt. The counter is interrupted so that the segment processor can service the IPC message frame. The counters pulse counting will commence after the IPC message request is serviced.

The Normal State Flag indicates the segment processor is in the Normal state. The following tasks are performed when the segment processor is in the Normal state: self-test and initialization; BIT diagnostics; segment auto configuration/ address conflict resolution; LED display control; IPC interface; transmit; receive; IPC interface service; HBPC kernel—Commnet interface; data collection; engineering unit conversion; execute control commands; event handler; and time sync.

The Idle State Flag indicates that the segment processor is in the Idle state. The segment processor goes into and remain in the Idle State on the detection of a non-recoverable self-test error during the execution of the self-test diagnostics.

The Address Resolution Test is initiated by the user and is part of the Modbus concentrator start-up process. The Address resolution Test tests for Commnet device address conflicts within a segment and for address conflicts between Commnet devices between Commnet segments.

Each segment processor performs the Commnet device Address Conflict Resolution test on command from the main processor. In this test, each segment processor checks the addresses of the four Commnet devices connected to it for address duplication. The segment processors sends the main processor the addresses of the Commnet devices connected to it and whether or not there is any address conflict between the Commnet devices it is connected to. The segment processors blinks the red LED fault indicators during the execution of this test. On completion of the Address Conflict Resolution test, the segment processors receives the Commnet device address table from the main processor and is commanded to turn on the red LED fault indicators if the segment processor has an Commnet address conflict.

The Device address table is a table of addresses of Commnet devices connected to Modbus concentrator. The Add Cnflt Flg is a flag that is set when the main processor detects a Commnet address conflict. The Add Cnflt tst. request frame to segment processors to perform Address Conflict test. The LED Blnk cmd. request frame to command segment processors to blink the red LED indicators during the execution of the Commnet device address conflict test. On command from the main processor, the segment processors checks for conflicts between the addresses of the Commnet devices connected to the segment processor and for more than four Commnet devices connected to the segment processor. The segment processor flags address conflicts within the Commnet devices connected to the segment processor. The segment processors sends their results to the main processor on command from the main processor and the main processor records all Commnet device conflicts detected by the segment processors. During the execution of the Address Resolution Test, the main processor commands the segment processors to blink the red LED fault indicators. The main processor also commands the segment processors to stop blinking the red LED fault indicators at the completion of the Address Conflict Resolution Test. The segment processors turn on the red LED fault indicators on command from the main processor to inform the user that there is an address conflict. The main processor updates the Commnet device address table and transfer the address table to each of the segment processors. The segment processors place the updated address table in memory.

The Device address list is a list of addresses of Commnet devices connected to the segment processor. The Sg Cnflt Flg is a flag which is set when the segment processor detects an Commnet device address conflict. Each segment processor has one green and one red diagnostic LED for displaying the status of the segments diagnostics status during and after the execution of the address conflict and address resolution test. The LED Blnk cmd, request frame to segment processors to have segment processors illuminate the green and red LEDs during and after the execution of the address conflict resolution test. The Address Conflict Test Status is sent to the segment processors from the main processor. Segment processors decodes the test status and illuminate the green and red fault indicators according to the Commnet device address conflict and resolution received.

Each segment processors on direction from the main processor illuminates or blinks the green and red LED fault indicators in accordance to the Commnet device Address Conflict Resolution test status received from the main processor. The segment processors illuminates the LED fault indicators under its control on direction from the main processor. Each of the segment processors is able to illuminate or modulate the green and red LEDs intensity to indicate the following address conflict and address resolution test error conditions: Commnet segment communications OK; segment empty/no devices configured; one or more Commnet device addresses out of range (300–514); one or more Commnet devices not responding; more than four Commnet devices on segment; more than one waveform capturing meter in segment; address conflict within segment; and address conflict within and across multiple segments.

The segment processors also illuminates or blinks the green and red BIT fault indicators under it's direction to indicate the following Modbus status: RS-485 Transmit/ Receiving fault (No response, frame damaged, frame in error); Modbus concentrator status OK; and the master processor has non-recoverable failure.

Figure 107:
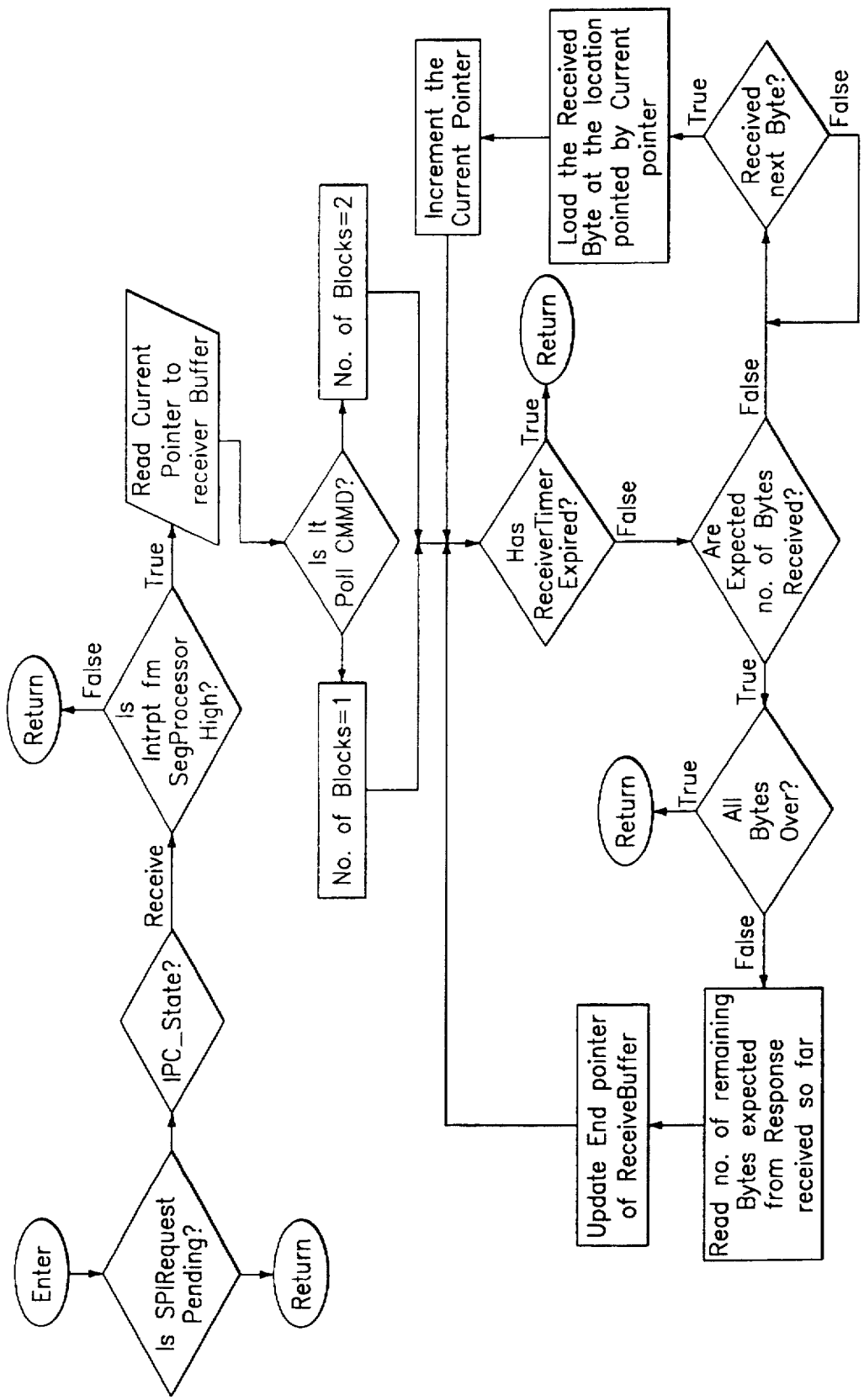
FIGS. 107 and 108 are software structure diagrams of the SPI handler module of the Modbus concentrator.
Figure 108:
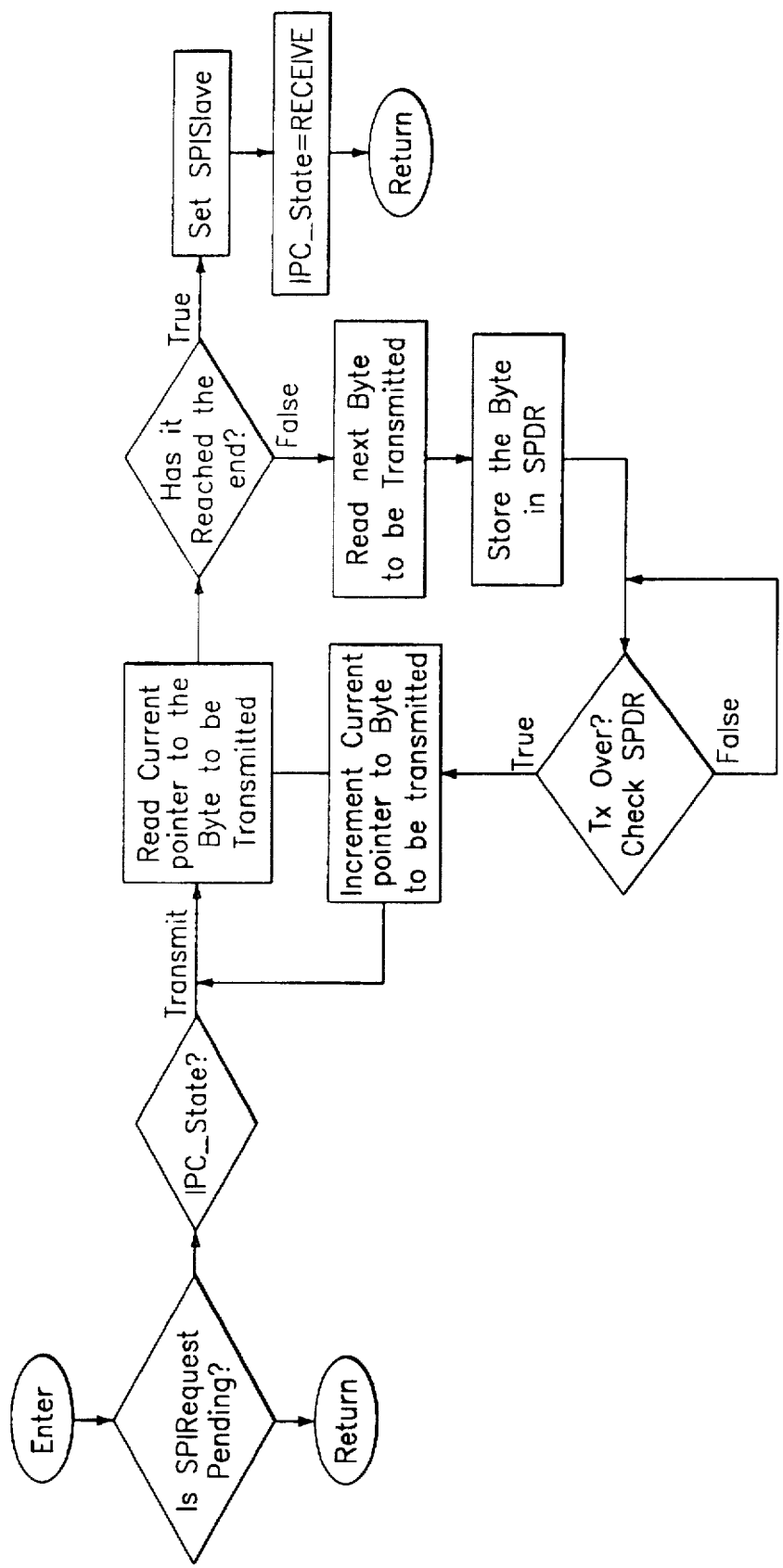

The IPC Interface task provides the services for initiating and performing data transfers with the main IPC task in the main processor. Referring to FIGS. 107 and 108 the segment processor employ the SPI port for IPC data transfers. The ipc rx buffer is a receive buffer, the ipc rx buff len is the number of bytes in received frame, and the addr table is an address table.

This task is invoked when a message frame is received from the main processor. The following processing activities are performed in executing this task. On receipt of any message frame from the main processor, the IPC Interface handler checks the message frame for data validity (address validity and CRC check on message frame data) and the processing state of the segment processor. If the segment processor is busy servicing a previous request, an exception message is developed and sent to the main processor indicating that the latest frame message is not being serviced. If the segment processor is not busy (not servicing a message frame from the main processor), the segment processors IPC Interface handler will service the received message frame. The following list defines the message frames that the segment processor's IPC Interface handler will service.

To support the re-transmit function, the segment processors retains a copy of the last request frame from the main processor in the ipc tx buffer until the next request frame is received. On receipt of frame, the main and segment processors update the time in their internal set point registers. The main processor does not respond to the Computer on a Broadcast frame. The Read Coil Status (01) results when a request for read coil status is received, this process builds the mod tx buffer from dev reg db and forward the request to the appropriate segment processor. The receive frame provides the Commnet devices coil status. The Read Holding Registers (03) results when a request for read holding registers is received, this function builds the mod tx buffer from dev reg buffer and forward the request to the appropriate segment processor. The receive frame provides the start register number and number of registers for reading the register database. The Read Input Registers (04) involves similar processing as the above request, but it reads the data from the Commnet devices input registers. The Force Single Coil (05) results when a request for force the coil status is received, this process builds the ipc ctrl tx buffer from dev reg buffer and forward the request to force a coil to the ON or OFF state to the appropriate segment processor. The receive frame provides the Commnet devices coil status. The Preset Single Register (06) is a control command from the computer. On receipt of this request, this procedure builds ipc ctrl tx buffer and sends it to appropriate segment processor through IPC control interface. The function sets ctrl ready flag to notify the IPC interface (for both polling & control tasks). Builds the response frame and send it to the computer. The Preset Multiple Registers (16) is also a control command except that it can control multiple parameters of a selected device. Like the previous request, upon receipt of this request, this procedure builds ipc ctrl tx buffer and forward it to the segment processor through IPC control interface. The function sets ctrl ready flag to notify the IPC interface (both polling & control tasks). Finally, it builds the response frame and sends it out. The Re-Transmit the last message (56) results on receipt of a request for re-transmit, it initiates re-transmission of the transmit buffer build for last request. The Test Telegram (80) results when a request for test telegram is received, this process builds the ipc mod tx buffer from dev reg buffer and forward the request to the appropriate segment processor. The segment processor retransmits the received message back to the main processor. This process is performed during initialization in the execution of the self test diagnostics. When the function is busy servicing a request from Modbus master, it sets a dev busy flag to send exception message when another request is received.

The Dev req frm is a Commnet device control frame; the Dev pol frm is a Commnet device poll frame; the mn proc res are response frames to main processor's IPC request frames; and the dvc busy flg is an exception message to main processor indicating the IPC is busy servicing a previous IPC request.

The Interrupt Service for IPC Interface has one out-going and one in-coming for inter processor communications. The reception of request frames from the main processor invokes this method only once for complete frame. Therefore, the processing receives all the characters before exiting the interrupt. The ISR receives byte by byte and stores it in the ipc rx buffer. The number of bytes to be received can be computed from function code (for some function codes, byte count is available in the data field). Thus, it receives the characters according to the byte count. The mod rx buf len is updated after checking received frame contents & CRC are all OK.

In case of reception, the following variables are updated after the last receive interrupt servicing is completed: ipc rx buffer is a receive buffer and the ipc rx buf len is the number of bytes to reception.

The HBPC kernel is resident in the segment processor and provide the processing services and interface between the segment processor tasks communicating with Commnet devices and the Commnet devices. The HBPC kernel is employed by every request frame transmitted to a Commnet device from the segment processor and also in servicing the response frames from the Commnet devices. The Tx reg buff is an IPC Commnet device poll or command request frames, placed in the transmit register buffer by either the Execute Control Command task or the IPC Receive task. The HBPC kernel forwards Commnet device poll and command request frames to Commnet devices when these frames are to be sent to a Commnet device. The Execute Control Command task places control request frames into the transmit register buffer while the IPC Receive task places poll request frames into the transmit register buffer. The Data Collection task removes all Commnet device response frames from the receive register buffer. The transmit and receive resister buffers is part of the device register buffer. The cmnt dvce dat is a Commnet device response data/value frame, placed in the receive register buffer by the HBPC kernel.

Data collection is the process of the segment processors polling the Commnet devices connected to the segment processor with register read commands to obtain the contents of the Commnet devices dynamic value registers, fixed value registers, set point registers, event registers and statistics registers. On receipt of the response frames from the Commnet devices, the segment processors places the Commnet devices register contents into the appropriate device register data list in the segment processor's device register buffer. The Commnet devices registers is polled in the sequence the device registers are contained in the devices register address table. The received data is retained in the binary format (raw data) it is received in.

The Commnet command table is a table of Commnet device register read/write commands, the Commnet device addr table is a table of all Commnet device addresses, the Commnet dvce frame cmd is a polled Commnet device frame command that defines the register whose contents are to be transferred to the segment processor in the Commnet devices response frame. The Commnet device reg lst is a register data contained in the Commnet device received frames is placed into the devices register list in the segment processor's device register buffer in the sequence the device registers were polled.

The segment processor develops Commnet device request frames and send the request frame to all of the Commnet devices connected to the segment processor. On receipt of the Commnet device request frame, the Commnet device places the contents of the particular dynamic value register, fixed value register, set point register, event register or statistics register addressed into a response frame and return the response frame to the segment processor. The HBPC kernel removes the message frame overhead from the response frame and place the received register data into the HBPC kernel's receive data buffer. The Data Collection task then places the register data into the associated devices register data list in the device register list. The register data is retained in the binary format (raw data) it is received in. The binary form of the register data is: Bnn/Bmm, where 0 nn 24.0 mm 24 and nn mm.

The Commnet dvce frame is a Commnet device request frame that identifies a Commnet device's dynamic value register, fixed value register, point register, event register and statistics register contents are to be transferred to the segment processor in the devices Commnet response frame. The Device raw reg lst is a list of a devices raw register data received from the Commnet devices, contained in the segment processors device data buffer.

Engineering Unit Conversion is the process of converting the Commnet device's dynamic value and set point registers data to engineering unit data. The data format conversion is performed by employment of the data conversion algorithms contained in the Commnet device documents defined in the following table. The table matches one-to-one with the segment processor register map and lists the reference document with page number for the algorithm to be employed in converting the acquired register data into the engineering units. The Device reg lst is a list of devices raw register data received from the Commnet devices, contained in the segment processors device data buffer. The dvce conv also is a Commnet device register data conversion algorithms. The Engineering Unit Conversion task takes the Commnet devices dynamic value and set point registers raw data and employ the Commnet device data conversion algorithms defined in the following tables in converting the raw register data into engineering unit data. After the data is converted, the Engineering Unit Conversion task places the converted data in engineering units format back into the devices register data list in the segment processors device register buffer.

Execute Control Commands is the process of the main processor receiving a special command from the computer and forwarding the command to a segment processor. On receipt of the command, the segment processor develops and sends the appropriate IPC response frame to the main processor to acknowledge receiving the command and develop the Commnet device request frame and forward the command to the addressed Commnet device. The Commnet device executes the command. As the command is being executed, the segment processor requests Commnet device status. The segment processor transfers the Commnet devices status to the main processor. The segment processor interrupts all processing tasks to service the Control Command.

The IPC Function Request 06, the main processor IPC function request for the segment processor to preset a value into a Commnet device read/write register, Commnet Response Frame, and segment processor IPC function response to the main processor to acknowledge receiving IPC Function Request 06.

The segment processors polls the Commnet devices connected to the segment processor for the data contained in the dynamic value registers, fixed value registers, set point registers, event registers and the statistics registers and on receipt of this data places the event register data into event logs. The segment processor maintains the event logs in a linked list in the IPC transmit buffer. On receiving Function Request 03 from the main processor, the segment processors transmits the event logs to the main processor in the response to IPC Function Request 03. The IPC Function Request 03, IPC Read R/W Registers request from the main processor to each of the segment processors. The Function Request 03 is the request for the segment processors to transfer the contents of their data registers to the main processor. The Commnet Response frame 84, a response frame received from Commnet devices to obtain the data contained in the dynamic value registers, fixed value registers, set point registers, event registers and the statistics registers. The Dev addr table is a table of addresses of Commnet devices connected to the Modbus concentrator. The Cmnt Dvce Dat is received data/value frames from Commnet devices (received in HBPC kernel receive buffer) and which are transferred to the segment processors ipc tx buff for transfer to the main processor. The Wall time is the current time.

The segment processors polls the Commnet devices through the Commnet function request 84 (Update Registers) for the Commnet devices the dynamic value registers, fixed value registers, set point registers, event registers and the statistics registers data employing the Commnet device address table. After the response frames are received, the segment processors places the devices event register data into the device event logs in the IPC transmit buffer. The segment processor adds the current time to the devices event logs. The event logs is maintained in a linked list in the IPC transmit buffer. The main processor polls the segment processors for their Commnet device status through IPC Function Request 03. When the segment processors receive this request, the segment processors develops the IPC Response frame for IPC Function 03 and transfer the its event log to the main processor. The segment processor clears all event logs transferred to the main processor after the event logs are transferred to the main processor. The segment processor maintains event logs in the IPC transmit buffer. The Commnet Request frame 84, an update register request frame sent to all Commnet devices to obtain the data contained in the dynamic value registers, fixed value registers, set point registers, event registers and the statistics registers. The IPC Function 03 Response, each of the segment processors develops and returns IPC Function Response to IPC Function 03 to the main processor in response to receiving a IPC Function Request 03, Read R/W Registers, from the main processor. The ipc tx buff, Commnet device received register data/value, placed into IPC transmit buffer for transferring device status to the main processor.

Time synchronization is the process of updating the time reference in the main and segment processors. The time synchronization process is automatically performed on command from the computer on the initial application of power to the Modbus concentrator and at any time the computer wants to update the time reference in the main and segment processors. The computer sends the main processor RS-485 Modbus function request 16 (Preset Multiple Registers) with the new time reference to be placed into the main processor and segment processors set point registers. The main processor transfers the updated time reference to the segment processors through IPC Function Request 110 (Time Sync Update). The segment processors places the received time reference into the segment processor's time reference set point registers. The IPC Function Request 110, IPC Time Sync Update request from the main processors to each of the segment processors. Request contains new time reference to be placed into each of the segment processors time reference set point registers.

At power up or when the Computer wants to update the time reference in the main and segment processor's set point registers through RS-485 function 16 (Preset Multiple Registers). When the main processor receives either of these RS-485 function requests, the main processor updates the time reference in its set point registers and sends each of the segment processors IPC function code 110 (Time Sync Update). On receipt of this IPC request, each of the segment processors places the updated time reference into the segment processors set point registers. Each of the segment processors develops the response frame to IPC function code 110 and sends the response frames to the main processor. The IPC Function Response 110, each of the segment processors develops and returns IPC Function Response 110 to the main processor in response to receiving a IPC Function Request 110 from the main processor.

The Modbus RTU converter provides data collection of all attached Commnet devices, processing of metering data (i.e., formatting of raw data into engineering units), demand calculations, energy calculations, processing of events (e.g., trips and alarms), execution of commands upon host request, configuration and addressing of devices, self test and diagnostics, communications drivers, and other utilities.

It will be appreciated that a programmable logic controller could be programmed to perform the same functions of the Modbus concentrator, described above, and that such is within the scope of the present invention.

Ethernet gateway 150 encapsulates a serial protocol in a LAN packet (TCP/IP). The Ethernet network sends and receives data packets via the LAN to Ethernet gateway 150. Packets of serial data, encapsulated in a LAN packet, received from computer 142, are retransmitted by gateway 150 to remote data monitoring devices on the appropriate serial port, and conversely, data packets received by gateway 150 on a serial port will be sent to computer 142 via the LAN. LAN protocols are standard commercial protocols (i.e., TCP/IP), and the power management system of the embodiment of FIG. 3 is designed to co-exist in the same LAN with other devices. Since, gateway 150 seeks to retransmit packets received from the LAN, it is very important to ensure that these packets did in fact come from the power management system and not other non-related devices (i.e., authentication and security). This serial-to-Ethernet transfer protocol employs a header which contains information regarding the number of bytes in the serial data packet and a checksum byte that ensures that the header itself has not been corrupted.

Figure 64:
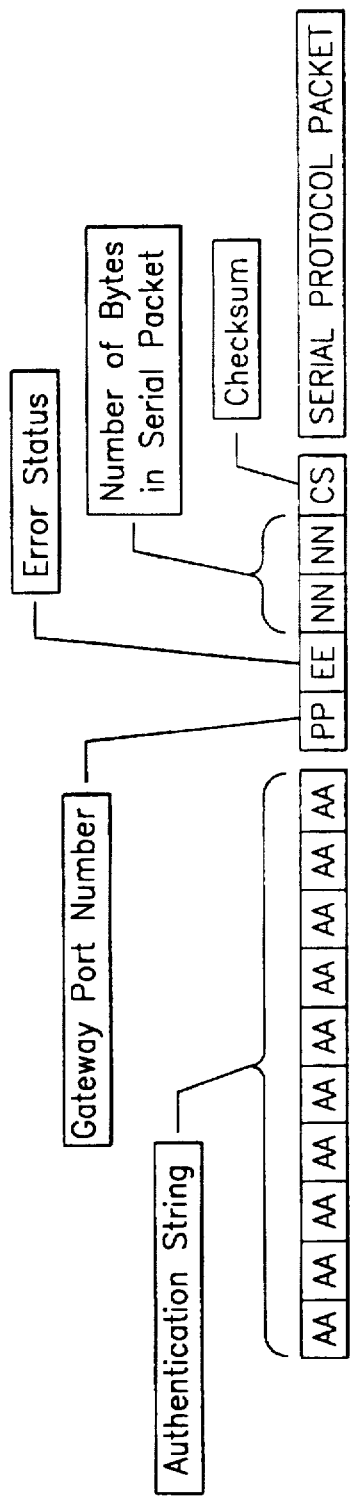
FIG. 64 is a diagram of a header of the serial-to-Ethernet protocol used in the power management and control system of the present invention.

Referring to FIG. 64, LAN packets transmitted to the gateway 150 by computer 142 comprise the serial communications data packet plus a fifteen byte header inserted in front of it. The first ten bytes contain a string of AAhex characters to help identify the packet as a valid power management packet. The eleventh byte, the port byte, indicates which of the four ports of the gateway the message is to be transmitted on. The twelfth byte, the error status, is zero when the LAN packet is originated by computer 142. However, if the LAN packet was originated by a gateway, this byte will contain any serial communications errors (i.e., parity, overrun, framing errors, etc.) that may have occurred when the gateway received the serial packet. The two bytes that follow indicate the number of bytes to follow this fifteen byte header. The last byte of the header contains a one byte checksum for the header.

Figure 65:
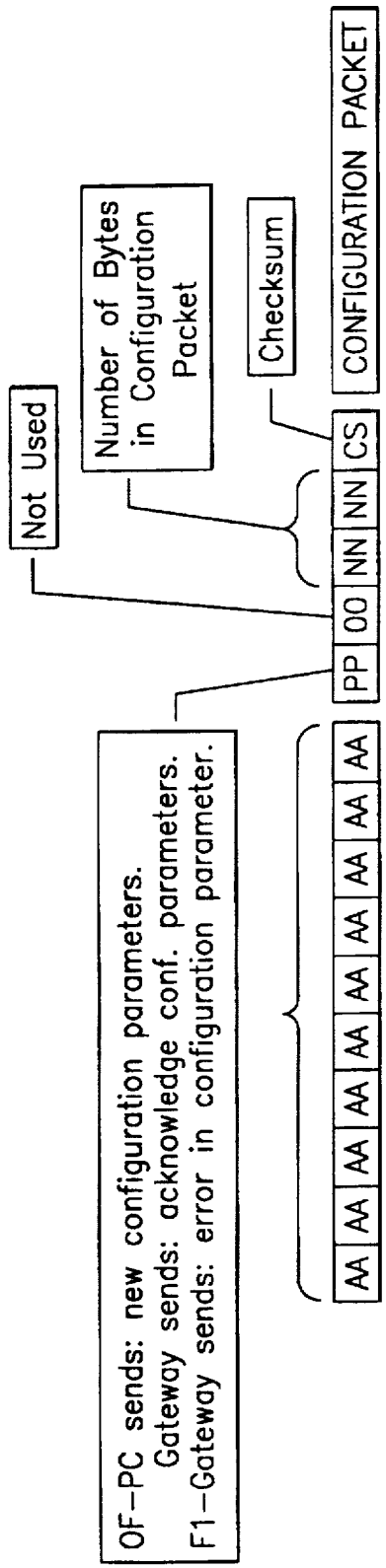
FIG. 65 is a diagram of a header of the serial-to-Ethernet protocol used for configuration loading in the power management and control system of the present invention.
Figure 66:
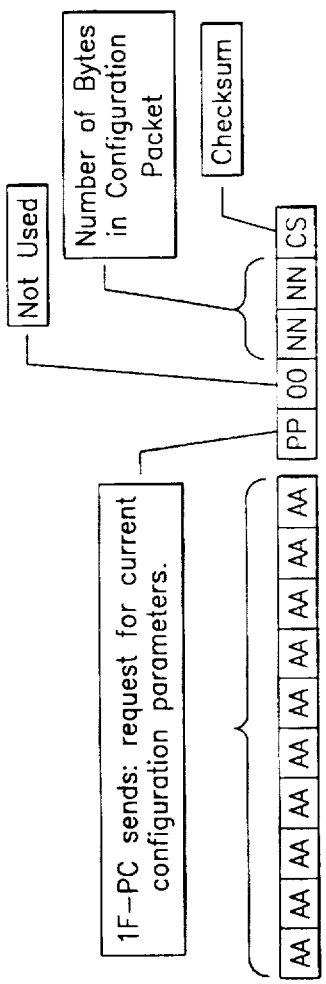
FIG. 66 is a diagram of a configuration request for the serial-to-Ethernet protocol used in the power management and control system of the present invention.

Configuration parameters for the serial ports of the Ethernet gateways are set to enable serial communications. The user sets these parameters at the computer which in turn sends them to the gateway. Serial communications configuration parameters (i.e., baud rate, number of stop bits, etc.) and status data (i.e., parity, overrun, framing errors, etc.) must be communicated between the gateway and the computer in an exception manner. Whereby, the gateway will not mistakenly transmit these configuration parameters on a serial port, and the computer will not mis-interpret them as a data packet. These parameters are sent to the gateway via the LAN. The header format described above is used for this purpose by sending special commands on the port byte. Two types of gateway configuration commands can be initiated by the computer:

(1) 0F hex in the port byte, the data bytes in the serial data packet field contain the configuration parameters, FIG. 65; and (2) 1F hex in the port byte, no data bytes should follow the header byte, whereby this message will prompt the gateway to send back the current configuration, FIG. 66.

Two types of configuration messages can be initiated by the gateway:

(1) 0F hex in the port byte, the gateway will send this message as confirmation of the receipt and acceptance of a set of configuration parameters for which no errors were detected, and this message will also be sent in response to a prompt for current configuration, FIG. 65; and (2) F1 hex in the port byte, the gateway will send this message if it detects an error in a configuration message from the computer, FIG. 65.

In the example shown in FIG. 66, the computer 142 is physically connected to each Ethernet gateway 150 over an Ethernet LAN. Each Ethernet gateway 150 has four communication ports and its own LAN address. The Ethernet gateway 150 communication ports are coupled to the remote devices 600, e.g., the trip units, meters, relays and control devices described hereinbefore. Therefore, whenever a particular physical serial communication port is to be addressed, the LAN address must reference the Ethernet gateway 150 that physically contains the communication port in question, and also, must specify which of the four ports on that Ethernet gateway is being addressed.

Figure 67:
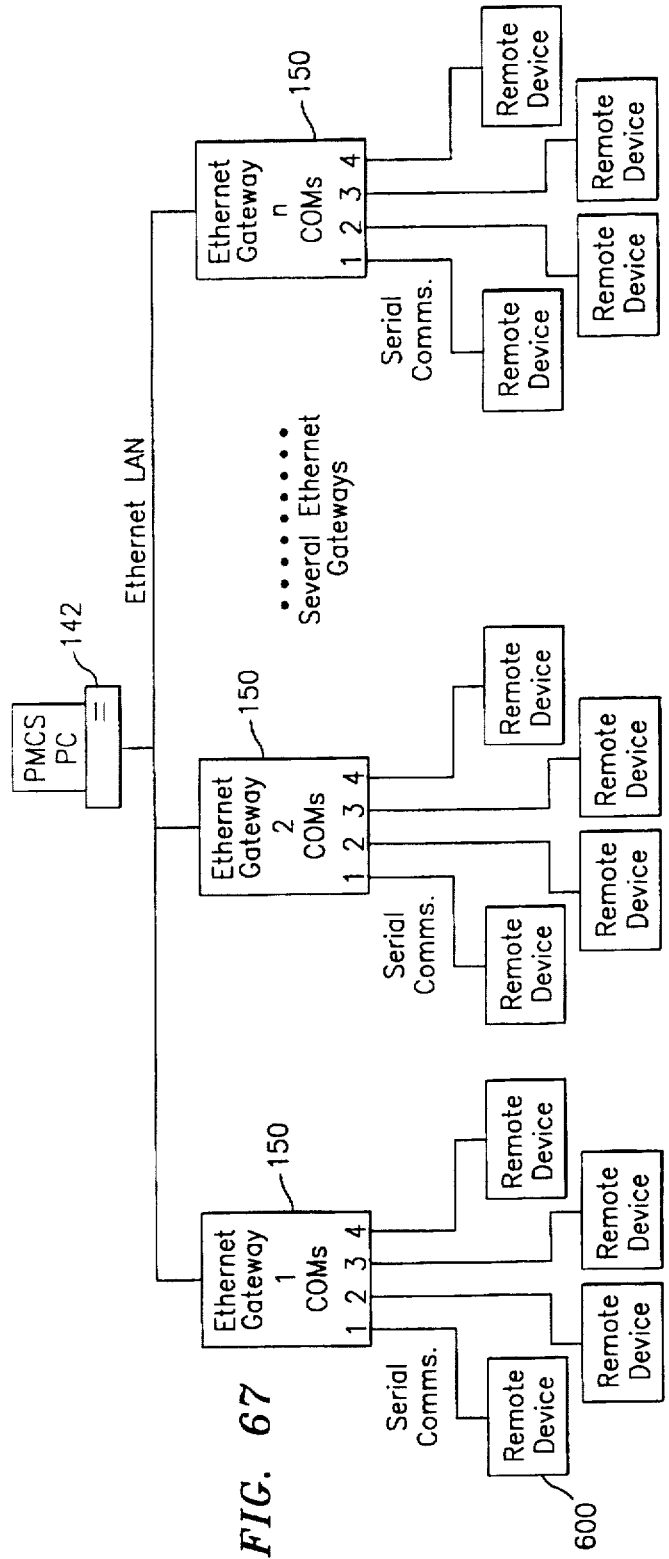
FIG. 67 is a block diagram of the physical interconnection between a computer and a plurality of remote devices in a power management control system.
Figure 68:
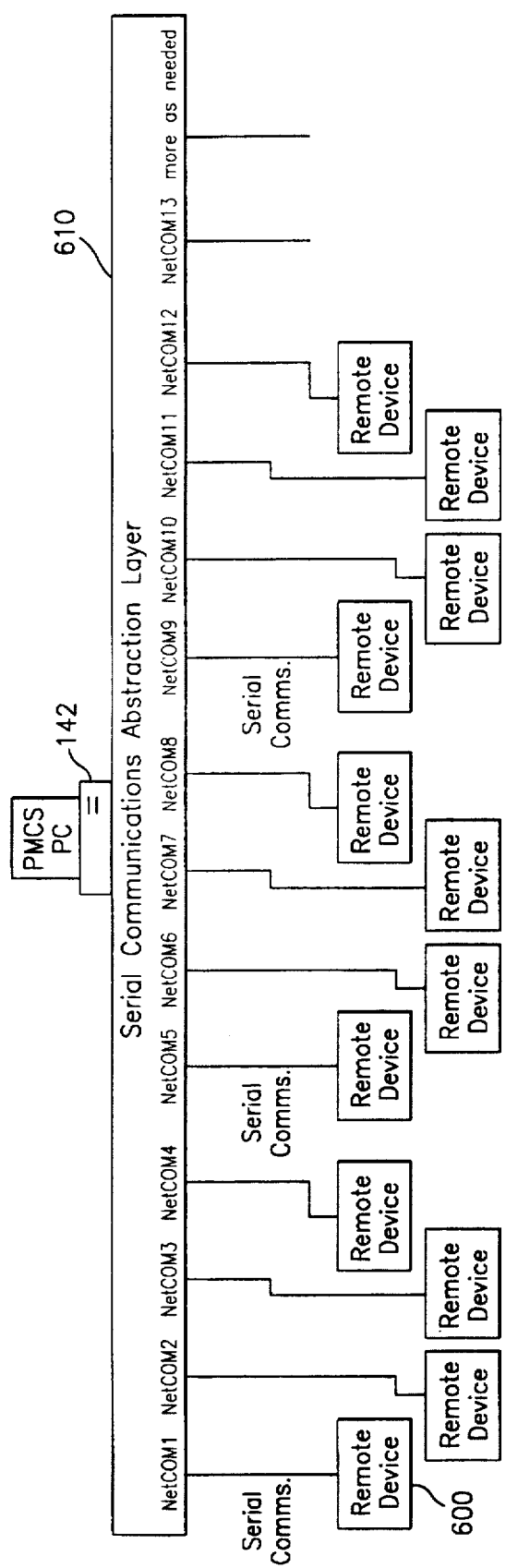
FIG. 68 is a block diagram of the virtual interconnection between a computer and a plurality of remote devices in a power management control system.

In accordance with the present invention, the Ethernet LAN and the Ethernet gateways 150 are abstracted into a set of network virtual communication ports. As shown in FIG. 67, the communication ports of the Ethernet gateways 150 are represented by a serial communications abstraction layer 610. The remote devices 600 are accessed through one of the network virtual communication ports represented in the serial communications abstraction layer 610. This allows the user to visualize these ports as if they were physically located at the computer 142 rather than the Ethernet gateways 150.

Advantages of the network virtual communication ports include; simplified addressing of the monitoring devices that communicate serially; simplified computer software; and allowance of greater code re-use and compatibility between this system and other systems which access serial ports directly from the computer.

The power management and control system also includes a DDE server simulator for simulating supervisory management and control of electrical distribution systems. The DDE server simulator is an alternative DDE server which simulates device values rather than acquiring data from real devices. The DDE interface to the client is identical to the interface with the server, except that the DDE server simulator does not display I/O traffic. The DDE server simulator generates and calculates device data from user generated electrical property profiles and updates DDE compliant clients. The DDE server simulator has the capability to simulate up to, e.g., 300 Modbus devices and supports clients such as Wonderware's Intouch 5.0, MS-Excel and DDE client applications capable of message passing. The DDE server simulator allows the user to completely setup and test the user interface for a system without being attached to the actual network and devices.

The DDE server simulator accepts the actual topics and item names. The profiles are user configurable with an option to apply white noise to the data, which provides true-to-life values to the user. These simulated measured values are used to calculate derived parameters and pre-set arrays provide wave form data in the proper format. Device events and trips can be interjected by the user and properly interpreted by the simulator. The data is passed to the clients via DDE. The DDE server simulator can accept up to, e.g., 300 different topics at a time and shares the system topic and device configuration files with the DDE server. This system aids in the creation of supervisory control and data acquisition applications for electrical distribution components metering and monitoring. The DDE server simulator allows users to create and test a supervisory control and data acquisition system's graphical interface without being connected to the actual network or the devices.

The DDE server simulator simulates the modbus register maps of the electrical distribution, monitoring, and control devices. The DDE server simulator also uses the same base configuration as the DDE server (described hereinbefore) and simulates the behavior of a number of communicating devices without being connected to a network. Some of the key features of DDE server simulator are: user configurable power simulation profiles and topic setup parameters; mnemonic cross reference between register items and standardized, alphanumeric parameter names; consistent device event and trip simulation for dissimilar devices; consistent waveform analysis interface and simulation between dissimilar devices; and generic support for any Modbus RTU compliant device.

Figure 69:
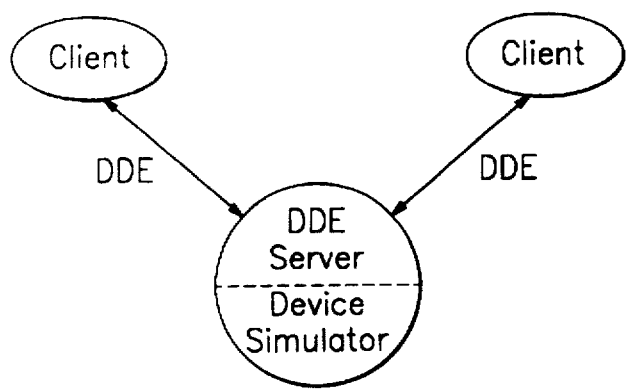
FIG. 69 is a diagram of the relationship between clients and a DDE server simulator.

FIG. 69 shows the general overview of the relationship between the DDE clients and the DDE server simulator. As previously discussed, the dynamic data exchange (DDE) is a method of communication which allows concurrently running programs to exchange data. The DDE server is a program which accepts requests for data items and supplies requested data to client program using DDE. The DDE client is a program which requests data items from DDE server and accepts data through DDE.

The DDE server simulator generates data for devices configured by the user and supports the same devices discussed hereinbefore with respect to the DDE server.

The DDE server simulator receives different types of inputs. The first type of input is DDE messages which are received from the clients and mainly comprise a request to send data as identified by Topic and Item name. These messages may also be for setpoint download to the data point identified by Topic and Item names. For example, for an EPM meter, the DDE message is GE16MODB |EPM1 |VOLT, where GE16MODB is the application name for the DDE server, EPM1 is meter identification name (Topic), and VOLT is a voltage (Item). Devices to be simulated by DDE server simulator will be based on topics configured by the user. A second type of input is configuration data which includes device configuration parameters, device register-map configurations, protocol timer intervals, and protocol time-outs which are input through a configuration utility.

The DDE server simulator consists of modules for performing configuration, simulation of device functions, and servicing DDE clients. The user has to configure server specific parameters and simulator specific parameters which include topic configuration and server operational parameters. The server specific configuration data is stored in initialization files and other configuration files. Examples of server specific configuration data are device address, topic name configuration, device register map, invalid register addresses, and timer values such as protocol timer intervals and protocol time-out values.

There are five DDE server simulator specific configuration parameters. In general, all the register values are accessible through a common interface for all devices. The common interface allows the user to read/write register content as long integer, integer or a float value. Also, read/write of integer values as signed decimal, unsigned decimal, hexadecimal or BCD values is provided. Long integer values are accessible as signed decimal, hexadecimal, BCD or Unix Time Value. A long integer value in, e.g., Unix Time registers is converted to be shown as date and time value. Date and time entered by user for Unix Time registers are converted to Unix Time value format and written as long integer value. It is possible to manipulate individual register items through the common register map interface. It is also possible to store current register values for each topic in disk files and load register values with stored data at a later time. For each device type, the register map is fixed according to the map of the device.

The user is required to input event code to generate an event. The DDE server simulator supports event generation for the device types with event definition in register map.

Tripping actions are supported through user inputs through an appropriate user interface. The user is not be required to set specific register values to generate trip conditions.

The DDE server simulator supports pulse, step, sinusoidal, saw tooth and triangular profiles which are user selected. The user selected profile is plotted graphically. A random noise with user defined band is applied to the data values. In an exemplary embodiment, the noise applied is white noise. It is also possible to save all the profile settings for each device and reload them from a file.

Simulation of measured parameters can be stopped by the user by selecting a 'freeze' option and resumed by selecting an 'unfreeze' option.

The DDE server simulator simulates supervisory management and control of an electrical distribution system. It should be noted, however, that the simulation of the data produced by remote power control and monitoring devices is not necessarily intended to match the field device characteristics in terms of accuracy and entirety. Communications between the DDE server simulator and the client(s) conforms to the DDE topic and item name conventions, allowing DDE clients to be able to handle data coming from the simulator without any changes. The DDE server simulator simulates parameters for devices which have been configured by user. By using a timer, the DDE server simulator finds the instantaneous values of all measured parameters from a simulated profile for all configured devices every 'n' milliseconds. Instantaneous values are filled in the corresponding registers of a simulated register map of the device. Computed parameter values are also determined and filled at every 'tick' of timer. Programmed inputs are accepted from the DDE server simulator configuration utility and applied to simulated register maps whenever they are given by user.

For all configured devices, measured parameter data is simulated according to the user selected profile combined with the random noise level input by the user. In addition to these, instantaneous simulated values are dependent on the profile length selected by the user. Simulation for a device is stopped upon a 'freeze' request and resumed on an 'unfreeze' request from the user. These measured parameters are parameters which are actually measured by the device being simulated. Simulation for parameters of this category is done by updating registers of a simulated register map with instantaneous values of a profile. The DDE server simulator assigns a default profile to measured parameters of each simulated device. The user can change this to any supported profile of his/her choice. Supported profiles, as described above, are sinusoidal, pulse, triangular, ramp and saw tooth.

All computed parameters are simulated by combining instantaneous values of measured parameters using empirical equations. Computation is automatically stopped on "freezing" simulation of measured parameters. These parameters are computed from the instantaneous values of measured parameters using an applicable empirical formula. Computed parameters are updated to registers of a simulated register map. For, some specific parameters (e.g., hour counters), a user can choose an "increment by 'N'" option.

Any parameter that needs accumulation of values (e.g., energy) shall be generated using an increment value defined in the profile dialog boxes. The value shall be incremented by the amount specified by user every time the simulator computes values for computed parameters. For example, if a user has specified that the KWH increment is 1 unit then, every time selected computed parameters are updated the simulator will increment KWH register value by 1.

Programmed parameters are either values configured by user or setpoints downloaded from a DDE client. When simulation for measured parameters is "frozen", all parameters are programmed parameters until simulation is resumed. All registers of the simulated register map of a device are available for viewing by the user. Where a register allows modification (read/write or write only), the user can also modify contents of that register through the device simulation interface. The DDE server simulator allows the user to generate abnormal field conditions such as relay trip condition, event occurrence, clearing measured/computed parameters etc., through an interface provided by device simulator screen. A list of measured, computed and programmed parameters for each device is provided below.

Setpoint download will be handled by changing appropriate setpoint value registers in the simulated register map of the devices.

Write requests for coils are acknowledged positively by the DDE server simulator. Coils status is changed to requested status. If a coil is only a write only coil, its register content is not modified. Where applicable, command's effect on other relevant registers of devices is simulated. Commands to be handled this way are listed under simulation parameter list below.

When a request for waveform capture/recording is received, simulated register maps of corresponding devices are filled with a template of waveform capture/recording data. Waveform recording (WFR) and Waveform capture (WFC) are supported for the PML 3720. Waveform capture is supported for the PML 3710 and PL Meter. In response to LoadSetpoint or ArmWFR commands from the DDE client, WFC/WFR data are recorded from the waveform template values. The data is updated in the corresponding registers, and the availability items, WFR_AVAIL, PML_WFC_AVAIL, PML_WFR_AVAIL, are set. Similarly, trigger WFC/WFR manual commands update registers with the data. Upon receipt of the retrieve command from DDE clients, the simulator forms the proper string from register data and supply the data under the appropriate waveform data item.

Using the event code as input by the user, the time stamp is applied, the event code loaded into the proper register and the event counter register is updated. When the event link is established, the simulator supplies the appropriate event item. The number of event registers supported for devices is the same as the ones supported by individual devices (i.e., as specified in the corresponding register maps). On user request for trip simulation, corresponding register values are set to simulate trip conditions.

The DDE simulator provides the updated measured, computed and programmed parameter data to the DDE clients upon request. The DDE server simulator also retrieves commands from DDE clients and forms the proper string from register data and supply data under the appropriate waveform data item. Additional data to be updated on request includes appropriate setpoint registers in response to setpoint download requests from client, waveform record/capture data to DDE clients and all register values in the device register maps to DDE clients. The user will be able to access simulated data points of DDE link using register address of items. Only mnemonics can be used in the case of special items such as event, status etc. Additional outputs include: register contents on device simulator screen; instantaneous values of parameters of selected device on device simulator screen; profile being used for simulation of measured parameters along with superimposed noise on device simulator screen; simulator configuration handling; data value update to clients for active topics and items; configuration dialog box handling for user requests to configure server simulator; server simulator execution and termination on user request from main menu.

Figure 69A:
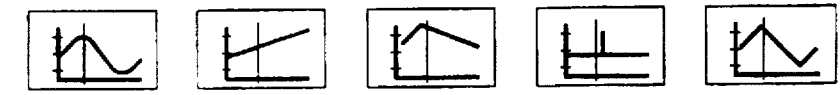
FIG. 69A is a view of a load profile window for use with the DDE server simulator.
Figure 69B:
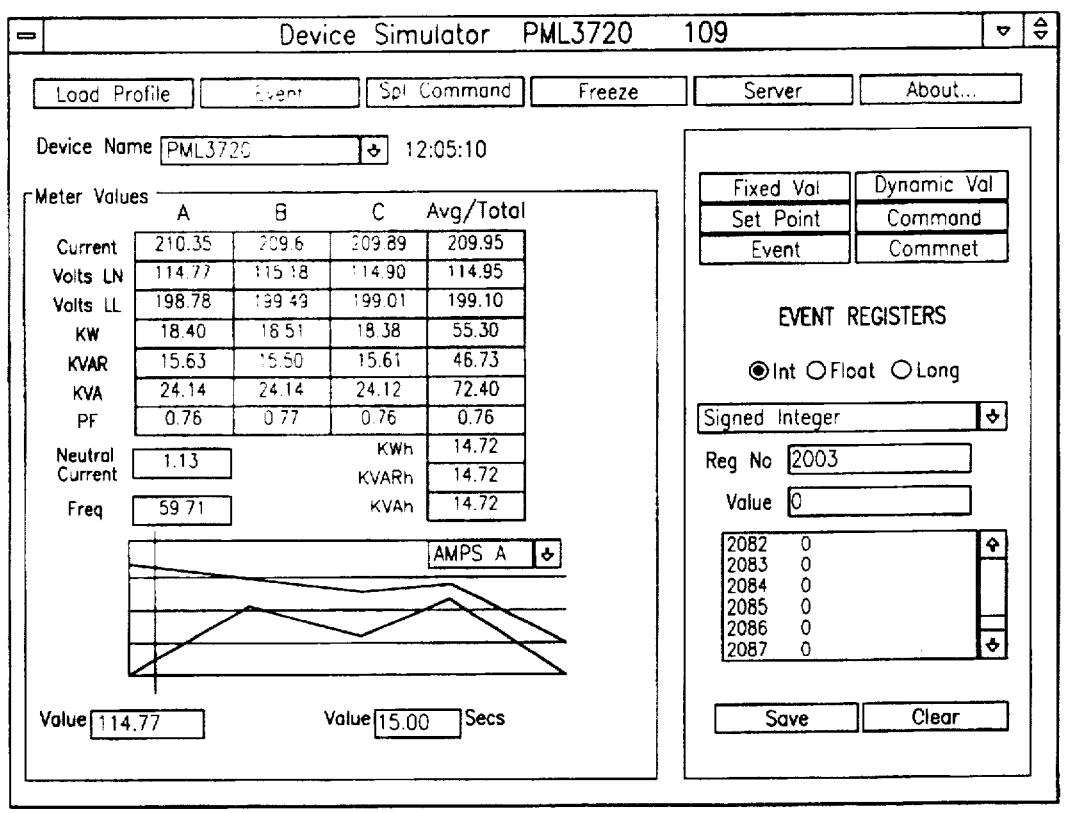
FIG. 69B is a view of a device simulator window for use with the DDE server simulator.

FIG. 69B illustrates a device simulation screen for one of the devices described below (i.e., PML3720). The device simulator screen allows the user to enter the configuration data discussed above.

The user can define a profile of the data to be used in the DDE server simulator. The DDE server simulator supports pulse, step, sinusoidal, saw tooth and triangular profiles. FIG. 69A illustrates a screen for defining the data profile. The user selects the profile shape and various parameters of the profile as shown in FIG. 69A. The user can choose any of these profiles for the measured parameters. The user selected profile will be plotted graphically and a random noise with a user defined band shall be applied to the data values. In an exemplary embodiment, the noise applied is white noise. It is also possible to save all the profile settings for each device and reload them from files. The configuration parameters and properties for each profile are explained below.

Pulse start time will be configured by user. Pulse duration for the parameter is configurable in terms of seconds. Pulse height of the parameter is also configurable. At the given pulse start time, a parameter value is taken to user configured value. At the end of configured pulse duration, the parameter value will be brought back to normal value. Normal value of the parameter is also configurable by the user. The actual value of the parameter at any moment will depend on the white noise added to the pulse function profile.

Step start time is configured by user. Step height of the parameter is also configurable. At the given step start time, the parameter value is taken to be the user configured value. The actual value of the parameter at any moment will depend on the white noise added to the step function profile.

Sinusoidal profile's frequency (cycle time), peak to peak range and average value is configured by the user. The cycle time is in multiples of minutes and peak values are absolute values. Whenever system starts, the simulation starts at that moment with a reference time value of 0. The actual value of the parameter at any moment depends on the white noise added to the sinusoidal function profile.

Saw tooth profile's frequency, maximum value and minimum value are configured by user. The cycle time is in multiples of minutes, and maximum and minimum values are absolute values. Whenever the system starts, simulation will start at that moment with a reference time value of zero. The actual value of the parameter at any moment depends on the white noise added to the saw tooth function profile.

Triangular profile's frequency, maximum and minimum values are configured by the user. The cycle time is in multiples of minutes and peak values are absolute values. Whenever the system starts, simulation starts at that moment with a reference time value of zero. Actual value of the parameter at any moment will depend on the white noise added to the triangular function profile.

In general, all the register values associated with the simulated power control and monitoring devices shall be accessible through a common interface for all devices. It is possible to manipulate individual register items through the common register map interface.

The DDE server simulator will support event generation for the device types with event definition in register map. A user interface is provided for event generation through which the user may input/select an event code. Time stamping of event, loading the event code into the proper register and maintenance of event counter register is performed by the DDE server simulator. When the event link is established, the DDE server simulator shall supply the appropriate event item. The number of event registers supported for devices shall be same as the ones supported by individual devices (i.e.. as specified in the corresponding register maps).

Relay tripping actions are also supported through a user interface. The user is not required to set specific register values to generate trip conditions. Selecting the user interface controls sets the required register with the proper values for trip condition.

The user interface includes dialog boxes allow selection of profile parameters and noise characteristics of data values for each measured parameter. Also, any parameter that needs accumulation of values (e.g., energy) is generated using an increment value defined in the profile dialog boxes. The configuration dialogs are the same as that for DDE server. The topic configuration file formats are the same as that of respective DDE server configuration data file. Event generation and trip simulation are established as discussed above. A user interface is also provided for command coils of General Electric Company devices.

The DDE server simulator supports all the DDE_EXECUTE commands that are supported by the DDE SERVER. It also supports the same data formats for capture and recording of data items. Data supplied for a waveform is defined by a fixed template representing the requested amount of data. In an exemplary embodiment, the amount of data for waveform capture is 128 samples of one cycle for waveform capture. The amount of data for waveform recording is 16 samples of per cycle for 12/18/36 cycles for waveform recording based on device type and waveform depth that is setup.

Automatic capture and recording is supported in a limited way by immediately setting WFR_AVAIL. PML_WFC_AVAIL. PML_WFR_AVAIL items in response to LoadSetpoint or ArmWFR commands from the client. The LoadSetpoint command loads relevant setpoint registers with parameters supplied for the command. These commands move the above-mentioned template data to the corresponding registers.

A trigger WFC/WFR manual commands only updates registers with the template data. A retrieve command forms the proper string from the register data and supply data under appropriate waveform data item. A setpoint trigger from the simulator screen will not be supported for WFC/WFR.

Figure 70:
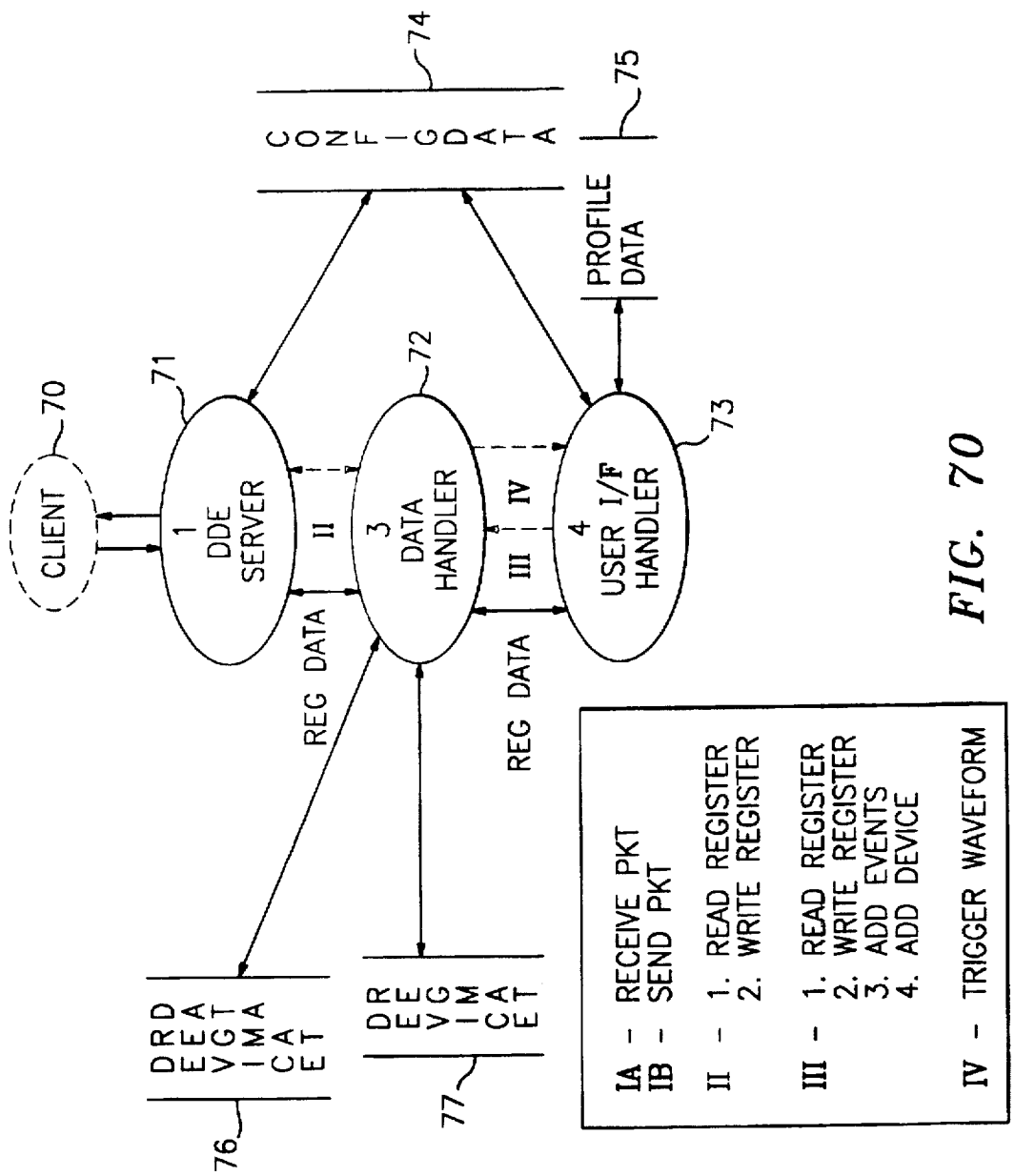
FIG. 70 is a diagram showing additional detail of the DDE server simulator of FIG. 69.

FIG. 70 is a block diagram of the DDE server simulator shown generally in FIG. 69. The DDE server simulator includes the DDE server module 71, a data handler module 72, and a user interface handler module 73. A device register map 77 and device register map data 76 are used by the data handler module 72. A configuration data file 74 is coupled to the DDE server module 71 and the user I/F handler module 73. A profile data file 75 also provides information to the user I/F handler module 73. Each of these elements is described below.

The data handler module 72 is an on-line module which handles all register map data for all the data being simulated and performs the following functions: establishes the register map for all devices being simulated; permits reading and writing of the register maps; performs event handling for all devices which supports events; performs command coils specific functions; triggers waveform commands to the user I/F handler module 73; saves register map data to files; and handles data in 32-bit format for PML 3710 and 3720.

The user I/F handler module 73 is an on-line module which handles user I/F for device simulation. The user I/F handler module 73 performs the following functions: setup all devices configured at server for simulation; provides user interface for event generation; provides user interface for special commands such as relay tripping, clear energy etc. generates data for measured and computed parameters using profiled data (sinusoidal, saw tooth, triangular, pulse, step profile) for user defined time intervals; provide user interface for viewing or changing register values for all type of devices; handles 32-bit mode processing for PML 3710 and 3720; user selected parameter is plotted graphically; displays measured and computed parameters instantly; allows freezing and unfreezing of simulation; and performs waveform capturing and recording.

The DDE server module 71 is an on-line module which sends/receives DDE messages to/from clients. The DDE server module 71 provides the following functions: receives messages from clients; sends message in appropriate query form to device simulator; receives response from device simulator; and updates active clients on all items requested by them.

The device register map 77 is a memory structure that contains device register map for all devices configured by the user. This is a two dimensional array of pointers to a structure which has following members: address of the device; pointer to device register map; handle of device register map memory; and pointer to next device structure.

Figure 71:
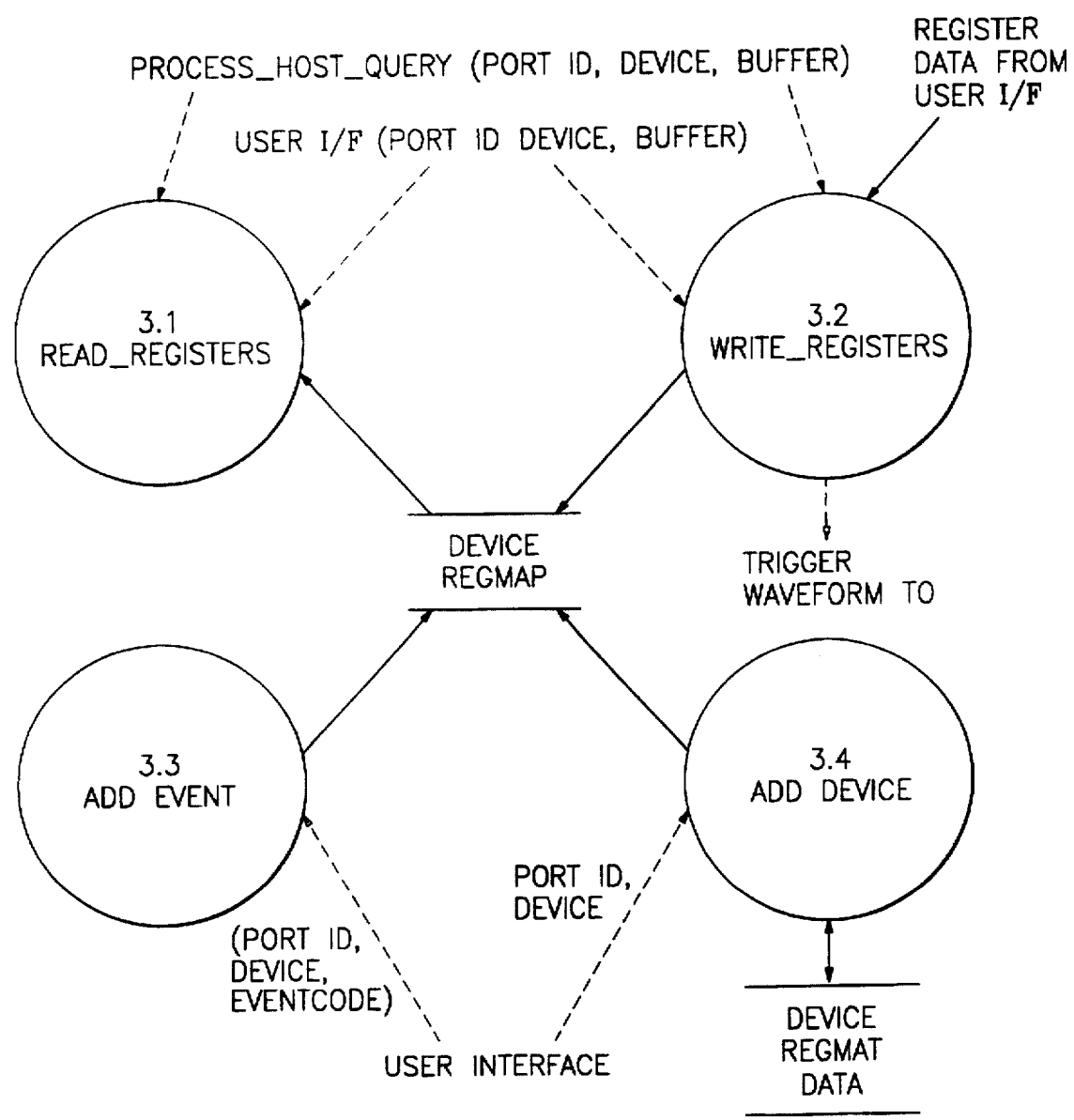
FIG. 71 is a diagram of the interaction between modules in the DDE server simulator.

The device register map 77 is dimensioned as 16 ports by 13 device types. Each pointer points to the head of a linked list which is ordered according to device address. The device register map data 76 stores data about the devices referenced in the device register map 77. The file structure of the device register map 77 contains device register data for all devices simulated during last run of the server simulator. The data is stored in 'device type' wise in different file. This data is loaded at start up. Each file contains following data: address of the device, port no., device type, and register data. FIG. 71 illustrates how the data handler module 72 interacts with the device register map 77 and the device register map data 76.

The configuration data file 74 is used in the user I/F handler module. It will provide data about all devices which are configured at the server. This data is loaded at start up of server simulator. The structure has the following members: port no. (1–16), device name, device type, address of the device.

The profile data file 75 This file structure contains user profile selection parameter of all devices, which were simulated, in last run of the server simulator. It will also provide information about measured type of profile which was last used by each device etc. The following data is loaded at startup of server simulator; device name; device type; all necessary parameter required for simulation of the parameters; and type of profile (step, pulse, triangular, sinusoidal, saw tooth).

Figure 72:
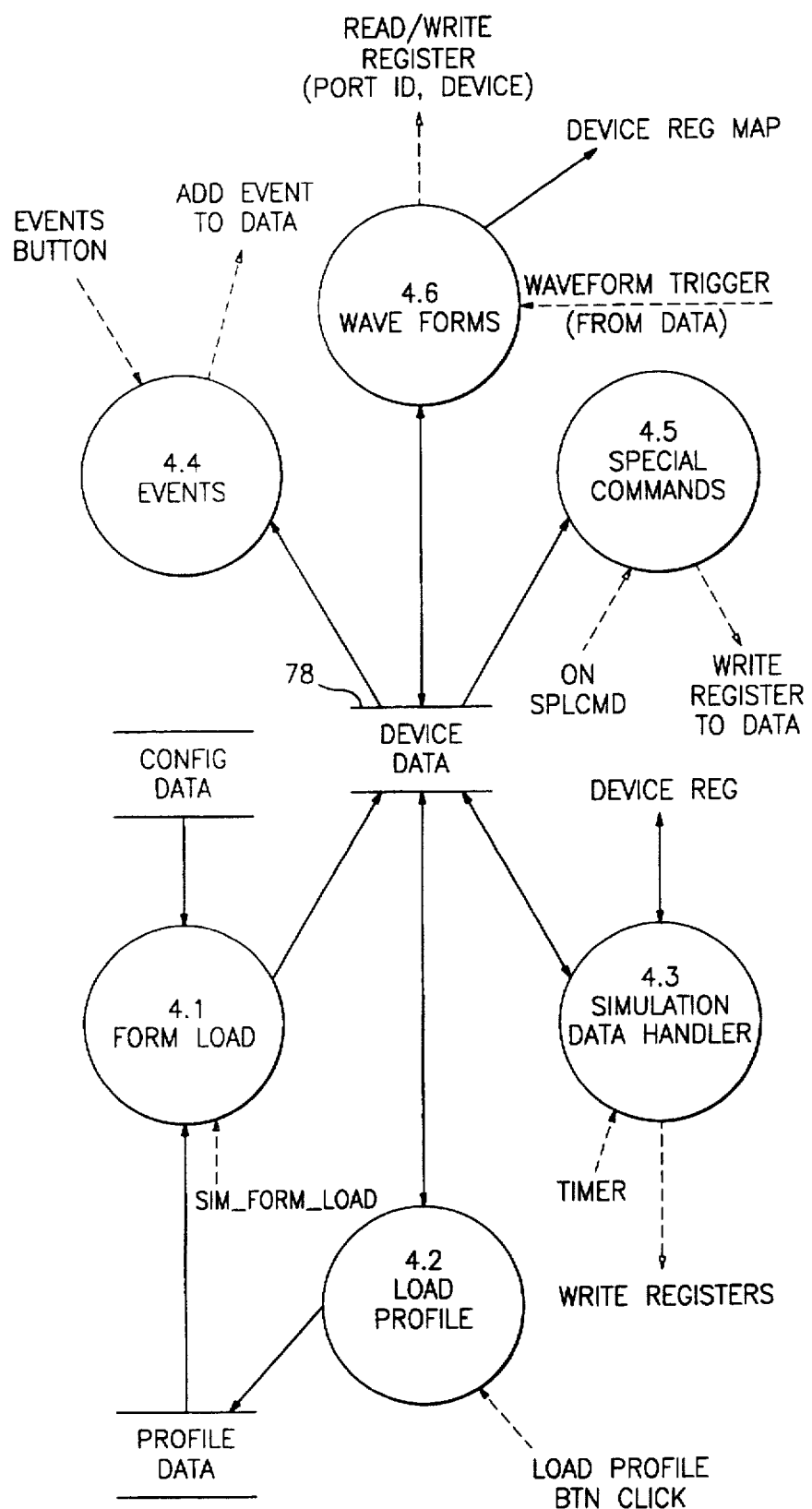
FIG. 72 is a diagram of the interaction between modules in the DDE server simulator.

FIG. 72 is a detailed view of the operations of the user I/F handler module 73 and various data files. A device data file 78 is a memory structure that is used by user I/F module 73. It will provide data about all devices being simulated. It will also provide information about measured and computed parameters for each type of device being simulated. The device data file 78 has the following members: port no. (1–16); device name; device type; address of the device; all measured and computed parameters for particular device; and type of profile (step, pulse, triangular, sinusoidal, saw tooth).

Figure 73:
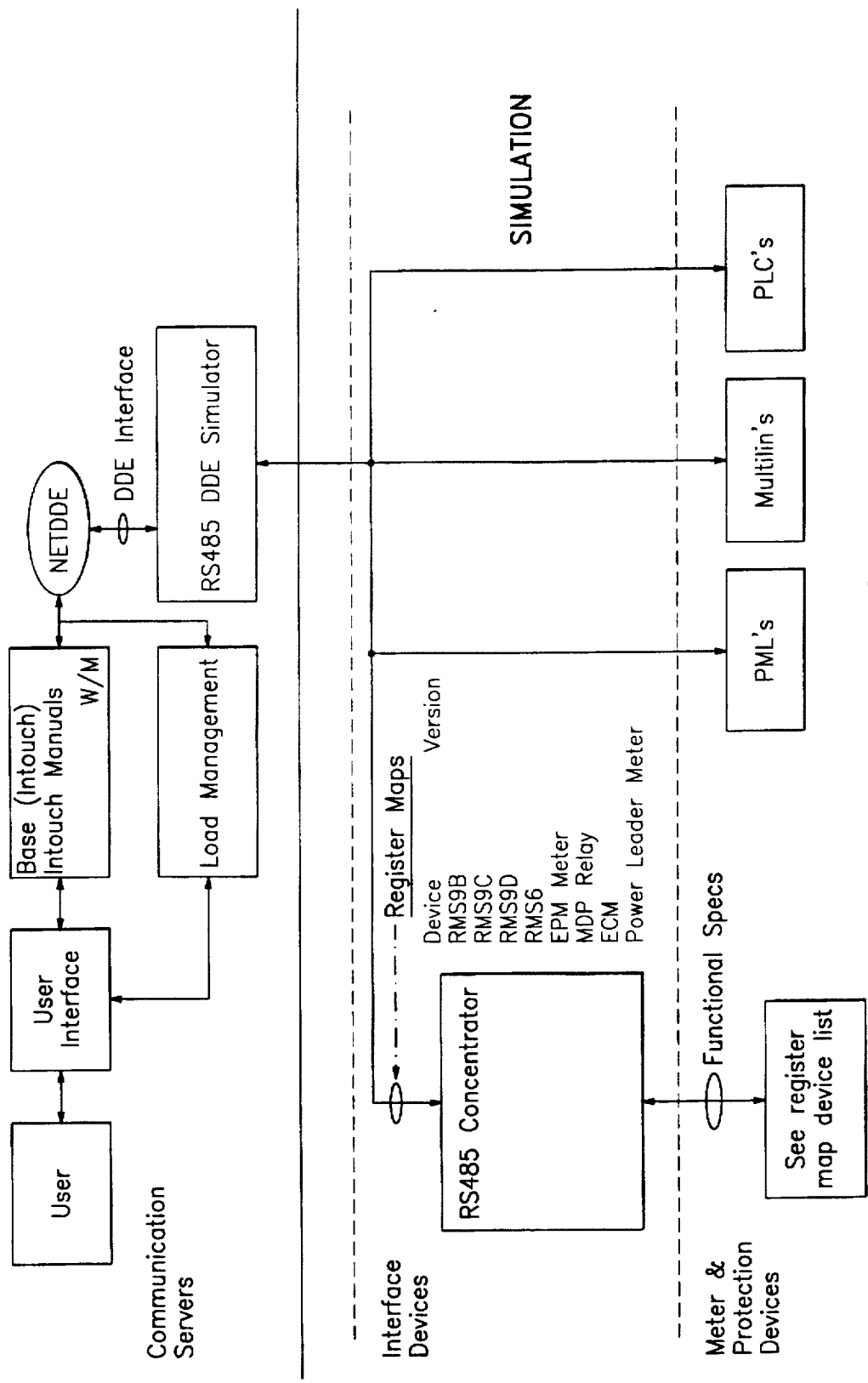
FIG. 73 is a block diagram of the DDE server simulator.

FIG. 73 is a block diagram which illustrates the system interconnections between the DDE server simulator and other components of the power management control system. The user interacts with the DDE server simulator through a user interface. Requests for information are sent to the DDE server simulator through a client software program (such as Intouch 5.0, MS-Excel). NetDDE facilitates the DDE between the client and the DDE server simulator. Communication to and from the user and the DDE server simulator is monitored by a load management device. The user interface to the DDE server simulator is similar to the user interface to the DDE server when physical (non-simulated) devices are being monitored. In the DDE server simulator system shown in FIG. 73, the devices illustrated as coupled to the DDE server simulator are not physical devices, but simulated devices. The simulated devices include direct connect devices (e.g., PML's, Multilin's, PLC's) and non-direct connect devices that are connected through a simulated concentrator.

The DDE server simulator provides a user the ability to create and monitor a power management control system without physically creating the system. The user interface for the DDE server and the DDE server simulator are substantially the same and the user can operate in either mode with ease. The user can also trigger events (e.g. relay tripping) and monitor the reaction in the power management control system. The DDE server simulator is a powerful tool that significantly reduces the expense in creating a viable power management control system.

Figure 74:
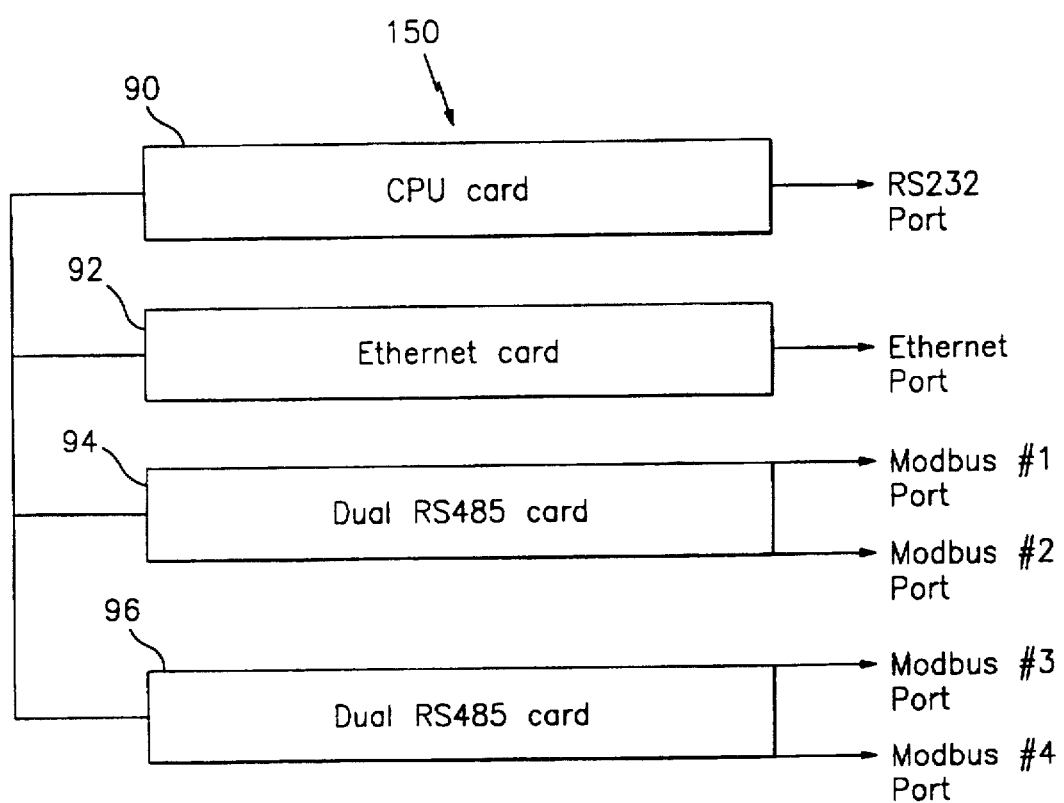
FIG. 74 is a block diagram of the Ethernet gateway shown in FIG. 2.

FIG. 74 is a block diagram of the Ethernet gateway 150 shown in FIG. 2. The Ethernet gateway 150 includes a central processing unit (CPU) card 90 which includes a microprocessor and memory for storing program instructions to be executed by the microprocessor. An Ethernet card 92 provides communications between the Ethernet gateway 150 (shown in FIG. 2) and the computer 142 (shown in FIG. 2) over the Ethernet network 148 (shown in FIG. 2). The Ethernet gateway 150 also includes two dual RS-485 cards for establishing the modbus ports which are connected to direct connect devices 130 (shown in FIG. 2) or a modbus concentrator 138 (shown in FIG. 2). The CPU card 90 includes software for configuring the Ethernet gateway 150 and executing Ethernet gateway diagnostics, both of which are described below.

Configuration of the gateway 150 requires a dumb terminal (not shown in the drawings) with RS232 port set to 19.2 kbps, 8 data bits, even parity, and 1 stop bit and a null modem cable. The dumb terminal is connected to the RS232 port of the CPU card 90 using the null modem cable. The Ethernet gateway 150 is then powered up. When the Ethernet gateway 150 finishes powering up the following message is transmitted to the dumb terminal:

Power up complete: Gateway active.

The following steps are then performed to configure the Ethernet gateway 150. The operator first types "SET<ENTER>" on the dumb terminal to bring up the configuration menu. If an error was made typing in this string, the operator should wait 10s and try again. This instruction begins execution of the Ethernet gateway 150 configuration program which allows the operator to configure the Ethernet gateway 150 parameters as desired. The operator may then exit and save the parameters. A stored configuration file is modified with the new parameters and the following message is sent to the dumb terminal:

Configuration saved.

The Ethernet gateway 150 is now configured and ready for operation. It may be turned off at this point.

A variety of Ethernet gateway 150 parameters may be configured through the configuration program. The operator may adjust the baud rate, parity setting, number of data bits and number of stop bits for each of the four RS-485 modbus ports shown in FIG. 74. Valid baud rates are 1200, 2400, 4800, 9600, and 19200. The number of data bits may be 7 or 8 and the number of stop bits may be none, 1 or 2. The parity setting may be set to none, even or odd. The configuration program allows the operator to define the gateway socket number and host socket number. The Ethernet gateway 150 has the ability to communicate with different types of Ethernet drivers such as IEEE or Dix. The configuration menu allows selection of the Ethernet frame type based on the type of Ethernet driver.

During gateway operation, the CPU card 90 may sent messages to the RS232 port for monitoring by the dumb terminal. The configuration program includes an option for enabling or disabling this message monitoring. Message monitoring on individual ports (e.g. 1, 2, 3 or 4) is also an option. There are also options for saving the configuration data, and discarding the configuration data.

The dumb terminal may also be used to update the Ethernet gateway 150 software. Selection of an appropriate menu item starts a transfer of the Ethernet gateway 150 software from the dumb terminal to the Ethernet gateway 150. In an exemplary embodiment, the transfer protocol is XMODEM. If an unrecoverable error occurs during transfer or cancel characters are sent from the dumb terminal (e.g., ctrl-C) then the transfer is aborted and the following message is sent to the terminal:

XMODEM transfer aborted—Press <ENTER>

If the XMODEM transfer completes successfully then the following message is sent to the terminal:

XMODEM transfer successful—Press <ENTER>

The configuration should then be saved and the system rebooted to activate the new software.

Configuration parameters may also be communicated to the Ethernet gateway 150 over the Ethernet network 148 (shown in FIG. 2) coupled to Ethernet card 92. Messages to configure system parameters over the Ethernet network are sent to the Ethernet card 92 by appending a header with the device number set to 0F hex and the error status byte set to 00 hex to a message containing configuration parameters. Each data byte in the message corresponds to one configuration parameter. The configuration parameters which may be set over the Ethernet network include the baud rate, the number of data bits, the number of stop bits, and the parity setting of each of the modbus ports of the RS-485 cards 94 and 96. Also included in the configuration parameters is a value for enabling or disabling message monitoring.

A configuration message containing a device number 0F hex and error status byte of 01 hex and no data will not change any configuration parameters but will prompt the Ethernet gateway 150 to send back the current configuration. If the Ethernet gateway 150 detects an error in a configuration message from the host then it sends a message with a device number of 0F hex and error status byte of 01 hex in the header and no data back to the host. In this case no parameters are modified.

As mentioned above, the CPU card 90 includes software for executing Ethernet gateway 150 diagnostics. The diagnostics include performing a loop back test to test of all the RS-485 ports established by cards 94 and 96 and performing a test of the Ethernet connection by doing an internal ping of the Ethernet gateway's IP address.

If monitor mode has been enabled during the Ethernet gateway 150 configuration, diagnostic messages sent to the RS232 port of CPU card 90 have the following format:

TTTTTTTT DDD *HH HH HH* *BB BB BB*<CR><LF>

Where: TTTTTTTT is the relative time of the message in timer ticks. This rolls over every 1000000000 timer ticks.

DDD is the direction of the message:

E-n, where n=1, 2, 3, or 4—Message from Ethernet to indicated RS-485 port.

n-E, where n=1, 2, 3, or 4—Message from indicated RS-485 port to Ethernet.

HH HH HH—Header bytes added to regular modbus message. Printed as two hex digits.

BB BB BB—Binary data of regular modbus message. Printed as two hex digits.

These configuration and diagnostic routines allow an operator to establish and modify various operating parameters of the Ethernet gateway 150. This allows the operator to configure and test the Ethernet gateway 150 prior to coupling it to direct connect devices 130 or modbus concentrators 138 (shown in FIG. 2). By testing the Ethernet gateway 150 prior to connecting direct connect devices or modbus concentrators, it is easier to determine the source of malfunctions in the network.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of generating a switchgear elevation window indicative of the actual switchgear, comprising:

selecting a cabinet wizard;

locating said cabinet wizard in a window;

selecting hardware wizards;

locating said hardware wizards in said window at the same relative positions on said cabinet wizard as the actual switchgear;

selecting a plurality of power monitoring or control device wizards; and locating said plurality of power monitoring or control device wizards in said window at the same relative positions on said cabinet wizard as the actual switchgear.

2. The method of claim 1 wherein each of said power monitoring or control device wizards has dialog box associated therewith, said dialog box providing a navigational link between said window and another window displaying detailed metering, configuration or control information for the actual corresponding power monitoring or control device.

3. The method of claim 1 wherein each of said power monitoring or control device wizards has a dialog box associated therewith, said dialog box providing a navigational link between said window and another window displaying all available detailed metering, configuration and control information for the actual corresponding power monitoring or control device.

4. The method of claim 2 further comprising:

logging alarms and events of said detailed metering, configuration or control information for the actual corresponding power monitoring or control device.

5. The method of claim 2 further comprising:

collating said alarms and events into a plurality of categories for analysis.

6. The method of claim 1 wherein said power monitoring or control device wizards include trip unit wizards, meter wizards, relay wizards or control device wizards.

7. The method of claim 1 wherein said hardware wizards include handle wizards, panels wizards, of fasteners wizards.

8. The method of claim 1 further comprising:

generating said power monitoring or control device wizards.

9. The method of claim 8 wherein said step of generating further comprises:

configuring setup data for each of said power monitoring or control device wizards.

10. The method of claim 8 wherein said step of generating further comprises:

assigning an identifier each of said power monitoring or control device wizards.

11. A method of waveform capture comprising:

collecting waveform data from a power monitoring device; and displaying at least two waveform parameters simultaneously on amplitude and phase axis.

12. The method of claim 11 wherein said at least two waveform parameters includes at least two of $I_a$, $I_b$, $I_c$, $I_n$, $V_a$, $V_b$, $V_c$ and $V_x$.

13. The method of claim 12 wherein said step of displaying at least two waveform parameters comprises displaying $I_a$, $I_b$, $I_c$, $I_n$, $V_a$, $V_b$, $V_c$ and $V_x$.

14. A method of generating a switchgear elevation window indicative of the actual switchgear, comprising:

selecting a graphical representation of a cabinet wizard;

locating said cabinet wizard in a window;

selecting a graphical representation of one or more hardware wizards;

locating said hardware wizards in said window at the same relative positions on said cabinet wizard as the actual switchgear;

selecting a graphical representation of a plurality of power monitoring or control device wizards; and locating said plurality of power monitoring or control device wizards in said window at the same relative positions on said cabinet wizard as the actual switchgear.

* * * * *